US009205754B2

United States Patent
Hyde et al.

(10) Patent No.: US 9,205,754 B2
(45) Date of Patent: Dec. 8, 2015

(54) COMMUNICATION AND CONTROL REGARDING ELECTRICITY PROVIDER FOR WIRELESS ELECTRIC VEHICLE ELECTRICAL ENERGY TRANSFER

(71) Applicant: Elwha LLC, Bellevue, WA (US)

(72) Inventors: Roderick A. Hyde, Redmond, WA (US); Jordin T. Kare, Seattle, WA (US); Richard T. Lord, Tacoma, WA (US); Robert W. Lord, Seattle, WA (US); Clarence T. Tegreene, Mercer Island, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 144 days.

(21) Appl. No.: 14/092,126

(22) Filed: Nov. 27, 2013

(65) Prior Publication Data

US 2015/0091506 A1    Apr. 2, 2015

Related U.S. Application Data

(63) Continuation of application No. 14/091,702, filed on Nov. 27, 2013, and a continuation-in-part of application No. 14/092,306, filed on Nov. 27, 2013, and a continuation-in-part of application No.

(Continued)

(51) Int. Cl.
*H02J 7/00* (2006.01)
*H02J 7/14* (2006.01)
(Continued)

(52) U.S. Cl.
CPC ........... *B60L 11/1848* (2013.01); *B60L 11/182* (2013.01); *B60L 11/184* (2013.01); *B60L 11/185* (2013.01); *B60L 11/1811* (2013.01); *B60L 11/1816* (2013.01); *B60L 11/1838* (2013.01);
(Continued)

(58) Field of Classification Search
USPC ......... 320/109, 108, 107, 104, 106, 152, 110, 320/112
See application file for complete search history.

(56) References Cited

U.S. PATENT DOCUMENTS 4,102,273 A * 7/1978 Merkle et al. .................... 104/34
5,202,617 A * 4/1993 Nor ............................... 320/130

(Continued)

FOREIGN PATENT DOCUMENTS

| JP | 2009/106136 A | 5/2009 |
|---|---|---|
| JP | 2010/246271 A | 10/2010 |
| JP | 2013/034323 A | 2/2013 |
| WO | WO 2009/113268 A1 | 9/2009 |
| WO | WO 2011/037322 A2 | 3/2011 |

OTHER PUBLICATIONS

PCT International Search Report; International App. No. PCT/US2014/066785; Mar. 16, 2015; pp. 1-4.

*Primary Examiner* — Edward Tso
*Assistant Examiner* — Alexis A Boateng

(57) ABSTRACT

A computationally implemented system and method that is designed to, but is not limited to: electronically assessing electricity provider detail information associated with providing electrical energy to one or more electric vehicle wireless electrical energy chargers configured for wirelessly charging one or more electric vehicles with electrical energy from the one or more electric vehicle wireless electrical energy chargers to the one or more electric vehicles, the one or more electric vehicles including one or more electric motors to provide motive force for directionally propelling the one or more electric vehicles. In addition to the foregoing, other method aspects are described in the claims, drawings, and text forming a part of the present disclosure.

43 Claims, 57 Drawing Sheets

Related U.S. Application Data

14/089,513, filed on Nov. 25, 2013, and a continuation-in-part of application No. 14/092,082, filed on Nov. 27, 2013, and a continuation-in-part of application No. 14/086,903, filed on Nov. 21, 2013, and a continuation-in-part of application No. 14/041,443, filed on Sep. 30, 2013.

(51) Int. Cl.
*B60L 11/18* (2006.01)
*H02J 7/02* (2006.01)

(52) U.S. Cl.
CPC ......... *B60L 11/1842* (2013.01); *B60L 11/1844* (2013.01); *B60L 11/1846* (2013.01); *B60L 11/1861* (2013.01); *B60L 2220/12* (2013.01); *B60L 2220/16* (2013.01); *B60L 2230/16* (2013.01); *B60L 2230/22* (2013.01); *B60L 2230/24* (2013.01); *B60L 2240/12* (2013.01); *B60L 2240/14* (2013.01); *B60L 2240/622* (2013.01); *B60L 2240/662* (2013.01); *B60L 2240/665* (2013.01); *B60L 2240/667* (2013.01); *B60L 2250/12* (2013.01); *B60L 2250/20* (2013.01); *B60L 2250/22* (2013.01); *B60L 2260/52* (2013.01); *B60L 2260/54* (2013.01); *H02J 7/00* (2013.01); *H02J 7/0027* (2013.01); *H02J 7/0054* (2013.01); *H02J 7/025* (2013.01)

(56) References Cited

U.S. PATENT DOCUMENTS

| | | | |
|---|---|---|---|
| 5,283,513 A | | 2/1994 | Fujita et al. |
| 5,349,535 A | | 9/1994 | Gupta |
| 5,585,205 A | * | 12/1996 | Kohchi ..................... 429/99 |
| 5,594,318 A | | 1/1997 | Nor et al. |
| 5,656,916 A | | 8/1997 | Hotta |
| 5,821,731 A | | 10/1998 | Kuki et al. |
| 5,927,938 A | * | 7/1999 | Hammerslag ............. 414/809 |
| 5,951,229 A | | 9/1999 | Hammerslag |
| 5,952,813 A | | 9/1999 | Ochiai |
| 5,998,963 A | | 12/1999 | Aarseth |
| 6,218,796 B1 | * | 4/2001 | Kozlowski ................ 318/280 |
| 6,614,204 B2 | | 9/2003 | Pellegrino et al. |
| 6,934,603 B1 | * | 8/2005 | Kochanneck .............. 700/245 |
| 7,201,384 B2 | * | 4/2007 | Chaney .................... 180/68.5 |
| 7,602,143 B2 | | 10/2009 | Capizzo |
| 2004/0142733 A1 | * | 7/2004 | Parise ...................... 455/572 |
| 2005/0002263 A1 | * | 1/2005 | Iwase et al. ........... 365/230.03 |
| 2008/0258682 A1 | | 10/2008 | Li |
| 2010/0145717 A1 | * | 6/2010 | Hoeltzel .................... 705/1.1 |
| 2010/0300323 A1 | | 12/2010 | Ennis |
| 2011/0057816 A1 | | 3/2011 | Noble et al. |
| 2011/0123309 A1 | | 5/2011 | Berdelle-Hilge et al. |
| 2011/0303509 A1 | | 12/2011 | Agassi et al. |
| 2013/0029595 A1 | * | 1/2013 | Widmer et al. ............. 455/39 |

\* cited by examiner

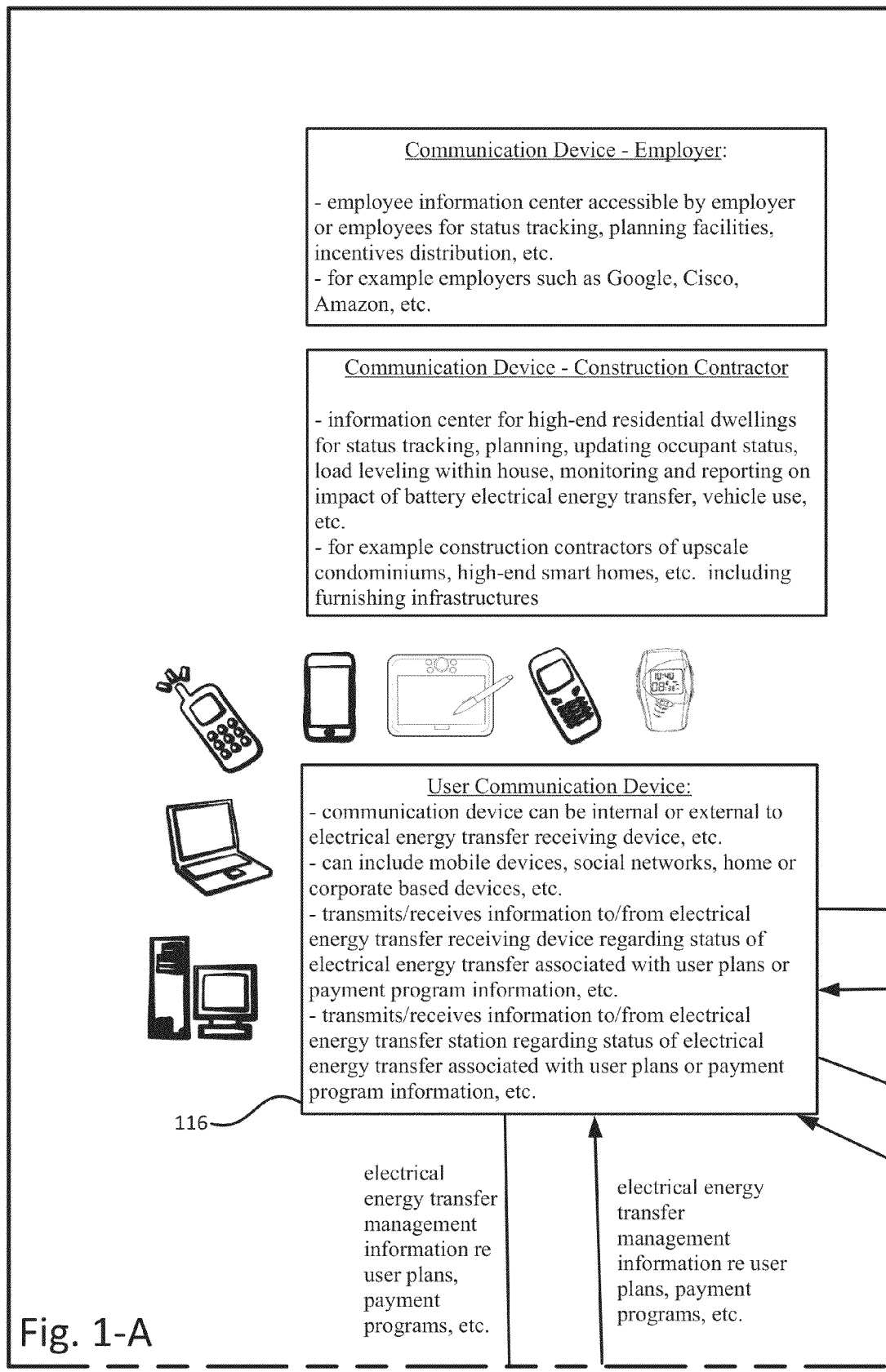
Fig. 1-A

Fig. 1-B electrical energy transfer management information re user plans, payment programs, etc.

electrical energy transfer management information re user plans, payment programs, etc.

electrical energy transfer management information re user plans, payment programs, etc.

electrical energy transfer management information re user plans, payment programs, etc.

Interface to Communication Device - Employer

- user interface to employee information center accessible by employer or employees for status tracking, planning facilities, incentives distribution, etc.
- for example employers such as Google, Cisco, Amazon, etc.

Interface to Communication Device – Construction Contractor

- user interface to information center for high-end residential dwellings for status tracking, planning, etc.
- for example construction contractors of upscale condominiums, high-end smart homes, etc. including furnishing infrastructures

User Interface of User Communication Device:

- visual or audio output re inquiries as to user's plans re use of electrical energy transfer receiving device to include itinerary or calendar of user or others to use the electrical energy transfer receiving device, plan can include payment plans, maintenance of device, etc.
- output can include information re status of current or planned electrical energy transfer as impacting user's plans, etc.
- interface can accept input from user re payment program, planned use of electrical energy transfer receiving device to impact method of electrical energy transfer such as fast or slow electrical energy transfer rates, etc.

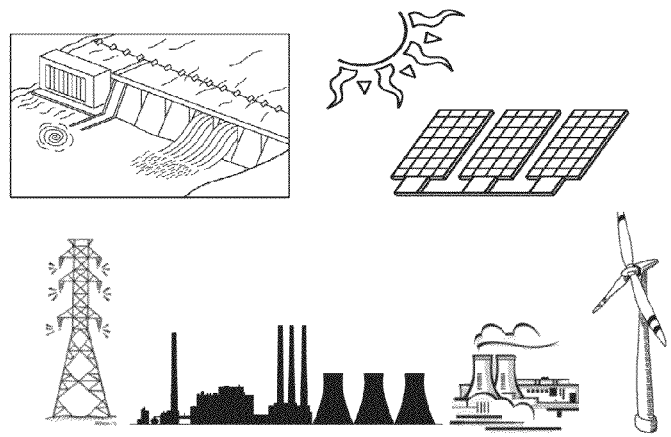

Electricity Provider Equipment:

For example electrical equipment manufacturers such as GE, Westinghouse, Siemens, or ABB For example electrical utilities such PG&E, So Cal Edison, etc.

electrical energy transfer management information re user plans, load sharing, payment programs, etc.

Electricity Provider:

- transmits/receives information to/from electrical energy transfer station regarding status of electrical energy transfer associated with load sharing, user plans or payment program information, etc.
- time and amount of use rate structures
- smart metering, power cycling to distribute load among electrical energy transferrs and other energy consuming devices electrical energy transfer management information re user plans, load sharing, payment programs, etc.

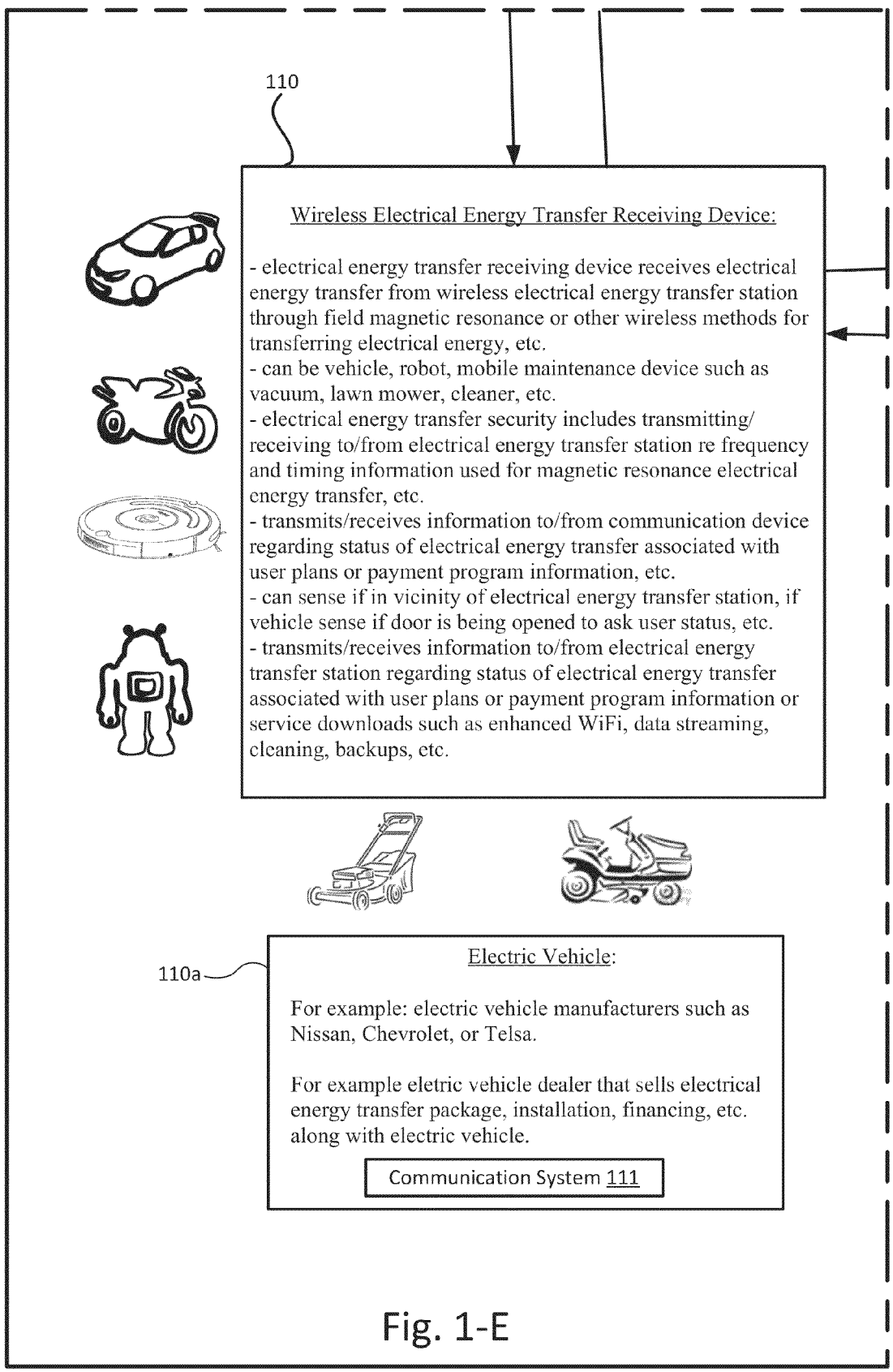
Fig. 1-E

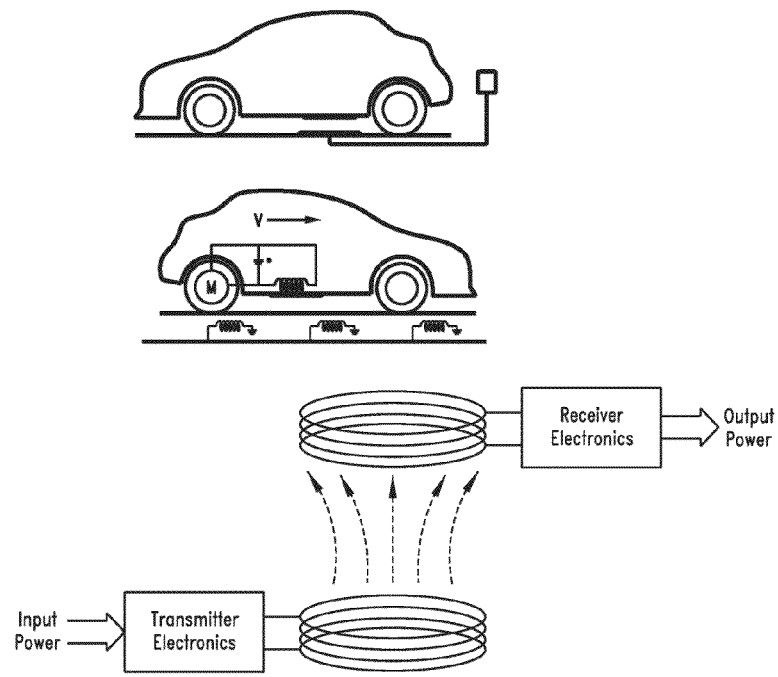
Fig. 1-F

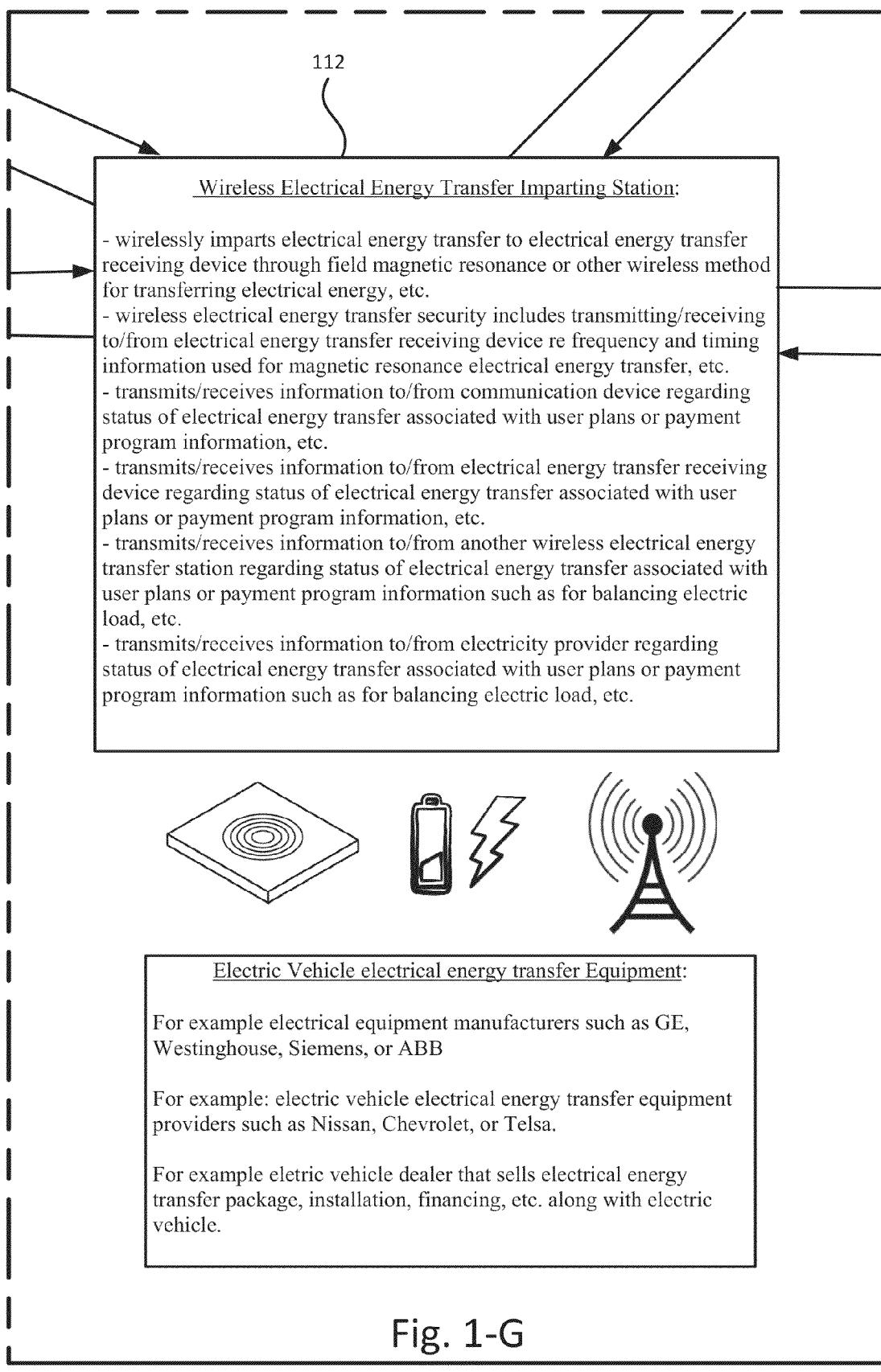
Fig. 1-G

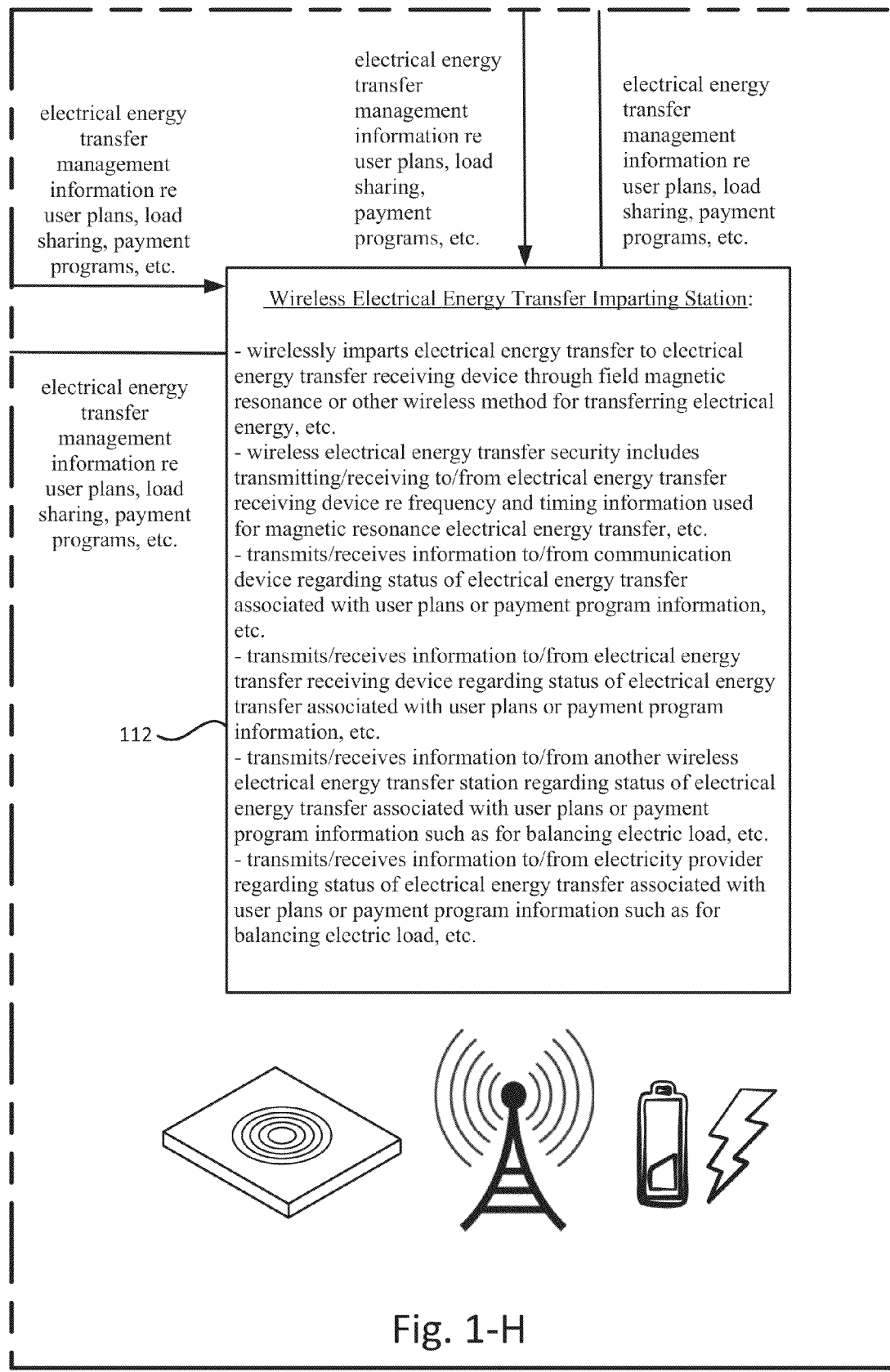
Fig. 1-H

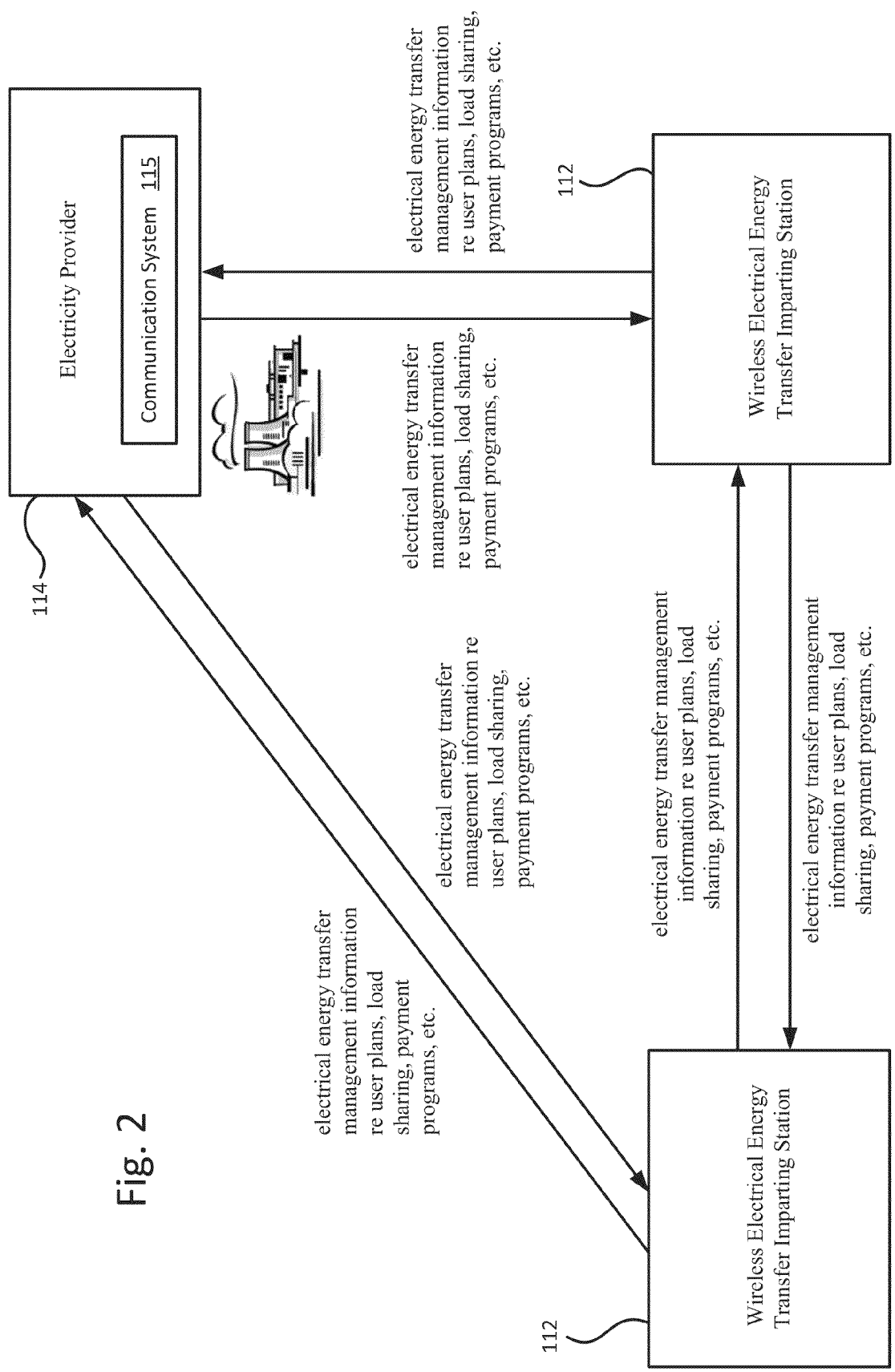

m10 processing module m11 electronically assessing electricity provider detail information associated with providing electrical energy to electric vehicle wireless electrical energy chargers configured for wirelessly charging electric vehicles with electrical energy from the electric vehicle wireless electrical energy chargers to the electric vehicles, the electric vehicles including electric motors to provide motive force for directionally propelling electric vehicles module m12 electronically requesting electric vehicle wireless electrical energy charger planning information of the electric vehicle wireless electrical energy chargers regarding indications of electric vehicle user activities involving the electric vehicles to be prepared for by wirelessly charging the electric vehicles with electrical energy from the electric vehicle wireless electrical energy chargers module m13 electronically outputting electric vehicle wireless electrical energy charger advisement information to the electric vehicle wireless electrical energy chargers based upon portions of the electricity provider detail information and based upon portions of electric vehicles wireless electrical energy charger planning information, electric vehicles wireless electrical energy charger advisement information regarding preparation of the electric vehicles for the electric vehicle user activities through electrical energy charging of the electric vehicles by the electric vehicle wireless electrical energy chargers module

Fig. 4

Fig. 5-A m11 electronically assessing electricity provider detail information associated with providing electrical energy to electric vehicle wireless electrical energy chargers configured for wirelessly charging electric vehicles...

m1101 assessing electricity provider detail information regarding generation of electricity associated with providing electrical energy to electric vehicle wireless energy chargers module m1102 assessing information regarding generation of electricity according to schedules involving time periods to switch from use of a first electricity generation source to a second electricity generation source module m1103 assessing information regarding generation of electricity according to schedules for generating electricity by an electricity generation source located on location of the electric vehicle wireless electrical energy chargers module m1104 assessing information regarding generation of electricity according to electric vehicle user selection of electricity generation sources to provide electrical energy to electric vehicle wireless electrical energy chargers module m1105 assessing information regarding generation of electricity according to financial status information for user accounts of electric vehicles module m1106 assessing information regarding generation of electricity according to electricity generation rate capacity of electricity generation sources module m1107 assessing information regarding generation of electricity according to electrical transmission capacity of network distribution from electricity generation sources to electric vehicle wireless electrical energy chargers module m1108 assessing information regarding generation of electricity according to planned use of electricity generation sources to service estimated charging service demand of a plurality of electric vehicles module m1109 assessing information regarding generation of electricity according to amount of time requested for providing electrical energy to electric vehicle wireless electrical energy chargers module m1110 assessing information regarding generation of electricity according to amount of electrical energy to be transferred to electric vehicles in a designated period of time by the electric vehicle wireless electrical energy chargers module

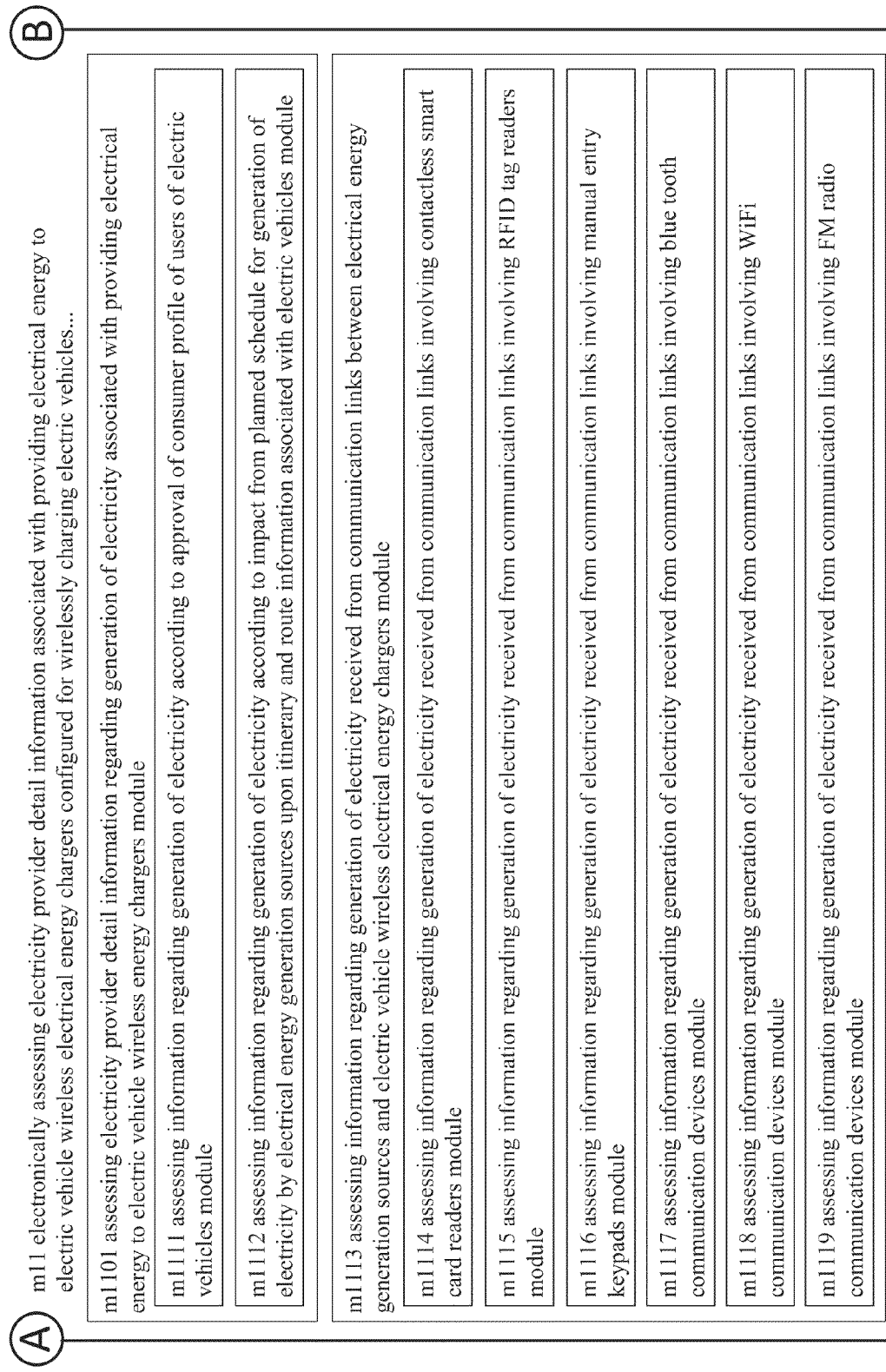
Fig. 5-B

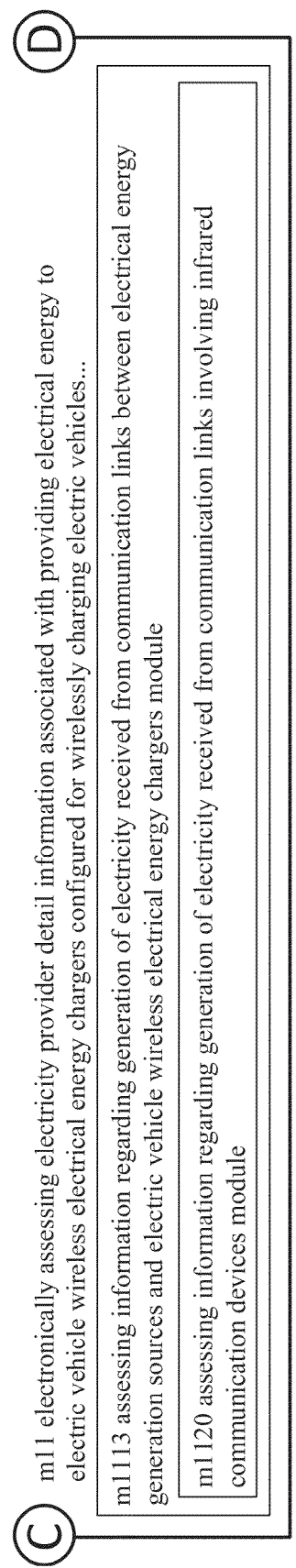
Fig. 5-C

Ⓑ m12 electronically requesting electric vehicle wireless electrical energy charger planning information of the electric vehicle wireless electrical energy chargers regarding indications of electric vehicle user activities...

m1201 requesting electric vehicle wireless electrical energy charger planning information wirelessly module m1202 requesting information of involving RFID tags module m1203 requesting information of involving blue tooth supported communication module m1204 requesting information of involving WiFi facilitated communication module m1205 requesting information of involving FM radio wave communication module m1206 requesting information of involving infrared supported communication module m1207 requesting information of involving direct non-wireless communication module m1208 requesting information of involving direct wire connections module m1209 requesting information of involving direct sound wave broadcasts module m1210 requesting information of involving overt action by the electric vehicle users module m1211 requesting information of involving employer databases module m1212 requesting information of involving electronic calendaring systems module

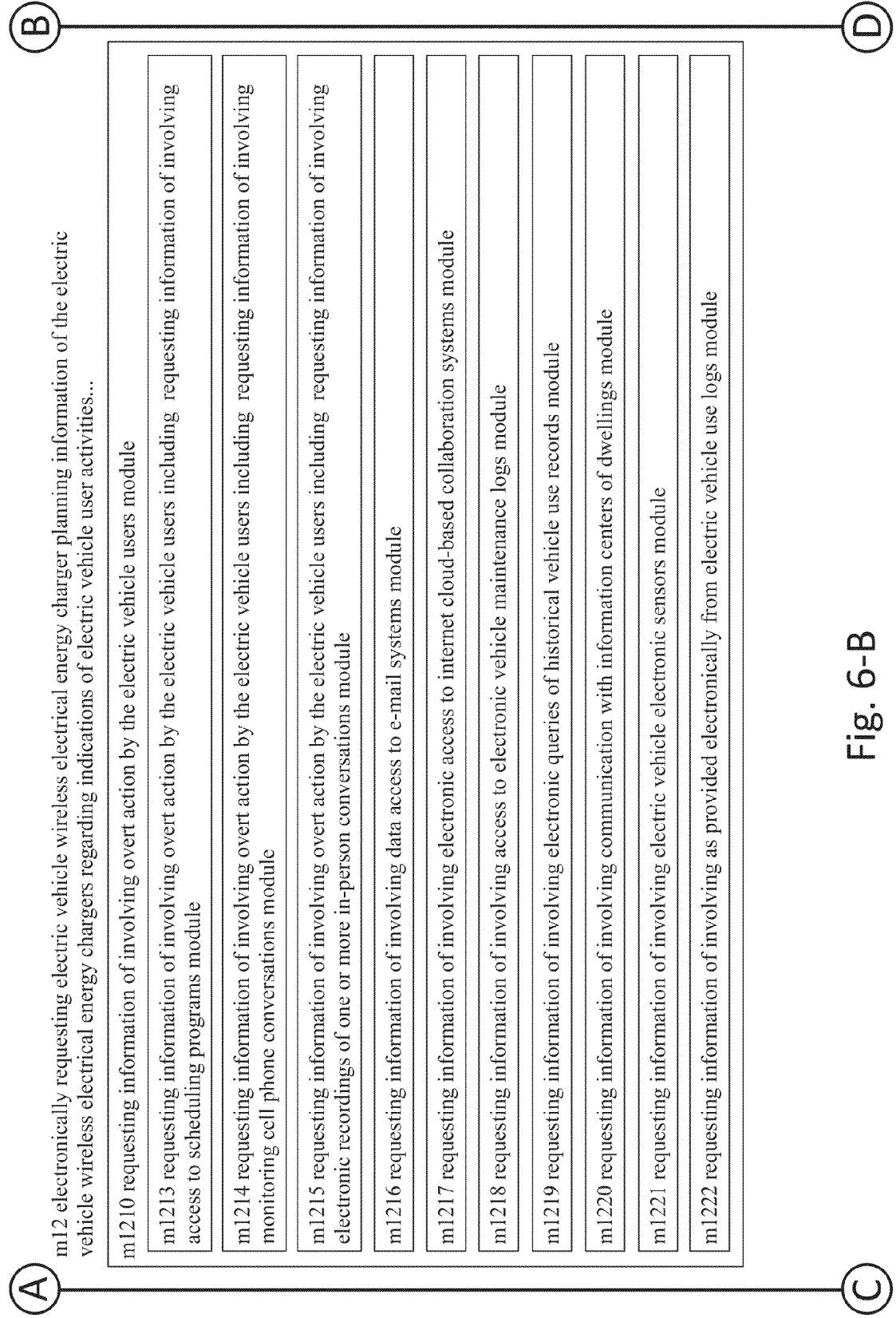
Fig. 6-B

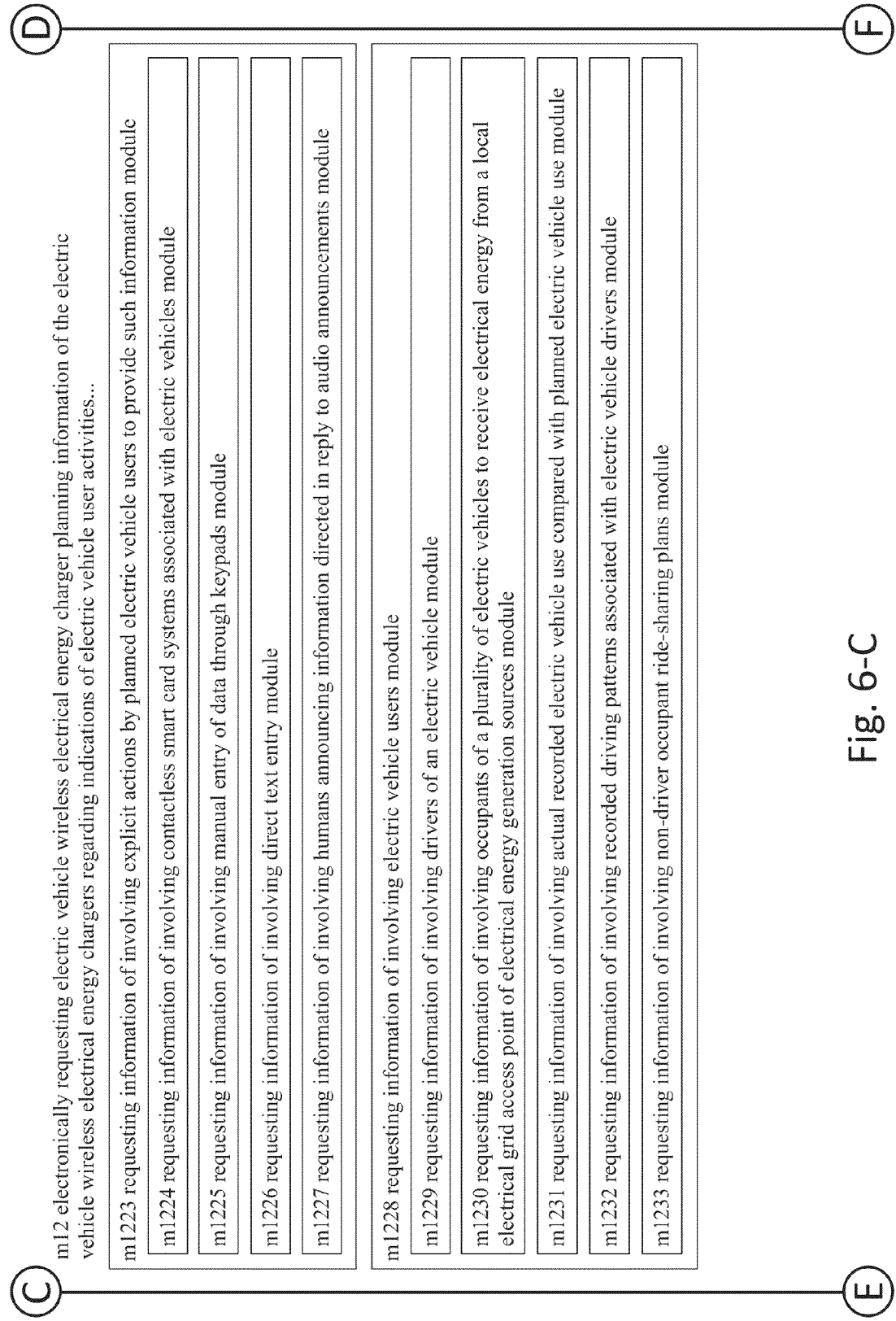
Fig. 6-C

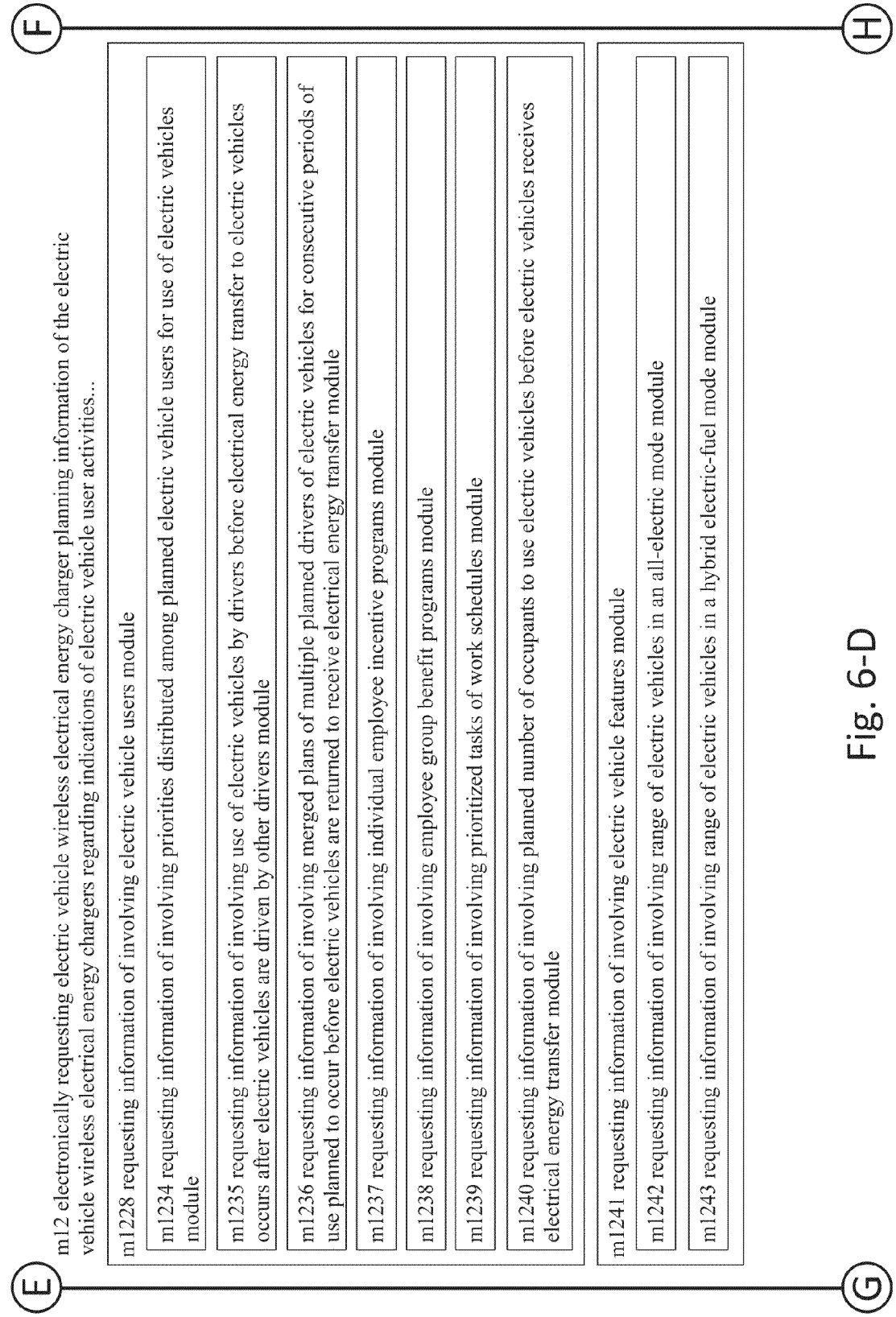
Fig. 6-D

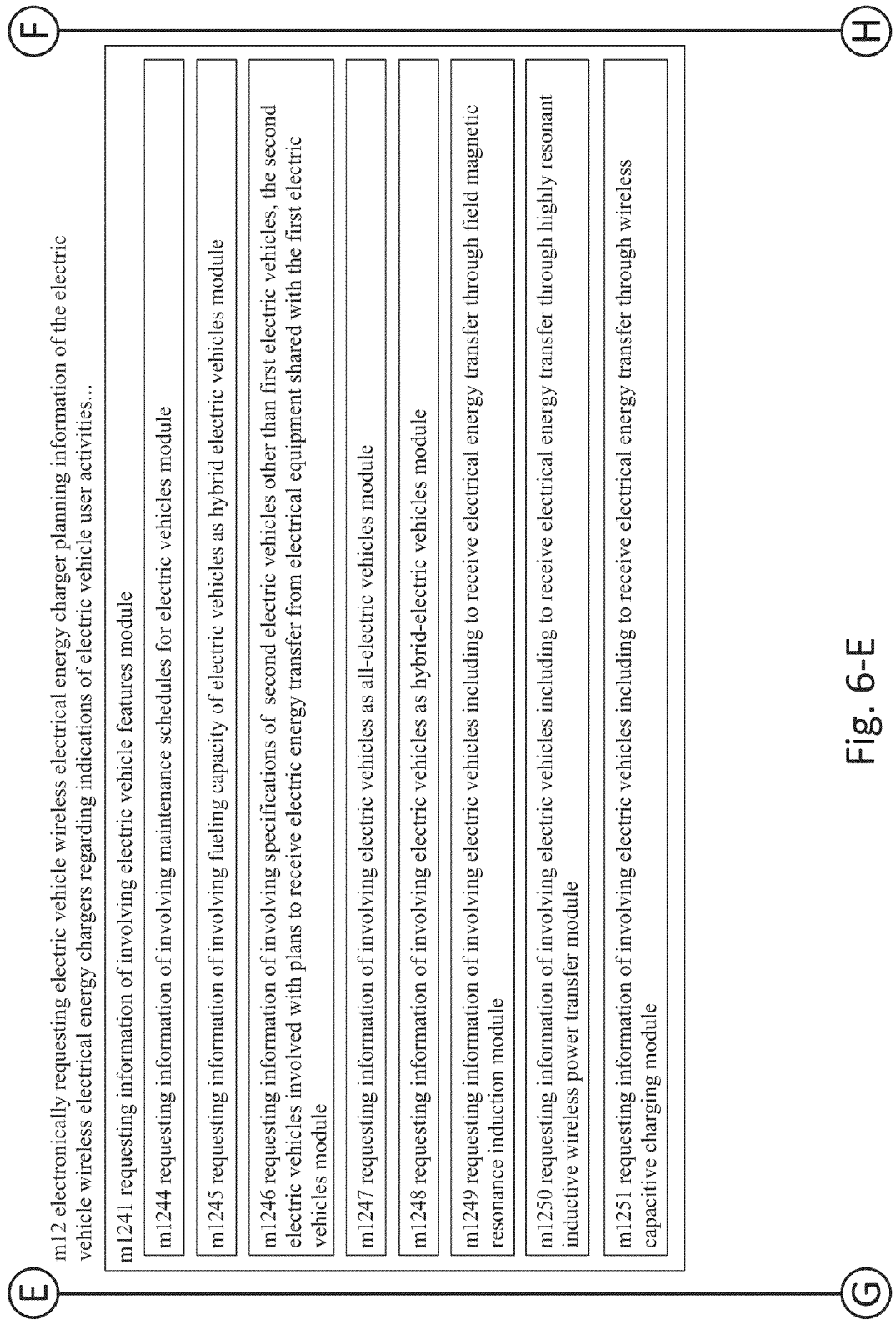
Fig. 6-E

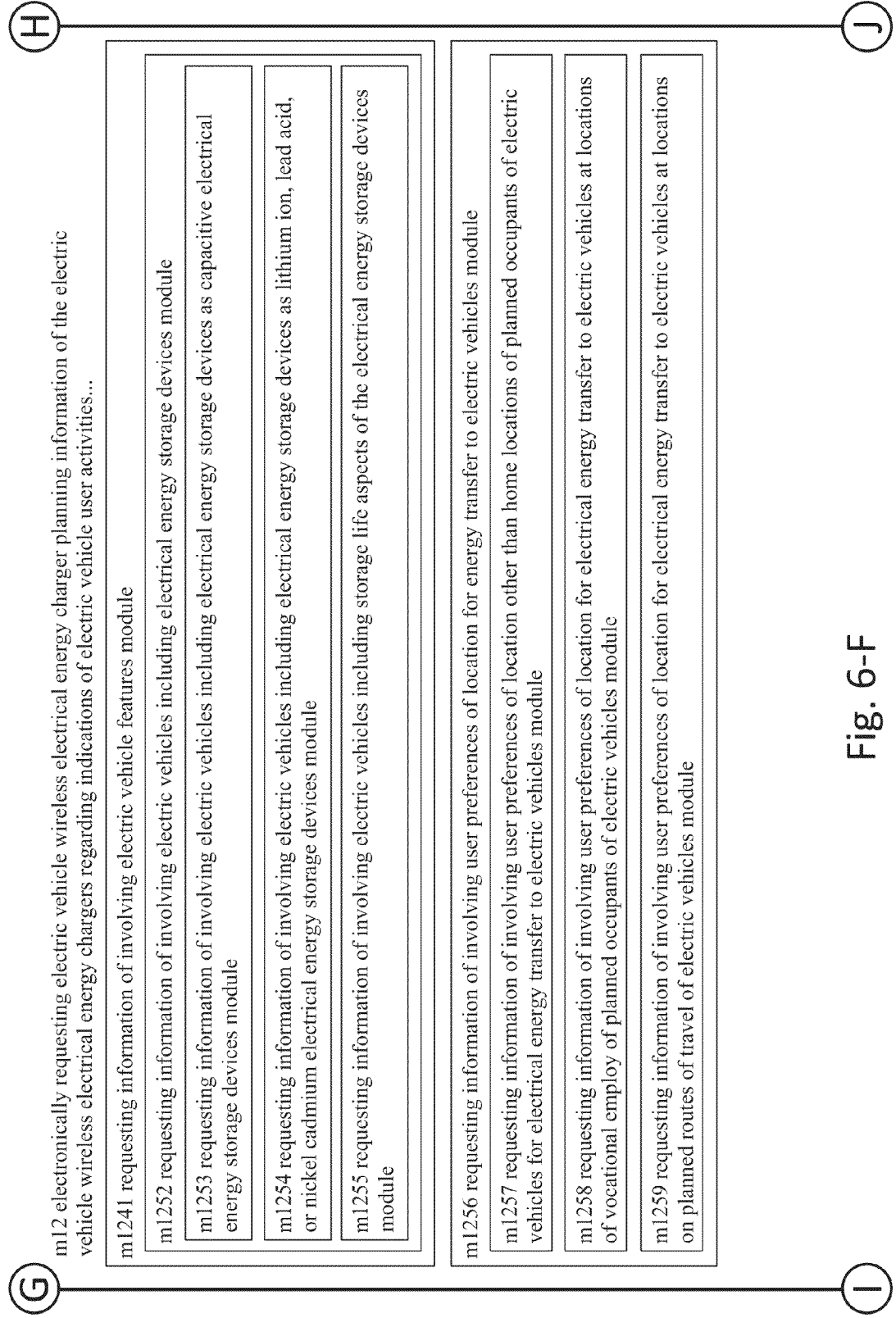
Fig. 6-F

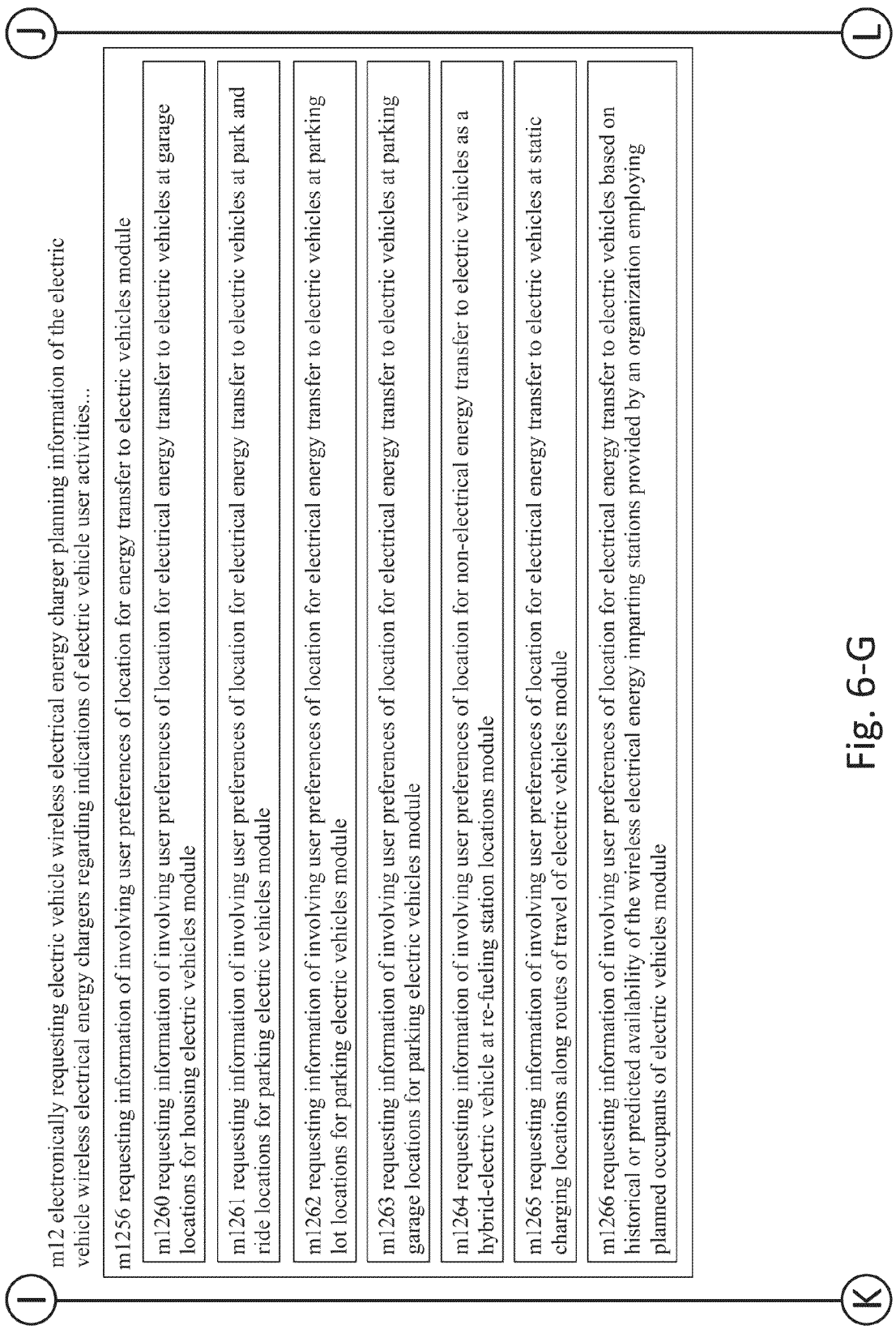
Fig. 6-G

- m12 electronically requesting electric vehicle wireless electrical energy charger planning information of the electric vehicle wireless electrical energy chargers regarding indications of electric vehicle user activities...
  - m1256 requesting information of involving user preferences of location for energy transfer to electric vehicles module
  - m1267 requesting information of involving user preferences of location for electrical energy transfer to electric vehicles at locations for mechanical maintenance of electric vehicles module
  - m1268 requesting information of involving preferences for fuels used to re-fuel electric vehicles as hybrid electric vehicles module
  - m1269 requesting information of involving preferences for contingency plans for unplanned unavailability to electric vehicles of the electric vehicle wireless electrical energy chargers module
  - m1270 requesting information of involving information regarding uses of electric vehicles module
  - m1271 requesting information of involving terrain or traffic information regarding routes of travel for electric vehicles module
  - m1272 requesting information of involving commuter routing information for electric vehicles module
  - m1273 requesting information of involving trip advisory information regarding routes of travel for electric vehicles module
  - m1274 requesting information of involving alternative modes of transportation along routes of travel for electric vehicles module
  - m1275 requesting information of involving periods in which electric vehicles will be unavailable for use module
  - m1276 requesting information of involving planned errands to be run by users of electric vehicles module
  - m1277 requesting information of involving commercial delivery schedules utilizing electric vehicles module

Fig. 6-H m12 electronically requesting electric vehicle wireless electrical energy charger planning information of the electric vehicle wireless electrical energy chargers regarding indications of electric vehicle user activities...

| m1270 requesting information of involving information regarding uses of electric vehicles module |
|---|
| m1278 requesting information of involving courier service uses for electric vehicles module |
| m1279 requesting information of involving industrial cargo transport by electric vehicles module |
| m1280 requesting information of involving uses of electric vehicles including requesting information of involving driving habits of users of electric vehicles module |
| m1281 requesting information of involving itineraries associated with use of electric vehicles module |
| m1282 requesting information of involving weather forecasts associated with travel through use of electric vehicles module |
| m1283 requesting information of involving news broadcasts associated with travel through use of electric vehicles module |
| m1284 requesting information of involving emergency warning messages associated with use of electric vehicles module |
| m1285 requesting information of involving availability of alternate transportation within a designated distance from electric vehicle wireless electrical energy chargers for transferring electrical energy to electric vehicles module |
| m1286 requesting information of involving ride-share programs associated with travel routes traveled by electric vehicles module |

- m13 electronically outputting electric vehicle wireless electrical energy charger advisement information to the electric vehicle wireless electrical energy chargers based upon portions of the electricity provider detail information...
- m1301 outputting advisement information for controlling electric vehicle wireless electrical energy chargers module
- m1302 outputting advisement information involving schedules for electrical load sharing for electrical energy generation sources with electric vehicle wireless electrical energy chargers associated with electric vehicles module
- m1303 outputting advisement information involving electricity use data accessed through remote reporting from electric utility databases module
- m1304 outputting advisement information involving consumer incentive programs associated with electricity cost schedules module
- m1305 outputting advisement information involving electricity financial cost rate schedules module
- m1306 outputting advisement information involving electricity load share capacity schedules for electric vehicle wireless electrical energy chargers module
- m1307 outputting advisement information involving electric utility capacity information passed through communication channels of electric vehicle wireless electrical energy chargers module
- m1308 outputting advisement information involving electrical energy charging appointments reserved for electrical vehicles other than electric vehicles module
- m1309 outputting advisement information involving maximum charging rate capacities of electric vehicle wireless electrical energy chargers module
- m1310 outputting advisement information involving cost information for priority handling of charging of electric vehicles by electric vehicle wireless electrical energy chargers module

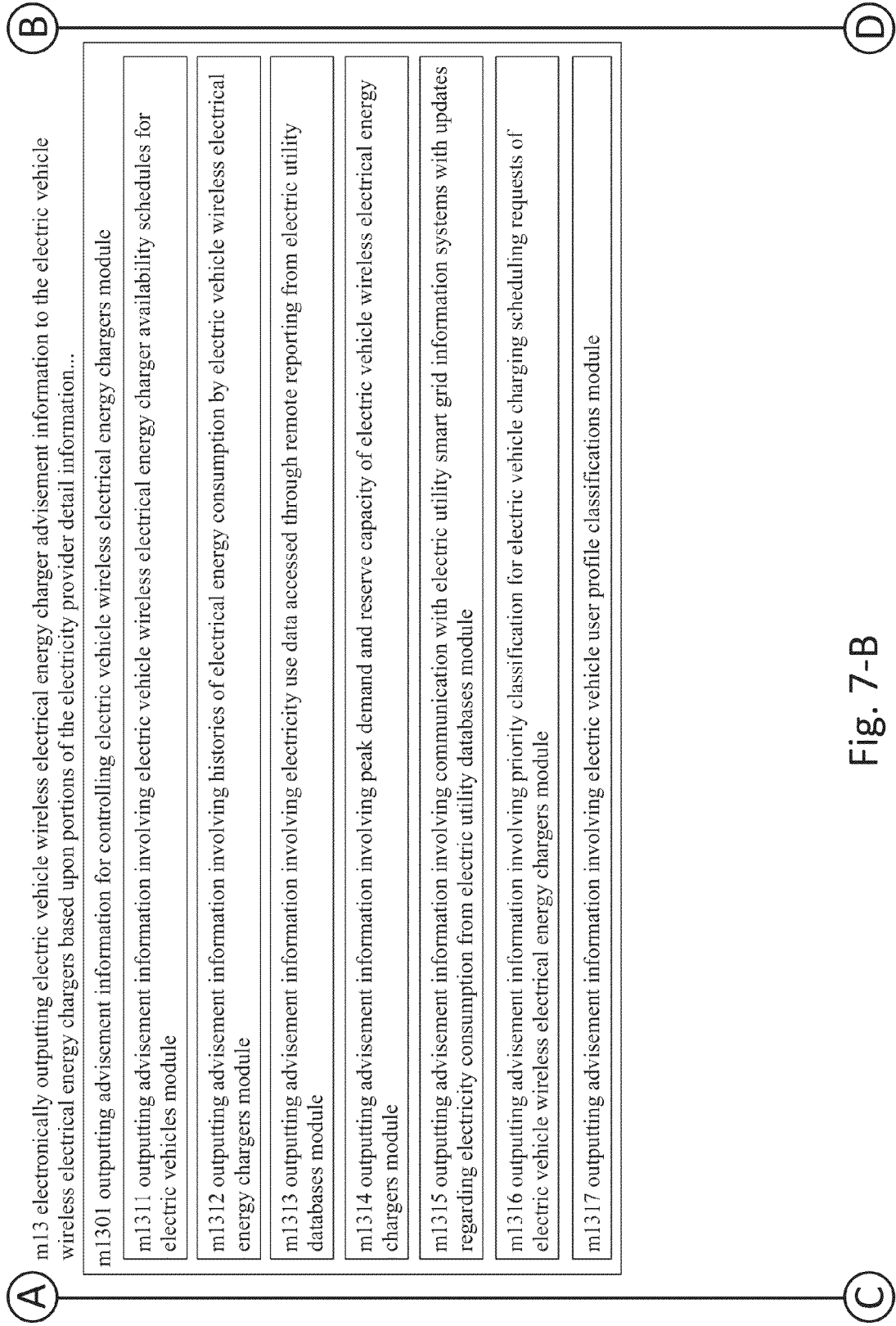
Fig. 7-B

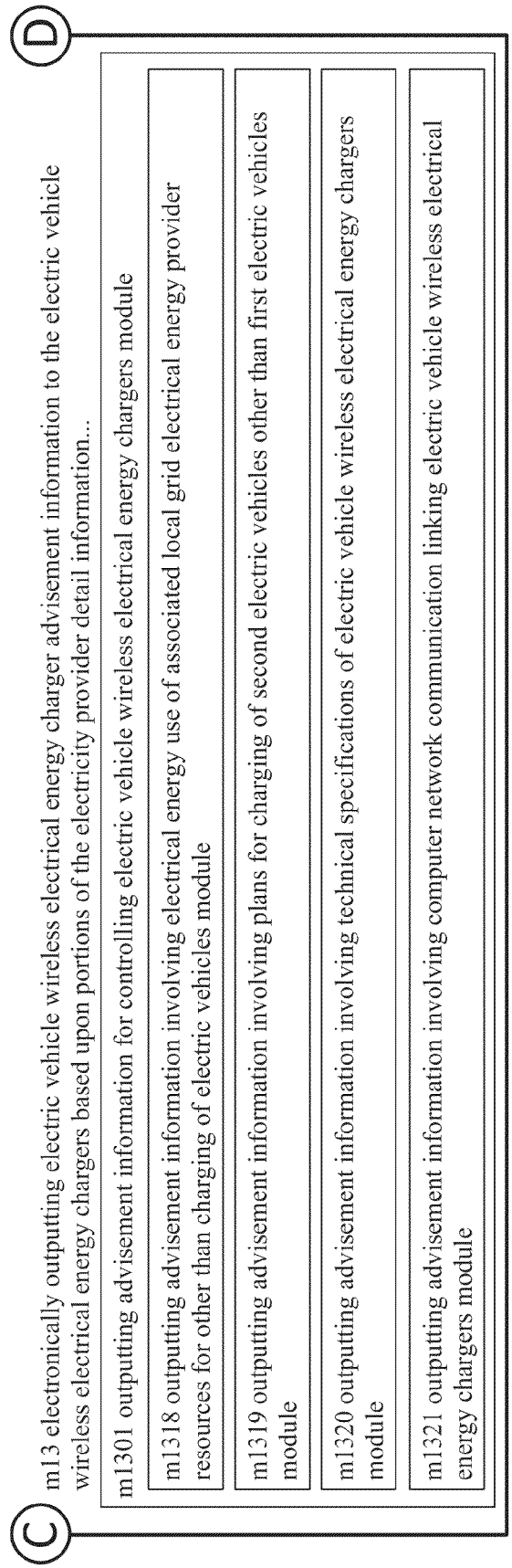
Fig. 7-C

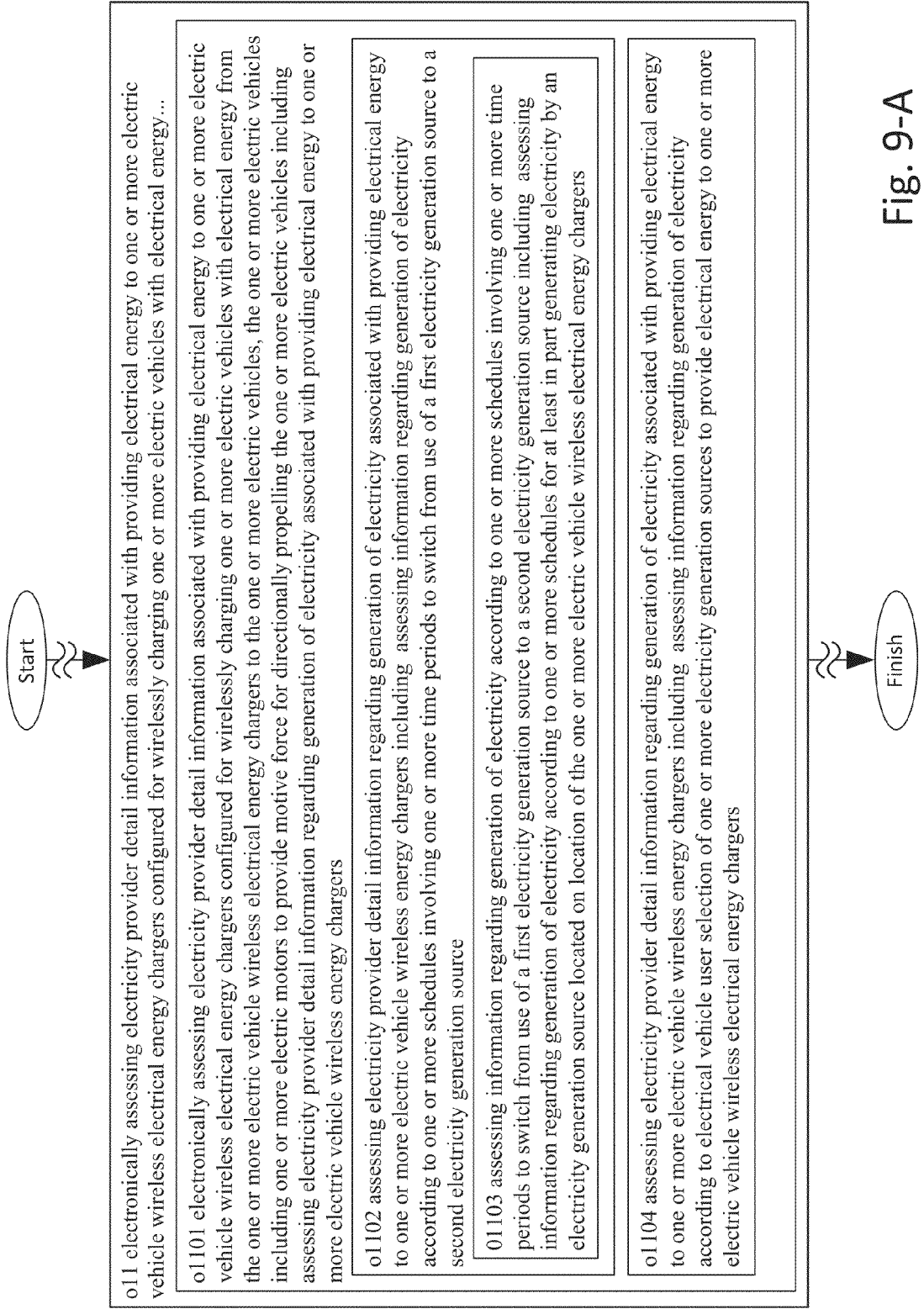
Fig. 9-A

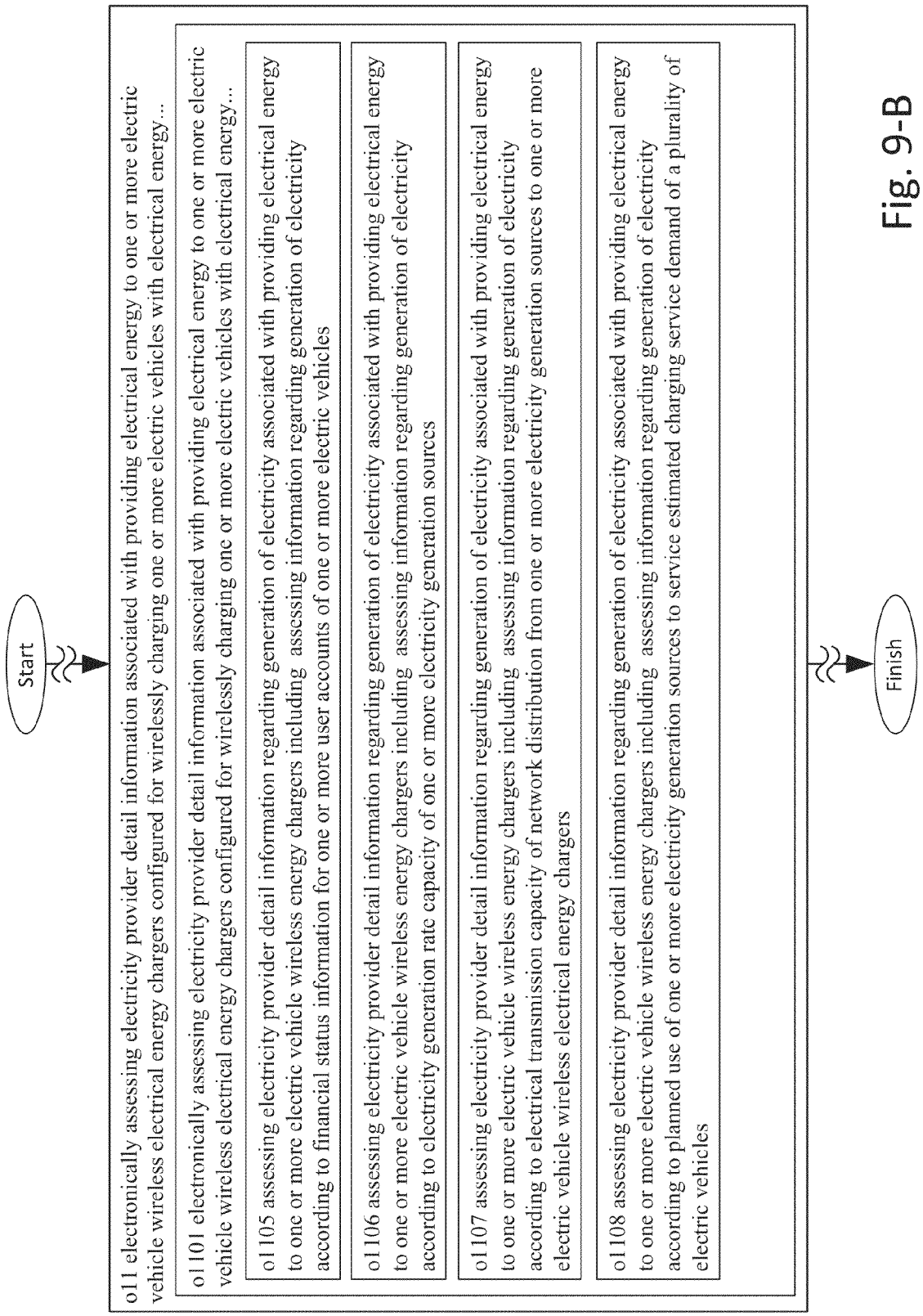
Fig. 9-B

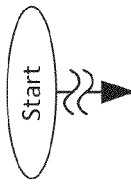

o11 electronically assessing electricity provider detail information associated with providing electrical energy to one or more electric vehicle wireless electrical energy chargers configured for wirelessly charging one or more electric vehicles with electrical energy...

o11101 electronically assessing electricity provider detail information associated with providing electrical energy to one or more electric vehicle wireless electrical energy chargers configured for wirelessly charging one or more electric vehicles with electrical energy...

o11109 assessing electricity provider detail information regarding generation of electricity associated with providing electrical energy to one or more electric vehicle wireless energy chargers including assessing information regarding generation of electricity according to amount of time requested for providing electrical energy to one or more electric vehicle wireless electrical energy chargers o11110 assessing electricity provider detail information regarding generation of electricity associated with providing electrical energy to one or more electric vehicle wireless energy chargers including assessing information regarding generation of electricity according to amount of electrical energy to be transferred to one or more electric vehicles in a designated period of time by the one or more electric vehicle wireless electrical energy chargers o11110 assessing electricity provider detail information regarding generation of electricity associated with providing electrical energy to one or more electric vehicle wireless energy chargers including assessing information regarding generation of electricity according to amount of electrical energy to be transferred to one or more electric vehicles in a designated period of time by the one or more electric vehicle wireless electrical energy chargers o11111 assessing electricity provider detail information regarding generation of electricity associated with providing electrical energy to one or more electric vehicle wireless energy chargers including assessing information regarding generation of electricity according to approval of consumer profile of one or more users of one or more electric vehicles

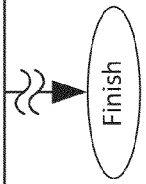

Fig. 9-C o11 electronically assessing electricity provider detail information associated with providing electrical energy to one or more electric vehicle wireless electrical energy chargers configured for wirelessly charging one or more electric vehicles with electrical energy...

o1101 electronically assessing electricity provider detail information associated with providing electrical energy to one or more electric vehicle wireless electrical energy chargers configured for wirelessly charging one or more electric vehicles with electrical energy...

o1112 assessing electricity provider detail information regarding generation of electricity associated with providing electrical energy to one or more electric vehicle wireless energy chargers including assessing information regarding generation of electricity according to impact from planned schedule for generation of electricity by one or more electrical energy generation sources upon itinerary and route information associated with one or more electric vehicles o1113 electronically assessing electricity provider detail information associated with providing electrical energy to one or more electric vehicle wireless electrical energy chargers configured for wirelessly charging one or more electric vehicles with electrical energy from the one or more electric vehicle wireless electrical energy chargers to the one or more electric vehicles, the one or more electric vehicles including one or more electric motors to provide motive force for directionally propelling the one or more electric vehicles including assessing information regarding generation of electricity received from one or more communication links between one or more electrical energy generation sources and one or more electric vehicle wireless electrical energy chargers o1114 assessing information regarding generation of electricity received from one or more communication links between one or more electrical energy generation sources and one or more electric vehicle wireless electrical energy chargers including assessing information regarding generation of electricity received from one or more communication links involving at least in part one or more contactless smart card readers

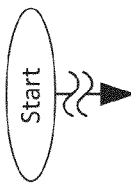
Start

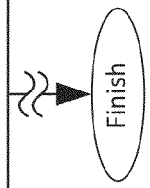
Finish

Fig. 9-D

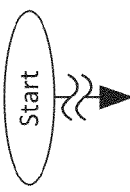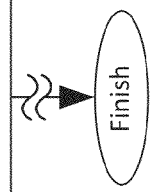

o11 electronically assessing electricity provider detail information associated with providing electrical energy to one or more electric vehicle wireless electrical energy chargers configured for wirelessly charging one or more electric vehicles with electrical energy...

o1113 electronically assessing electricity provider detail information associated with providing electrical energy to one or more electric vehicle wireless electrical energy chargers configured for wirelessly charging one or more electric vehicles with electrical energy...

o1115 assessing information regarding generation of electricity received from one or more communication links between one or more electrical energy generation sources and one or more electric vehicle wireless electrical energy chargers including assessing information regarding generation of electricity received from one or more communication links involving at least in part one or more RFID tag readers o1116 assessing information regarding generation of electricity received from one or more communication links between one or more electrical energy generation sources and one or more electric vehicle wireless electrical energy chargers including assessing information regarding generation of electricity received from one or more communication links involving at least in part one or more manual entry keypads o1117 assessing information regarding generation of electricity received from one or more communication links between one or more electrical energy generation sources and one or more electric vehicle wireless electrical energy chargers including assessing information regarding generation of electricity received from one or more communication links involving at least in part one or more blue tooth communication devices

Fig. 9-E

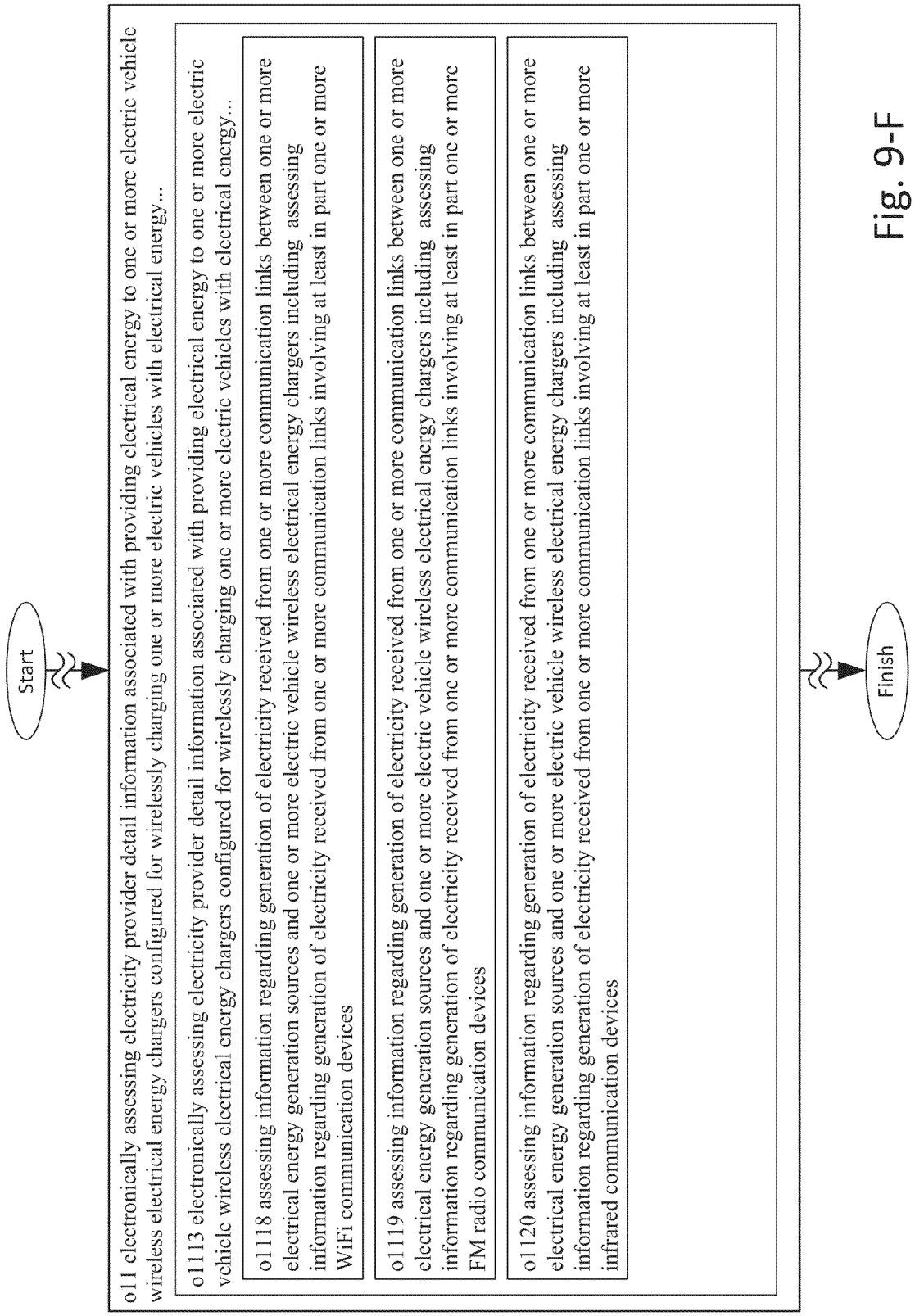
Fig. 9-F

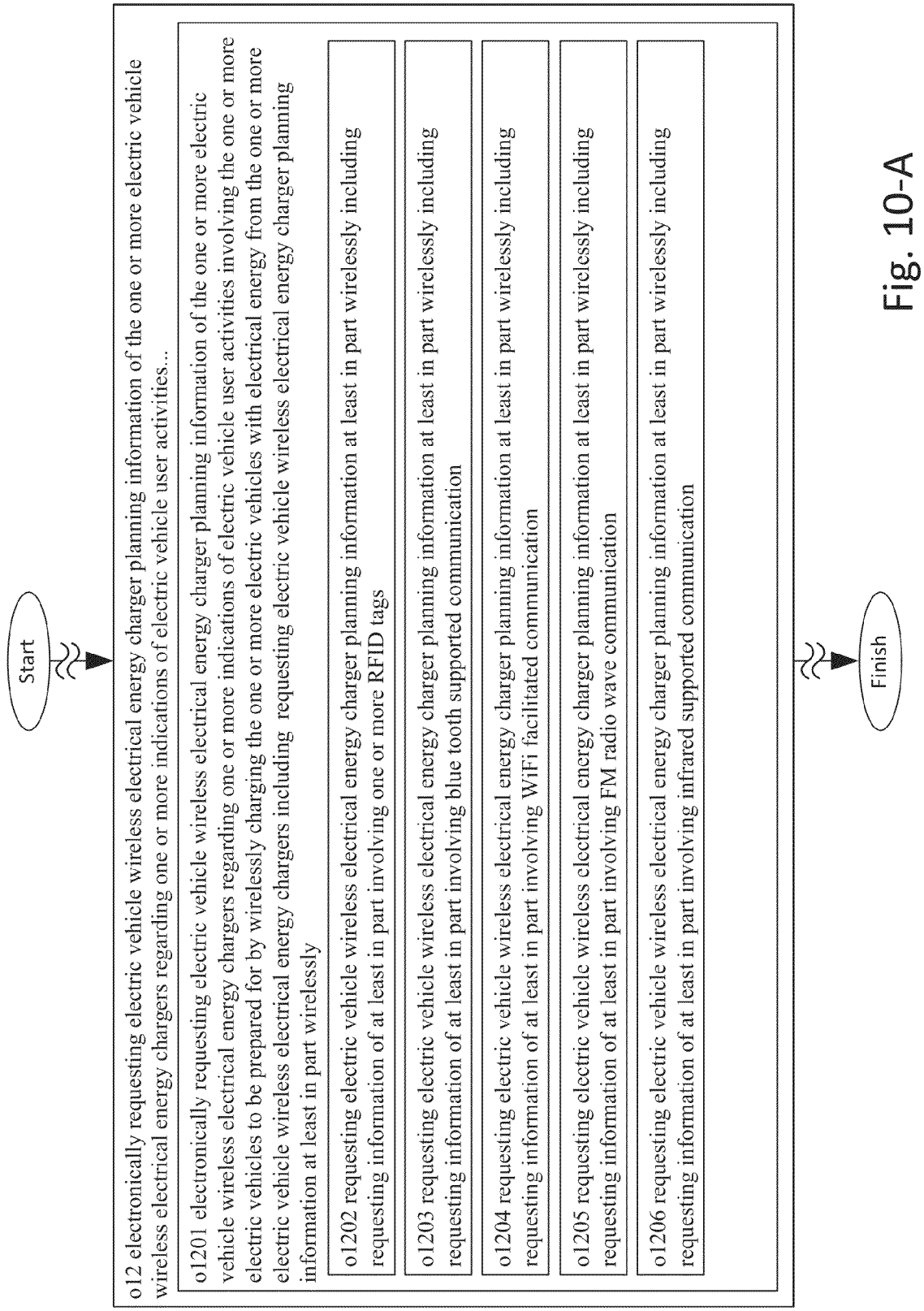
Fig. 10-A

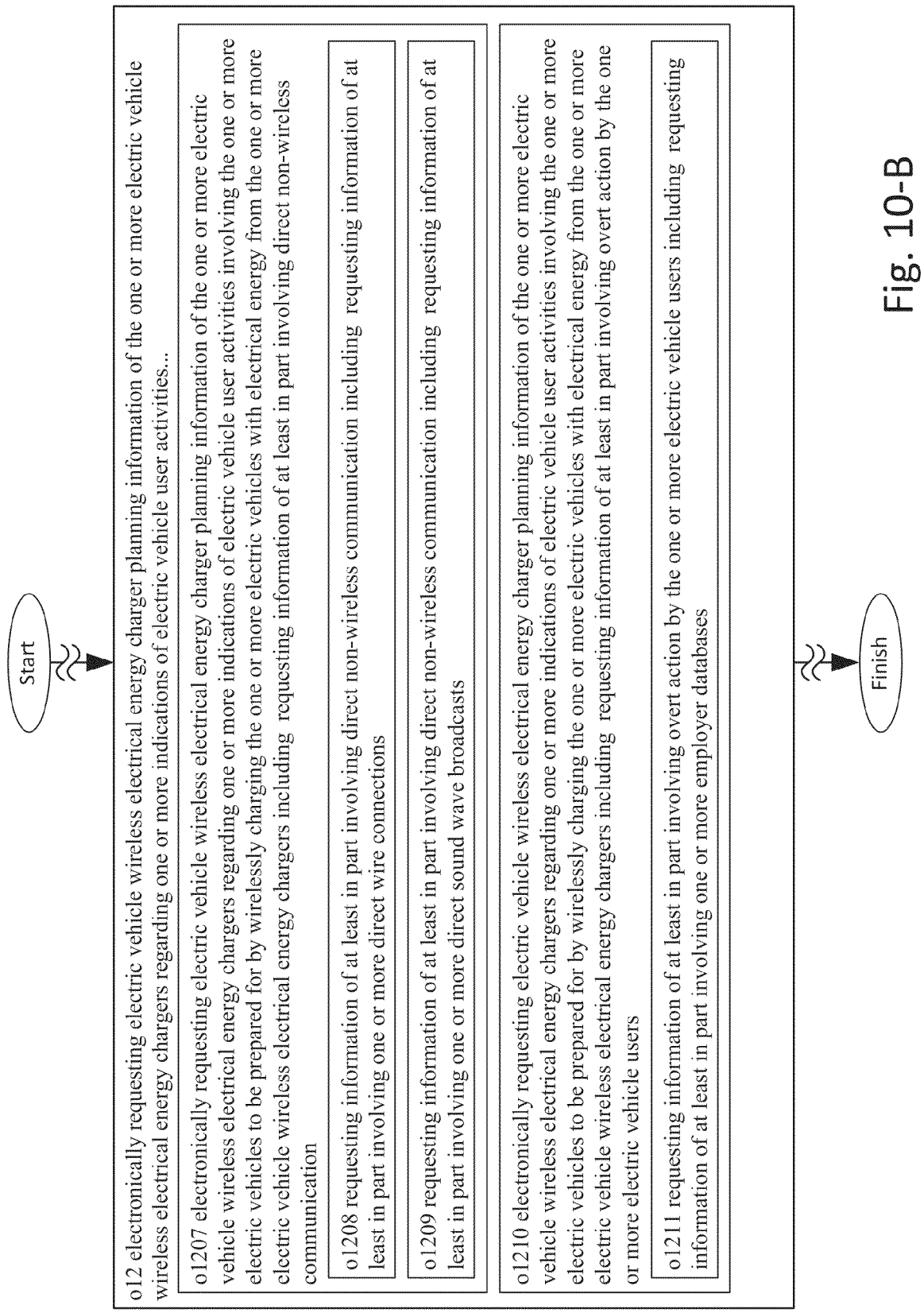
Fig. 10-B

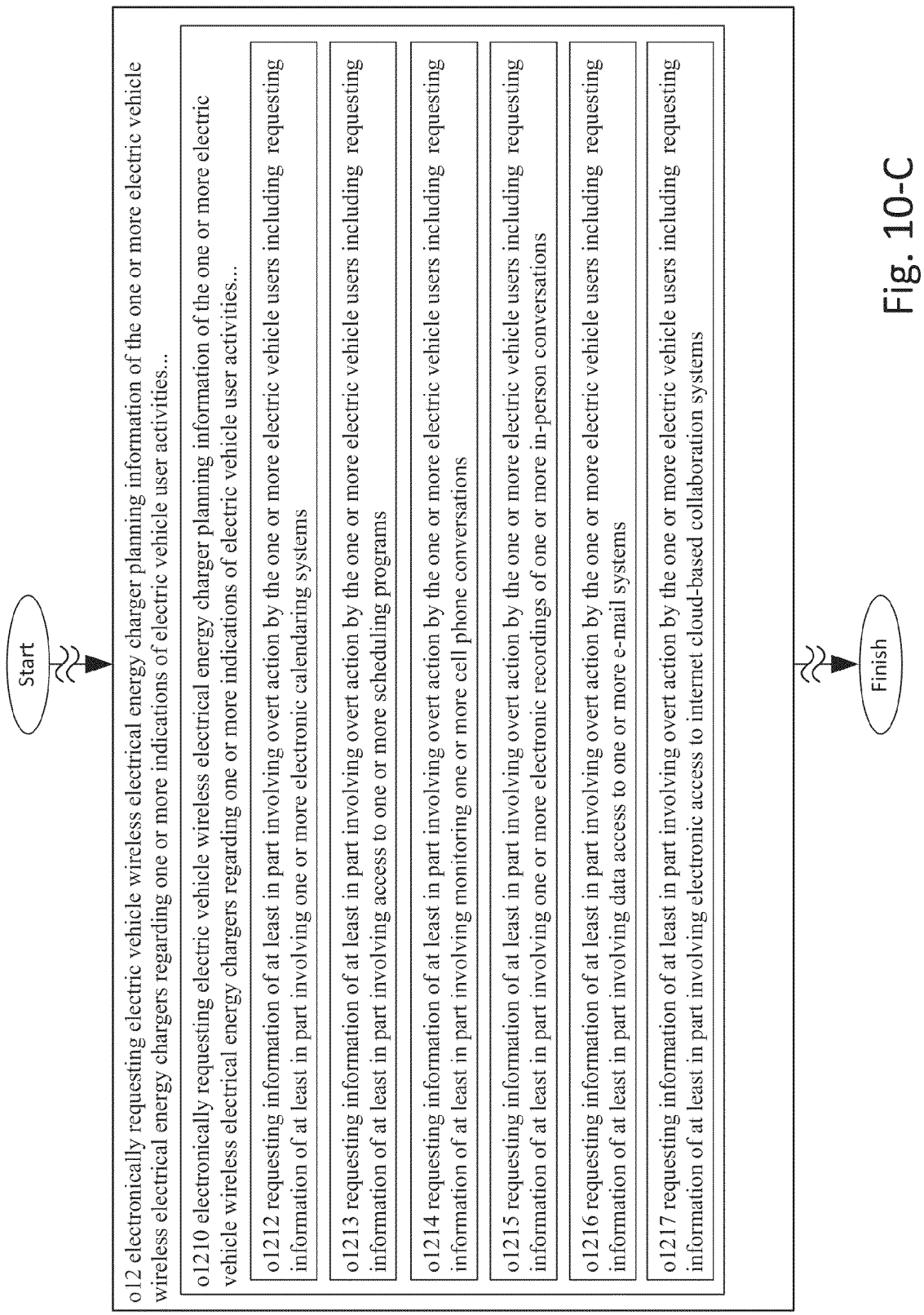
Fig. 10-C

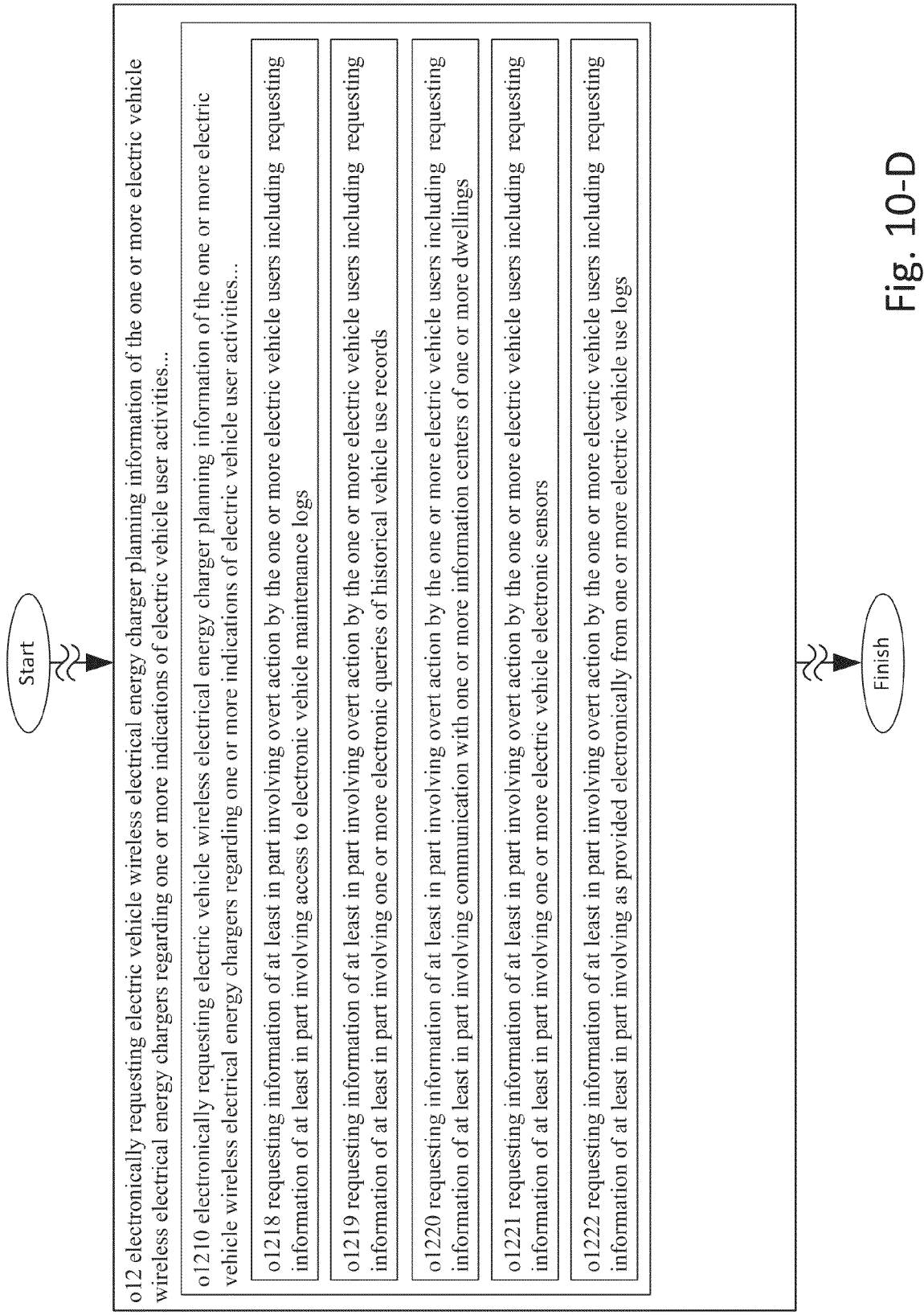
Fig. 10-D

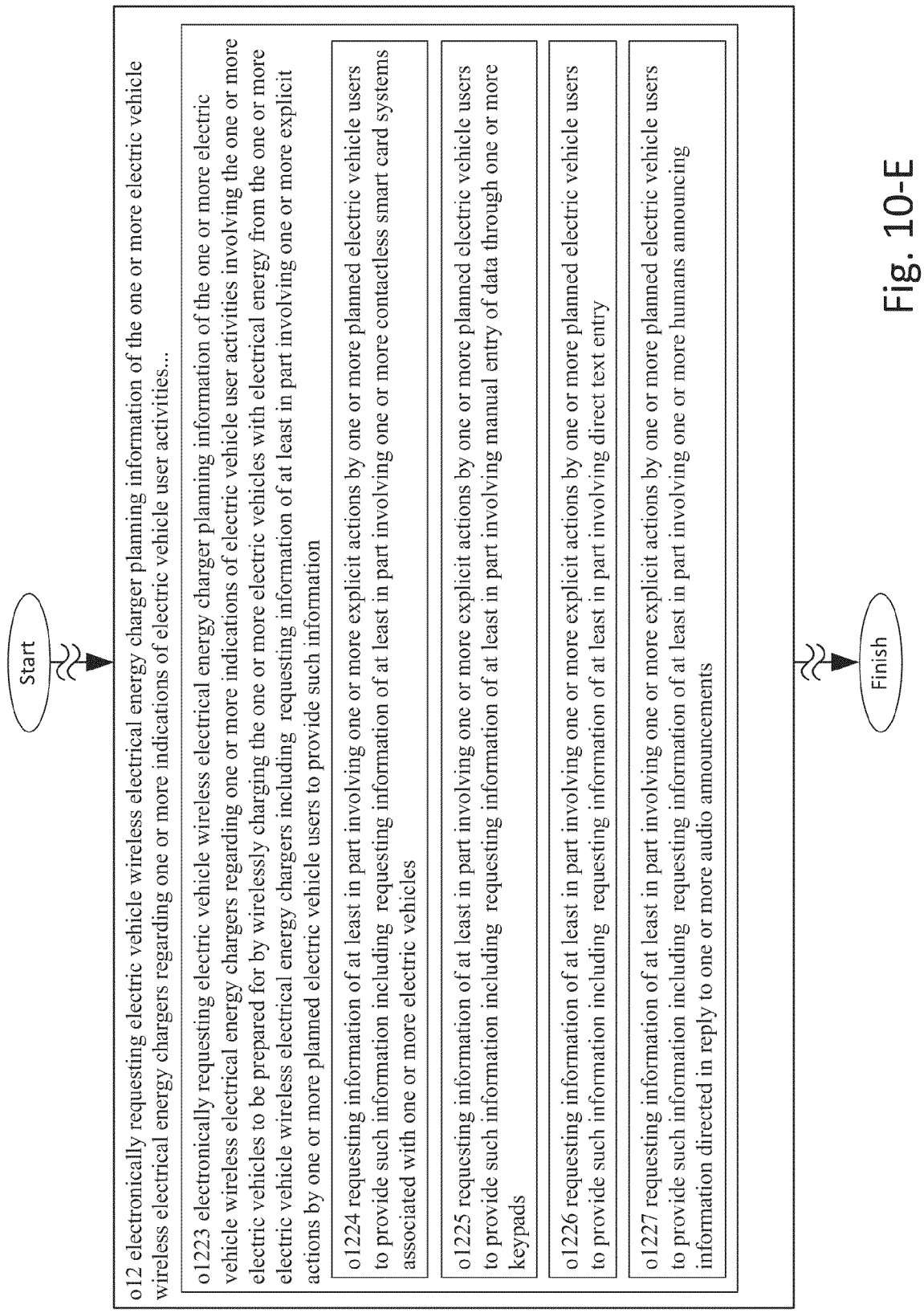
Fig. 10-E

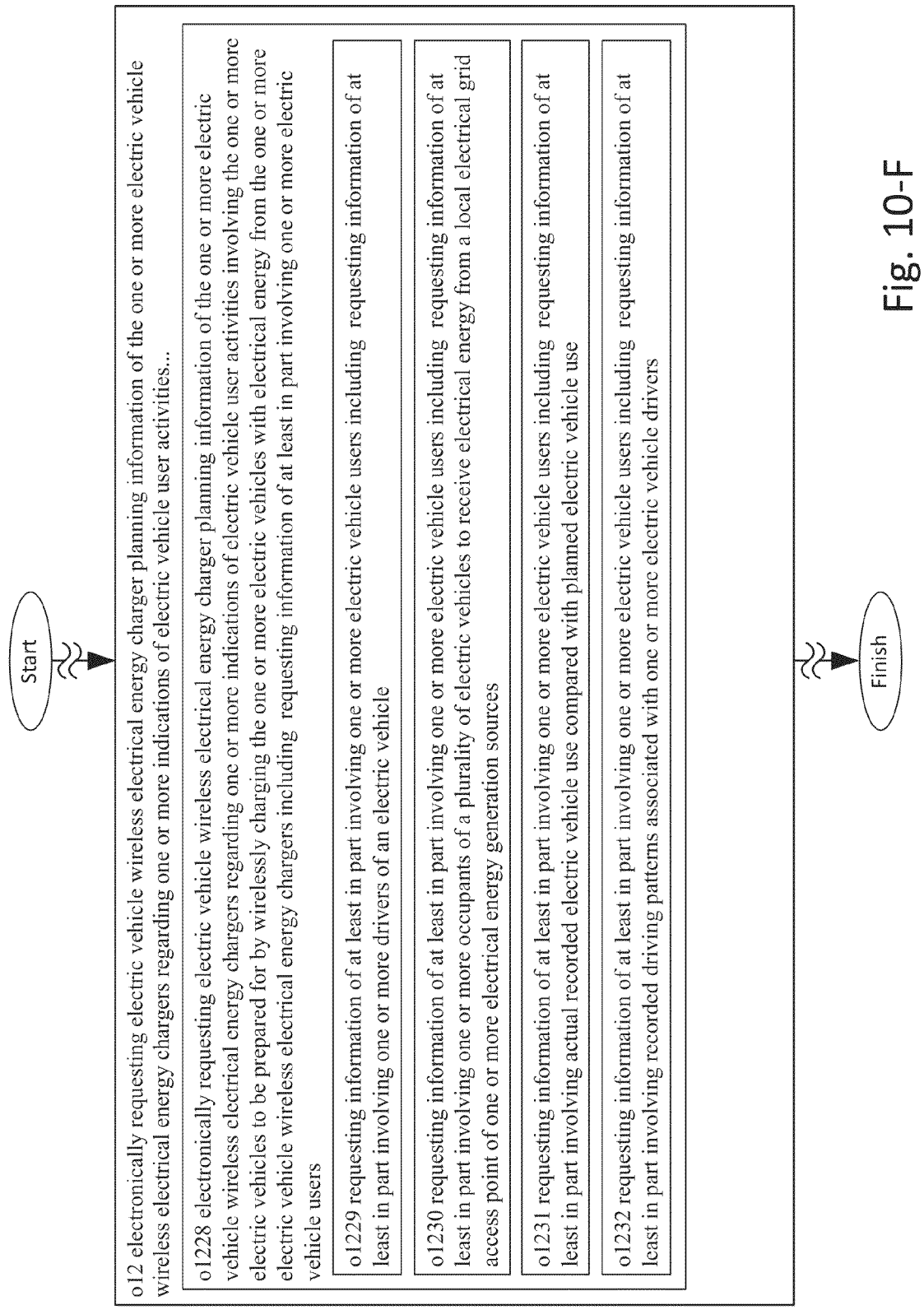
Fig. 10-F

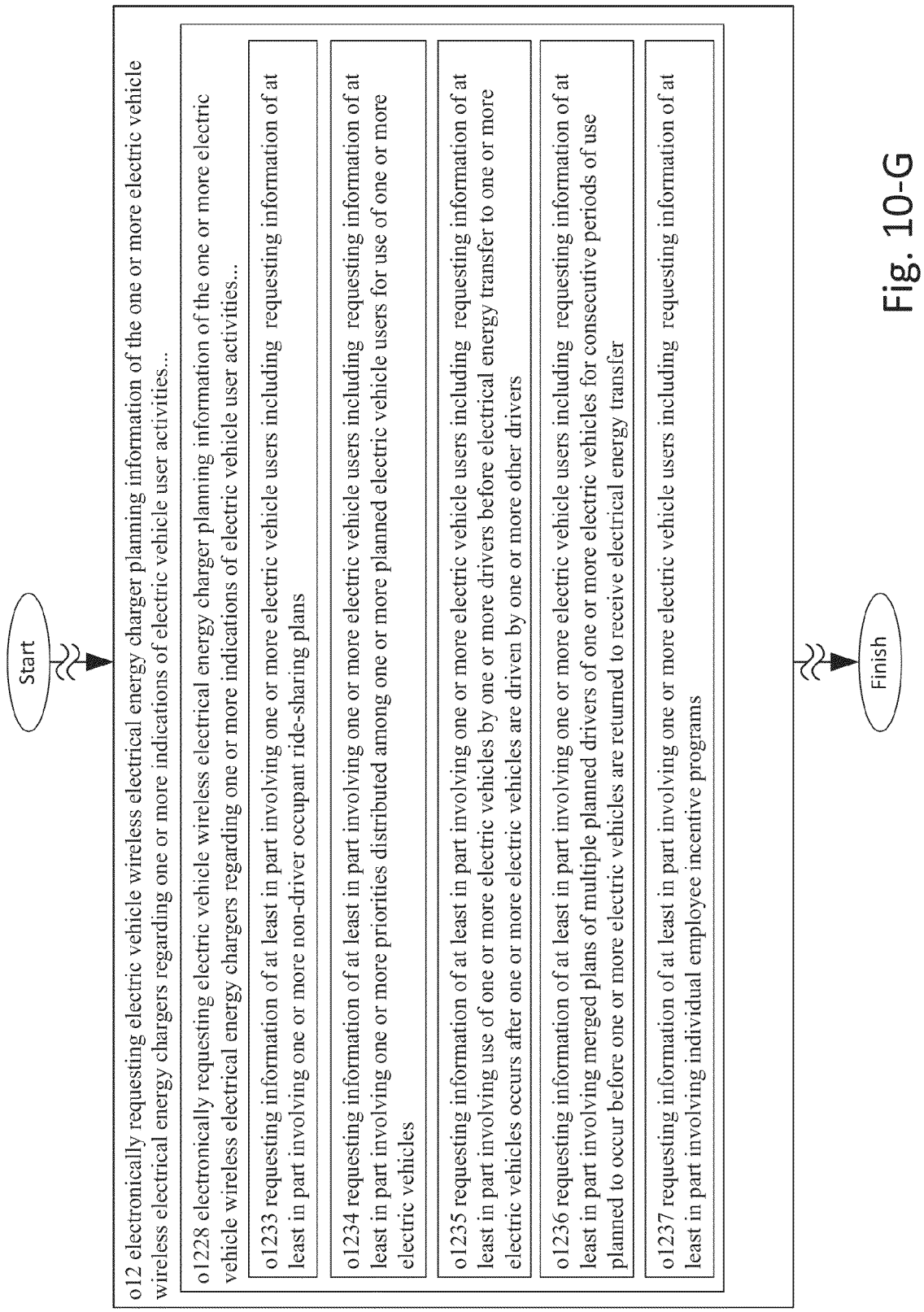
Fig. 10-G

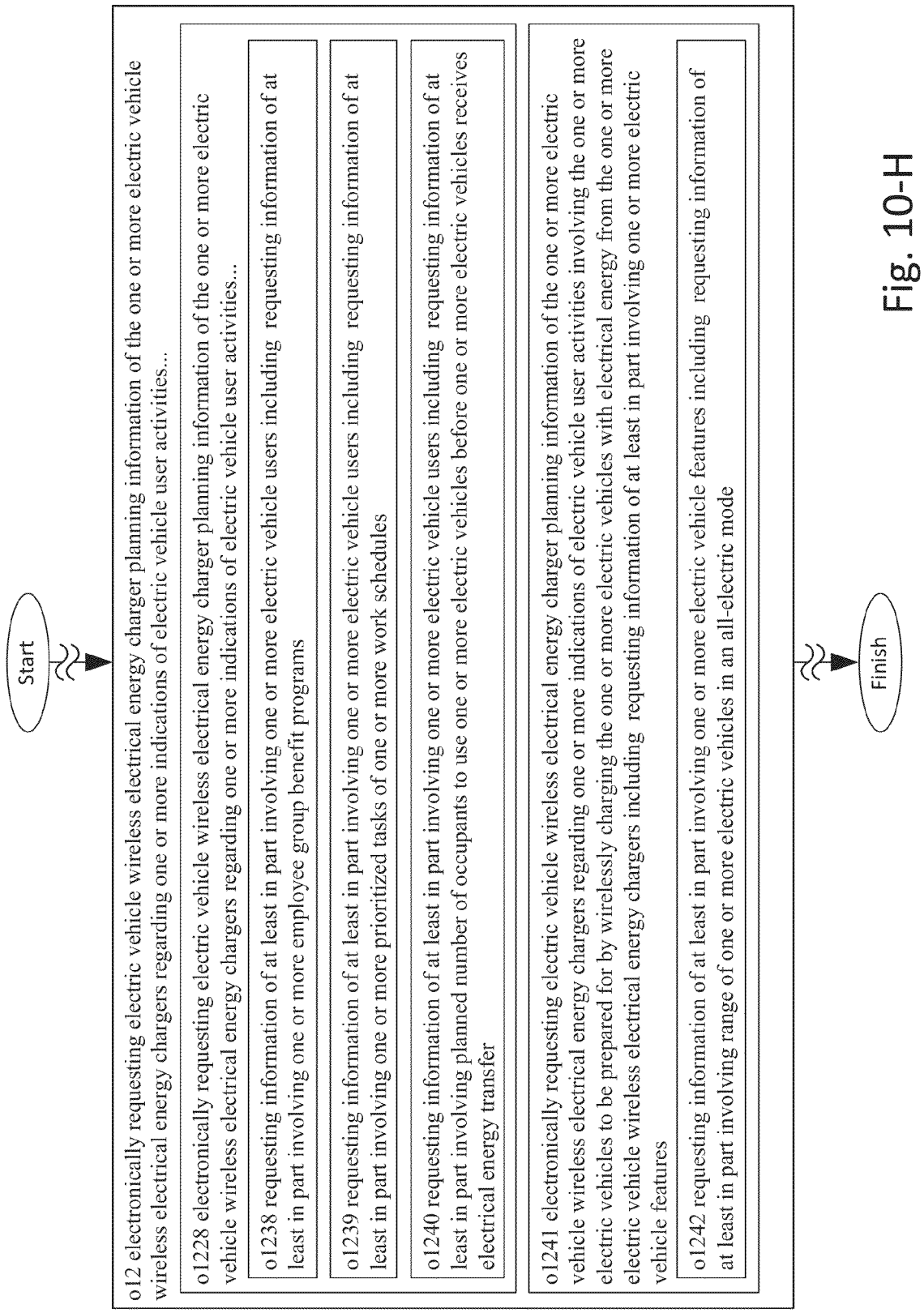
Fig. 10-H

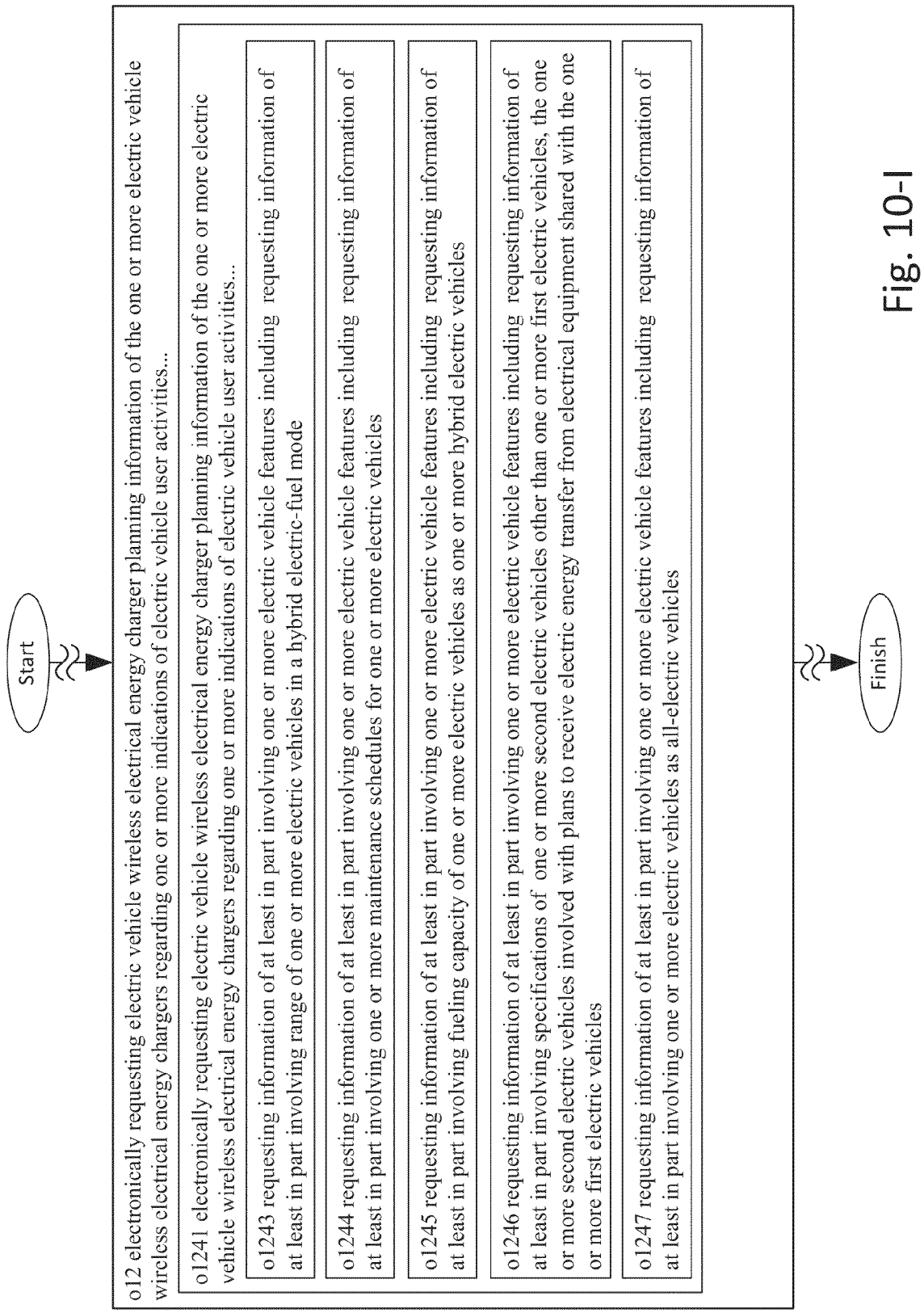
Fig. 10-I

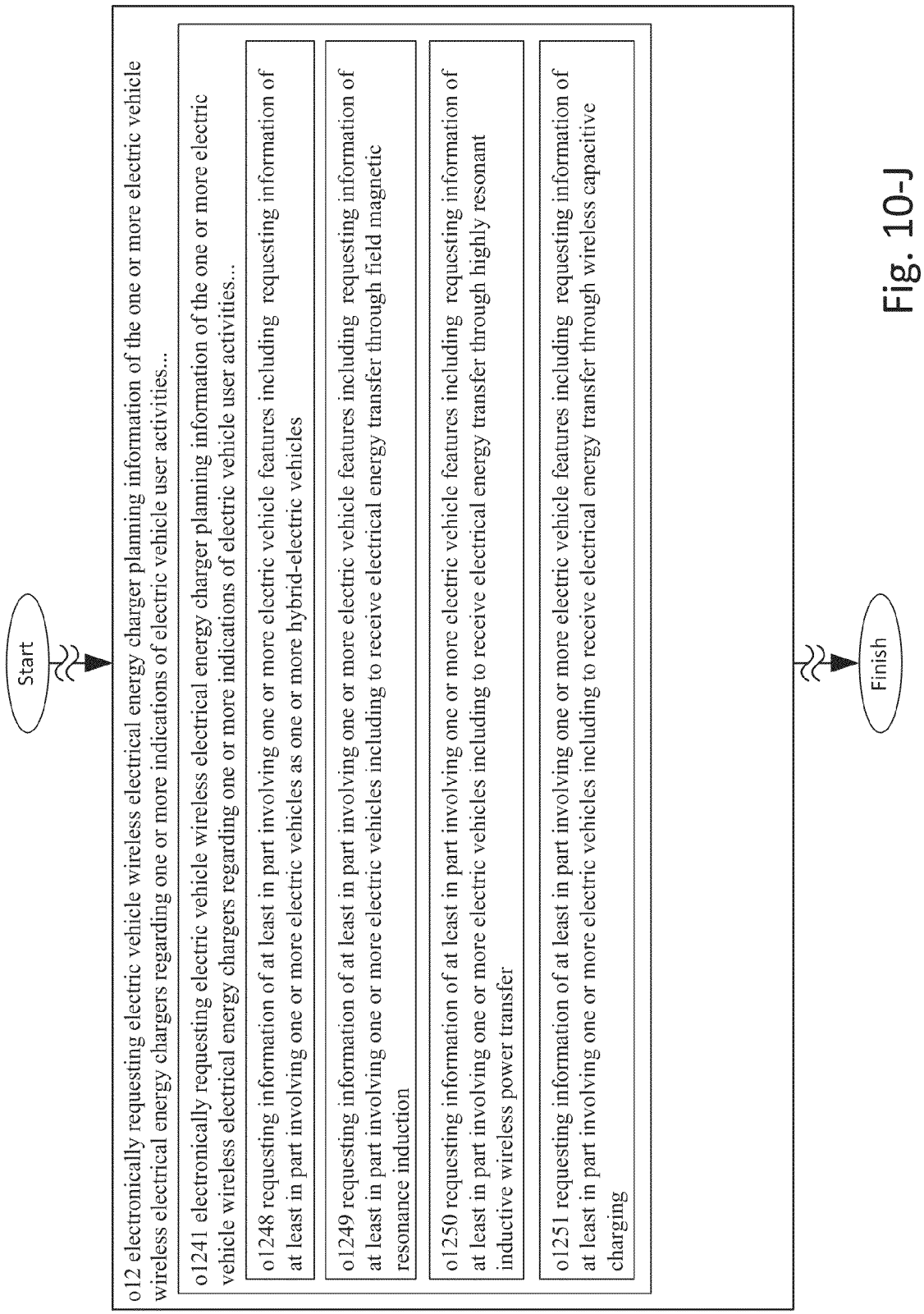
Fig. 10-J

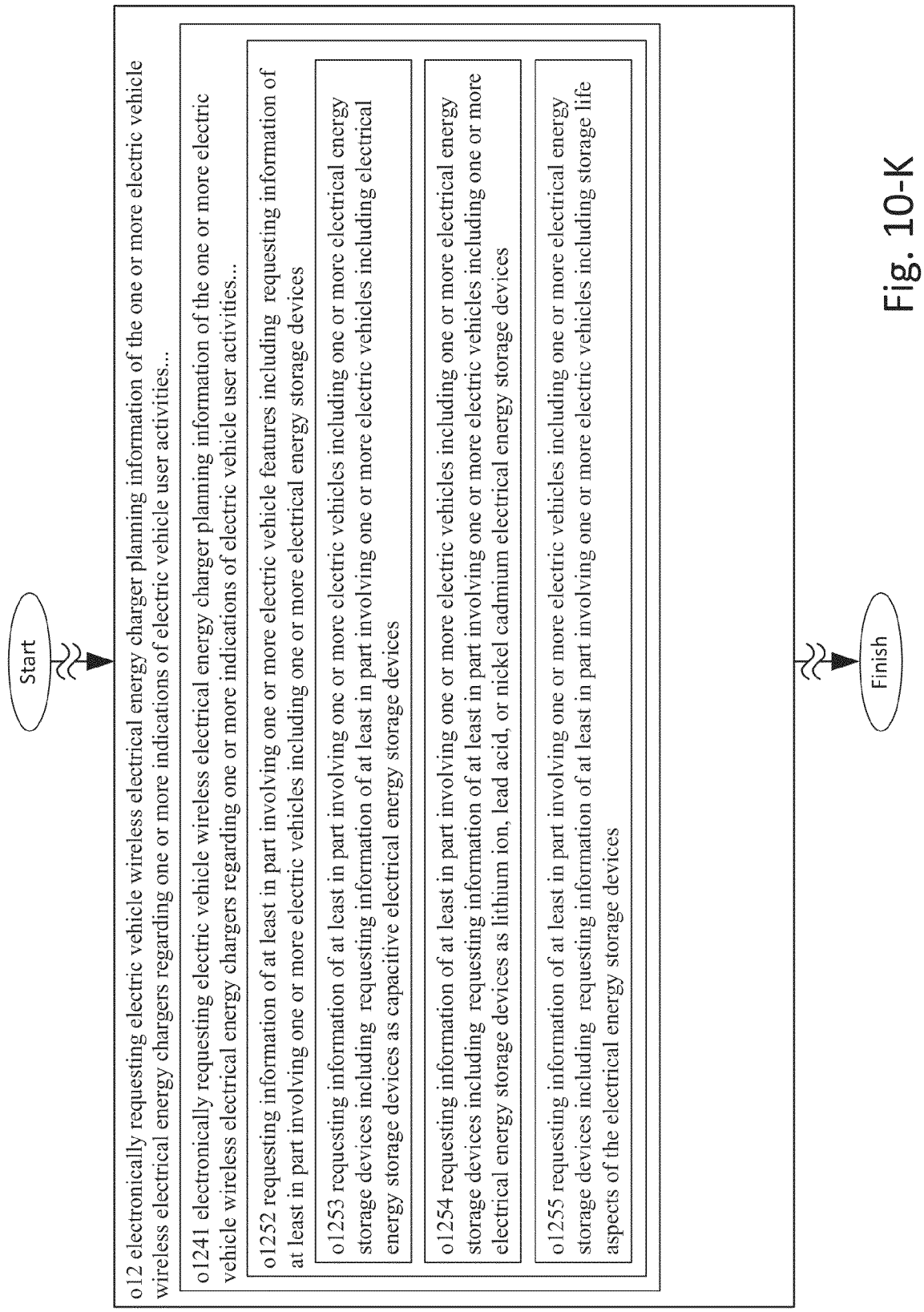
Fig. 10-K

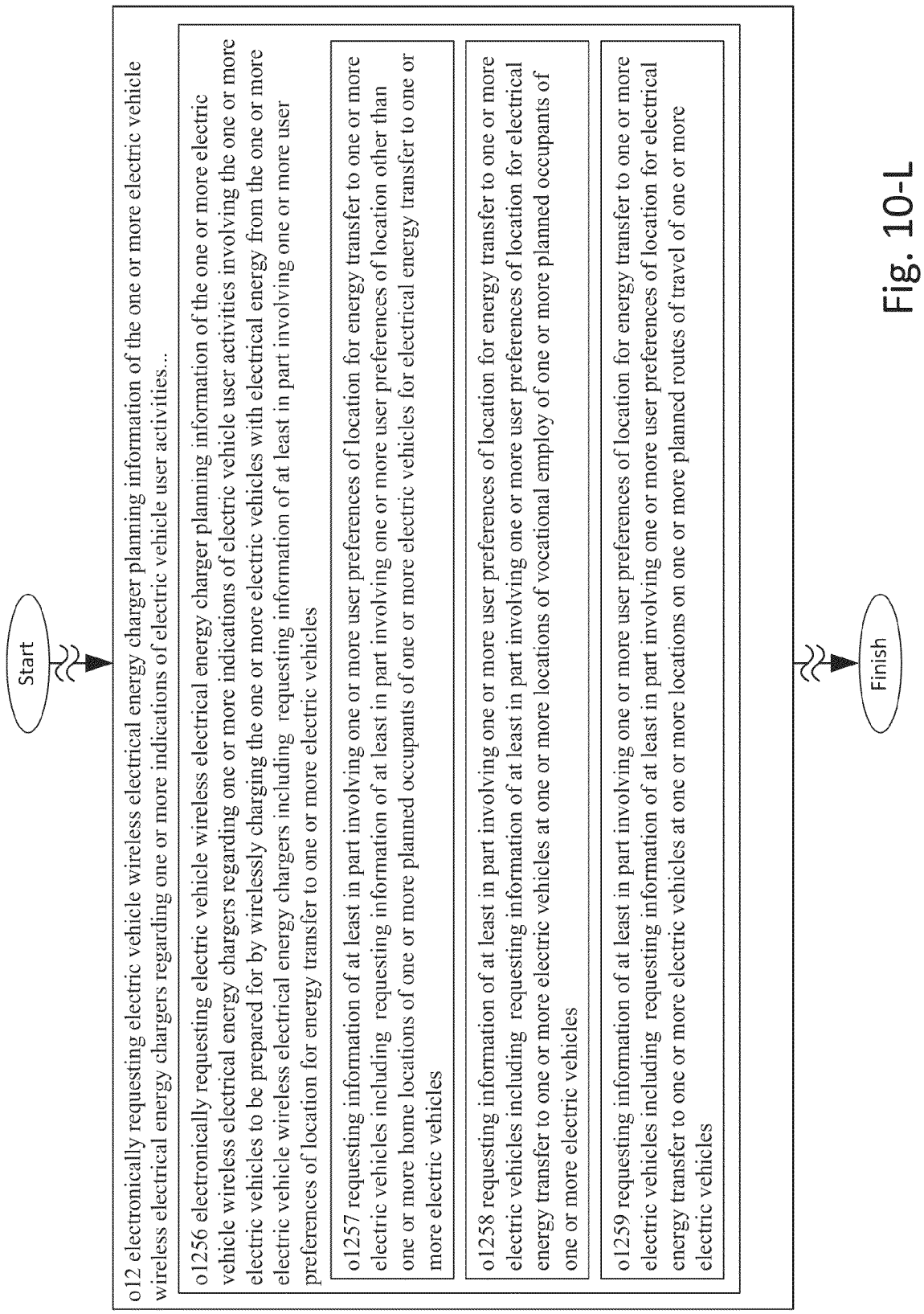
Fig. 10-L

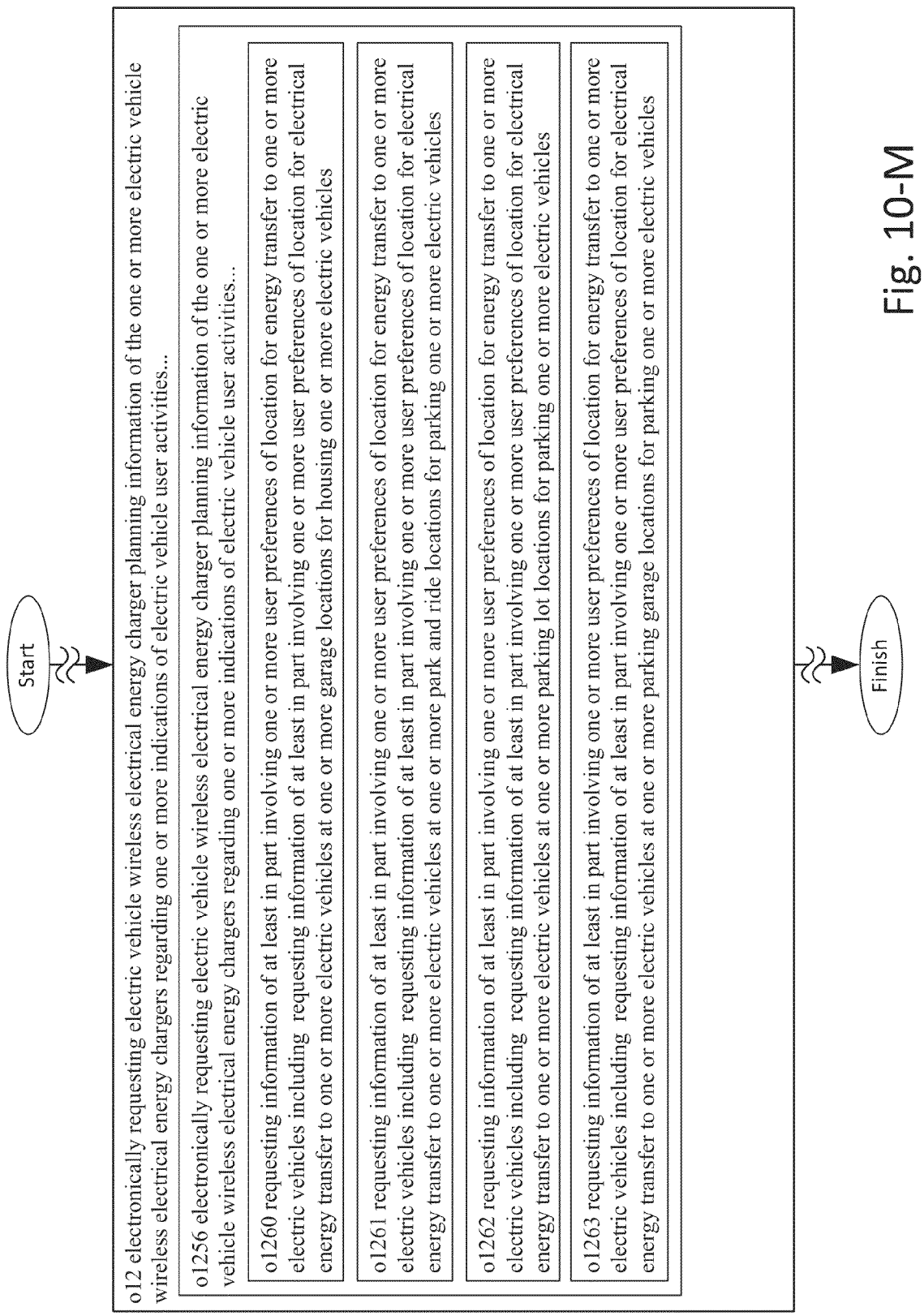
Fig. 10-M

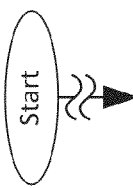

o12 electronically requesting electric vehicle wireless electrical energy charger planning information of the one or more electric vehicle wireless electrical energy chargers regarding one or more indications of electric vehicle user activities...

o1256 electronically requesting electric vehicle wireless electrical energy charger planning information of the one or more electric vehicle wireless electrical energy chargers regarding one or more indications of electric vehicle user activities...

o1264 requesting information of at least in part involving one or more user preferences of location for energy transfer to one or more electric vehicles including requesting information of at least in part involving one or more user preferences of location for non-electrical energy transfer to one or more electric vehicles as a hybrid-electric vehicle at one or more re-fueling station locations o1265 requesting information of at least in part involving one or more user preferences of location for energy transfer to one or more electric vehicles including requesting information of at least in part involving one or more user preferences of location for electrical energy transfer to one or more electric vehicles at one or more static charging locations along one or more routes of travel of one or more electric vehicles o1266 requesting information of at least in part involving one or more user preferences of location for energy transfer to one or more electric vehicles including requesting information of at least in part involving one or more user preferences of location for electrical energy transfer to one or more electric vehicles based on historical or predicted availability of the one or more wireless electrical energy imparting stations provided by an organization employing one or more planned occupants of one or more electric vehicles o1267 requesting information of at least in part involving one or more user preferences of location for energy transfer to one or more electric vehicles including requesting information of at least in part involving one or more user preferences of location for electrical energy transfer to one or more electric vehicles at one or more locations for mechanical maintenance of one or more electric vehicles

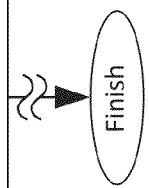

Fig. 10-N

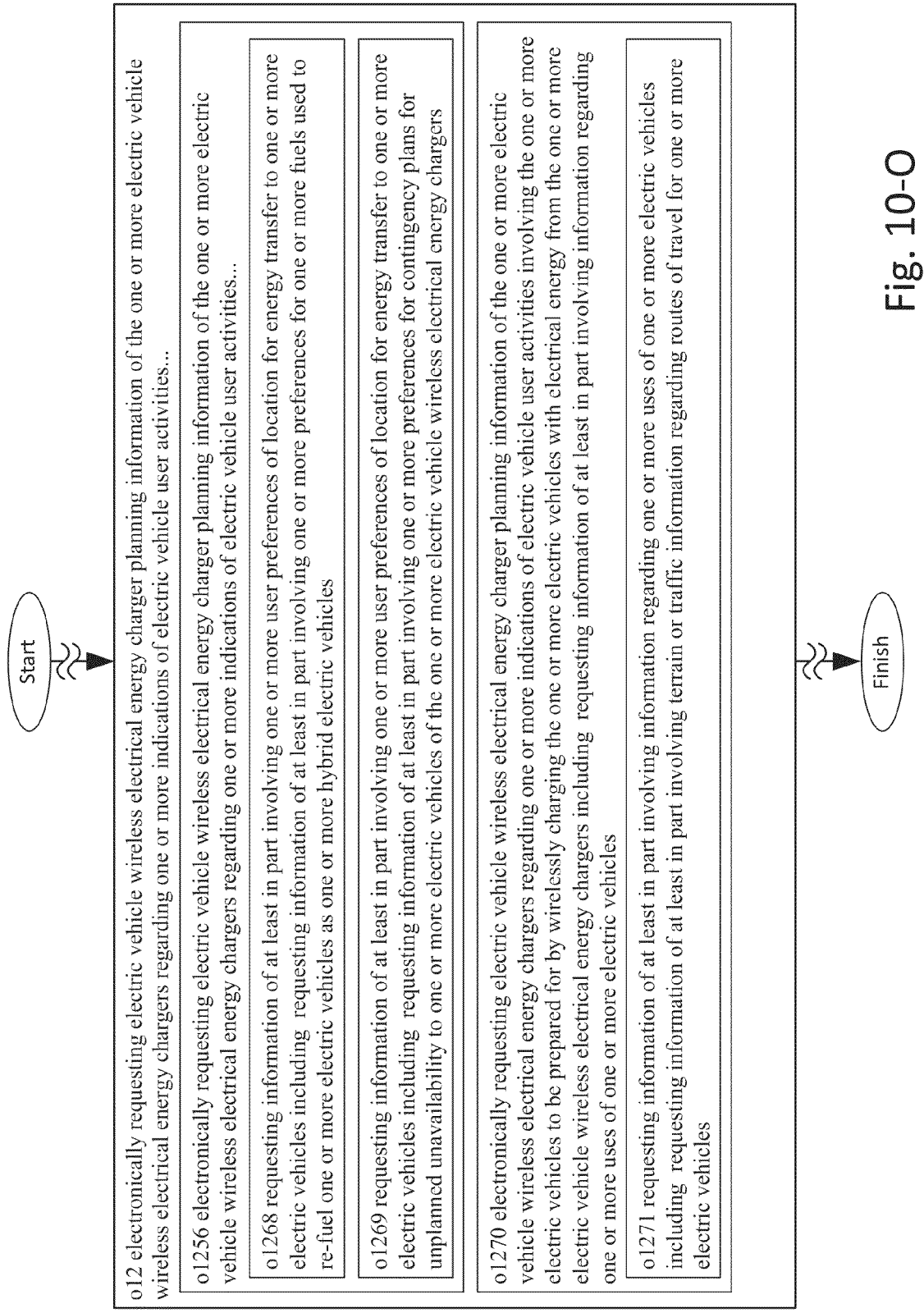
Fig. 10-O

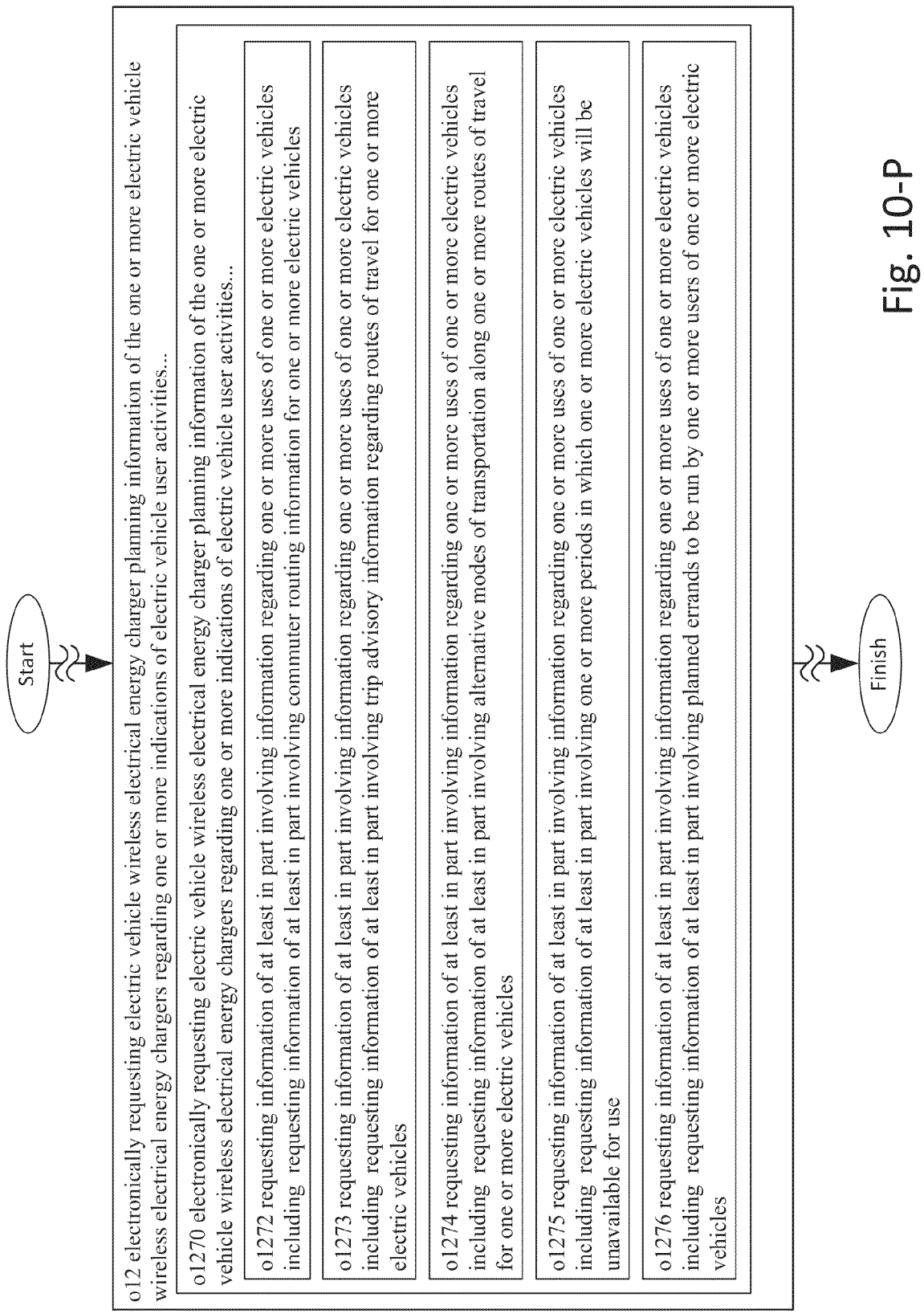
Fig. 10-P

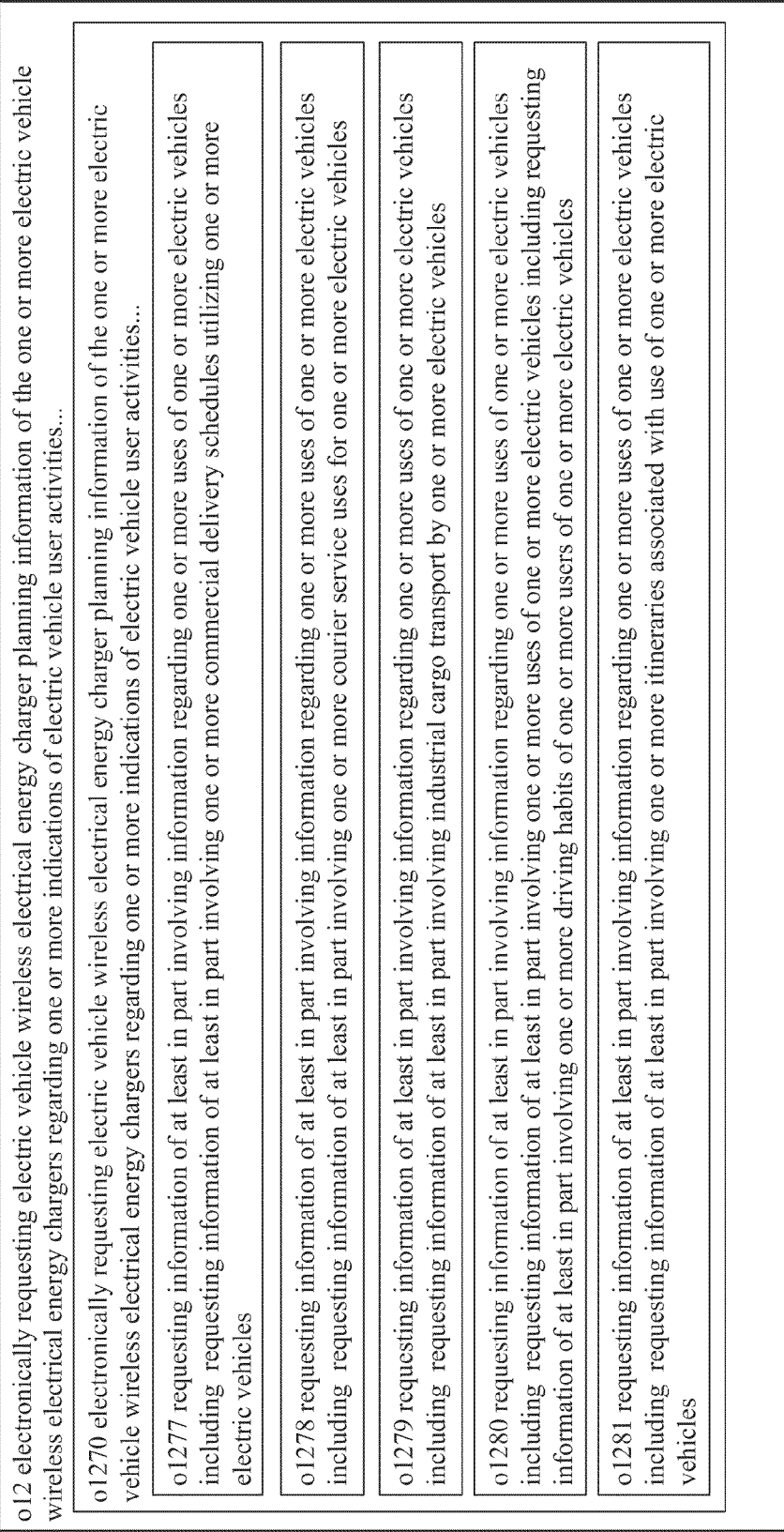

Fig. 10-Q o12 electronically requesting electric vehicle wireless electrical energy charger planning information of the one or more electric vehicle wireless electrical energy chargers regarding one or more indications of electric vehicle user activities...

o1270 electronically requesting electric vehicle wireless electrical energy charger planning information of the one or more electric vehicle wireless electrical energy chargers regarding one or more indications of electric vehicle user activities...

o1277 requesting information of at least in part involving information regarding one or more uses of one or more electric vehicles including requesting information of at least in part involving one or more commercial delivery schedules utilizing one or more electric vehicles o1278 requesting information of at least in part involving information regarding one or more uses of one or more electric vehicles including requesting information of at least in part involving one or more courier service uses for one or more electric vehicles o1279 requesting information of at least in part involving information regarding one or more uses of one or more electric vehicles including requesting information of at least in part involving industrial cargo transport by one or more electric vehicles o1280 requesting information of at least in part involving information regarding one or more uses of one or more electric vehicles including requesting information of at least in part involving one or more uses of one or more electric vehicles including requesting information of at least in part involving one or more driving habits of one or more users of one or more electric vehicles o1281 requesting information of at least in part involving information regarding one or more uses of one or more electric vehicles including requesting information of at least in part involving one or more itineraries associated with use of one or more electric vehicles o12 electronically requesting electric vehicle wireless electrical energy charger planning information of the one or more electric vehicle wireless electrical energy chargers regarding one or more indications of electric vehicle user activities...

o1270 electronically requesting electric vehicle wireless electrical energy charger planning information of the one or more electric vehicle wireless electrical energy chargers regarding one or more indications of electric vehicle user activities...

o1282 requesting information of at least in part involving information regarding one or more uses of one or more electric vehicles including requesting information of at least in part involving one or more weather forecasts associated with travel through use of one or more electric vehicles o1283 requesting information of at least in part involving information regarding one or more uses of one or more electric vehicles including requesting information of at least in part involving one or more news broadcasts associated with travel through use of one or more electric vehicles o1284 requesting information of at least in part involving information regarding one or more uses of one or more electric vehicles including requesting information of at least in part involving emergency warning messages associated with use of one or more electric vehicles o1285 requesting information of at least in part involving information regarding one or more uses of one or more electric vehicles including requesting information of at least in part involving availability of alternate transportation within a designated distance from one or more electric vehicle wireless electrical energy chargers for transferring electrical energy to one or more electric vehicles o1286 requesting information of at least in part involving information regarding one or more uses of one or more electric vehicles including requesting information of at least in part involving ride-share programs associated with travel routes traveled by one or more electric vehicles

Fig. 10-R

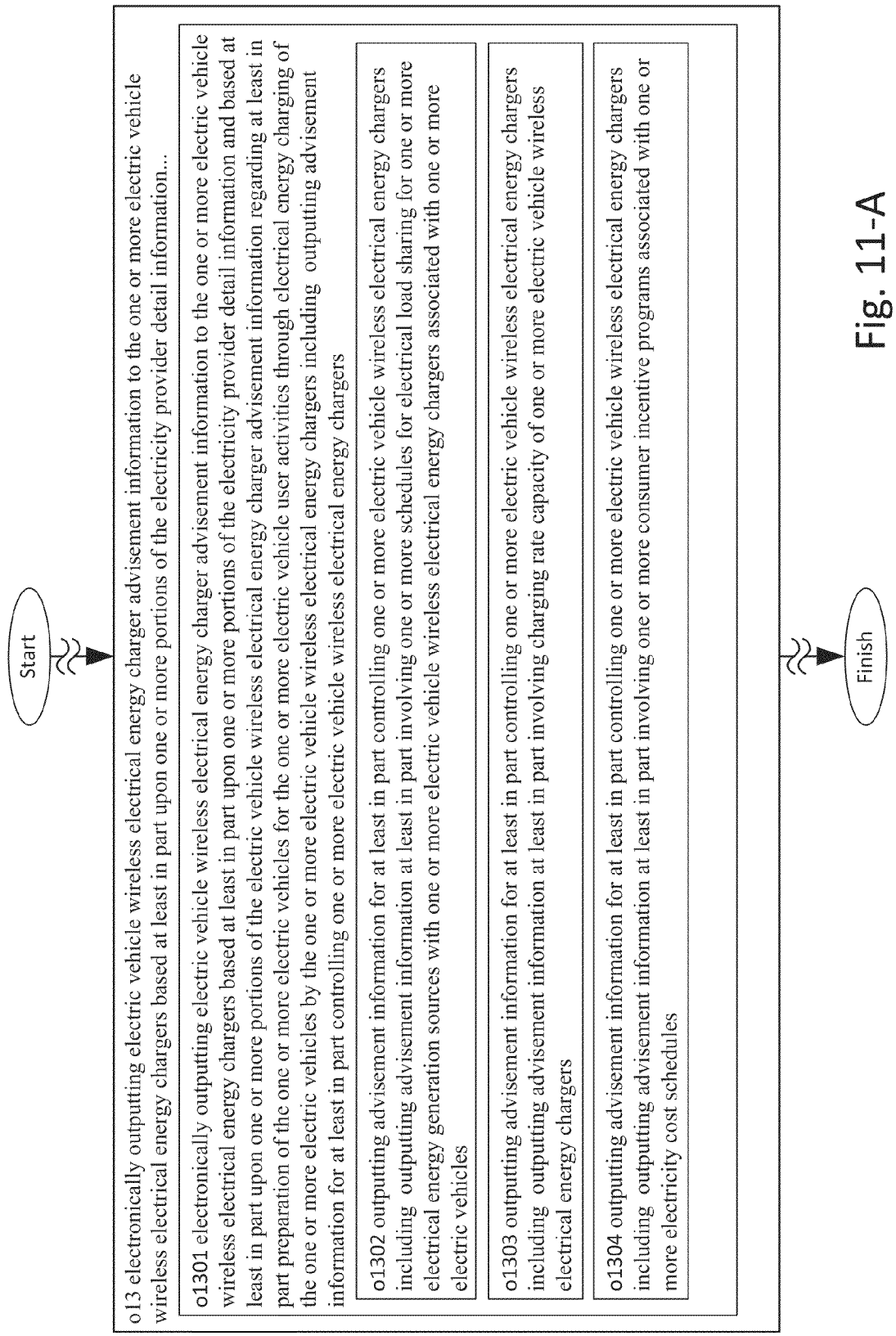
Fig. 11-A

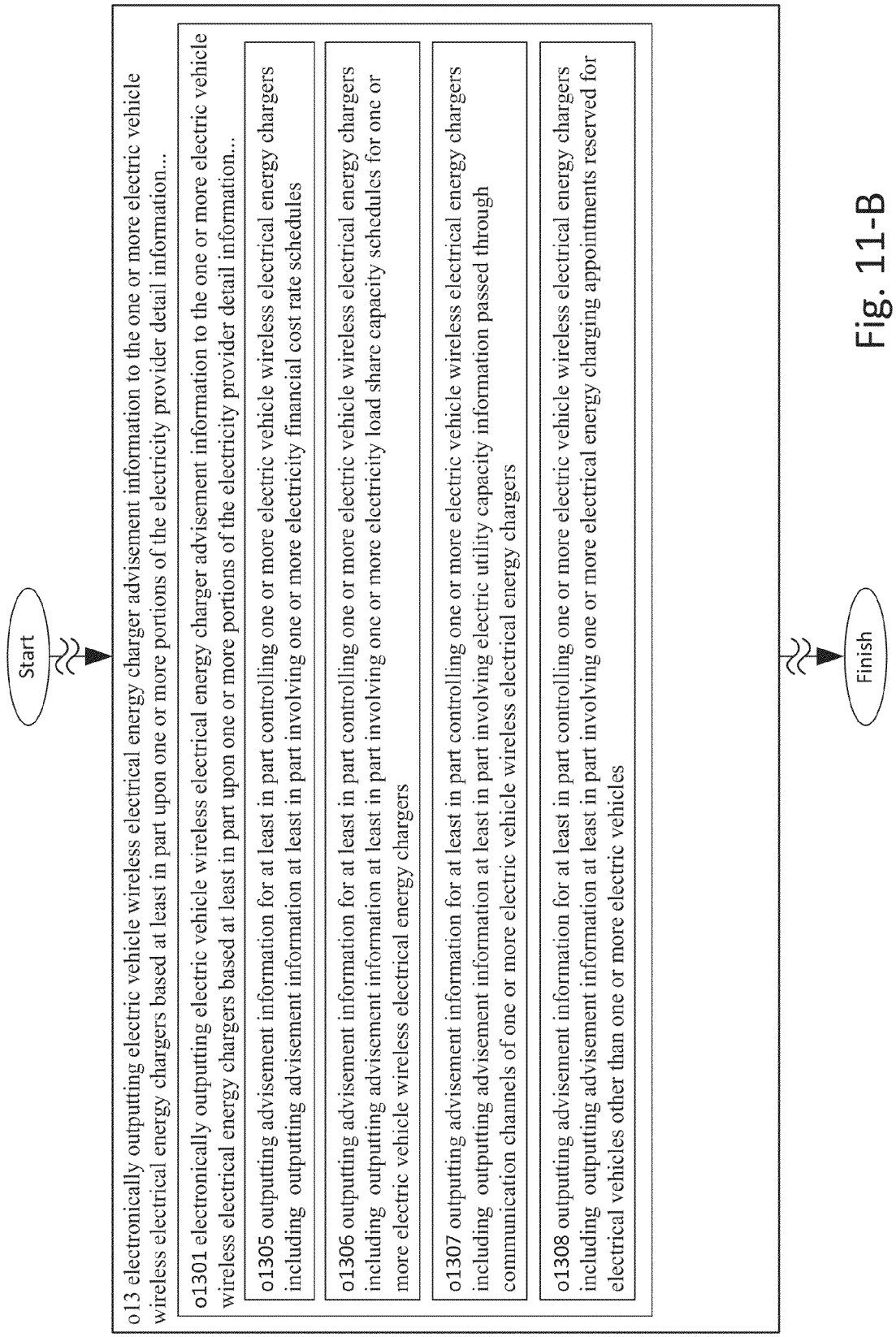
Fig. 11-B

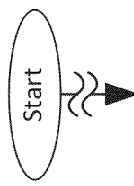
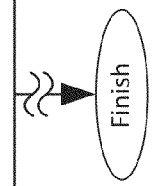

Fig. 11-C o13 electronically outputting electric vehicle wireless electrical energy charger advisement information to the one or more electric vehicle wireless electrical energy chargers based at least in part upon one or more portions of the electricity provider detail information...

o1301 electronically outputting electric vehicle wireless electrical energy charger advisement information to the one or more electric vehicle wireless electrical energy chargers based at least in part upon one or more portions of the electricity provider detail information...

o1309 outputting advisement information for at least in part controlling one or more electric vehicle wireless electrical energy chargers including outputting advisement information at least in part involving maximum charging rate capacities of one or more electric vehicle wireless electrical energy chargers o1310 outputting advisement information for at least in part controlling one or more electric vehicle wireless electrical energy chargers including outputting advisement information at least in part involving cost information for priority handling of charging of one or more electric vehicles by one or more electric vehicle wireless electrical energy chargers o1311 outputting advisement information for at least in part controlling one or more electric vehicle wireless electrical energy chargers including outputting advisement information at least in part involving one or more electric vehicle wireless electrical energy charger availability schedules for one or more electric vehicles o1312 outputting advisement information for at least in part controlling one or more electric vehicle wireless electrical energy chargers including outputting advisement information at least in part involving one or more histories of electrical energy consumption by one or more electric vehicle wireless electrical energy chargers

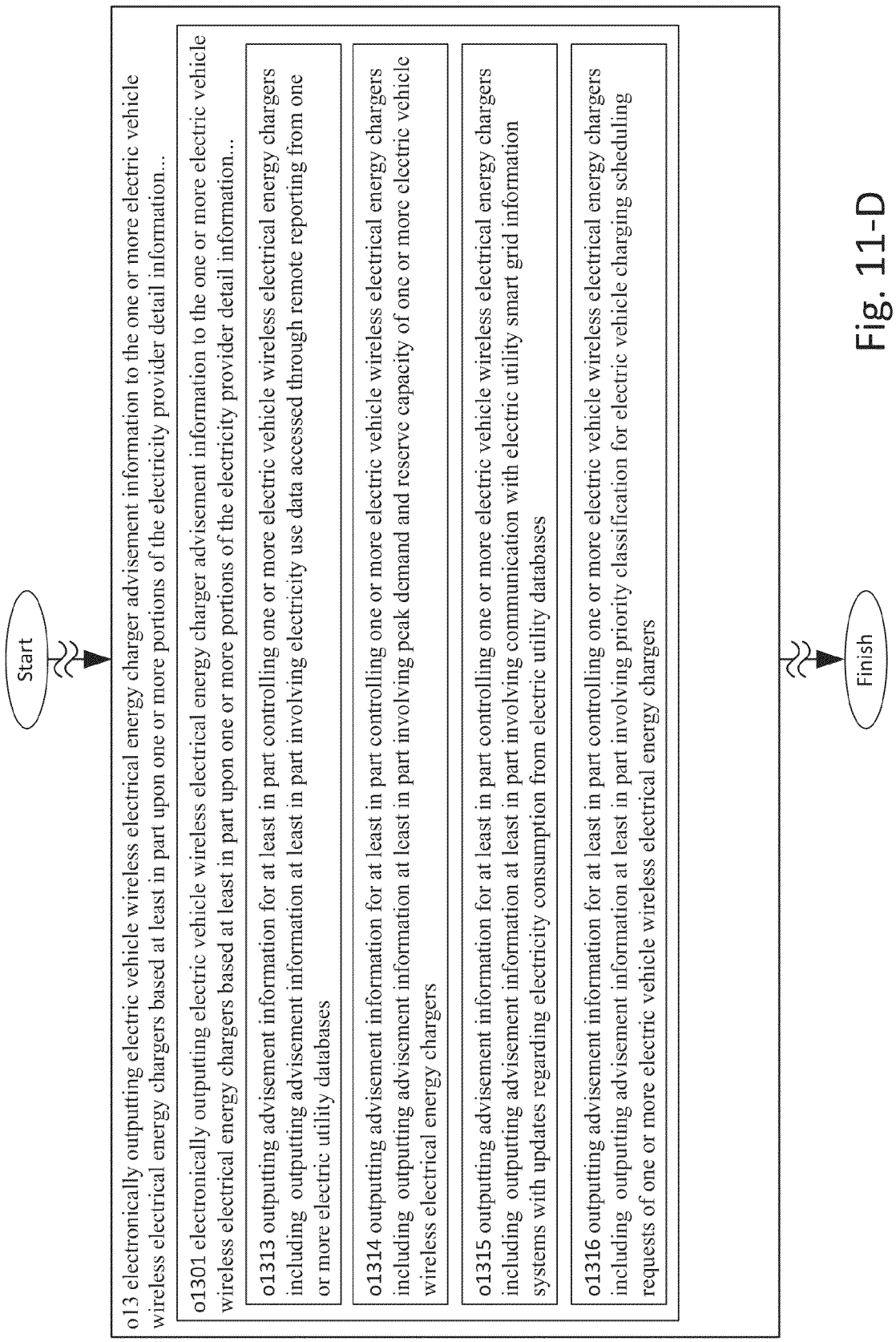
Fig. 11-D

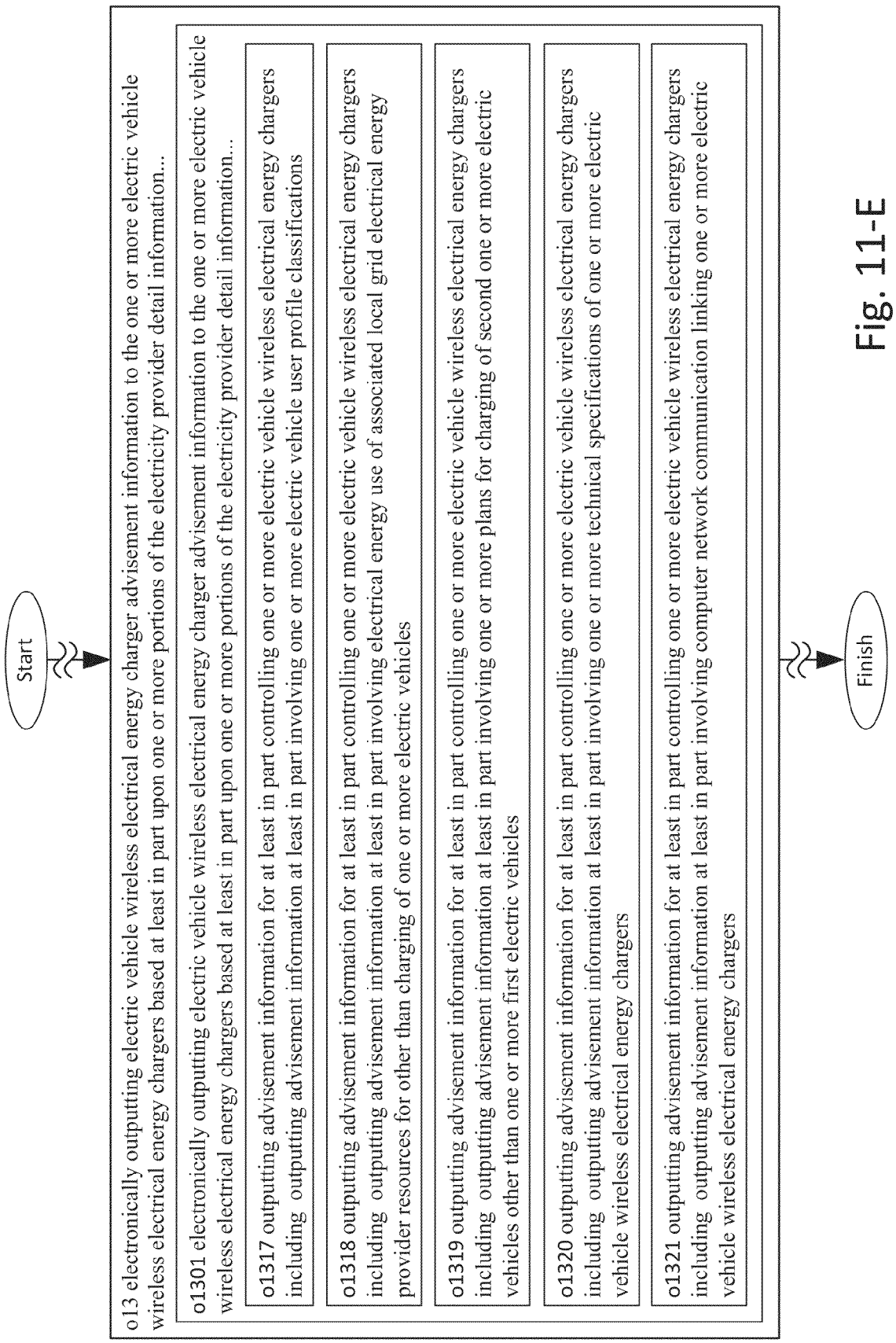
Fig. 11-E

COMMUNICATION AND CONTROL REGARDING ELECTRICITY PROVIDER FOR WIRELESS ELECTRIC VEHICLE ELECTRICAL ENERGY TRANSFER

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

The present application constitutes a continuation of U.S. patent application Ser. No. 14/091,702, entitled COMMUNCATION AND CONTROL REGARDING ELECTRICITY PROVIDER FOR WIRELESS ELECTRIC VEHICLE ELECTRICAL ENERGY TRANSFER, naming Roderick A. Hyde Jordin, T. Kare, Richard T. Lord, Robert W. Lord, Clarence T. Tegreene, Lowell Wood, Jr. as inventors, filed 27, Nov., 2013 which is currently co-pending or is an application of which a currently co-pending application is entitled to the benefit of the filing date.

The present application constitutes a continuation of the U.S. patent application Ser. No. 14/092,082, entitled COMMUNICATION AND CONTROL SYSTEM AND METHOD REGARDING ELECTRIC VEHICLE FOR WIRELESS ELECTRIC VEHICLE ELECTRICAL ENERGY TRANSFER, naming Roderick A. Hyde; Jordin T. Kare; Richard T. Lord; Robert W. Lord; Clarence T. Tegreene; Lowell L. Wood, Jr. as inventors, filed 27, Nov., 2013 which is currently co-pending or is an application of which a currently co-pending application is entitled to the benefit of the filing date.

The present application constitutes a continuation-in-part of U.S. patent application Ser. No. 14/092,306, entitled COMMUNIATION AND CONTROL SYSTEM AND METHOD REGARDING ELECTRIC VEHICLE CHARGING EQUIPMENT FOR WIRELESS ELECTRIC VEHICLE ELECTRICAL ENERGY TRANSFER, naming ROderick A. Hyde; Jordin T. Kare; Richard T. Lord; Robert W. Lord; Clarence T. Tegreene; Lowell L. Wood, Jr. as inventors, filed 27, Nov., 2013 which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/089,513, entitled COMMUNICATION AND CONTROL SYSTEM AND METHOD REGARDING ELECTRIC VEHICLE CHARGING EQUIPMENT FOR WIRELESS ELECTRIC VEHICLE ELECTRICAL ENERGY TRANSFER, naming Roderick A. Hyde; Jordin T. Kare; Richard T. Lord; Robert W. Lord; Clarence T. Tegreene; and Lowell L. Wood, Jr. as inventors, filed 25 Nov. 2013 which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/086,903, entitled COMMUNICATION AND CONTROL SYSTEM AND METHOD REGARDING ELECTRIC VEHICLE FOR WIRELESS ELECTRIC VEHICLE ELECTRICAL ENERGY TRANSFER, naming Roderick A. Hyde; Jordin T. Kare; Richard T. Lord; Robert W. Lord; Clarence T. Tegreene; and Lowell L. Wood, Jr. as inventors, filed 21 Nov. 2013 which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/041,443, entitled COMMUNICATION AND CONTROL REGARDING WIRELESS ELECTRIC VEHICLE ELECTRICAL ENERGY TRANSFER, naming Roderick A. Hyde; Jordin T. Kare; Richard T. Lord; Robert W. Lord; Clarence T. Tegreene; and Lowell L. Wood, Jr. as inventors, filed 30 Sep. 2013 which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one aspect, a computationally-implemented method includes, but is not limited to electronically assessing electricity provider detail information associated with providing electrical energy to one or more electric vehicle wireless electrical energy chargers configured for wirelessly charging one or more electric vehicles with electrical energy from the one or more electric vehicle wireless electrical energy chargers to the one or more electric vehicles, the one or more electric vehicles including one or more electric motors to provide motive force for directionally propelling the one or more electric vehicles; electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers; and electronically outputting electric vehicle wireless electrical energy charger advisement information to the one or more electric vehicle wireless electrical energy chargers based at least in part upon one or more portions of the electricity provider detail information and based at least in part upon one or more portions of the electric vehicle wireless electrical energy charger planning information, the electric vehicle electrical energy charger advisement information regarding at least in part preparation of the one or more electric vehicles for the one or more electric vehicle user activities through electrical energy charging of the one or more electric vehicles by the one or more electric vehicle wireless electrical energy chargers. In addition to the foregoing, other method aspects are described in the claims, drawings, and text forming a part of the disclosure set forth herein.

In one or more various aspects, related machines, compositions of matter, or manufactures of systems may include, but are not limited to, circuitry and/or programming for effecting the herein-referenced method aspects; the circuitry and/or programming can be virtually any combination of hardware, software, and/or firmware configured to effect the herein-referenced method aspects depending upon the design choices of the system designer (limited to patentable subject matter under 35 USC 101).

A computationally-implemented system includes, but is not limited to: means for electronically assessing electricity provider detail information associated with providing electrical energy to one or more electric vehicle wireless electrical energy chargers configured for wirelessly charging one or more electric vehicles with electrical energy from the one or more electric vehicle wireless electrical energy chargers to the one or more electric vehicles, the one or more electric vehicles including one or more electric motors to provide motive force for directionally propelling the one or more electric vehicles; means for electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers; and means for electronically outputting electric vehicle wireless electrical energy charger advisement information to the one or more electric vehicle wireless electrical energy chargers based at least in part upon one or more portions of the electricity provider detail information and based at least in part upon one or more portions of the electric vehicle wireless electrical energy charger planning information, the electric vehicle electrical energy charger advisement information regarding at least in part preparation of the one or more electric vehicles for the one or more electric vehicle user activities through electrical energy charging of the one or more electric vehicles by the one or more electric vehicle wireless electrical energy chargers. In addition to the foregoing, other system aspects are described in the claims, drawings, and text forming a part of the disclosure set forth herein.

A computationally-implemented system includes, but is not limited to electrical circuitry arrangement for electronically assessing electricity provider detail information associated with providing electrical energy to electric vehicle wireless electrical energy chargers configured for wirelessly charging electric vehicles with electrical energy from one or more electric vehicles wireless electrical energy chargers to one or more electric vehicles, one or more electric vehicles including electric motors to provide motive force for directionally propelling one or more electric; electrical circuitry arrangement for electronically requesting electric vehicle wireless electrical energy charger planning information of one or more electric vehicles wireless electrical energy chargers regarding indications of electric vehicle user activities involving one or more electric vehicles to be prepared for by wirelessly charging one or more electric vehicles with electrical energy from one or more electric vehicles wireless electrical energy chargers; and electrical circuitry arrangement for electronically outputting electric vehicle wireless electrical energy charger advisement information to one or more electric vehicles wireless electrical energy chargers based upon portions of the electricity provider detail information and based upon portions of the electric vehicle wireless electrical energy charger planning information, the electric vehicle wireless electrical energy charger advisement information regarding preparation of one or more electric vehicles for one or more electric vehicles user activities through electrical energy charging of one or more electric vehicles by one or more electric vehicles wireless electrical energy chargers. In addition to the foregoing, other system aspects are described in the claims, drawings, and text forming a part of the disclosure set forth herein.

A system includes, but is not limited to electronically assessing electricity provider detail information associated with providing electrical energy to electric vehicle wireless electrical energy chargers configured for wirelessly charging electric vehicles with electrical energy from one or more electric vehicles wireless electrical energy chargers to one or more electric vehicles, one or more electric vehicles including electric motors to provide motive force for directionally propelling one or more electric module configured to operate in accordance with electronically assessing electricity provider detail information associated with providing electrical energy to one or more electric vehicle wireless electrical energy chargers configured for wirelessly charging one or more electric vehicles with electrical energy from the one or more electric vehicle wireless electrical energy chargers to the one or more electric vehicles, the one or more electric vehicles including one or more electric motors to provide motive force for directionally propelling the one or more electric vehicles; electronically requesting electric vehicle wireless electrical energy charger planning information of one or more electric vehicles wireless electrical energy chargers regarding indications of electric vehicle user activities involving one or more electric vehicles to be prepared for by wirelessly charging one or more electric vehicles with electrical energy from one or more electric vehicles wireless electrical energy chargers module configured to operate in accordance with electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers; electronically outputting electric vehicle wireless electrical energy charger advisement information to one or more electric vehicles wireless electrical energy chargers based upon portions of the electricity provider detail information and based upon portions of the electric vehicle wireless electrical energy charger planning information, the electric vehicle wireless electrical energy charger advisement information regarding preparation of one or more electric vehicles for one or more electric vehicles user activities through electrical energy charging of one or more electric vehicles by one or more electric vehicles wireless electrical energy chargers module configured to operate in accordance with electronically outputting electric vehicle wireless electrical energy charger advisement information to the one or more electric vehicle wireless electrical energy chargers based at least in part upon one or more portions of the electricity provider detail information and based at least in part upon one or more portions of the electric vehicle wireless electrical energy charger planning information, the electric vehicle electrical energy charger advisement information regarding at least in part preparation of the one or more electric vehicles for the one or more electric vehicle user activities through electrical energy charging of the one or more electric vehicles by the one or more electric vehicle wireless electrical energy chargers. In addition to the foregoing, other system aspects are described in the claims, drawings, and text forming a part of the disclosure set forth herein.

An article of manufacture including one or more non-transitory signal-bearing storage medium bearing one or more instructions for electronically assessing electricity provider detail information associated with providing electrical energy to one or more electric vehicle wireless electrical energy chargers configured for wirelessly charging one or more electric vehicles with electrical energy from the one or more electric vehicle wireless electrical energy chargers to the one or more electric vehicles, the one or more electric vehicles including one or more electric motors to provide motive force for directionally propelling the one or more electric vehicles; one or more instructions for electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers; and one or more instructions for electronically outputting electric vehicle wireless electrical energy charger advisement information to the one or more electric vehicle wireless electrical energy chargers based at least in part upon one or more portions of the electricity provider detail information and based at least in part upon one or more portions of the electric vehicle wireless electrical energy charger planning information, the electric vehicle electrical energy charger advisement information regarding at least in part preparation of the one or more electric vehicles for the one or more electric vehicle user activities through electrical energy charging of the one or more electric vehicles by the one or more electric vehicle wireless electrical energy chargers. In addition to the foregoing, other computer program product aspects are described in the claims, drawings, and text forming a part of the disclosure set forth herein.

A system including one or more computing devices; and one or more instructions when executed on the one or more computing devices cause the one or more computing devices to perform electronically assessing electricity provider detail information associated with providing electrical energy to one or more electric vehicle wireless electrical energy chargers configured for wirelessly charging one or more electric vehicles with electrical energy from the one or more electric vehicle wireless electrical energy chargers to the one or more electric vehicles, the one or more electric vehicles including one or more electric motors to provide motive force for directionally propelling the one or more electric vehicles; electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers; and electronically outputting electric vehicle wireless electrical energy charger advisement information to the one or more electric vehicle wireless electrical energy chargers based at least in part upon one or more portions of the electricity provider detail information and based at least in part upon one or more portions of the electric vehicle wireless electrical energy charger planning information, the electric vehicle electrical energy charger advisement information regarding at least in part preparation of the one or more electric vehicles for the one or more electric vehicle user activities through electrical energy charging of the one or more electric vehicles by the one or more electric vehicle wireless electrical energy chargers. In addition to the foregoing, other computer program product aspects are described in the claims, drawings, and text forming a part of the disclosure set forth herein.

In addition to the foregoing, various other method and/or system and/or program product aspects are set forth and described in the teachings such as text (e.g., claims and/or detailed description) and/or drawings of the present disclosure.

In one or more various aspects, a method includes but is not limited to that which is illustrated in the drawings. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of is an example of Communication and Control Regarding Electricity Provider for Wireless Electric Vehicle Electrical Energy Transfer that may provide context, for instance, in introducing one or more processes and/or devices described herein.

In accordance with 37 CFR 1.84(h)(2)

Figure 1:
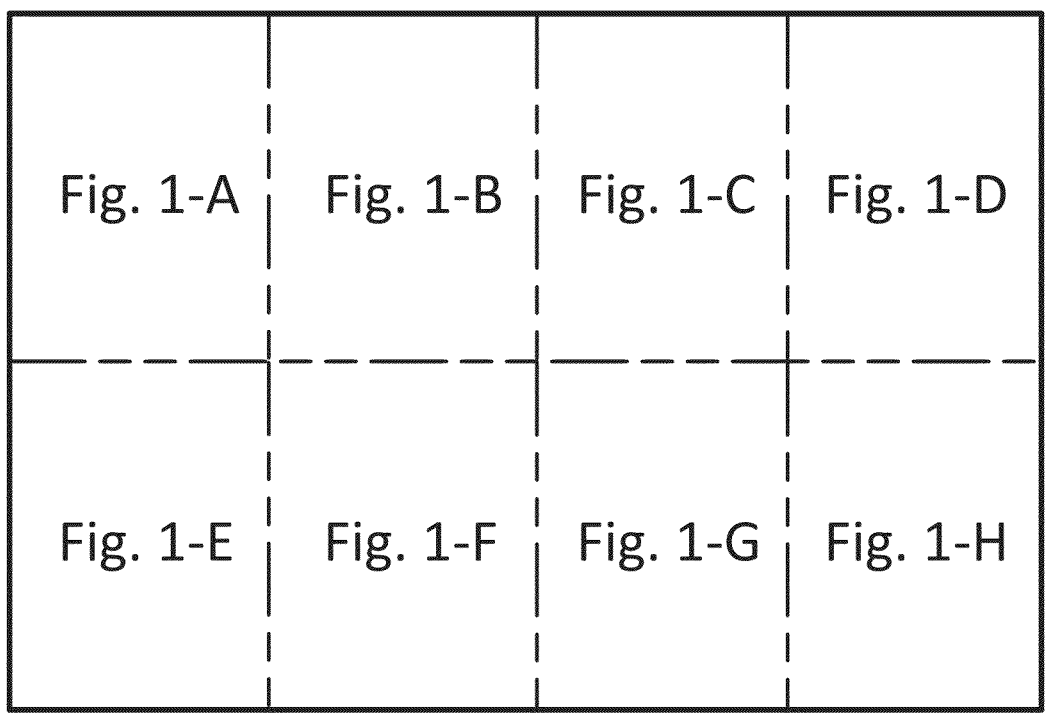
FIG. 1 shows how FIG. 1-A through FIG. 1-H (Sheets 2-9) are to be arranged and assembled to form "a view of a large machine or device in its entirety . . . broken into partial views . . . extended over several sheets" labeled. The "views on two or more sheets form, in effect, a single complete view, [and] the views on the several sheets . . . [are] so arranged that the complete figure can be assembled" from "partial views drawn on separate sheets . . . linked edge to edge," in that the partial-view FIGS. 1-A to 1-H are ordered alphabetically, by increasing column from left to right, as shown in the following table (with further orientation as indicated by phantom-lines on the partial-view figures)

| FIG. 1-A | FIG. 1-B | FIG. 1-C | FIG. 1-D |
| FIG. 1-E | FIG. 1-F | FIG. 1-G | FIG. 1-H |

FIG. 2 shows a schematic diagram of implementation(s) of environment(s) and/or implementations(s) of one or more technologies described herein including electricity provider implementation(s) in communication with wireless electrical energy imparting station implementation(s).

Figure 3:
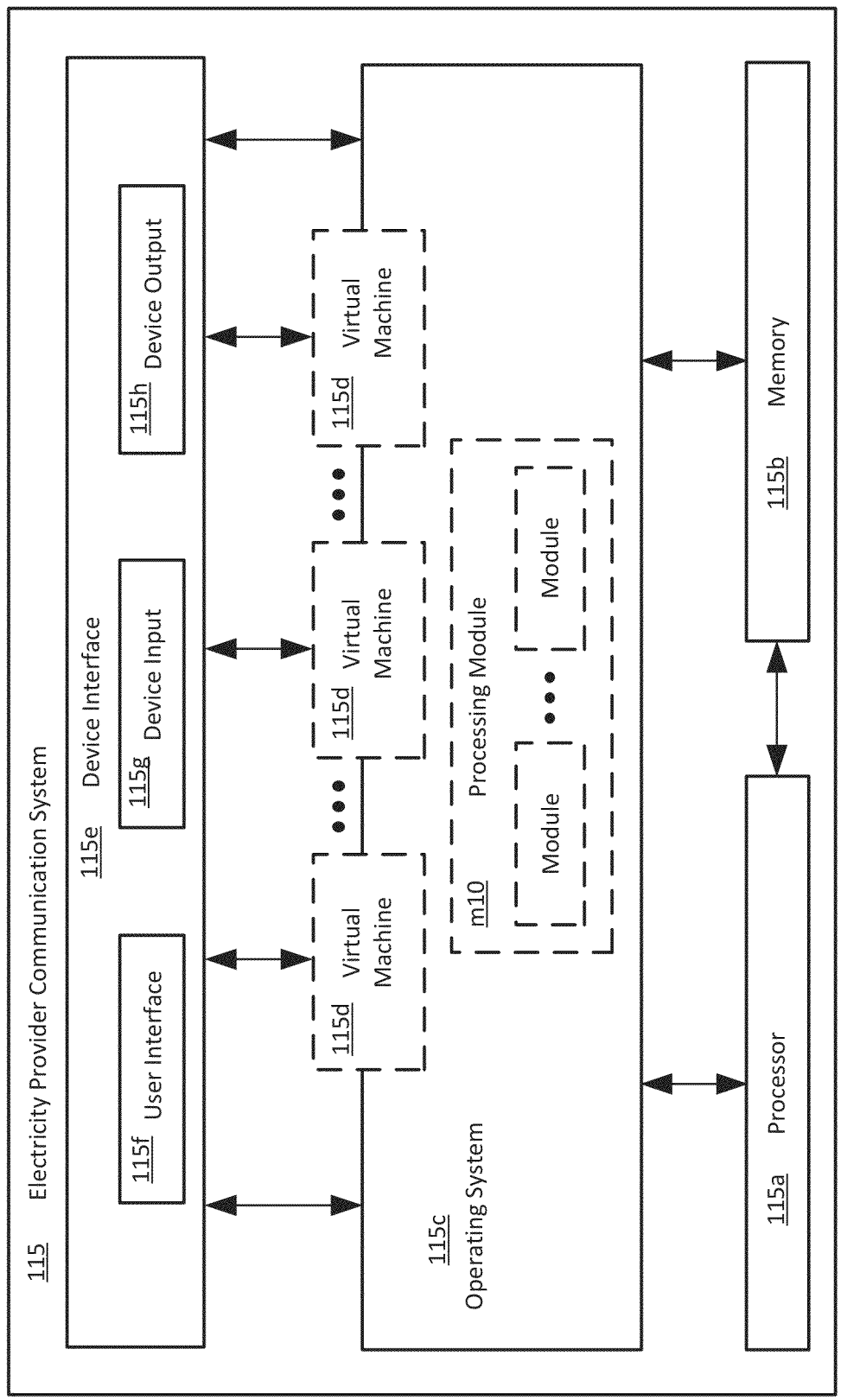

FIG. 3 shows a schematic diagram of implementation(s) of environment(s) and/or implementations(s) of one or more technologies described herein including electricity provider implementation(s).

FIG. 4 shows a schematic diagram of implementation(s) of environment(s) and/or implementations(s) of one or more technologies described herein including processing module implementation(s).

FIG. 5-A through FIG. 5-C (sheets 13-15) show a partially schematic diagram of an implementation(s) of electronically accessing energy impartation information regarding imparting of wireless electrical energy from wireless electrical energy imparting stations to an electric vehicle, the energy impartation information including aspects regarding evidence of intended activity of users of the electric vehicle, the electric vehicle configured for travel by electromotive force through electrical energy wirelessly received from the wireless electrical energy imparting stations and stored by the electric vehicle module(s).

FIG. 6-A through FIG. 6-I (sheets 16-24) show a partially schematic diagram of an implementation(s) of electronically determining operational direction information for wirelessly imparting electrical energy from the wireless electrical energy imparting stations to the electric vehicle based upon the energy impartation information module(s).

FIG. 7-A through FIG. 7-C (sheets 25-27) show a partially schematic diagram of an implementation(s) of electronically transmitting wireless electrical energy receiving advisory information based upon the operational direction information, the wireless electrical energy receiving advisory information for use by the electric vehicle in wirelessly receiving electrical energy from the wireless electrical energy imparting stations module(s).

Figure 8:
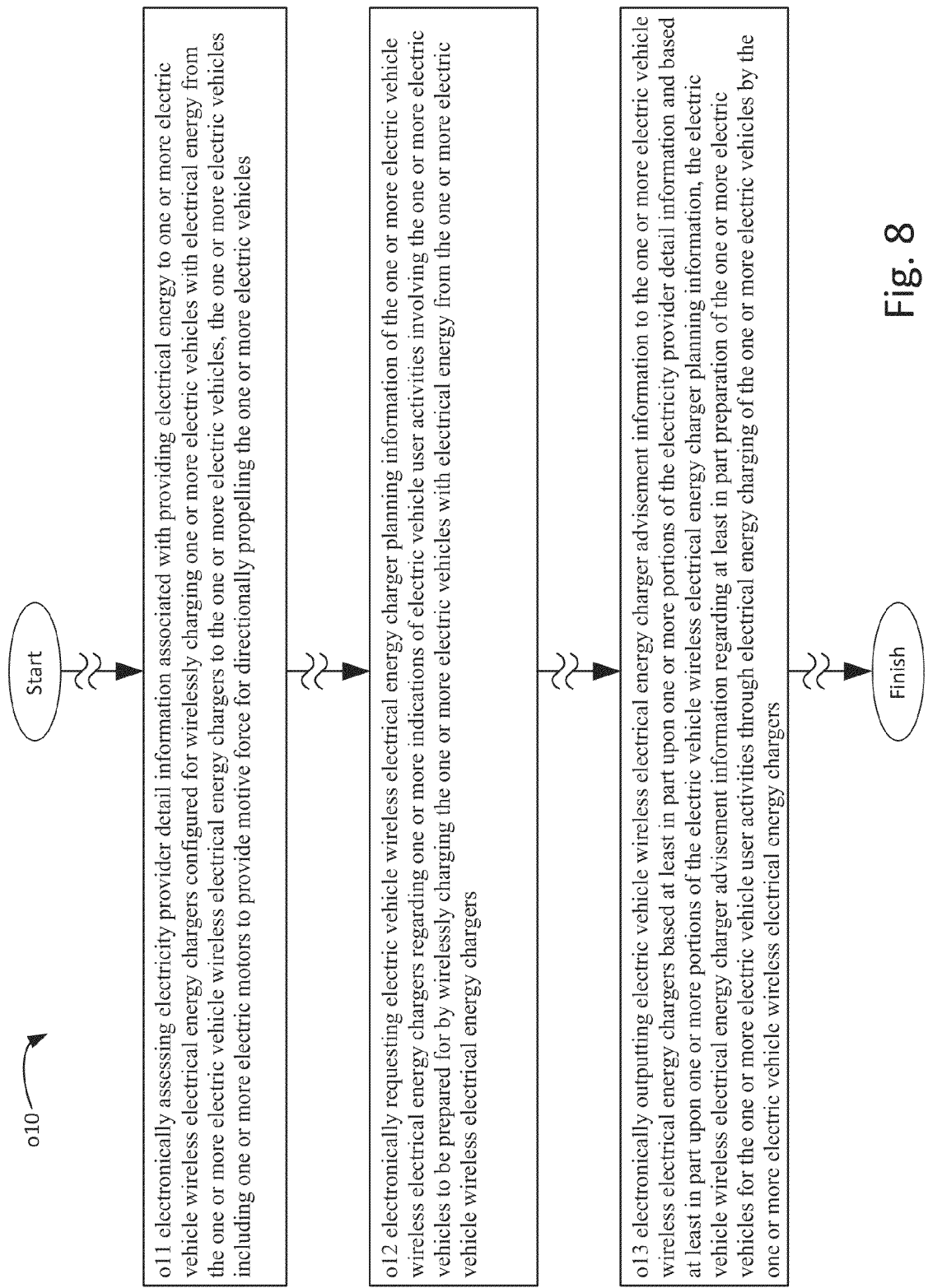

FIG. 8 shows a high-level flowchart illustrating an operational flow o10 representing exemplary operations related to operation o11, operation o12, and operation o13.

FIG. 9-A through FIG. 9-F (Sheets 29-34) show a high-level flowchart including exemplary implementations of operation o11 of FIG. 8.

FIG. 10-A through FIG. 10-R (Sheets 35-52) show a high-level flowchart including exemplary implementations of operation o12 of FIG. 8.

FIG. 11-A through FIG. 11-E (Sheets 53-57) show a high-level flowchart including exemplary implementations of operation o13 of FIG. 8.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present application may use formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Thus, in accordance with various embodiments, computationally implemented methods, systems, circuitry, articles of manufacture, ordered chains of matter, and computer program products are designed to, among other things, provide an interface for the environment illustrated in FIG. 1-A through FIG. 1-H.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very High Speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/ functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/ converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/ or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scalable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a nonexclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although one or more users maybe shown and/or described herein, e.g., in FIGS. 1-A through 1-H, and other places, as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") generally encompass active-state components and/or inactive-state components and/or standby-state components, unless context requires otherwise.

As depicted in FIGS. 1-A through 1-H, a communication and control system and method regarding wireless electric vehicle electrical energy transfer is shown to include a wireless electrical energy transfer receiving device 110, wireless electrical energy transfer imparting station(s) 112, an electricity provider 114, and a user communication device 116 with a user interface of the user communication device 118. The wireless electrical energy transfer receiving device 110, wireless electrical energy transfer imparting station(s) 112, electricity provider 114, and user communication device 116 with user interface 118 can communicate with each other using wired or wireless communication networks such as but not limited to internet, cellular, point-to-point and other network modes. Other methods of communication between one or more of these various devices and/or systems can include but are not limited to one or more of the following such as contactless smart card located on vehicle, RFID tag, manual entering of data into keypad, blue tooth communication, WiFi communication, FM radio wave communication, infrared communication, direct connection via wired communication, audio (e.g., voice recognition, etc.). Communication between these devices and/or systems can include purposes such as identification and verification of consumer, user, or other individual(s), identification and verification of energy transfer source and/or receiver, finance status of user or other account, energy available at source and/or point of reception, condition of electrical receiving device (e.g., vehicle, energy storage system (e.g., batteries, etc.)), use history (how vehicle or other electrical energy receiving device was used) such as information provided by a vehicle log, use or energy transfer scheduling, or energy transfer logs or project energy transfer deadline(s), etc., projected energy transfer completion time with respect to an adequate energy amount in storage for next destination of a vehicle, user or other individual profile and/or account information, projected user itinerary and/or route planning Itinerary planning can also include route planning, travel objectives, daily commuter schedule and routes, planned versus actual vehicle routes, various planned and actual tasks and errands associated with vehicle or other device use.

In some implementations there are singular or multiple of wireless electrical energy transfer receiving device 110, wireless electrical energy transfer imparting station(s) 112, electricity provider 114, or user communication device 116 with user interface 118.

In one or more implementations of the wireless electrical energy transfer receiving device 110 can be involved with receiving electrical energy transfer from wireless electrical energy transfer station through field magnetic resonance or other wireless methods for transferring electrical energy, etc. Examples of such can include vehicle(s), robot(s), mobile maintenance device(s) such as vacuum(s), lawn mower(s), cleaner(s), etc. The wireless electrical energy transfer receiving device 110 can be involved with electrical energy transfer security including transmitting/receiving to/from electrical energy transfer imparting station(s) re frequency and timing information used for magnetic resonance electrical energy transfer, etc. By coordinating changes in frequencies regarding what frequency electrical energy is transferred theft of electrical energy transferred can be deterred. Other aspects can include the wireless electrical energy transfer receiving device 110 transmitting/receiving information to/from the user communication device user 116 regarding status of electrical energy transfer associated with user plans or payment program information, etc. The wireless electrical energy transfer receiving device 110 can sense if it is in the vicinity of the wireless electrical energy transfer imparting station 112, and/or sensing if its door (e.g., in an electrical vehicle implementation) is being opened to ask user status, etc. The wireless electrical energy transfer receiving device 110 can transmit/receive information to/from electrical the electrical energy transfer imparting station 112 regarding status of electrical energy transfer associated with user plans or payment program information or service downloads such as enhanced WiFi, data streaming, cleaning, backups, etc. The wireless electrical energy transfer receiving device 110 can send to the wireless electrical energy transfer imparting station(s) 112 electrical energy transfer management information re frequency security, user plans, load sharing, payment programs, etc. The wireless electrical energy transfer receiving device 110 can receive from the wireless electrical energy transfer imparting station(s) 112 electrical energy transfer management information re frequency security, user plans, load sharing, payment programs, etc. The wireless electrical energy transfer receiving device 110 can send to the user communication device 116 electrical energy transfer management information re user plans, payment programs, etc. The wireless electrical energy transfer receiving device 110 can receive from the user communication device 116 electrical energy transfer management information re user plans, payment programs, etc.

Exemplary implementations of the wireless electrical energy transfer receiving device 110 can include one or more electric vehicles such as manufactured by such manufacturers as Nissan, Chevrolet, or Tesla. Furthermore exemplary implementation can include electric vehicle dealers that sell electrical energy transfer packages including equipment, installation, financing, etc. along with electric vehicle. Exemplary implementations of electric vehicle can include aspects such as batteries such as lithium ion, lead acid, nickel cadmium, capacitors, etc. Other aspects of electric vehicles can include charging (wireless energy transfer) technology such as wireless changing of the vehicle. Considerations regarding wireless energy transfer imparted to the vehicle can include how the vehicle is driven, commuting details such as distance, routes, errands, tasks, commercial deliveries, courier services, industrial cargo transport, location of electrical energy transfer, garage configuration, park and ride details, parking lot layout, commercial charging station infrastructure, etc. Other exemplary implementations can include aspects involving the alliance for wireless power (A4WP) such as involving Qualcomm Inc., Apple Inc., Intel, Inc. and/or Samsung Inc.'s implementation(s) of near field magnetic resonance or simply field magnetic resonance electrical energy transfer or other wireless electrical energy transfer technologies such as for transferring electrical energy from millimeters up to meters in distance. Such implementations can include electrical energy transfer for airport parking lots, employee parking lots, private of public garages, and other locations where one or more vehicles may be stationary for short or long term durations. Exemplary implementations can include charging one or more vehicles through induction pads located in parking spaces beneath where the one or more vehicles are parked.

The wireless electrical energy transfer imparting station(s) 112 can wirelessly impart electrical energy transfer to the electrical energy transfer receiving device 110 through field magnetic resonance or other wireless method for transferring electrical energy, etc. The wireless electrical energy transfer imparting station(s) 112 can accomplish wireless electrical energy transfer security such as through transmitting/receiving to/from the electrical energy transfer receiving device 110 regarding frequency and timing information used for field magnetic resonance electrical energy transfer, etc. The wireless electrical energy transfer imparting station(s) 112 can transmit/receive information to/from the user communication device 116 regarding status of electrical energy transfer associated with user plans or payment program information, etc. The wireless electrical energy transfer imparting station(s) 112 can transmit/receive information to/from the electrical energy transfer receiving device 110 regarding status of electrical energy transfer associated with user plans or payment program information, etc. The wireless electrical energy transfer imparting station(s) 112 can transmit/receive information to/from another wireless electrical energy transfer imparting station 112 regarding status of electrical energy transfer associated with user plans or payment program information such as for balancing electric load, etc. The wireless electrical energy transfer imparting station(s) 112 can transmits/receive information to/from electricity provider 114 regarding status of electrical energy transfer associated with user plans or payment program information such as for balancing electric load, etc. As shown, the wireless electrical energy transfer imparting station(s) 112 can send to the electrical energy transfer receiving device 110 electrical energy transfer management information re frequency security, user plans, load sharing, payment programs, etc. The wireless electrical energy transfer imparting station(s) 112 can receive from the electrical energy transfer receiving device 110 electrical energy transfer management information re frequency security, user plans, load sharing, payment programs, etc. The wireless electrical energy transfer imparting station(s) 112 can send to the user communication device 116 electrical energy transfer management information re user plans, payment programs, etc. The wireless electrical energy transfer imparting station(s) 112 can receive from the user communication device 116 electrical energy transfer management information re user plans, payment programs, etc. The wireless electrical energy transfer imparting station(s) 112 can send to another wireless electrical energy transfer imparting station(s) 112 electrical energy transfer management information re user plans, load sharing, payment programs, etc. The wireless electrical energy transfer imparting station(s) 112 can receive from another wireless electrical energy transfer imparting station(s) 112 electrical energy transfer management information re user plans, load sharing, payment programs, etc. The wireless electrical energy transfer imparting station(s) 112 can send to electricity provider 114 electrical energy transfer management information re user plans, load sharing, payment programs, etc. The wireless electrical energy transfer imparting station(s) 112 can receive from electricity provider 114 electrical energy transfer management information re user plans, load sharing, payment programs, etc.

Exemplary implementations of the wireless electrical energy transfer imparting station(s) 112 can include electric vehicle electrical energy transfer equipment. For example, example electrical equipment manufactured by manufacturers such as GE, Westinghouse, Siemens, or ABB. Other exemplary implementations can include electric vehicle electrical energy transfer equipment provided by electric vehicle manufacturers such as Nissan, Chevrolet, or Tesla or dealers thereof. For example, one or more electric vehicle dealers can sells electrical energy transfer packages including equipment installation, financing, etc. along with electric vehicle.

Exemplary implementations of the wireless electrical energy transfer imparting station(s) 112 can include smart metering such as including recorded consumption energy based on time period of other intervals of time, coordination of energy transfer based on electricity demand put on the electricity provider 114 by various parties, two-way communication between the metering at the wireless electrical energy transfer imparting station(s) 112 and the electricity provider 114 for control and/or reporting of energy transfer at the site of the metering. Further, load balancing at the wireless electrical energy transfer imparting station(s) 112 or the electricity provider 114 can be accomplished through load matching, daily peak demand reserve, storage of excess electrical power during low demand periods to release as demand rises, store of energy during peak times and release energy during off peak times, use of a battery bank to store energy, use of an electricity providing grid to balance energy production and consumption, use of smart grid technology to allow consumers and other users to communicate with utility using digital means, and control from the electricity provider 114 to switch electrical energy transfer at the wireless electrical energy transfer imparting station(s) 112 on or off.

In implementations of the wireless electrical energy transfer imparting station(s) 112 there may be multiple priorities from various perspectives (such as user, vehicle, charging station, electricity provider, etc.) for electrical energy transfer such as urgent or immediate need, when lower rate/cost is available, when next lower (lowest) rate/cost is available, or dependent on charging optimization or electrical energy supply optimization. Exemplary implementations can include the electric vehicle or other implementations of the wireless electrical energy transfer receiving device 110 receiving charge when rate/cost is lowest, and allowing grid to receive electrical energy when rates are higher. Implementations can utilize server technology with communication networks to implement communication. Such server technology can be used to store user profiles and utility power grid load balancing history and other data.

The wireless electrical energy transfer imparting station(s) 112 can utilize field magnetic resonance technology or resonant inductive coupling which can involve wireless transmission of electrical energy between two coils that are tuned to resonate at the same frequency and include electrical equipment such as resonance transformers. Further aspects can include the wireless electrical energy transfer imparting station(s) 112 having one or more voltage-controlled oscillator electrical circuits with one or more first transducers and one or more second transducers to electrically charge an energy storage device using electromagnetic or inductive charging. Exemplary implementations can include one or more electric vehicles equipped with one or more translocators for transmitting one or more coded signals to the wireless electrical energy transfer imparting station(s) 112 corresponding to the location of an electric vehicle or other wireless electrical energy transfer receiving device 110 and further activating the wireless electrical energy transfer imparting station(s) 112.

In implementations the wireless electrical energy transfer imparting station(s) 112 could communicate with the wireless electrical energy transfer receiving device 110 and/or the electricity provider 114 through an encrypted link so that both the electrical energy transfer receiving device 110 and the wireless electrical energy transfer imparting station(s) 112 know ahead of time what frequency to use for electrical energy transfer to hinder theft of electrical energy. Frequencies can be varied in this manner to thwart prediction of such frequencies. Further modes of electrical energy transfer can include fast and slow transfers depending upon plans, efficiencies, cost rates, and other factors discussed herein such as an electrical vehicle could audibly ask the driver the driver's plans, financial membership status (such as a "gold membership" status), input from social network associates or monitoring, smart metering by electricity provider 114 and/or other user aspects as the driver exits the vehicle and then factors such aspects into subsequent electrical energy transfer rates and timing. The wireless electrical energy transfer imparting station(s) 112 can also provide various data downloads including news updates, software, data maintenance, etc. as the electrical energy transfer is occurring.

The wireless electrical energy transfer imparting station(s) 112 can also include communication not only with one or more electric vehicles but also other electricity consuming devices in a dwelling or other structure or location such as involving load leveling or balancing between charging an electric vehicle and powering household air conditioning, refrigeration, and hot water heating.

In implementations the electricity provider 114 can transmit/receive information to/from the wireless electrical energy transfer imparting station(s) 112 regarding status of electrical energy transfer associated with load sharing, user plans or payment program information, etc. including time and amount of use rate structures and smart metering, power cycling to distribute load among electrical energy transfers and other energy consuming devices. The electricity provider 114 can send to the wireless electrical energy transfer imparting station(s) 112 electrical energy transfer management information re user plans, load sharing, payment programs, etc. The electricity provider can receive from the wireless electrical energy transfer imparting station(s) 112 electrical energy transfer management information re user plans, load sharing, payment programs, etc. Exemplary implementations of the electricity provider 114 can include electricity provider equipment such as equipment manufactured by electrical equipment manufacturers such as GE, Westinghouse, Siemens, or ABB and electricity providers including electrical utilities such PG&E, So Cal Edison, and/or locally owned equipment such as solar panels, wind generators, etc. Other aspects can be involved such as smart metering and/or load balancing mentioned above.

Implementations of the user communication device 116 can include the user communication device being internal or external to electrical energy transfer receiving device, etc. The user communication device 116 can include mobile devices, social networks, home or corporate based devices, etc. The user communication device 116 can transmit/receive information to/from the wireless electrical energy transfer receiving device 110 regarding status of electrical energy transfer associated with user plans or payment program information, etc. The user communication device 116 can transmit/receive information to/from the wireless electrical energy transfer imparting station(s) 112 regarding status of electrical energy transfer associated with user plans or payment program information, etc. The user communication device 116 can send to the wireless electrical energy transfer receiving device 110 electrical energy transfer management information re user plans, payment programs, etc. The user communication device 116 can receive from the wireless electrical energy transfer receiving device 110 electrical energy transfer management information re user plans, payment programs, etc. The user communication device 116 can send to the wireless electrical energy transfer imparting station(s) 112 electrical energy transfer management information re user plans, payment programs, etc. The user communication device 116 can receive from the wireless electrical energy transfer imparting station(s) 112 electrical energy transfer management information re user plans, payment programs, etc. The user communication device 116 can send to the user interface 118 electrical energy transfer management information re user plans, payment programs, etc. The user communication device 116 can receive from the user interface 118 electrical energy transfer management information re user plans, payment programs, etc.

The user communication device 116 with the user interface 118 can include but are not limited to one or more of the following: a mobile device, a tablet, a cell phone, a smart phone, a gaming unit, a laptop, a walkie-talkie, a notebook computer, a tablet, using operating systems including Android, iOS, Win 8 or other operating systems and/or including one or more other types of wireless mobile device.

Exemplary implementations of the user communication device 116 can include an employer based information system such as an employee information center accessible by employer or employees for status tracking, planning facilities, incentives distribution, etc. For instance, employers could include Google Inc., Cisco Inc., Amazon Inc., etc.

Employee perks could be tracked and otherwise utilized by the employee information center such as including the employer coving costs of electrical energy transfer to charge an employee's electric vehicle parked in an employee parking space provided by the employer as a convenience to the employee.

Other implementations of the user communication device 116 can include an information center for high-end residential dwellings for status tracking, planning, updating occupant status, load leveling within house, monitoring and reporting on impact of battery electrical energy transfer, vehicle use, etc. For example construction contractors of upscale condominiums, high-end smart homes, etc. Including furnishing infrastructures could be involved with installation of such exemplary implementations. Aspects can include smart home information centers that can provide such functions as establishment of appropriate time(s) to charge electric vehicle(s) based on upon predicted use by occupants of such vehicle(s) based on input from such occupants through active and passive means such as direct inquiry of occupants or review of occupant itineraries stored in calendaring databases and other databases.

Implementations of the user interface 118 of the user communication device 116 can include visual or audio output re inquiries as to user's plans re use of electrical energy transfer receiving device to include itinerary or calendar of user or others to use the electrical energy transfer receiving device, plan can include payment plans, maintenance of device, etc. Other output can include information re status of current or planned electrical energy transfer as impacting user's plans, etc. The user interface 118 can accept input from user re payment program, planned use of electrical energy transfer receiving device to impact method of electrical energy transfer such as fast or slow electrical energy transfer rates, etc. The user interface 118 can send to user communication device 116 electrical energy transfer management information re user plans, payment programs, etc. The user interface 118 can receive from the user communication device 116 electrical energy transfer management information re user plans, payment programs, etc.

Exemplary implementations of the user interface 118 can include a user interface to an employee information center accessible by employer or employees for status tracking, planning facilities, incentives distribution, etc. Such employers can include Google Inc., Cisco Inc., Amazon Inc., etc. Other implementations of the user interface 118 can include a user interface to information center for high-end residential dwellings for status tracking, planning, etc. For example implementations can be provided by construction contractors of upscale condominiums, high-end smart homes, etc. including furnishing infrastructures such as using smart home information centers as discussed above.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in implementation(s)," 'in one embodiment," "in some embodiments," "in several embodiments," "in at least one embodiment," "in various embodiments," etc., may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

FIG. 2 shows electricity provider 114 including electricity provider communication system 115 in communication with wireless electrical energy transfer imparting stations 112.

Turning now to FIG. 3, electricity provider communication system 115 is depicted in FIG. 3 to include processor 115a, memory 115b, operating system 115c, and device interface 115e.

Processor(s)

Processor 115a may include one or more microprocessors, central processing units ("cpu"), graphics processing units ("gpu"), physics processing units, digital signal processors, network processors, floating point processors, and the other processors. In implementation(s), processor 115a may be a server. In implementation(s), processor 115a may be a distributed-core processor. Although processor 115a can be understood in one sense as depicted as a single processor that is part of a single electricity provider communication system 115, processor 115a may be multiple processors distributed over one or many wireless electrical energy transfer imparting system communication systems 115, which may or may not be configured to operate together. Processor 115a is illustrated as being configured to execute computer readable instructions in order to execute one or more operations described above, and as illustrated in FIGS. 8-11E.

Memory System(s)

Further shown in FIG. 3, electricity provider communication system 115 includes memory 115*b*, which may include memory, cache memory such as random access memory (RAM), flash memory, synchronous random access memory (SRAM), dynamic random access memory (DRAM), or other types of memory such as read only memory ("ROM"), programmable read only memory ("PROM"), flash memory, hard drives, erasable programmable read-only memory (EPROM), disk-based media, disc-based media, magnetic storage, optical storage, volatile memory, nonvolatile memory, mass storage devices, and any combination thereof. In implementation(s), memory 115*b* may be at single network site(s) or separated from the communication system 115, e.g., available on different system(s) on a network, wired or wirelessly. For example, in a networked system, there may be many communication systems 115 having memory 115*a* as located at central server(s) that may be a few feet away or located across an ocean. In implementation(s) memory 115*b* may be located at multiple network sites, including sites that are distant from each other.

Operating System(s)

Referring again to FIG. 3, electricity provider communication system 115 includes operating system 115*c*, some versions thereof being mobile or otherwise, and may include processing module m10, which may further include modules (some of which are described below), and may further include virtual machines 115*d* (such as process virtual machines, virtual machines of hardware, virtual machines of virtual machines, Java virtual machines, Dalvik virtual machines, virtual machines for use with Android operating systems such as Samsung or Google mobile devices or for use with other mobile operating systems such as Apple iOS on Microsoft Windows based mobile operating systems, etc.).

Device Interface(s)

As shown also in FIG. 3, electricity provider communication system 115 can include device interface 115*e*, which can include user interface 115*f*, device input 115*g*, and device output 115*h*.

In implementation(s), device interface can include any component that allows interaction with its environment. For example, in implementation(s) device interface 115*e* can include one or more sensors, e.g., a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), a radio, including a wireless radio, a transmitter, a receiver, an emitter, a broadcaster, etc.

In implementation(s), device interface 115*e* also may include one or more user interface components, e.g., user interface 115*f* (e.g., although they are drawn separately, in implementation(s), user interface 115*f* is a type of device interface 115*e*), and in implementation(s) including one or more device inputs 115*g* and one or more device outputs 115*h*. User interface 115*f* may include any hardware, software, firmware, and combination thereof that allows one or more users to interact with electricity provider communication system 115, and for vice versa. In implementation(s), user interface 115*f* may include a monitor, screen, touchscreen, liquid crystal display ("LCD") screen, light emitting diode ("LED") screen, speaker, handset, earpiece, keyboard, keypad, touchpad, mouse, trackball, remote control, button set, microphone, video camera, still camera, a charge-coupled device ("CCD") element, a photovoltaic element, etc.

Referring again to FIG. 3, implementation(s) of device interface 115*e* may include one or more components in addition to or integrated with user interface 115*f* to provide ways that communication system 115 can input and output information with its environment(s) and/or user(s). These components of device interface 115*e* for user interface 115*f*, device input 115*g*, and/or device output 115*h* may include one or more sensors, e.g., a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), a radio, including a wireless radio, a transmitter, a receiver, an emitter, a broadcaster, etc., and other components as well to serve user interface, input and/or output function(s) for device interface 115*e* such as for user interface 115*f*, device input 115*g* and device output 115*h*.

Further examples of user interface 115*f*, device input 115*g*, and/or device output 115*h* may include any hardware, software, firmware, and combination thereof, to provide capability for a user thereof to interact with electricity provider communication system 115. Implementation(s) of user interface 115*f*, device input 115*g*, and/or device output 115*h* can include monitor(s), screen(s), touchscreen(s), liquid crystal display ("LCD") screen(s), light emitting diode ("LED") screen(s), speaker(s), handset(s), earpiece(s), keyboard(s), keypad(s), touchpad(s), mouse(s), trackball(s), remote control(s), button set(s), microphone(s), video camera(s), still camera(s), a charge-coupled device ("CCD") element(s), a photovoltaic element(s), etc.

As other examples, implementation(s) of device interface 115*e* can include including portions for outputting information, inputting information, and/or controlling aspects thereof. Various arrangements such as display window(s), audio emitter(s), tactile interface(s), button(s), slider(s), gesture interface(s), articulation(s), knob(s), icon(s), desktop(s), ribbon(s), bar(s), tool(s), stylus area(s), keypad(s), keyboard(s), and other audio, video, graphic, tactile, etc., input, output, or control aspects can be used. For instance, graphical user interface presentations can be presented upon display surfaces while other input and/or output aspects can be utilized.

Modules

Implementations of modules can involve different combinations (limited to patentable subject matter under 35 U.S.C. 101) of one or more aspects from one or more electrical circuitry arrangements and/or one or more aspects from one or more instructions.

In one or more implementations, as shown in FIG. 4, the processing module m10 may include electronically assessing electricity provider detail information associated with providing electrical energy to electric vehicle wireless electrical energy chargers configured for wirelessly charging electric vehicles with electrical energy from the electric vehicles wireless electrical energy chargers to the electric vehicles, the electric vehicles including electric motors to provide motive force for directionally propelling electric vehicles module m11.

In one or more implementations, as shown in FIG. 4, the processing module m10 may include electronically requesting electric vehicle wireless electrical energy charger planning information of the electric vehicles wireless electrical energy chargers regarding indications of electric vehicle user activities involving the electric vehicles to be prepared for by wirelessly charging one or more electric vehicles with electrical energy from the electric vehicle wireless electrical energy chargers module m12.

In one or more implementations, as shown in FIG. 4, the processing module m10 may include electronically outputting electric vehicle wireless electrical energy charger advisement information to the electric vehicle wireless electrical energy chargers based upon portions of the electricity provider detail information and based upon portions of the electric vehicle wireless electrical energy charger planning information, electric vehicles wireless electrical energy charger advisement information regarding preparation of the electric vehicles for the electric vehicles user activities through electrical energy charging of the electric vehicles by the electric vehicles wireless electrical energy chargers module m13.

In one or more implementations, as shown in FIG. 5-A, module m11 may include assessing electricity provider detail information regarding generation of electricity associated with providing electrical energy to electric vehicle wireless energy chargers module m1101.

In one or more implementations, as shown in FIG. 5-A, module m1101 may include assessing information regarding generation of electricity according to schedules involving time periods to switch from use of a first electricity generation source to a second electricity generation source module m1102.

In one or more implementations, as shown in FIG. 5-A, module m1102 may include assessing information regarding generation of electricity according to schedules for generating electricity by an electricity generation source located on location of one or more electric vehicles wireless electrical energy chargers module m1103.

In one or more implementations, as shown in FIG. 5-A, module m1101 may include assessing information regarding generation of electricity according to electrical vehicle user selection of electricity generation sources to provide electrical energy to electric vehicle wireless electrical energy chargers module m1104.

In one or more implementations, as shown in FIG. 5-A, module m1101 may include assessing information regarding generation of electricity according to financial status information for user accounts of electric vehicles module m1105.

In one or more implementations, as shown in FIG. 5-A, module m1101 may include assessing information regarding generation of electricity according to electricity generation rate capacity of electricity generation sources module m1106.

In one or more implementations, as shown in FIG. 5-A, module m1101 may include assessing information regarding generation of electricity according to electrical transmission capacity of network distribution from electricity generation sources to electric vehicle wireless electrical energy chargers module m1107.

In one or more implementations, as shown in FIG. 5-A, module m1101 may include assessing information regarding generation of electricity according to planned use of electricity generation sources to service estimated charging service demand of a plurality of electric vehicles module m1108.

In one or more implementations, as shown in FIG. 5-A, module m1101 may include assessing information regarding generation of electricity according to amount of time requested for providing electrical energy to electric vehicle wireless electrical energy chargers module m1109.

In one or more implementations, as shown in FIG. 5-A, module m1101 may include assessing information regarding generation of electricity according to amount of electrical energy to be transferred to electric vehicles in a designated period of time by the electric vehicle wireless electrical energy chargers module m1110.

In one or more implementations, as shown in FIG. 5-B, module m1101 may include assessing information regarding generation of electricity according to approval of consumer profile of users of electric vehicles module m1111.

In one or more implementations, as shown in FIG. 5-B, module m1101 may include assessing information regarding generation of electricity according to impact from planned schedule for generation of electricity by electrical energy generation sources upon itinerary and route information associated with electric vehicles module m1112.

In one or more implementations, as shown in FIG. 5-B, module m11 may include assessing information regarding generation of electricity received from communication links between electrical energy generation sources and electric vehicle wireless electrical energy chargers module m1113.

In one or more implementations, as shown in FIG. 5-B, module m1113 may include assessing information regarding generation of electricity received from communication links involving contactless smart card readers module m1114.

In one or more implementations, as shown in FIG. 5-B, module m1113 may include assessing information regarding generation of electricity received from communication links involving RFID tag readers module m1115.

In one or more implementations, as shown in FIG. 5-B, module m1113 may include assessing information regarding generation of electricity received from communication links involving manual entry keypads module m1116.

In one or more implementations, as shown in FIG. 5-B, module m1113 may include assessing information regarding generation of electricity received from communication links involving blue tooth communication devices module m1117.

In one or more implementations, as shown in FIG. 5-B, module m1113 may include assessing information regarding generation of electricity received from communication links involving WiFi communication devices module m1118.

In one or more implementations, as shown in FIG. 5-B, module m1113 may include assessing information regarding generation of electricity received from communication links involving FM radio communication devices module m1119.

In one or more implementations, as shown in FIG. 5-C, module m1113 may include assessing information regarding generation of electricity received from communication links involving infrared communication devices module m1120.

In one or more implementations, as shown in FIG. 6-A, module m12 may include requesting electric vehicle wireless electrical energy charger planning information wirelessly module m1201.

In one or more implementations, as shown in FIG. 6-A, module m1201 may include requesting information of involving RFID tags module m1202.

In one or more implementations, as shown in FIG. 6-A, module m1201 may include requesting information of involving blue tooth supported communication module m1203.

In one or more implementations, as shown in FIG. 6-A, module m1201 may include requesting information of involving WiFi facilitated communication module m1204.

In one or more implementations, as shown in FIG. 6-A, module m1201 may include requesting information of involving FM radio wave communication module m1205.

In one or more implementations, as shown in FIG. 6-A, module m1201 may include requesting information of involving infrared supported communication module m1206.

In one or more implementations, as shown in FIG. 6-A, module m12 may include requesting information of involving direct non-wireless communication module m1207.

In one or more implementations, as shown in FIG. 6-A, module m1207 may include requesting information of involving direct wire connections module m1208.

In one or more implementations, as shown in FIG. 6-A, module m1207 may include requesting information of involving direct sound wave broadcasts module m1209.

In one or more implementations, as shown in FIG. 6-A, module m12 may include requesting information of involving overt action by the electric vehicle users module m1210.

In one or more implementations, as shown in FIG. 6-A, module m1210 may include requesting information of involving employer databases module m1211.

In one or more implementations, as shown in FIG. 6-A, module m1210 may include requesting information of involving electronic calendaring systems module m1212.

In one or more implementations, as shown in FIG. 6-B, module m1210 may include requesting information of involving overt action by the electric vehicle users including requesting information of involving access to scheduling programs module m1213.

In one or more implementations, as shown in FIG. 6-B, module m1210 may include requesting information of involving overt action by the electric vehicle users including requesting information of involving monitoring cell phone conversations module m1214.

In one or more implementations, as shown in FIG. 6-B, module m1210 may include requesting information of involving overt action by the electric vehicle users including requesting information of involving electronic recordings of one or more in-person conversations module m1215.

In one or more implementations, as shown in FIG. 6-B, module m1210 may include requesting information of involving data access to e-mail systems module m1216.

In one or more implementations, as shown in FIG. 6-B, module m1210 may include requesting information of involving electronic access to internet cloud-based collaboration systems module m1217.

In one or more implementations, as shown in FIG. 6-B, module m1210 may include requesting information of involving access to electronic vehicle maintenance logs module m1218.

In one or more implementations, as shown in FIG. 6-B, module m1210 may include requesting information of involving electronic queries of historical vehicle use records module m1219.

In one or more implementations, as shown in FIG. 6-B, module m1210 may include requesting information of involving communication with information centers of dwellings module m1220.

In one or more implementations, as shown in FIG. 6-B, module m1210 may include requesting information of involving electric vehicle electronic sensors module m1221.

In one or more implementations, as shown in FIG. 6-B, module m1210 may include requesting information of involving as provided electronically from electric vehicle use logs module m1222.

In one or more implementations, as shown in FIG. 6-C, module m12 may include requesting information of involving explicit actions by planned electric vehicle users to provide such information module m1223.

In one or more implementations, as shown in FIG. 6-C, module m1223 may include requesting information of involving contactless smart card systems associated with electric vehicles module m1224.

In one or more implementations, as shown in FIG. 6-C, module m1223 may include requesting information of involving manual entry of data through keypads module m1225.

In one or more implementations, as shown in FIG. 6-C, module m1223 may include requesting information of involving direct text entry module m1226.

In one or more implementations, as shown in FIG. 6-C, module m1223 may include requesting information of involving humans announcing information directed in reply to audio announcements module m1227.

In one or more implementations, as shown in FIG. 6-C, module m12 may include requesting information of involving electric vehicle users module m1228.

In one or more implementations, as shown in FIG. 6-C, module m1228 may include requesting information of involving drivers of an electric vehicle module m1229.

In one or more implementations, as shown in FIG. 6-C, module m1228 may include requesting information of involving occupants of a plurality of electric vehicles to receive electrical energy from a local electrical grid access point of electrical energy generation sources module m1230.

In one or more implementations, as shown in FIG. 6-C, module m1228 may include requesting information of involving actual recorded electric vehicle use compared with planned electric vehicle use module m1231.

In one or more implementations, as shown in FIG. 6-C, module m1228 may include requesting information of involving recorded driving patterns associated with electric vehicle drivers module m1232.

In one or more implementations, as shown in FIG. 6-C, module m1228 may include requesting information of involving non-driver occupant ride-sharing plans module m1233.

In one or more implementations, as shown in FIG. 6-D, module m1228 may include requesting information of involving priorities distributed among planned electric vehicle users for use of electric vehicles module m1234.

In one or more implementations, as shown in FIG. 6-D, module m1228 may include requesting information of involving use of electric vehicles by drivers before electrical energy transfer to electric vehicles occurs after electric vehicles are driven by other drivers module m1235.

In one or more implementations, as shown in FIG. 6-D, module m1228 may include requesting information of involving merged plans of multiple planned drivers of electric vehicles for consecutive periods of use planned to occur before electric vehicles are returned to receive electrical energy transfer module m1236.

In one or more implementations, as shown in FIG. 6-D, module m1228 may include requesting information of involving individual employee incentive programs module m1237.

In one or more implementations, as shown in FIG. 6-D, module m1228 may include requesting information of involving employee group benefit programs module m1238.

In one or more implementations, as shown in FIG. 6-D, module m1228 may include requesting information of involving prioritized tasks of work schedules module m1239.

In one or more implementations, as shown in FIG. 6-D, module m1228 may include requesting information of involving planned number of occupants to use electric vehicles before electric vehicles receives electrical energy transfer module m1240.

In one or more implementations, as shown in FIG. 6-D, module m12 may include requesting information of involving electric vehicle features module m1241.

In one or more implementations, as shown in FIG. 6-D, module m1241 may include requesting information of involving range of electric vehicles in an all-electric mode module m1242.

In one or more implementations, as shown in FIG. 6-D, module m1241 may include requesting information of involving range of electric vehicles in a hybrid electric-fuel mode module m1243.

In one or more implementations, as shown in FIG. 6-E, module m1241 may include requesting information of involving maintenance schedules for electric vehicles module m1244.

In one or more implementations, as shown in FIG. 6-E, module m1241 may include requesting information of involving fueling capacity of electric vehicles as hybrid electric vehicles module m1245.

In one or more implementations, as shown in FIG. 6-E, module m1241 may include requesting information of involving specifications of second electric vehicles other than first electric vehicles, the second electric vehicles involved with plans to receive electric energy transfer from electrical equipment shared with the first electric vehicles module m1246.

In one or more implementations, as shown in FIG. 6-E, module m1241 may include requesting information of involving electric vehicles as all-electric vehicles module m1247.

In one or more implementations, as shown in FIG. 6-E, module m1241 may include requesting information of involving electric vehicles as hybrid-electric vehicles module m1248.

In one or more implementations, as shown in FIG. 6-E, module m1241 may include requesting information of involving electric vehicles including to receive electrical energy transfer through field magnetic resonance induction module m1249.

In one or more implementations, as shown in FIG. 6-E, module m1241 may include requesting information of involving electric vehicles including to receive electrical energy transfer through highly resonant inductive wireless power transfer module m1250.

In one or more implementations, as shown in FIG. 6-E, module m1241 may include requesting information of involving electric vehicles including to receive electrical energy transfer through wireless capacitive charging module m1251.

In one or more implementations, as shown in FIG. 6-F, module m1241 may include requesting information of involving electric vehicles including electrical energy storage devices module m1252.

In one or more implementations, as shown in FIG. 6-F, module m1252 may include requesting information of involving electric vehicles including electrical energy storage devices as capacitive electrical energy storage devices module m1253.

In one or more implementations, as shown in FIG. 6-F, module m1252 may include requesting information of involving electric vehicles including electrical energy storage devices as lithium ion, lead acid, or nickel cadmium electrical energy storage devices module m1254.

In one or more implementations, as shown in FIG. 6-F, module m1252 may include requesting information of involving electric vehicles including storage life aspects of the electrical energy storage devices module m1255.

In one or more implementations, as shown in FIG. 6-F, module m12 may include requesting information of involving user preferences of location for energy transfer to electric vehicles module m1256.

In one or more implementations, as shown in FIG. 6-F, module m1256 may include requesting information of involving user preferences of location other than home locations of planned occupants of electric vehicles for electrical energy transfer to electric vehicles module m1257.

In one or more implementations, as shown in FIG. 6-F, module m1256 may include requesting information of involving user preferences of location for electrical energy transfer to electric vehicles at locations of vocational employ of planned occupants of electric vehicles module m1258.

In one or more implementations, as shown in FIG. 6-F, module m1256 may include requesting information of involving user preferences of location for electrical energy transfer to electric vehicles at locations on planned routes of travel of electric vehicles module m1259.

In one or more implementations, as shown in FIG. 6-G, module m1256 may include requesting information of involving user preferences of location for electrical energy transfer to electric vehicles at garage locations for housing electric vehicles module m1260.

In one or more implementations, as shown in FIG. 6-G, module m1256 may include requesting information of involving user preferences of location for electrical energy transfer to electric vehicles at park and ride locations for parking electric vehicles module m1261.

In one or more implementations, as shown in FIG. 6-G, module m1256 may include requesting information of involving user preferences of location for electrical energy transfer to electric vehicles at parking lot locations for parking electric vehicles module m1262.

In one or more implementations, as shown in FIG. 6-G, module m1256 may include requesting information of involving user preferences of location for electrical energy transfer to electric vehicles at parking garage locations for parking electric vehicles module m1263.

In one or more implementations, as shown in FIG. 6-G, module m1256 may include requesting information of involving user preferences of location for non-electrical energy transfer to electric vehicles as a hybrid-electric vehicle at re-fueling station locations module m1264.

In one or more implementations, as shown in FIG. 6-G, module m1256 may include requesting information of involving user preferences of location for electrical energy transfer to electric vehicles at static charging locations along routes of travel of electric vehicles module m1265.

In one or more implementations, as shown in FIG. 6-G, module m1256 may include requesting information of involving user preferences of location for electrical energy transfer to electric vehicles based on historical or predicted availability of the wireless electrical energy imparting stations provided by an organization employing planned occupants of electric vehicles module m1266.

In one or more implementations, as shown in FIG. 6-H, module m1256 may include requesting information of involving user preferences of location for electrical energy transfer to electric vehicles at locations for mechanical maintenance of electric vehicles module m1267.

In one or more implementations, as shown in FIG. 6-H, module m1256 may include requesting information of involving preferences for fuels used to re-fuel electric vehicles as hybrid electric vehicles module m1268.

In one or more implementations, as shown in FIG. 6-H, module m1256 may include requesting information of involving preferences for contingency plans for unplanned unavailability to electric vehicles of the electric vehicle wireless electrical energy chargers module m1269.

In one or more implementations, as shown in FIG. 6-H, module m12 may include requesting information of involving information regarding uses of electric vehicles module m1270.

In one or more implementations, as shown in FIG. 6-H, module m1270 may include requesting information of involving terrain or traffic information regarding routes of travel for electric vehicles module m1271.

In one or more implementations, as shown in FIG. 6-H, module m1270 may include requesting information of involving commuter routing information for electric vehicles module m1272.

In one or more implementations, as shown in FIG. 6-H, module m1270 may include requesting information of involving trip advisory information regarding routes of travel for electric vehicles module m1273.

In one or more implementations, as shown in FIG. 6-H, module m1270 may include requesting information of involving alternative modes of transportation along routes of travel for electric vehicles module m1274.

In one or more implementations, as shown in FIG. 6-H, module m1270 may include requesting information of involving periods in which electric vehicles will be unavailable for use module m1275.

In one or more implementations, as shown in FIG. 6-H, module m1270 may include requesting information of involving planned errands to be run by users of electric vehicles module m1276.

In one or more implementations, as shown in FIG. 6-H, module m1270 may include requesting information of involving commercial delivery schedules utilizing electric vehicles module m1277.

In one or more implementations, as shown in FIG. 6-I, module m1270 may include requesting information of involving courier service uses for electric vehicles module m1278.

In one or more implementations, as shown in FIG. 6-I, module m1270 may include requesting information of involving industrial cargo transport by electric vehicles module m1279.

In one or more implementations, as shown in FIG. 6-I, module m1270 may include requesting information of involving uses of electric vehicles including requesting information of involving driving habits of users of electric vehicles module m1280.

In one or more implementations, as shown in FIG. 6-I, module m1270 may include requesting information of involving itineraries associated with use of electric vehicles module m1281.

In one or more implementations, as shown in FIG. 6-I, module m1270 may include requesting information of involving weather forecasts associated with travel through use of electric vehicles module m1282.

In one or more implementations, as shown in FIG. 6-I, module m1270 may include requesting information of involving news broadcasts associated with travel through use of electric vehicles module m1283.

In one or more implementations, as shown in FIG. 6-I, module m1270 may include requesting information of involving emergency warning messages associated with use of electric vehicles module m1284.

In one or more implementations, as shown in FIG. 6-I, module m1270 may include requesting information of involving availability of alternate transportation within a designated distance from electric vehicle wireless electrical energy chargers for transferring electrical energy to electric vehicles module m1285.

In one or more implementations, as shown in FIG. 6-I, module m1270 may include requesting information of involving ride-share programs associated with travel routes traveled by electric vehicles module m1286.

In one or more implementations, as shown in FIG. 7-A, module m13 may include outputting advisement information for controlling electric vehicle wireless electrical energy chargers module m1301.

In one or more implementations, as shown in FIG. 7-A, module m1301 may include outputting advisement information involving schedules for electrical load sharing for electrical energy generation sources with electric vehicle wireless electrical energy chargers associated with electric vehicles module m1302.

In one or more implementations, as shown in FIG. 7-A, module m1301 may include outputting advisement information involving electricity use data accessed through remote reporting from electric utility databases module m1303.

In one or more implementations, as shown in FIG. 7-A, module m1301 may include outputting advisement information involving consumer incentive programs associated with electricity cost schedules module m1304.

In one or more implementations, as shown in FIG. 7-A, module m1301 may include outputting advisement information involving electricity financial cost rate schedules module m1305.

In one or more implementations, as shown in FIG. 7-A, module m1301 may include outputting advisement information involving electricity load share capacity schedules for electric vehicle wireless electrical energy chargers module m1306.

In one or more implementations, as shown in FIG. 7-A, module m1301 may include outputting advisement information involving electric utility capacity information passed through communication channels of electric vehicle wireless electrical energy chargers module m1307.

In one or more implementations, as shown in FIG. 7-A, module m1301 may include outputting advisement information involving electrical energy charging appointments reserved for electrical vehicles other than electric vehicles module m1308.

In one or more implementations, as shown in FIG. 7-A, module m1301 may include outputting advisement information involving maximum charging rate capacities of electric vehicle wireless electrical energy chargers module m1309.

In one or more implementations, as shown in FIG. 7-A, module m1301 may include outputting advisement information involving cost information for priority handling of charging of electric vehicles by electric vehicle wireless electrical energy chargers module m1310.

In one or more implementations, as shown in FIG. 7-B, module m1301 may include outputting advisement information involving electric vehicle wireless electrical energy charger availability schedules for electric vehicles module m1311.

In one or more implementations, as shown in FIG. 7-B, module m1301 may include outputting advisement information involving histories of electrical energy consumption by electric vehicle wireless electrical energy chargers module m1312.

In one or more implementations, as shown in FIG. 7-B, module m1301 may include outputting advisement information involving electricity use data accessed through remote reporting from electric utility databases module m1313.

In one or more implementations, as shown in FIG. 7-B, module m1301 may include outputting advisement information involving peak demand and reserve capacity of electric vehicle wireless electrical energy chargers module m1314.

In one or more implementations, as shown in FIG. 7-B, module m1301 may include outputting advisement information involving communication with electric utility smart grid information systems with updates regarding electricity consumption from electric utility databases module m1315.

In one or more implementations, as shown in FIG. 7-B, module m1301 may include outputting advisement information involving priority classification for electric vehicle charging scheduling requests of electric vehicle wireless electrical energy chargers module m1316.

In one or more implementations, as shown in FIG. 7-B, module m1301 may include outputting advisement information involving electric vehicle user profile classifications module m1317.

In one or more implementations, as shown in FIG. 7-C, module m1301 may include outputting advisement information involving electrical energy use of associated local grid electrical energy provider resources for other than charging of electric vehicles module m1318.

In one or more implementations, as shown in FIG. 7-C, module m1301 may include outputting advisement information involving plans for charging of second electric vehicles other than first electric vehicles module m1319.

In one or more implementations, as shown in FIG. 7-C, module m1301 may include outputting advisement information involving technical specifications of electric vehicle wireless electrical energy chargers module m1320.

In one or more implementations, as shown in FIG. 7-C, module m1301 may include outputting advisement information involving computer network communication linking electric vehicle wireless electrical energy chargers module m1321.

Flowcharts

An operational flow o10 as shown in FIG. 8 represents example operations related to electronically assessing electricity provider detail information associated with providing electrical energy to one or more electric vehicle wireless electrical energy chargers configured for wirelessly charging one or more electric vehicles with electrical energy from the one or more electric vehicle wireless electrical energy chargers to the one or more electric vehicles, the one or more electric vehicles including one or more electric motors to provide motive force for directionally propelling the one or more electric vehicles; electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers; and electronically outputting electric vehicle wireless electrical energy charger advisement information to the one or more electric vehicle wireless electrical energy chargers based at least in part upon one or more portions of the electricity provider detail information and based at least in part upon one or more portions of the electric vehicle wireless electrical energy charger planning information, the electric vehicle electrical energy charger advisement information regarding at least in part preparation of the one or more electric vehicles for the one or more electric vehicle user activities through electrical energy charging of the one or more electric vehicles by the one or more electric vehicle wireless electrical energy chargers.

FIG. 8 and those figures that follow may have various examples of operational flows, and explanation may be provided with respect to the above-described examples and/or with respect to other examples and contexts. Nonetheless, it should be understood that the operational flows may be executed in a number of other environments and contexts, and/or in modified versions. Furthermore, although the various operational flows are presented in the sequence(s) illustrated, it should be understood that the various operations may be performed in other orders than those which are illustrated, or may be performed concurrently.

In FIG. 8 and those figures that follow, various operations may be depicted in a box-within-a-box manner. Such depictions may indicate that an operation in an internal box may comprise an optional exemplary implementation of the operational step illustrated in one or more external boxes. However, it should be understood that internal box operations may be viewed as independent operations separate from any associated external boxes and may be performed in any sequence with respect to all other illustrated operations, or may be performed concurrently.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In one or more implementations, as shown in FIG. 8, the operational flow o10 proceeds to operation o11 for electronically assessing electricity provider detail information associated with providing electrical energy to one or more electric vehicle wireless electrical energy chargers configured for wirelessly charging one or more electric vehicles with electrical energy from the one or more electric vehicle wireless electrical energy chargers to the one or more electric vehicles, the one or more electric vehicles including one or more electric motors to provide motive force for directionally propelling the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o11, for performance of the operation o11 by an electrical circuitry arrangement as activated thereto, and/or otherwise fulfillment of the operation o11. One or more non-transitory signal bearing physical media can bear the one or more instructions that when executed can direct performance of the operation o11. Furthermore, electronically assessing electricity provider detail information associated with providing electrical energy to electric vehicle wireless electrical energy chargers configured for wirelessly charging electric vehicles with electrical energy from one or more electric vehicles wireless electrical energy chargers to one or more electric vehicles, one or more electric vehicles including electric motors to provide motive force for directionally propelling one or more electric module m11 depicted in FIG. 4 as being included in the processing module m10, when executed and/or activated, can direct performance of and/or perform the operation o11. Illustratively, in one or more implementations, the operation o11 can be carried out, for example, by electronically assessing electricity provider detail information associated with providing electrical energy to one or more electric vehicle wireless electrical energy chargers configured for wirelessly charging one or more electric vehicles with electrical energy from the one or more electric vehicle wireless electrical energy chargers to the one or more electric vehicles, the one or more electric vehicles including one or more electric motors to provide motive force for directionally propelling the one or more electric vehicles.

In one or more implementations, as shown in FIG. 8, the operational flow o10 proceeds to operation o12 for electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o12, for performance of the operation o12 by an electrical circuitry arrangement as activated thereto, and/or otherwise fulfillment of the operation o12. One or more non-transitory signal bearing physical media can bear the one or more instructions that when executed can direct performance of the operation o12. Furthermore, electronically requesting electric vehicle wireless electrical energy charger planning information of one or more electric vehicles wireless electrical energy chargers regarding indications of electric vehicle user activities involving one or more electric vehicles to be prepared for by wirelessly charging one or more electric vehicles with electrical energy from one or more electric vehicles wireless electrical energy chargers module m12 depicted in FIG. 4 as being included in the processing module m10, when executed and/or activated, can direct performance of and/or perform the operation o12. Illustratively, in one or more implementations, the operation o12 can be carried out, for example, by electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers.

In one or more implementations, as shown in FIG. 8, the operational flow o10 proceeds to operation o13 for electronically outputting electric vehicle wireless electrical energy charger advisement information to the one or more electric vehicle wireless electrical energy chargers based at least in part upon one or more portions of the electricity provider detail information and based at least in part upon one or more portions of the electric vehicle wireless electrical energy charger planning information, the electric vehicle electrical energy charger advisement information regarding at least in part preparation of the one or more electric vehicles for the one or more electric vehicle user activities through electrical energy charging of the one or more electric vehicles by the one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o13, for performance of the operation o13 by an electrical circuitry arrangement as activated thereto, and/or otherwise fulfillment of the operation o13. One or more non-transitory signal bearing physical media can bear the one or more instructions that when executed can direct performance of the operation o13. Furthermore, electronically outputting electric vehicle wireless electrical energy charger advisement information to one or more electric vehicles wireless electrical energy chargers based upon portions of the electricity provider detail information and based upon portions of the electric vehicle wireless electrical energy charger planning information, the electric vehicle wireless electrical energy charger advisement information regarding preparation of one or more electric vehicles for one or more electric vehicles user activities through electrical energy charging of one or more electric vehicles by one or more electric vehicles wireless electrical energy chargers module m13 depicted in FIG. 4 as being included in the processing module m10, when executed and/or activated, can direct performance of and/or perform the operation o13. Illustratively, in one or more implementations, the operation o13 can be carried out, for example, by electronically outputting electric vehicle wireless electrical energy charger advisement information to the one or more electric vehicle wireless electrical energy chargers based at least in part upon one or more portions of the electricity provider detail information and based at least in part upon one or more portions of the electric vehicle wireless electrical energy charger planning information, the electric vehicle electrical energy charger advisement information regarding at least in part preparation of the one or more electric vehicles for the one or more electric vehicle user activities through electrical energy charging of the one or more electric vehicles by the one or more electric vehicle wireless electrical energy chargers.

In one or more implementations, as shown in FIG. 9-A, the operation o11 can include operation o1101 for electronically assessing electricity provider detail information associated with providing electrical energy to one or more electric vehicle wireless electrical energy chargers configured for wirelessly charging one or more electric vehicles with electrical energy from the one or more electric vehicle wireless electrical energy chargers to the one or more electric vehicles, the one or more electric vehicles including one or more electric motors to provide motive force for directionally propelling the one or more electric vehicles including assessing electricity provider detail information regarding generation of electricity associated with providing electrical energy to one or more electric vehicle wireless energy chargers. Origination of a physically tangible component group can be accomplished through skilled in the art design choice selection including use of one or more components and/or subsystems explicitly and/or implicitly referred to herein for at least in part implementing execution of one or more instructions of the operation o1101, for performance of the operation o1101 by an electrical circuitry arrangement as activated thereto, and/or otherwise fulfillment of the operation o1101. One or more non-transitory signal bearing physical media can bear the one or more instructions that when executed can direct performance of the operation o1101. Furthermore, assessing electricity provider detail information regarding generation of electricity associated with providing electrical energy to electric vehicle wireless energy chargers module m1101 depicted in FIG. 5-A as being included in the module m11, when executed and/or activated, can direct performance of and/or perform the operation o1101. Illustratively, in one or more implementations, the operation o1101 can be carried out, for example, by electronically assessing electricity provider detail information associated with providing electrical energy to one or more electric vehicle wireless electrical energy chargers configured for wirelessly charging one or more electric vehicles with electrical energy from the one or more electric vehicle wireless electrical energy chargers to the one or more electric vehicles, the one or more electric vehicles including one or more electric motors to provide motive force for directionally propelling the one or more electric vehicles including assessing electricity provider detail information regarding generation of electricity associated with providing electrical energy to one or more electric vehicle wireless energy chargers (e.g. assessing electricity provider detail information such as through tracking, monitoring, calculating, forecasting, reviewing, etc. historical, current, projected, estimated, anticipated, planned, etc. capacity, supply, equipment resource, etc. to produce, furnish, back-up, provide, etc. electrical energy in terms of kilowatt-hours, amps, sustained power, intermittent power, peak power, etc. to single, clusters, grouped, etc. in-ground mounted, portable, parking lot fixed, garage fixed, etc. electric vehicle wireless chargers, etc. from electrical power generation equipment such as local solar collection equipment located in vicinity of electric vehicle charger(s), power generation equipment remotely at regional or municipal power generation plant, etc.).

In one or more implementations, as shown in FIG. 9-A, the operation o1101 can include operation o1102 for assessing electricity provider detail information regarding generation of electricity associated with providing electrical energy to one or more electric vehicle wireless energy chargers including assessing information regarding generation of electricity according to one or more schedules involving one or more time periods to switch from use of a first electricity generation source to a second electricity generation source. Origination of a physically tangible component group can be accomplished through skilled in the art design choice selection including use of one or more components and/or subsystems explicitly and/or implicitly referred to herein for at least in part implementing execution of one or more instructions of the operation o1102, for performance of the operation o1102 by an electrical circuitry arrangement as activated thereto, and/or otherwise fulfillment of the operation o1102. One or more non-transitory signal bearing physical media can bear the one or more instructions that when executed can direct performance of the operation o1102. Furthermore, assessing information regarding generation of electricity according to schedules involving time periods to switch from use of a first electricity generation source to a second electricity generation source module m1102 depicted in FIG. 5-A as being included in the module m1101, when executed and/or activated, can direct performance of and/or perform the operation o1102. Illustratively, in one or more implementations, the operation o1102 can be carried out, for example, by assessing electricity provider detail information regarding generation of electricity associated with providing electrical energy to one or more electric vehicle wireless energy chargers (e.g. assessing electricity provider detail information such as through tracking, monitoring, calculating, forecasting, reviewing, etc. historical, current, projected, estimated, anticipated, planned, etc. capacity, supply, equipment resource, etc. to produce, furnish, back-up, provide, etc. electrical energy in terms of kilowatt-hours, amps, sustained power, intermittent power, peak power, etc. to single, clusters, grouped, etc. in-ground mounted, portable, parking lot fixed, garage fixed, etc. electric vehicle wireless chargers, etc. from electrical power generation equipment such as local solar collection equipment located in vicinity of electric vehicle charger(s), power generation equipment remotely at regional or municipal power generation plant, etc.) including assessing information regarding generation of electricity according to one or more schedules involving one or more time periods to switch from use of a first electricity generation source to a second electricity generation source (e.g. assessing information such as scheduling availability of production of electrical energy to meet future demand of electric vehicle wireless chargers by factoring various sources including local electricity sources provided by solar, wind, or locally delivered fuel sources such as co-generation facilities major regional or municipal electrical generation facilities such giga-watt coal power plants such as having solar production furnish substantial portions of generation capacity during sunshine conditions whereas municipal central plant furnishes during night time conditions, etc.).

In one or more implementations, as shown in FIG. 9-A, the operation o1102 can include operation o1103 for assessing information regarding generation of electricity according to one or more schedules involving one or more time periods to switch from use of a first electricity generation source to a second electricity generation source including assessing information regarding generation of electricity according to one or more schedules for at least in part generating electricity by an electricity generation source located on location of the one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1103, for performance of the operation o1103 by an electrical circuitry arrangement as activated thereto, and/or otherwise fulfillment of the operation o1103. One or more non-transitory signal bearing physical media can bear the one or more instructions that when executed can direct performance of the operation o1103. Furthermore, assessing information regarding generation of electricity according to schedules for generating electricity by an electricity generation source located on location of one or more electric vehicles wireless electrical energy chargers module m1103 depicted in FIG. 5-A as being included in the module m1102, when executed and/or activated, can direct performance of and/or perform the operation o1103. Illustratively, in one or more implementations, the operation o1103 can be carried out, for example, by assessing information regarding generation of electricity according to one or more schedules involving one or more time periods to switch from use of a first electricity generation source to a second electricity generation source (e.g., assessing information such as scheduling availability of production of electrical energy to meet future demand of electric vehicle wireless chargers by factoring various sources including local electricity sources provided by solar, wind, or locally delivered fuel sources such as co-generation facilities major regional or municipal electrical generation facilities such giga-watt coal power plants such as having solar production furnish substantial portions of generation capacity during sunshine conditions whereas municipal central plant furnishes during night time conditions, etc.) including assessing information regarding generation of electricity according to one or more schedules for at least in part generating electricity by an electricity generation source located on location of the one or more electric vehicle wireless electrical energy chargers (e.g., assessing information such as scheduling local electrical energy production based upon availability of sunshine for generation of electrical energy to meet future demand of electric vehicle wireless chargers by photovoltaic conversion of sunshine to generate electrical power to supplement or supply in conjunction with locally delivered fuel sources for co-generation facilities combining HVAC with electrical energy generation, etc.).

In one or more implementations, as shown in FIG. 9-A, the operation o1101 can include operation o1104 for assessing electricity provider detail information regarding generation of electricity associated with providing electrical energy to one or more electric vehicle wireless energy chargers including assessing information regarding generation of electricity according to electrical vehicle user selection of one or more electricity generation sources to provide electrical energy to one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1104, for performance of the operation o1104 by an electrical circuitry arrangement as activated thereto, and/or otherwise fulfillment of the operation o1104. One or more non-transitory signal bearing physical media can bear the one or more instructions that when executed can direct performance of the operation o1104. Furthermore, assessing information regarding generation of electricity according to electrical vehicle user selection of electricity generation sources to provide electrical energy to electric vehicle wireless electrical energy chargers module m1104 depicted in FIG. 5-A as being included in the module m1101, when executed and/or activated, can direct performance of and/or perform the operation o1104. Illustratively, in one or more implementations, the operation o1104 can be carried out, for example, by assessing electricity provider detail information regarding generation of electricity associated with providing electrical energy to one or more electric vehicle wireless energy chargers (e.g., assessing electricity provider detail information such as through tracking, monitoring, calculating, forecasting, reviewing, etc. historical, current, projected, estimated, anticipated, planned, etc. capacity, supply, equipment resource, etc. to produce, furnish, back-up, provide, etc. electrical energy in terms of kilowatt-hours, amps, sustained power, intermittent power, peak power, etc. to single, clusters, grouped, etc. in-ground mounted, portable, parking lot fixed, garage fixed, etc. electric vehicle wireless chargers, etc. from electrical power generation equipment such as local solar collection equipment located in vicinity of electric vehicle charger(s), power generation equipment remotely at regional or municipal power generation plant, etc.) including assessing information regarding generation of electricity according to electrical vehicle user selection of one or more electricity generation sources to provide electrical energy to one or more electric vehicle wireless electrical energy chargers (e.g., assessing information regarding what electrical energy generation equipment to use to provide electricity to charge electric vehicle based on selections made by electric vehicle user and/or associations pertaining to electric vehicle user as preferences involving payment plans for electric vehicle user, energy generation preferences such as solar, coal, local, regional power generation, electric vehicle user itinerary with respect to locations of charging stations and integration with electric power generation facilities and distribution grid, etc.).

In one or more implementations, as shown in FIG. 9-B, the operation o1101 can include operation o1105 for assessing electricity provider detail information regarding generation of electricity associated with providing electrical energy to one or more electric vehicle wireless energy chargers including assessing information regarding generation of electricity according to financial status information for one or more user accounts of one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1105, for performance of the operation o1105 by an electrical circuitry arrangement as activated thereto, and/or otherwise fulfillment of the operation o1105. One or more non-transitory signal bearing physical media can bear the one or more instructions that when executed can direct performance of the operation o1105. Furthermore, assessing information regarding generation of electricity according to financial status information for user accounts of electric vehicles module m1105 depicted in FIG. 5-A as being included in the module m1101, when executed and/or activated, can direct performance of and/or perform the operation o1105. Illustratively, in one or more implementations, the operation o1105 can be carried out, for example, by assessing electricity provider detail information regarding generation of electricity associated with providing electrical energy to one or more electric vehicle wireless energy chargers (e.g., assessing electricity provider detail information such as through tracking, monitoring, calculating, forecasting, reviewing, etc. historical, current, projected, estimated, anticipated, planned, etc. capacity, supply, equipment resource, etc. to produce, furnish, back-up, provide, etc. electrical energy in terms of kilowatt-hours, amps, sustained power, intermittent power, peak power, etc. to single, clusters, grouped, etc. in-ground mounted, portable, parking lot fixed, garage fixed, etc. electric vehicle wireless chargers, etc. from electrical power generation equipment such as local solar collection equipment located in vicinity of electric vehicle charger(s), power generation equipment remotely at regional or municipal power generation plant, etc.) including assessing information regarding generation of electricity according to financial status information for one or more user accounts of one or more electric vehicles (e.g., assessing information regarding user accounts associated with one or more electric vehicles as to banking information, credit information, security information, coupon information, credit information, reimbursement information, payment plan information, employee benefit information, etc.).

In one or more implementations, as shown in FIG. 9-B, the operation o1101 can include operation o1106 for assessing electricity provider detail information regarding generation of electricity associated with providing electrical energy to one or more electric vehicle wireless energy chargers including assessing information regarding generation of electricity according to electricity generation rate capacity of one or more electricity generation sources. Origination of a physically tangible component group can be accomplished through skilled in the art design choice selection including use of one or more components and/or subsystems explicitly and/or implicitly referred to herein for at least in part implementing execution of one or more instructions of the operation o1106, for performance of the operation o1106 by an electrical circuitry arrangement as activated thereto, and/or otherwise fulfillment of the operation o1106. One or more non-transitory signal bearing physical media can bear the one or more instructions that when executed can direct performance of the operation o1106. Furthermore, assessing information regarding generation of electricity according to electricity generation rate capacity of electricity generation sources module m1106 depicted in FIG. 5-A as being included in the module m1101, when executed and/or activated, can direct performance of and/or perform the operation o1106. Illustratively, in one or more implementations, the operation o1106 can be carried out, for example, by assessing electricity provider detail information regarding generation of electricity associated with providing electrical energy to one or more electric vehicle wireless energy chargers (e.g., assessing electricity provider detail information such as through tracking, monitoring, calculating, forecasting, reviewing, etc. historical, current, projected, estimated, anticipated, planned, etc. capacity, supply, equipment resource, etc. to produce, furnish, back-up, provide, etc. electrical energy in terms of kilowatt-hours, amps, sustained power, intermittent power, peak power, etc. to single, clusters, grouped, etc. in-ground mounted, portable, parking lot fixed, garage fixed, etc. electric vehicle wireless chargers, etc. from electrical power generation equipment such as local solar collection equipment located in vicinity of electric vehicle charger(s), power generation equipment remotely at regional or municipal power generation plant, etc.) including assessing information regarding generation of electricity according to electricity generation rate capacity of one or more electricity generation sources (e.g., assessing information as to electricity generation factoring into account steady state transfer rates, peak transfer rates, burst transfer rates, historical, estimated, or planned brownout or blackout conditions, etc.).

In one or more implementations, as shown in FIG. 9-B, the operation o1101 can include operation o1107 for assessing electricity provider detail information regarding generation of electricity associated with providing electrical energy to one or more electric vehicle wireless energy chargers including assessing information regarding generation of electricity according to electrical transmission capacity of network distribution from one or more electricity generation sources to one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1107, for performance of the operation o1107 by an electrical circuitry arrangement as activated thereto, and/or otherwise fulfillment of the operation o1107. One or more non-transitory signal bearing physical media can bear the one or more instructions that when executed can direct performance of the operation o1107. Furthermore, assessing information regarding generation of electricity according to electrical transmission capacity of network distribution from electricity generation sources to electric vehicle wireless electrical energy chargers module m1107 depicted in FIG. 5-A as being included in the module m1101, when executed and/or activated, can direct performance of and/or perform the operation o1107. Illustratively, in one or more implementations, the operation o1107 can be carried out, for example, by assessing electricity provider detail information regarding generation of electricity associated with providing electrical energy to one or more electric vehicle wireless energy chargers (e.g., assessing electricity provider detail information such as through tracking, monitoring, calculating, forecasting, reviewing, etc. historical, current, projected, estimated, anticipated, planned, etc. capacity, supply, equipment resource, etc. to produce, furnish, back-up, provide, etc. electrical energy in terms of kilowatt-hours, amps, sustained power, intermittent power, peak power, etc. to single, clusters, grouped, etc. in-ground mounted, portable, parking lot fixed, garage fixed, etc. electric vehicle wireless chargers, etc. from electrical power generation equipment such as local solar collection equipment located in vicinity of electric vehicle charger(s), power generation equipment remotely at regional or municipal power generation plant, etc.) including assessing information regarding generation of electricity according to electrical transmission capacity of network distribution from one or more electricity generation sources to one or more electric vehicle wireless electrical energy chargers (e.g., assessing information as to electricity generation factoring into account historical, planned, or estimated charging capacity, off-line cycling, downtime for maintenance, availability of electric vehicle charger due to demand of one or more electric vehicles, etc.).

In one or more implementations, as shown in FIG. 9-B, the operation o1101 can include operation o1108 for assessing electricity provider detail information regarding generation of electricity associated with providing electrical energy to one or more electric vehicle wireless energy chargers including assessing information regarding generation of electricity according to planned use of one or more electricity generation sources to service estimated charging service demand of a plurality of electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1108, for performance of the operation o1108 by an electrical circuitry arrangement as activated thereto, and/or otherwise fulfillment of the operation o1108. One or more non-transitory signal bearing physical media can bear the one or more instructions that when executed can direct performance of the operation o1108. Furthermore, assessing information regarding generation of electricity according to planned use of electricity generation sources to service estimated charging service demand of a plurality of electric vehicles module m1108 depicted in FIG. 5-A as being included in the module m1101, when executed and/or activated, can direct performance of and/or perform the operation o1108. Illustratively, in one or more implementations, the operation o1108 can be carried out, for example, by assessing electricity provider detail information regarding generation of electricity associated with providing electrical energy to one or more electric vehicle wireless energy chargers (e.g., assessing electricity provider detail information such as through tracking, monitoring, calculating, forecasting, reviewing, etc. historical, current, projected, estimated, anticipated, planned, etc. capacity, supply, equipment resource, etc. to produce, furnish, back-up, provide, etc. electrical energy in terms of kilowatt-hours, amps, sustained power, intermittent power, peak power, etc. to single, clusters, grouped, etc. in-ground mounted, portable, parking lot fixed, garage fixed, etc. electric vehicle wireless chargers, etc. from electrical power generation equipment such as local solar collection equipment located in vicinity of electric vehicle charger(s), power generation equipment remotely at regional or municipal power generation plant, etc.) including assessing information regarding generation of electricity according to planned use of one or more electricity generation sources to service estimated charging service demand of a plurality of electric vehicles (e.g., assessing information as to planned use of electricity generation facilities to estimated electric vehicle use factoring into account reliability of information collection, variability of statistical veracity of the data collected, population spectrum for data samples collected, etc.).

In one or more implementations, as shown in FIG. 9-C, the operation o1101 can include operation o1109 for assessing electricity provider detail information regarding generation of electricity associated with providing electrical energy to one or more electric vehicle wireless energy chargers including assessing information regarding generation of electricity according to amount of time requested for providing electrical energy to one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1109, for performance of the operation o1109 by an electrical circuitry arrangement as activated thereto, and/or otherwise fulfillment of the operation o1109. One or more non-transitory signal bearing physical media can bear the one or more instructions that when executed can direct performance of the operation o1109. Furthermore, assessing information regarding generation of electricity according to amount of time requested for providing electrical energy to electric vehicle wireless electrical energy chargers module m1109 depicted in FIG. 5-A as being included in the module m1101, when executed and/or activated, can direct performance of and/or perform the operation o1109. Illustratively, in one or more implementations, the operation o1109 can be carried out, for example, by assessing electricity provider detail information regarding generation of electricity associated with providing electrical energy to one or more electric vehicle wireless energy chargers (e.g., assessing electricity provider detail information such as through tracking, monitoring, calculating, forecasting, reviewing, etc. historical, current, projected, estimated, anticipated, planned, etc. capacity, supply, equipment resource, etc. to produce, furnish, back-up, provide, etc. electrical energy in terms of kilowatt-hours, amps, sustained power, intermittent power, peak power, etc. to single, clusters, grouped, etc. in-ground mounted, portable, parking lot fixed, garage fixed, etc. electric vehicle wireless chargers, etc. from electrical power generation equipment such as local solar collection equipment located in vicinity of electric vehicle charger(s), power generation equipment remotely at regional or municipal power generation plant, etc.) including assessing information regarding generation of electricity according to amount of time requested for providing electrical energy to one or more electric vehicle wireless electrical energy chargers (e.g., assessing information as to electricity generation to meet requested times to charge one or more electric vehicles by factoring into account historical, planned, or estimated availability of electric vehicle for charging by one or more electrical energy chargers based on historical, planned, or estimated one or more itineraries of travel associated with one or more electric vehicles, etc.).

In one or more implementations, as shown in FIG. 9-C, the operation o1101 can include operation o1110 for assessing electricity provider detail information regarding generation of electricity associated with providing electrical energy to one or more electric vehicle wireless energy chargers including assessing information regarding generation of electricity according to amount of electrical energy to be transferred to one or more electric vehicles in a designated period of time by the one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1110, for performance of the operation o1110 by an electrical circuitry arrangement as activated thereto, and/or otherwise fulfillment of the operation o1110. One or more non-transitory signal bearing physical media can bear the one or more instructions that when executed can direct performance of the operation o1110. Furthermore, assessing information regarding generation of electricity according to amount of electrical energy to be transferred to electric vehicles in a designated period of time by one or more electric vehicles wireless electrical energy chargers module m1110 depicted in FIG. 5-A as being included in the module m1101, when executed and/or activated, can direct performance of and/or perform the operation o1110. Illustratively, in one or more implementations, the operation o1110 can be carried out, for example, by assessing electricity provider detail information regarding generation of electricity associated with providing electrical energy to one or more electric vehicle wireless energy chargers (e.g., assessing electricity provider detail information such as through tracking, monitoring, calculating, forecasting, reviewing, etc. historical, current, projected, estimated, anticipated, planned, etc. capacity, supply, equipment resource, etc. to produce, furnish, back-up, provide, etc. electrical energy in terms of kilowatt-hours, amps, sustained power, intermittent power, peak power, etc. to single, clusters, grouped, etc. in-ground mounted, portable, parking lot fixed, garage fixed, etc. electric vehicle wireless chargers, etc. from electrical power generation equipment such as local solar collection equipment located in vicinity of electric vehicle charger(s), power generation equipment remotely at regional or municipal power generation plant, etc.) including assessing information regarding generation of electricity according to amount of electrical energy to be transferred to one or more electric vehicles in a designated period of time by the one or more electric vehicle wireless electrical energy chargers (e.g., assessing information as to electricity generation by factoring into account preferred safety margins to provide an additional percentage of charge over the minimum required to accomplish a given itinerary for each of the one or more electric vehicle wireless electrical energy chargers, etc.).

In one or more implementations, as shown in FIG. 9-C, the operation o1101 can include operation o1111 for assessing electricity provider detail information regarding generation of electricity associated with providing electrical energy to one or more electric vehicle wireless energy chargers including assessing information regarding generation of electricity according to approval of consumer profile of one or more users of one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1111, for performance of the operation o1111 by an electrical circuitry arrangement as activated thereto, and/or otherwise fulfillment of the operation o1111. One or more non-transitory signal bearing physical media can bear the one or more instructions that when executed can direct performance of the operation o1111. Furthermore, assessing information regarding generation of electricity according to approval of consumer profile of users of electric vehicles module m1111 depicted in FIG. 5-B as being included in the module m1101, when executed and/or activated, can direct performance of and/or perform the operation o1111. Illustratively, in one or more implementations, the operation o1111 can be carried out, for example, by assessing electricity provider detail information regarding generation of electricity associated with providing electrical energy to one or more electric vehicle wireless energy chargers (e.g., assessing electricity provider detail information such as through tracking, monitoring, calculating, forecasting, reviewing, etc. historical, current, projected, estimated, anticipated, planned, etc. capacity, supply, equipment resource, etc. to produce, furnish, back-up, provide, etc. electrical energy in terms of kilowatt-hours, amps, sustained power, intermittent power, peak power, etc. to single, clusters, grouped, etc. in-ground mounted, portable, parking lot fixed, garage fixed, etc. electric vehicle wireless chargers, etc. from electrical power generation equipment such as local solar collection equipment located in vicinity of electric vehicle charger(s), power generation equipment remotely at regional or municipal power generation plant, etc.) including assessing information regarding generation of electricity according to approval of consumer profile of one or more users of one or more electric vehicles (e.g., assessing information as to electricity generation by factoring into account electric vehicle user detail such as general demographic, consumer oriented shopping detail, employment work history, financial data, historical itinerary information, etc.).

In one or more implementations, as shown in FIG. 9-D, the operation o1101 can include operation o1112 for assessing electricity provider detail information regarding generation of electricity associated with providing electrical energy to one or more electric vehicle wireless energy chargers including assessing information regarding generation of electricity according to impact from planned schedule for generation of electricity by one or more electrical energy generation sources upon itinerary and route information associated with one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1112, for performance of the operation o1112 by an electrical circuitry arrangement as activated thereto, and/or otherwise fulfillment of the operation o1112. One or more non-transitory signal bearing physical media can bear the one or more instructions that when executed can direct performance of the operation o1112. Furthermore, assessing information regarding generation of electricity according to impact from planned schedule for generation of electricity by electrical energy generation sources upon itinerary and route information associated with electric vehicles module m1112 depicted in FIG. 5-B as being included in the module m1101, when executed and/or activated, can direct performance of and/or perform the operation o1112. Illustratively, in one or more implementations, the operation o1112 can be carried out, for example, by assessing electricity provider detail information regarding generation of electricity associated with providing electrical energy to one or more electric vehicle wireless energy chargers (e.g., assessing electricity provider detail information such as through tracking, monitoring, calculating, forecasting, reviewing, etc. historical, current, projected, estimated, anticipated, planned, etc. capacity, supply, equipment resource, etc. to produce, furnish, back-up, provide, etc. electrical energy in terms of kilowatt-hours, amps, sustained power, intermittent power, peak power, etc. to single, clusters, grouped, etc. in-ground mounted, portable, parking lot fixed, garage fixed, etc. electric vehicle wireless chargers, etc. from electrical power generation equipment such as local solar collection equipment located in vicinity of electric vehicle charger(s), power generation equipment remotely at regional or municipal power generation plant, etc.) including assessing information regarding generation of electricity according to impact from planned schedule for generation of electricity by one or more electrical energy generation sources upon itinerary and route information associated with one or more electric vehicles (e.g., assessing information as to scheduling of equipment used for electricity generation by factoring into account historical, planned, or estimated itinerary information associated with one or more users of one or more electric vehicles as individual or shared use, etc.).

In one or more implementations, as shown in FIG. 9-D, the operation o11 can include operation o1113 for electronically assessing electricity provider detail information associated with providing electrical energy to one or more electric vehicle wireless electrical energy chargers configured for wirelessly charging one or more electric vehicles with electrical energy from the one or more electric vehicle wireless electrical energy chargers to the one or more electric vehicles, the one or more electric vehicles including one or more electric motors to provide motive force for directionally propelling the one or more electric vehicles including assessing information regarding generation of electricity received from one or more communication links between one or more electrical energy generation sources and one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1113, for performance of the operation o1113 by an electrical circuitry arrangement as activated thereto, and/or otherwise fulfillment of the operation o1113. One or more non-transitory signal bearing physical media can bear the one or more instructions that when executed can direct performance of the operation o1113. Furthermore, assessing information regarding generation of electricity received from communication links between electrical energy generation sources and electric vehicle wireless electrical energy chargers module m1113 depicted in FIG. 5-B as being included in the module m11, when executed and/or activated, can direct performance of and/or perform the operation o1113. Illustratively, in one or more implementations, the operation o1113 can be carried out, for example, by electronically assessing electricity provider detail information associated with providing electrical energy to one or more electric vehicle wireless electrical energy chargers configured for wirelessly charging one or more electric vehicles with electrical energy from the one or more electric vehicle wireless electrical energy chargers to the one or more electric vehicles, the one or more electric vehicles including one or more electric motors to provide motive force for directionally propelling the one or more electric vehicles including assessing information regarding generation of electricity received from one or more communication links between one or more electrical energy generation sources and one or more electric vehicle wireless electrical energy chargers (e.g., assessing information as to information impacting planning regarding electricity generation received by one or more wired, wireless, cellular, packetized, direct point-to-point, internet, wide area network, local area network, or other communication links, etc.).

In one or more implementations, as shown in FIG. 9-D, the operation o1113 can include operation o1114 for assessing information regarding generation of electricity received from one or more communication links between one or more electrical energy generation sources and one or more electric vehicle wireless electrical energy chargers including assessing information regarding generation of electricity received from one or more communication links involving at least in part one or more contactless smart card readers. Origination of a physically tangible component group can be accomplished through skilled in the art design choice selection including use of one or more components and/or subsystems explicitly and/or implicitly referred to herein for at least in part implementing execution of one or more instructions of the operation o1114, for performance of the operation o1114 by an electrical circuitry arrangement as activated thereto, and/or otherwise fulfillment of the operation o1114. One or more non-transitory signal bearing physical media can bear the one or more instructions that when executed can direct performance of the operation o1114. Furthermore, assessing information regarding generation of electricity received from communication links involving contactless smart card readers module m1114 depicted in FIG. 5-B as being included in the module m1113, when executed and/or activated, can direct performance of and/or perform the operation o1114. Illustratively, in one or more implementations, the operation o1114 can be carried out, for example, by assessing information regarding generation of electricity received from one or more communication links between one or more electrical energy generation sources and one or more electric vehicle wireless electrical energy chargers (e.g., assessing information as to information impacting planning regarding electricity generation received by one or more wired, wireless, cellular, packetized, direct point-to-point, internet, wide area network, local area network, or other communication links, etc.) including assessing information regarding generation of electricity received from one or more communication links involving at least in part one or more contactless smart card readers (e.g., assessing information impacting planning regarding electricity generation received through involvement with contactless smart card readers located within one or more electric vehicles as accessed through a dashboard console of one or more electric vehicles, door panel of one or more electric vehicles, exterior surface of one or more electric vehicles, located near one or more electric vehicle wireless electrical energy chargers adjacent to locations for charging of one or more electric vehicles, etc.).

In one or more implementations, as shown in FIG. 9-E, the operation o1113 can include operation o1115 for assessing information regarding generation of electricity received from one or more communication links between one or more electrical energy generation sources and one or more electric vehicle wireless electrical energy chargers including assessing information regarding generation of electricity received from one or more communication links involving at least in part one or more RFID tag readers. Origination of a physically tangible component group can be accomplished through skilled in the art design choice selection including use of one or more components and/or subsystems explicitly and/or implicitly referred to herein for at least in part implementing execution of one or more instructions of the operation o1115, for performance of the operation o1115 by an electrical circuitry arrangement as activated thereto, and/or otherwise fulfillment of the operation o1115. One or more non-transitory signal bearing physical media can bear the one or more instructions that when executed can direct performance of the operation o1115. Furthermore, assessing information regarding generation of electricity received from communication links involving RFID tag readers module m1115 depicted in FIG. 5-B as being included in the module m1113, when executed and/or activated, can direct performance of and/or perform the operation o1115. Illustratively, in one or more implementations, the operation o1115 can be carried out, for example, by assessing information regarding generation of electricity received from one or more communication links between one or more electrical energy generation sources and one or more electric vehicle wireless electrical energy chargers (e.g., assessing information as to information impacting planning regarding electricity generation received by one or more wired, wireless, cellular, packetized, direct point-to-point, internet, wide area network, local area network, or other communication links, etc.) including assessing information regarding generation of electricity received from one or more communication links involving at least in part one or more RFID tag readers (e.g., assessing information impacting planning regarding electricity generation received through involvement with RFID tag readers located within one or more electric vehicles as accessed through a dashboard console of one or more electric vehicles, door panel of one or more electric vehicles, exterior surface of one or more electric vehicles, located near one or more electric vehicle wireless electrical energy chargers adjacent to locations for charging of one or more electric vehicles, etc.).

In one or more implementations, as shown in FIG. 9-E, the operation o1113 can include operation o1116 for assessing information regarding generation of electricity received from one or more communication links between one or more electrical energy generation sources and one or more electric vehicle wireless electrical energy chargers including assessing information regarding generation of electricity received from one or more communication links involving at least in part one or more manual entry keypads. Origination of a physically tangible component group can be accomplished through skilled in the art design choice selection including use of one or more components and/or subsystems explicitly and/or implicitly referred to herein for at least in part implementing execution of one or more instructions of the operation o1116, for performance of the operation o1116 by an electrical circuitry arrangement as activated thereto, and/or otherwise fulfillment of the operation o1116. One or more non-transitory signal bearing physical media can bear the one or more instructions that when executed can direct performance of the operation o1116. Furthermore, assessing information regarding generation of electricity received from communication links involving manual entry keypads module m1116 depicted in FIG. 5-B as being included in the module m1113, when executed and/or activated, can direct performance of and/or perform the operation o1116. Illustratively, in one or more implementations, the operation o1116 can be carried out, for example, by assessing information regarding generation of electricity received from one or more communication links between one or more electrical energy generation sources and one or more electric vehicle wireless electrical energy chargers (e.g., assessing information as to information impacting planning regarding electricity generation received by one or more wired, wireless, cellular, packetized, direct point-to-point, internet, wide area network, local area network, or other communication links, etc.) including assessing information regarding generation of electricity received from one or more communication links involving at least in part one or more manual entry keypads (e.g., assessing information impacting planning regarding electricity generation received through involvement with manual entry keypads located within one or more electric vehicles as accessed through a dashboard console of one or more electric vehicles, door panel of one or more electric vehicles, exterior surface of one or more electric vehicles, located near one or more electric vehicle wireless electrical energy chargers adjacent to locations for charging of one or more electric vehicles, etc.).

In one or more implementations, as shown in FIG. 9-E, the operation o1113 can include operation o1117 for assessing information regarding generation of electricity received from one or more communication links between one or more electrical energy generation sources and one or more electric vehicle wireless electrical energy chargers including assessing information regarding generation of electricity received from one or more communication links involving at least in part one or more blue tooth communication devices. Origination of a physically tangible component group can be accomplished through skilled in the art design choice selection including use of one or more components and/or subsystems explicitly and/or implicitly referred to herein for at least in part implementing execution of one or more instructions of the operation o1117, for performance of the operation o1117 by an electrical circuitry arrangement as activated thereto, and/or otherwise fulfillment of the operation o1117. One or more non-transitory signal bearing physical media can bear the one or more instructions that when executed can direct performance of the operation o1117. Furthermore, assessing information regarding generation of electricity received from communication links involving blue tooth communication devices module m1117 depicted in FIG. 5-B as being included in the module m1113, when executed and/or activated, can direct performance of and/or perform the operation o1117. Illustratively, in one or more implementations, the operation o1117 can be carried out, for example, by assessing information regarding generation of electricity received from one or more communication links between one or more electrical energy generation sources and one or more electric vehicle wireless electrical energy chargers (e.g., assessing information as to information impacting planning regarding electricity generation received by one or more wired, wireless, cellular, packetized, direct point-to-point, internet, wide area network, local area network, or other communication links, etc.) including assessing information regarding generation of electricity received from one or more communication links involving at least in part one or more blue tooth communication devices (e.g., assessing information impacting planning regarding electricity generation received through involvement with blue tooth communication devices located within one or more electric vehicles as accessed through a dashboard console of one or more electric vehicles, door panel of one or more electric vehicles, exterior surface of one or more electric vehicles, located near one or more electric vehicle wireless electrical energy chargers adjacent to locations for charging of one or more electric vehicles, etc.).

In one or more implementations, as shown in FIG. 9-F, the operation o1113 can include operation o1118 for assessing information regarding generation of electricity received from one or more communication links between one or more electrical energy generation sources and one or more electric vehicle wireless electrical energy chargers including assessing information regarding generation of electricity received from one or more communication links involving at least in part one or more WiFi communication devices. Origination of a physically tangible component group can be accomplished through skilled in the art design choice selection including use of one or more components and/or subsystems explicitly and/or implicitly referred to herein for at least in part implementing execution of one or more instructions of the operation o1118, for performance of the operation o1118 by an electrical circuitry arrangement as activated thereto, and/or otherwise fulfillment of the operation o1118. One or more non-transitory signal bearing physical media can bear the one or more instructions that when executed can direct performance of the operation o1118. Furthermore, assessing information regarding generation of electricity received from communication links involving WiFi communication devices module m1118 depicted in FIG. 5-B as being included in the module m1113, when executed and/or activated, can direct performance of and/or perform the operation o1118. Illustratively, in one or more implementations, the operation o1118 can be carried out, for example, by assessing information regarding generation of electricity received from one or more communication links between one or more electrical energy generation sources and one or more electric vehicle wireless electrical energy chargers (e.g., assessing information as to information impacting planning regarding electricity generation received by one or more wired, wireless, cellular, packetized, direct point-to-point, internet, wide area network, local area network, or other communication links, etc.) including assessing information regarding generation of electricity received from one or more communication links involving at least in part one or more WiFi communication devices (e.g., transmitting advisory information regarding WiFi communication devices located within one or more electric vehicles as accessed through a dashboard console of one or more electric vehicles, door panel of one or more electric vehicles, exterior surface of one or more electric vehicles, located near one or more electric vehicle wireless electrical energy chargers adjacent to locations for charging of one or more electric vehicles, etc.).

In one or more implementations, as shown in FIG. 9-F, the operation o1113 can include operation o1119 for assessing information regarding generation of electricity received from one or more communication links between one or more electrical energy generation sources and one or more electric vehicle wireless electrical energy chargers including assessing information regarding generation of electricity received from one or more communication links involving at least in part one or more FM radio communication devices. Origination of a physically tangible component group can be accomplished through skilled in the art design choice selection including use of one or more components and/or subsystems explicitly and/or implicitly referred to herein for at least in part implementing execution of one or more instructions of the operation o1119, for performance of the operation o1119 by an electrical circuitry arrangement as activated thereto, and/or otherwise fulfillment of the operation o1119. One or more non-transitory signal bearing physical media can bear the one or more instructions that when executed can direct performance of the operation o1119. Furthermore, assessing information regarding generation of electricity received from communication links involving FM radio communication devices module m1119 depicted in FIG. 5-B as being included in the module m1113, when executed and/or activated, can direct performance of and/or perform the operation o1119. Illustratively, in one or more implementations, the operation o1119 can be carried out, for example, by assessing information regarding generation of electricity received from one or more communication links between one or more electrical energy generation sources and one or more electric vehicle wireless electrical energy chargers (e.g., assessing information as to information impacting planning regarding electricity generation received by one or more wired, wireless, cellular, packetized, direct point-to-point, internet, wide area network, local area network, or other communication links, etc.) including assessing information regarding generation of electricity received from one or more communication links involving at least in part one or more FM radio communication devices (e.g., assessing information impacting planning regarding electricity generation received through involvement with FM radio communication devices located within one or more electric vehicles as accessed through a dashboard console of one or more electric vehicles, door panel of one or more electric vehicles, exterior surface of one or more electric vehicles, located near one or more electric vehicle wireless electrical energy chargers adjacent to locations for charging of one or more electric vehicles, etc.).

In one or more implementations, as shown in FIG. 9-F, the operation o1113 can include operation o1120 for assessing information regarding generation of electricity received from one or more communication links between one or more electrical energy generation sources and one or more electric vehicle wireless electrical energy chargers including assessing information regarding generation of electricity received from one or more communication links involving at least in part one or more infrared communication devices. Origination of a physically tangible component group can be accomplished through skilled in the art design choice selection including use of one or more components and/or subsystems explicitly and/or implicitly referred to herein for at least in part implementing execution of one or more instructions of the operation o1120, for performance of the operation o1120 by an electrical circuitry arrangement as activated thereto, and/or otherwise fulfillment of the operation o1120. One or more non-transitory signal bearing physical media can bear the one or more instructions that when executed can direct performance of the operation o1120. Furthermore, assessing information regarding generation of electricity received from communication links involving infrared communication devices module m1120 depicted in FIG. 5-C as being included in the module m1113, when executed and/or activated, can direct performance of and/or perform the operation o1120. Illustratively, in one or more implementations, the operation o1120 can be carried out, for example, by assessing information regarding generation of electricity received from one or more communication links between one or more electrical energy generation sources and one or more electric vehicle wireless electrical energy chargers (e.g., assessing information as to information impacting planning regarding electricity generation received by one or more wired, wireless, cellular, packetized, direct point-to-point, internet, wide area network, local area network, or other communication links, etc.) including assessing information regarding generation of electricity received from one or more communication links involving at least in part one or more infrared communication devices (e.g., assessing information impacting planning regarding electricity generation received through involvement with infrared communication devices located within one or more electric vehicles as accessed through a dashboard console of one or more electric vehicles, door panel of one or more electric vehicles, exterior surface of one or more electric vehicles, located near one or more electric vehicle wireless electrical energy chargers adjacent to locations for charging of one or more electric vehicles, etc.).

In one or more implementations, as shown in FIG. 10-A, the operation o12 can include operation o1201 for electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers including requesting electric vehicle wireless electrical energy charger planning information at least in part wirelessly. Origination of a physically tangible component group can be accomplished through skilled in the art design choice selection including use of one or more components and/or subsystems explicitly and/or implicitly referred to herein for at least in part implementing execution of one or more instructions of the operation o1201, for performance of the operation o1201 by an electrical circuitry arrangement as activated thereto, and/or otherwise fulfillment of the operation o1201. One or more non-transitory signal bearing physical media can bear the one or more instructions that when executed can direct performance of the operation o1201. Furthermore, requesting electric vehicle wireless electrical energy charger planning information wirelessly module m1201 depicted in FIG. 6-A as being included in the module m12, when executed and/or activated, can direct performance of and/or perform the operation o1201. Illustratively, in one or more implementations, the operation o1201 can be carried out, for example, by electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers including requesting electric vehicle wireless electrical energy charger planning information at least in part wirelessly (e.g., requesting wirelessly through involvement with cellular communication, packetized communication, networked communication, broadband communication, gigahertz frequency communication, etc.).

In one or more implementations, as shown in FIG. 10-A, the operation o1201 can include operation o1202 for requesting electric vehicle wireless electrical energy charger planning information at least in part wirelessly including requesting information of at least in part involving one or more RFID tags. Origination of a physically tangible component group can be accomplished through skilled in the art design choice selection including use of one or more components and/or subsystems explicitly and/or implicitly referred to herein for at least in part implementing execution of one or more instructions of the operation o1202, for performance of the operation o1202 by an electrical circuitry arrangement as activated thereto, and/or otherwise fulfillment of the operation o1202. One or more non-transitory signal bearing physical media can bear the one or more instructions that when executed can direct performance of the operation o1202. Furthermore, requesting information of involving RFID tags module m1202 depicted in FIG. 6-A as being included in the module m1201, when executed and/or activated, can direct performance of and/or perform the operation o1202. Illustratively, in one or more implementations, the operation o1202 can be carried out, for example, by requesting electric vehicle wireless electrical energy charger planning information at least in part wirelessly (e.g., requesting wirelessly through involvement with cellular communication, packetized communication, networked communication, broadband communication, gigahertz frequency communication, etc.) including requesting information of at least in part involving one or more RFID tags (e.g., requesting information through involvement with RFID tags associated with vehicle users or associated with vehicle being read by RFID readers mounted with vehicle or in parking area, etc.).

In one or more implementations, as shown in FIG. 10-A, the operation o1201 can include operation o1203 for requesting electric vehicle wireless electrical energy charger planning information at least in part wirelessly including requesting information of at least in part involving blue tooth supported communication. Origination of a physically tangible component group can be accomplished through skilled in the art design choice selection including use of one or more components and/or subsystems explicitly and/or implicitly referred to herein for at least in part implementing execution of one or more instructions of the operation o1203, for performance of the operation o1203 by an electrical circuitry arrangement as activated thereto, and/or otherwise fulfillment of the operation o1203. One or more non-transitory signal bearing physical media can bear the one or more instructions that when executed can direct performance of the operation o1203. Furthermore, requesting information of involving blue tooth supported communication module m1203 depicted in FIG. 6-A as being included in the module m1201, when executed and/or activated, can direct performance of and/or perform the operation o1203. Illustratively, in one or more implementations, the operation o1203 can be carried out, for example, by requesting electric vehicle wireless electrical energy charger planning information at least in part wirelessly (e.g., requesting wirelessly through involvement with cellular communication, packetized communication, networked communication, broadband communication, gigahertz frequency communication, etc.) including requesting information of at least in part involving blue tooth supported communication (e.g., requesting information through involvement with blue tooth communication from user mobile calendaring device to blue tooth receiver affixed to vehicle, etc.).

In one or more implementations, as shown in FIG. 10-A, the operation o1201 can include operation o1204 for requesting electric vehicle wireless electrical energy charger planning information at least in part wirelessly including requesting information of at least in part involving WiFi facilitated communication. Origination of a physically tangible component group can be accomplished through skilled in the art design choice selection including use of one or more components and/or subsystems explicitly and/or implicitly referred to herein for at least in part implementing execution of one or more instructions of the operation o1204, for performance of the operation o1204 by an electrical circuitry arrangement as activated thereto, and/or otherwise fulfillment of the operation o1204. One or more non-transitory signal bearing physical media can bear the one or more instructions that when executed can direct performance of the operation o1204. Furthermore, requesting information of involving WiFi facilitated communication module m1204 depicted in FIG. 6-A as being included in the module m1201, when executed and/or activated, can direct performance of and/or perform the operation o1204. Illustratively, in one or more implementations, the operation o1204 can be carried out, for example, by requesting electric vehicle wireless electrical energy charger planning information at least in part wirelessly (e.g., requesting wirelessly through involvement with cellular communication, packetized communication, networked communication, broadband communication, gigahertz frequency communication, etc.) including requesting information of at least in part involving WiFi facilitated communication (e.g., requesting information through involvement with WiFi com-munication from user laptop to WiFi reception device integrated into vehicle console, etc.).

In one or more implementations, as shown in FIG. 10-A, the operation o1201 can include operation o1205 for requesting electric vehicle wireless electrical energy charger planning information at least in part wirelessly including requesting information of at least in part involving FM radio wave communication. Origination of a physically tangible component group can be accomplished through skilled in the art design choice selection including use of one or more components and/or subsystems explicitly and/or implicitly referred to herein for at least in part implementing execution of one or more instructions of the operation o1205, for performance of the operation o1205 by an electrical circuitry arrangement as activated thereto, and/or otherwise fulfillment of the operation o1205. One or more non-transitory signal bearing physical media can bear the one or more instructions that when executed can direct performance of the operation o1205. Furthermore, requesting information of involving FM radio wave communication module m1205 depicted in FIG. 6-A as being included in the module m1201, when executed and/or activated, can direct performance of and/or perform the operation o1205. Illustratively, in one or more implementations, the operation o1205 can be carried out, for example, by requesting electric vehicle wireless electrical energy charger planning information at least in part wirelessly (e.g., requesting wirelessly through involvement with cellular communication, packetized communication, networked communication, broadband communication, gigahertz frequency communication, etc.) including requesting information of at least in part involving FM radio wave communication (e.g., requesting information through involvement with FM radio broadcast from handheld user personal information management system being received by electric vehicle communication system, etc.).

In one or more implementations, as shown in FIG. 10-A, the operation o1201 can include operation o1206 for requesting electric vehicle wireless electrical energy charger planning information at least in part wirelessly including requesting information of at least in part involving infrared supported communication. Origination of a physically tangible component group can be accomplished through skilled in the art design choice selection including use of one or more components and/or subsystems explicitly and/or implicitly referred to herein for at least in part implementing execution of one or more instructions of the operation o1206, for performance of the operation o1206 by an electrical circuitry arrangement as activated thereto, and/or otherwise fulfillment of the operation o1206. One or more non-transitory signal bearing physical media can bear the one or more instructions that when executed can direct performance of the operation o1206. Furthermore, requesting information of involving infrared supported communication module m1206 depicted in FIG. 6-A as being included in the module m1201, when executed and/or activated, can direct performance of and/or perform the operation o1206. Illustratively, in one or more implementations, the operation o1206 can be carried out, for example, by requesting electric vehicle wireless electrical energy charger planning information at least in part wirelessly (e.g., requesting wirelessly through involvement with cellular communication, packetized communication, networked communication, broadband communication, gigahertz frequency communication, etc.) including requesting information of at least in part involving infrared supported communication (e.g., requesting information through involvement with one or more infrared transmitters located near one or more parking locations for electric vehicles and one or more infrared receivers located on one or more electric vehicles, etc.).

In one or more implementations, as shown in FIG. 10-B, the operation o12 can include operation o1207 for electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers including requesting information of at least in part involving direct non-wireless communication. Origination of a physically tangible component group can be accomplished through skilled in the art design choice selection including use of one or more components and/or subsystems explicitly and/or implicitly referred to herein for at least in part implementing execution of one or more instructions of the operation o1207, for performance of the operation o1207 by an electrical circuitry arrangement as activated thereto, and/or otherwise fulfillment of the operation o1207. One or more non-transitory signal bearing physical media can bear the one or more instructions that when executed can direct performance of the operation o1207. Furthermore, requesting information of involving direct non-wireless communication module m1207 depicted in FIG. 6-A as being included in the module m12, when executed and/or activated, can direct performance of and/or perform the operation o1207. Illustratively, in one or more implementations, the operation o1207 can be carried out, for example, by electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers including requesting information of at least in part involving direct non-wireless communication (e.g., requesting information through involvement with hard wired network cable connecting one or more databases containing scheduling information, etc.).

In one or more implementations, as shown in FIG. 10-B, the operation o1207 can include operation o1208 for requesting information of at least in part involving direct non-wireless communication including requesting information of at least in part involving one or more direct wire connections. Origination of a physically tangible component group can be accomplished through skilled in the art design choice selection including use of one or more components and/or subsystems explicitly and/or implicitly referred to herein for at least in part implementing execution of one or more instructions of the operation o1208, for performance of the operation o1208 by an electrical circuitry arrangement as activated thereto, and/or otherwise fulfillment of the operation o1208. One or more non-transitory signal bearing physical media can bear the one or more instructions that when executed can direct performance of the operation o1208. Furthermore, requesting information of involving direct wire connections module m1208 depicted in FIG. 6-A as being included in the module m1207, when executed and/or activated, can direct performance of and/or perform the operation o1208. Illustratively, in one or more implementations, the operation o1208 can be carried out, for example, by requesting information of at least in part involving direct non-wireless communication (e.g., requesting information through involvement with hard wired network cable connecting one or more databases containing scheduling information, etc.) including requesting information of at least in part involving one or more direct wire connections (e.g., requesting information through involvement with electrical grid wiring from central planning station on through to communication device located adjacent to charging of electric vehicle, etc.).

In one or more implementations, as shown in FIG. 10-B, the operation o1207 can include operation o1209 for requesting information of at least in part involving direct non-wireless communication including requesting information of at least in part involving one or more direct sound wave broadcasts. Origination of a physically tangible component group can be accomplished through skilled in the art design choice selection including use of one or more components and/or subsystems explicitly and/or implicitly referred to herein for at least in part implementing execution of one or more instructions of the operation o1209, for performance of the operation o1209 by an electrical circuitry arrangement as activated thereto, and/or otherwise fulfillment of the operation o1209. One or more non-transitory signal bearing physical media can bear the one or more instructions that when executed can direct performance of the operation o1209. Furthermore, requesting information of involving direct sound wave broadcasts module m1209 depicted in FIG. 6-A as being included in the module m1207, when executed and/or activated, can direct performance of and/or perform the operation o1209. Illustratively, in one or more implementations, the operation o1209 can be carried out, for example, by requesting information of at least in part involving direct non-wireless communication (e.g., requesting information through involvement with hard wired network cable connecting one or more databases containing scheduling information, etc.) including requesting information of at least in part involving one or more direct sound wave broadcasts (e.g., requesting information through involvement with one or more verbal responses of one or more electric vehicle users to one or more audible queries of the one or more users in vicinity of electric vehicle parking station, requesting information ultrasonically, etc.).

In one or more implementations, as shown in FIG. 10-B, the operation o12 can include operation o1210 for electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers including requesting information of at least in part involving overt action by the one or more electric vehicle users. Origination of a physically tangible component group can be accomplished through skilled in the art design choice selection including use of one or more components and/or subsystems explicitly and/or implicitly referred to herein for at least in part implementing execution of one or more instructions of the operation o1210, for performance of the operation o1210 by an electrical circuitry arrangement as activated thereto, and/or otherwise fulfillment of the operation o1210. One or more non-transitory signal bearing physical media can bear the one or more instructions that when executed can direct performance of the operation o1210. Furthermore, requesting information of involving overt action by one or more electric vehicles users module m1210 depicted in FIG. 6-A as being included in the module m12, when executed and/or activated, can direct performance of and/or perform the operation o1210. Illustratively, in one or more implementations, the operation o1210 can be carried out, for example, by electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers including requesting information of at least in part involving overt action by the one or more electric vehicle users (e.g., requesting information through involvement with eaves-dropping on one or more audible conversations of one or more electric vehicle users, etc.).

In one or more implementations, as shown in FIG. 10-B, the operation o1210 can include operation o1211 for requesting information of at least in part involving overt action by the one or more electric vehicle users including requesting information of at least in part involving one or more employer databases. Origination of a physically tangible component group can be accomplished through skilled in the art design choice selection including use of one or more components and/or subsystems explicitly and/or implicitly referred to herein for at least in part implementing execution of one or more instructions of the operation o1211, for performance of the operation o1211 by an electrical circuitry arrangement as activated thereto, and/or otherwise fulfillment of the operation o1211. One or more non-transitory signal bearing physical media can bear the one or more instructions that when executed can direct performance of the operation o1211. Furthermore, requesting information of involving employer databases module m1211 depicted in FIG. 6-A as being included in the module m1210, when executed and/or activated, can direct performance of and/or perform the operation o1211. Illustratively, in one or more implementations, the operation o1211 can be carried out, for example, by requesting information of at least in part involving overt action by the one or more electric vehicle users (e.g., requesting information through involvement with eaves-dropping on one or more audible conversations of one or more electric vehicle users, etc.) including requesting information of at least in part involving one or more employer databases (e.g., requesting information through involvement with one or more human relations databases regarding perks, bonuses, rewards, incentives or other compensation associated with one or more electric vehicle users that are drive or otherwise ride in one or more electric vehicles potentially available for charging at one or more vicinities of an employer of the one or more electric vehicle users, etc.).

In one or more implementations, as shown in FIG. 10-C, the operation o1210 can include operation o1212 for requesting information of at least in part involving overt action by the one or more electric vehicle users including requesting information of at least in part involving one or more electronic calendaring systems. Origination of a physically tangible component group can be accomplished through skilled in the art design choice selection including use of one or more components and/or subsystems explicitly and/or implicitly referred to herein for at least in part implementing execution of one or more instructions of the operation o1212, for performance of the operation o1212 by an electrical circuitry arrangement as activated thereto, and/or otherwise fulfillment of the operation o1212. One or more non-transitory signal bearing physical media can bear the one or more instructions that when executed can direct performance of the operation o1212. Furthermore, requesting information of involving electronic calendaring systems module m1212 depicted in FIG. 6-A as being included in the module m1210, when executed and/or activated, can direct performance of and/or perform the operation o1212. Illustratively, in one or more implementations, the operation o1212 can be carried out, for example, by requesting information of at least in part involving overt action by the one or more electric vehicle users (e.g., requesting information through involvement with eaves-dropping on one or more audible conversations of one or more electric vehicle users, etc.) including requesting information of at least in part involving one or more electronic calendaring systems (e.g., requesting information through involvement with one or more calendaring systems to determine how one or more electric vehicles are to be used over a course of time by factoring in relevant activity listed in the one or more calendaring systems, etc.).

In one or more implementations, as shown in FIG. 10-C, the operation o1210 can include operation o1213 for requesting information of at least in part involving overt action by the one or more electric vehicle users including requesting information of at least in part involving access to one or more scheduling programs. Origination of a physically tangible component group can be accomplished through skilled in the art design choice selection including use of one or more components and/or subsystems explicitly and/or implicitly referred to herein for at least in part implementing execution of one or more instructions of the operation o1213, for performance of the operation o1213 by an electrical circuitry arrangement as activated thereto, and/or otherwise fulfillment of the operation o1213. One or more non-transitory signal bearing physical media can bear the one or more instructions that when executed can direct performance of the operation o1213. Furthermore, requesting information of involving overt action by one or more electric vehicles users including requesting information of involving access to scheduling programs module m1213 depicted in FIG. 6-B as being included in the module m1210, when executed and/or activated, can direct performance of and/or perform the operation o1213. Illustratively, in one or more implementations, the operation o1213 can be carried out, for example, by requesting information of at least in part involving overt action by the one or more electric vehicle users (e.g., requesting information through involvement with eaves-dropping on one or more audible conversations of one or more electric vehicle users, etc.) including requesting information of at least in part involving access to one or more scheduling programs (e.g., requesting information through involvement with analyzing one or more scheduled activities containing in one or more scheduling programs associated with one or more group projects and/or personal errands of one or more electric vehicle users, etc.).

In one or more implementations, as shown in FIG. 10-C, the operation o1210 can include operation o1214 for requesting information of at least in part involving overt action by the one or more electric vehicle users including requesting information of at least in part involving monitoring one or more cell phone conversations. Origination of a physically tangible component group can be accomplished through skilled in the art design choice selection including use of one or more components and/or subsystems explicitly and/or implicitly referred to herein for at least in part implementing execution of one or more instructions of the operation o1214, for performance of the operation o1214 by an electrical circuitry arrangement as activated thereto, and/or otherwise fulfillment of the operation o1214. One or more non-transitory signal bearing physical media can bear the one or more instructions that when executed can direct performance of the operation o1214. Furthermore, requesting information of involving overt action by one or more electric vehicles users including requesting information of involving monitoring cell phone conversations module m1214 depicted in FIG. 6-B as being included in the module m1210, when executed and/or activated, can direct performance of and/or perform the operation o1214. Illustratively, in one or more implementations, the operation o1214 can be carried out, for example, by requesting information of at least in part involving overt action by the one or more electric vehicle users (e.g., requesting information through involvement with eaves-dropping on one or more audible conversations of one or more electric vehicle users, etc.) including requesting information of at least in part involving monitoring one or more cell phone conversations (e.g., requesting information through involvement with extracting relevant information of one or more cell phone calls either in real time or through accessing recorded information either of oral or textual content, etc.).

In one or more implementations, as shown in FIG. 10-C, the operation o1210 can include operation o1215 for requesting information of at least in part involving overt action by the one or more electric vehicle users including requesting information of at least in part involving one or more electronic recordings of one or more in-person conversations. Origination of a physically tangible component group can be accomplished through skilled in the art design choice selection including use of one or more components and/or subsystems explicitly and/or implicitly referred to herein for at least in part implementing execution of one or more instructions of the operation o1215, for performance of the operation o1215 by an electrical circuitry arrangement as activated thereto, and/or otherwise fulfillment of the operation o1215. One or more non-transitory signal bearing physical media can bear the one or more instructions that when executed can direct performance of the operation o1215. Furthermore, requesting information of involving overt action by one or more electric vehicles users including requesting information of involving electronic recordings of one or more in-person conversations module m1215 depicted in FIG. 6-B as being included in the module m1210, when executed and/or activated, can direct performance of and/or perform the operation o1215. Illustratively, in one or more implementations, the operation o1215 can be carried out, for example, by requesting information of at least in part involving overt action by the one or more electric vehicle users (e.g., requesting information through involvement with eaves-dropping on one or more audible conversations of one or more electric vehicle users, etc.) including requesting information of at least in part involving one or more electronic recordings of one or more in-person conversations (e.g., requesting information through involvement with mining recording of one or more oral conversations by one or more electric vehicle users regarding plans associated with use of one or more electric vehicles, etc.).

In one or more implementations, as shown in FIG. 10-C, the operation o1210 can include operation o1216 for requesting information of at least in part involving overt action by the one or more electric vehicle users including requesting information of at least in part involving data access to one or more e-mail systems. Origination of a physically tangible component group can be accomplished through skilled in the art design choice selection including use of one or more components and/or subsystems explicitly and/or implicitly referred to herein for at least in part implementing execution of one or more instructions of the operation o1216, for performance of the operation o1216 by an electrical circuitry arrangement as activated thereto, and/or otherwise fulfillment of the operation o1216. One or more non-transitory signal bearing physical media can bear the one or more instructions that when executed can direct performance of the operation o1216. Furthermore, requesting information of involving data access to e-mail systems module m1216 depicted in FIG. 6-B as being included in the module m1210, when executed and/or activated, can direct performance of and/or perform the operation o1216. Illustratively, in one or more implementations, the operation o1216 can be carried out, for example, by requesting information of at least in part involving overt action by the one or more electric vehicle users (e.g., requesting information through involvement with eaves-dropping on one or more audible conversations of one or more electric vehicle users, etc.) including requesting information of at least in part involving data access to one or more e-mail systems (e.g., requesting information through involvement with extracting relevant planning information associated with use of one or more electric vehicles by one or more users of one or more electric vehicles through textual analysis of one or more e-mails sent or received by the one or more users, etc.).

In one or more implementations, as shown in FIG. 10-C, the operation o1210 can include operation o1217 for requesting information of at least in part involving overt action by the one or more electric vehicle users including requesting information of at least in part involving electronic access to internet cloud-based collaboration systems. Origination of a physically tangible component group can be accomplished through skilled in the art design choice selection including use of one or more components and/or subsystems explicitly and/or implicitly referred to herein for at least in part implementing execution of one or more instructions of the operation o1217, for performance of the operation o1217 by an electrical circuitry arrangement as activated thereto, and/or otherwise fulfillment of the operation o1217. One or more non-transitory signal bearing physical media can bear the one or more instructions that when executed can direct performance of the operation o1217. Furthermore, requesting information of involving electronic access to internet cloud-based collaboration systems module m1217 depicted in FIG. 6-B as being included in the module m1210, when executed and/or activated, can direct performance of and/or perform the operation o1217. Illustratively, in one or more implementations, the operation o1217 can be carried out, for example, by requesting information of at least in part involving overt action by the one or more electric vehicle users (e.g., requesting information through involvement with eaves-dropping on one or more audible conversations of one or more electric vehicle users, etc.) including requesting information of at least in part involving electronic access to internet cloud-based collaboration systems (e.g., requesting information through involvement with mining data contained in scheduling, planning, conferencing, or other cloud based content, etc.).

In one or more implementations, as shown in FIG. 10-D, the operation o1210 can include operation o1218 for requesting information of at least in part involving overt action by the one or more electric vehicle users including requesting information of at least in part involving access to electronic vehicle maintenance logs. Origination of a physically tangible component group can be accomplished through skilled in the art design choice selection including use of one or more components and/or subsystems explicitly and/or implicitly referred to herein for at least in part implementing execution of one or more instructions of the operation o1218, for performance of the operation o1218 by an electrical circuitry arrangement as activated thereto, and/or otherwise fulfillment of the operation o1218. One or more non-transitory signal bearing physical media can bear the one or more instructions that when executed can direct performance of the operation o1218. Furthermore, requesting information of involving access to electronic vehicle maintenance logs module m1218 depicted in FIG. 6-B as being included in the module m1210, when executed and/or activated, can direct performance of and/or perform the operation o1218. Illustratively, in one or more implementations, the operation o1218 can be carried out, for example, by requesting information of at least in part involving overt action by the one or more electric vehicle users (e.g., requesting information through involvement with eaves-dropping on one or more audible conversations of one or more electric vehicle users, etc.) including requesting information of at least in part involving access to electronic vehicle maintenance logs (e.g., requesting information through involvement with analyzing data contained in electronic logs of one or more electric vehicles regarding trip length, velocity, acceleration, idling, and other performance profiles, etc.).

In one or more implementations, as shown in FIG. 10-D, the operation o1210 can include operation o1219 for requesting information of at least in part involving overt action by the one or more electric vehicle users including requesting information of at least in part involving one or more electronic queries of historical vehicle use records. Origination of a physically tangible component group can be accomplished through skilled in the art design choice selection including use of one or more components and/or subsystems explicitly and/or implicitly referred to herein for at least in part implementing execution of one or more instructions of the operation o1219, for performance of the operation o1219 by an electrical circuitry arrangement as activated thereto, and/or otherwise fulfillment of the operation o1219. One or more non-transitory signal bearing physical media can bear the one or more instructions that when executed can direct performance of the operation o1219. Furthermore, requesting information of involving electronic queries of historical vehicle use records module m1219 depicted in FIG. 6-B as being included in the module m1210, when executed and/or activated, can direct performance of and/or perform the operation o1219. Illustratively, in one or more implementations, the operation o1219 can be carried out, for example, by requesting information of at least in part involving overt action by the one or more electric vehicle users (e.g., requesting information through involvement with eaves-dropping on one or more audible conversations of one or more electric vehicle users, etc.) including requesting information of at least in part involving one or more electronic queries of historical vehicle use records (e.g., requesting information through involvement with determining patterns of use regarding duration, trip length, frequency of use, weekly use profiles, monthly use profiles, impact by outside events such as holidays, weekends, work schedule as contain in use logs, etc.).

In one or more implementations, as shown in FIG. 10-D, the operation o1210 can include operation o1220 for requesting information of at least in part involving overt action by the one or more electric vehicle users including requesting information of at least in part involving communication with one or more information centers of one or more dwellings. Origination of a physically tangible component group can be accomplished through skilled in the art design choice selection including use of one or more components and/or subsystems explicitly and/or implicitly referred to herein for at least in part implementing execution of one or more instructions of the operation o1220, for performance of the operation o1220 by an electrical circuitry arrangement as activated thereto, and/or otherwise fulfillment of the operation o1220. One or more non-transitory signal bearing physical media can bear the one or more instructions that when executed can direct performance of the operation o1220. Furthermore, requesting information of involving communication with information centers of dwellings module m1220 depicted in FIG. 6-B as being included in the module m1210, when executed and/or activated, can direct performance of and/or perform the operation o1220. Illustratively, in one or more implementations, the operation o1220 can be carried out, for example, by requesting information of at least in part involving overt action by the one or more electric vehicle users (e.g., requesting information through involvement with eaves-dropping on one or more audible conversations of one or more electric vehicle users, etc.) including requesting information of at least in part involving communication with one or more information centers of one or more dwellings (e.g., requesting information through involvement with data queries of one or more home databases such as located in a central planning area of the house such as the kitchen, den, or home office, as accessed through a local network to determine planned or estimated activity, etc.).

In one or more implementations, as shown in FIG. 10-D, the operation o1210 can include operation o1221 for requesting information of at least in part involving overt action by the one or more electric vehicle users including requesting information of at least in part involving one or more electric vehicle electronic sensors. Origination of a physically tangible component group can be accomplished through skilled in the art design choice selection including use of one or more components and/or subsystems explicitly and/or implicitly referred to herein for at least in part implementing execution of one or more instructions of the operation o1221, for performance of the operation o1221 by an electrical circuitry arrangement as activated thereto, and/or otherwise fulfillment of the operation o1221. One or more non-transitory signal bearing physical media can bear the one or more instructions that when executed can direct performance of the operation o1221. Furthermore, requesting information of involving electric vehicle electronic sensors module m1221 depicted in FIG. 6-B as being included in the module m1210, when executed and/or activated, can direct performance of and/or perform the operation o1221. Illustratively, in one or more implementations, the operation o1221 can be carried out, for example, by requesting information of at least in part involving overt action by the one or more electric vehicle users (e.g., requesting information through involvement with eaves-dropping on one or more audible conversations of one or more electric vehicle users, etc.) including requesting information of at least in part involving one or more electric vehicle electronic sensors (e.g., requesting information through involvement with queries submitted to one or more electric vehicle charging stations located along paths of use of one or more electric vehicles such as located at a home garage, or a parking lot of a place of employ of one or more of one or more electric vehicles users regarding frequency of use, duration of charging, amplitude or rate of charging, etc.).

In one or more implementations, as shown in FIG. 10-D, the operation o1210 can include operation o1222 for requesting information of at least in part involving overt action by the one or more electric vehicle users including requesting information of at least in part involving as provided electronically from one or more electric vehicle use logs. Origination of a physically tangible component group can be accomplished through skilled in the art design choice selection including use of one or more components and/or subsystems explicitly and/or implicitly referred to herein for at least in part implementing execution of one or more instructions of the operation o1222, for performance of the operation o1222 by an electrical circuitry arrangement as activated thereto, and/or otherwise fulfillment of the operation o1222. One or more non-transitory signal bearing physical media can bear the one or more instructions that when executed can direct performance of the operation o1222. Furthermore, requesting information of involving as provided electronically from electric vehicle use logs module m1222 depicted in FIG. 6-B as being included in the module m1210, when executed and/or activated, can direct performance of and/or perform the operation o1222. Illustratively, in one or more implementations, the operation o1222 can be carried out, for example, by requesting information of at least in part involving overt action by the one or more electric vehicle users (e.g., requesting information through involvement with eaves-dropping on one or more audible conversations of one or more electric vehicle users, etc.) including requesting information of at least in part involving as provided electronically from one or more electric vehicle use logs (e.g., requesting information through involvement with analysis of use logs contained onboard in one or more electric vehicles regarding performance metrics of one or more electric vehicles showing characteristics of use including kinematic and dynamic parameters including acceleration, deceleration, cruising, parking, waiting, idling, GPS location data and other patterns of use, etc.).

In one or more implementations, as shown in FIG. 10-E, the operation o12 can include operation o1223 for electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers including requesting information of at least in part involving one or more explicit actions by one or more planned electric vehicle users to provide such information. Origination of a physically tangible component group can be accomplished through skilled in the art design choice selection including use of one or more components and/or subsystems explicitly and/or implicitly referred to herein for at least in part implementing execution of one or more instructions of the operation o1223, for performance of the operation o1223 by an electrical circuitry arrangement as activated thereto, and/or otherwise fulfillment of the operation o1223. One or more non-transitory signal bearing physical media can bear the one or more instructions that when executed can direct performance of the operation o1223. Furthermore, requesting information of involving explicit actions by planned electric vehicle users to provide such information module m1223 depicted in FIG. 6-C as being included in the module m12, when executed and/or activated, can direct performance of and/or perform the operation o1223. Illustratively, in one or more implementations, the operation o1223 can be carried out, for example, by electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers including requesting information of at least in part involving one or more explicit actions by one or more planned electric vehicle users to provide such information (e.g., requesting information through involvement with active data entry by one or more of one or more electric vehicles users such as downloading data of a personal data assistant device of the users, or through text of voice entry directed to an interface found in the dashboard of one or more electric vehicles, etc.).

In one or more implementations, as shown in FIG. 10-E, the operation o1223 can include operation o1224 for requesting information of at least in part involving one or more explicit actions by one or more planned electric vehicle users to provide such information including requesting information of at least in part involving one or more contactless smart card systems associated with one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1224, for performance of the operation o1224 by an electrical circuitry arrangement as activated thereto, and/or otherwise fulfillment of the operation o1224. One or more non-transitory signal bearing physical media can bear the one or more instructions that when executed can direct performance of the operation o1224. Furthermore, requesting information of involving contactless smart card systems associated with electric vehicles module m1224 depicted in FIG. 6-C as being included in the module m1223, when executed and/or activated, can direct performance of and/or perform the operation o1224. Illustratively, in one or more implementations, the operation o1224 can be carried out, for example, by requesting information of at least in part involving one or more explicit actions by one or more planned electric vehicle users to provide such information (e.g., requesting information through involvement with active data entry by one or more of one or more electric vehicles users such as downloading data of a personal data assistant device of the users, or through text of voice entry directed to an interface found in the dashboard of one or more electric vehicles, etc.) including requesting information of at least in part involving one or more contactless smart card systems associated with one or more electric vehicles (e.g., requesting information through involvement with one or more electric vehicle users swiping cards, cell phones, wallets or other smart cards type devices containing information regarding either the user profile information, past or future itineraries, etc.).

In one or more implementations, as shown in FIG. 10-E, the operation o1223 can include operation o1225 for requesting information of at least in part involving one or more explicit actions by one or more planned electric vehicle users to provide such information including requesting information of at least in part involving manual entry of data through one or more keypads. Origination of a physically tangible component group can be accomplished through skilled in the art design choice selection including use of one or more components and/or subsystems explicitly and/or implicitly referred to herein for at least in part implementing execution of one or more instructions of the operation o1225, for performance of the operation o1225 by an electrical circuitry arrangement as activated thereto, and/or otherwise fulfillment of the operation o1225. One or more non-transitory signal bearing physical media can bear the one or more instructions that when executed can direct performance of the operation o1225. Furthermore, requesting information of involving manual entry of data through keypads module m1225 depicted in FIG. 6-C as being included in the module m1223, when executed and/or activated, can direct performance of and/or perform the operation o1225. Illustratively, in one or more implementations, the operation o1225 can be carried out, for example, by requesting information of at least in part involving one or more explicit actions by one or more planned electric vehicle users to provide such information (e.g., requesting information through involvement with active data entry by one or more of one or more electric vehicles users such as downloading data of a personal data assistant device of the users, or through text of voice entry directed to an interface found in the dashboard of one or more electric vehicles, etc.) including requesting information of at least in part involving manual entry of data through one or more keypads (e.g., requesting information through involvement with use of data entry on one or more keypads such as located on a console within one or more electric vehicles or sear a charging station of one or more electric vehicles, etc.).

In one or more implementations, as shown in FIG. 10-E, the operation o1223 can include operation o1226 for requesting information of at least in part involving one or more explicit actions by one or more planned electric vehicle users to provide such information including requesting information of at least in part involving direct text entry. Origination of a physically tangible component group can be accomplished through skilled in the art design choice selection including use of one or more components and/or subsystems explicitly and/or implicitly referred to herein for at least in part implementing execution of one or more instructions of the operation o1226, for performance of the operation o1226 by an electrical circuitry arrangement as activated thereto, and/or otherwise fulfillment of the operation o1226. One or more non-transitory signal bearing physical media can bear the one or more instructions that when executed can direct performance of the operation o1226. Furthermore, requesting information of involving direct text entry module m1226 depicted in FIG. 6-C as being included in the module m1223, when executed and/or activated, can direct performance of and/or perform the operation o1226. Illustratively, in one or more implementations, the operation o1226 can be carried out, for example, by requesting information of at least in part involving one or more explicit actions by one or more planned electric vehicle users to provide such information (e.g., requesting information through involvement with active data entry by one or more of one or more electric vehicles users such as downloading data of a personal data assistant device of the users, or through text of voice entry directed to an interface found in the dashboard of one or more electric vehicles, etc.) including requesting information of at least in part involving direct text entry (e.g., requesting information through involvement with intended use of one or more electric vehicles through responses typed into a text entry device such as on a smart phone or keypad or other text entry device by one or more users of one or more electric vehicles, etc.).

In one or more implementations, as shown in FIG. 10-E, the operation o1223 can include operation o1227 for requesting information of at least in part involving one or more explicit actions by one or more planned electric vehicle users to provide such information including requesting information of at least in part involving one or more humans announcing information directed in reply to one or more audio announcements. Origination of a physically tangible component group can be accomplished through skilled in the art design choice selection including use of one or more components and/or subsystems explicitly and/or implicitly referred to herein for at least in part implementing execution of one or more instructions of the operation o1227, for performance of the operation o1227 by an electrical circuitry arrangement as activated thereto, and/or otherwise fulfillment of the operation o1227. One or more non-transitory signal bearing physical media can bear the one or more instructions that when executed can direct performance of the operation o1227. Furthermore, requesting information of involving humans announcing information directed in reply to audio announcements module m1227 depicted in FIG. 6-C as being included in the module m1223, when executed and/or activated, can direct performance of and/or perform the operation o1227. Illustratively, in one or more implementations, the operation o1227 can be carried out, for example, by requesting information of at least in part involving one or more explicit actions by one or more planned electric vehicle users to provide such information (e.g., requesting information through involvement with active data entry by one or more of one or more electric vehicles users such as downloading data of a personal data assistant device of the users, or through text of voice entry directed to an interface found in the dashboard of one or more electric vehicles, etc.) including requesting information of at least in part involving one or more humans announcing information directed in reply to one or more audio announcements (e.g., requesting information through involvement with querying information from one or more users of one or more electric vehicles by the users verbally responding to audio cues announced by an audio system to the users based upon determined location of the users by the audio system, etc.).

In one or more implementations, as shown in FIG. 10-F, the operation o12 can include operation o1228 for electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers including requesting information of at least in part involving one or more electric vehicle users. Origination of a physically tangible component group can be accomplished through skilled in the art design choice selection including use of one or more components and/or subsystems explicitly and/or implicitly referred to herein for at least in part implementing execution of one or more instructions of the operation o1228, for performance of the operation o1228 by an electrical circuitry arrangement as activated thereto, and/or otherwise fulfillment of the operation o1228. One or more non-transitory signal bearing physical media can bear the one or more instructions that when executed can direct performance of the operation o1228. Furthermore, requesting information of involving electric vehicle users module m1228 depicted in FIG. 6-C as being included in the module m12, when executed and/or activated, can direct performance of and/or perform the operation o1228. Illustratively, in one or more implementations, the operation o1228 can be carried out, for example, by electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers including requesting information of at least in part involving one or more electric vehicle users (e.g., requesting information through involvement with analysis of commute information such as residence location, work location, employment scheduling, or other errand information of one or more passengers associated with one or more drivers of one or more electric vehicles, etc.).

In one or more implementations, as shown in FIG. 10-F, the operation o1228 can include operation o1229 for requesting information of at least in part involving one or more electric vehicle users including requesting information of at least in part involving one or more drivers of an electric vehicle.

Origination of a physically tangible component group can be accomplished through skilled in the art design choice selection including use of one or more components and/or subsystems explicitly and/or implicitly referred to herein for at least in part implementing execution of one or more instructions of the operation o1229, for performance of the operation o1229 by an electrical circuitry arrangement as activated thereto, and/or otherwise fulfillment of the operation o1229. One or more non-transitory signal bearing physical media can bear the one or more instructions that when executed can direct performance of the operation o1229. Furthermore, requesting information of involving drivers of an electric vehicle module m1229 depicted in FIG. 6-C as being included in the module m1228, when executed and/or activated, can direct performance of and/or perform the operation o1229. Illustratively, in one or more implementations, the operation o1229 can be carried out, for example, by requesting information of at least in part involving one or more electric vehicle users (e.g., requesting information through involvement with analysis of commute information such as residence location, work location, employment scheduling, or other errand information of one or more passengers associated with one or more drivers of one or more electric vehicles, etc.) including requesting information of at least in part involving one or more drivers of an electric vehicle (e.g., requesting information through involvement with analysis of driving habits of one or more drivers of one or more electric vehicles such as their driving styles, favorite places to drive, compliance with driving rules, etc.).

In one or more implementations, as shown in FIG. 10-F, the operation o1228 can include operation o1230 for requesting information of at least in part involving one or more electric vehicle users including requesting information of at least in part involving one or more occupants of a plurality of electric vehicles to receive electrical energy from a local electrical grid access point of one or more electrical energy generation sources. Origination of a physically tangible component group can be accomplished through skilled in the art design choice selection including use of one or more components and/or subsystems explicitly and/or implicitly referred to herein for at least in part implementing execution of one or more instructions of the operation o1230, for performance of the operation o1230 by an electrical circuitry arrangement as activated thereto, and/or otherwise fulfillment of the operation o1230. One or more non-transitory signal bearing physical media can bear the one or more instructions that when executed can direct performance of the operation o1230. Furthermore, requesting information of involving occupants of a plurality of electric vehicles to receive electrical energy from a local electrical grid access point of electrical energy generation sources module m1230 depicted in FIG. 6-C as being included in the module m1228, when executed and/or activated, can direct performance of and/or perform the operation o1230. Illustratively, in one or more implementations, the operation o1230 can be carried out, for example, by requesting information of at least in part involving one or more electric vehicle users (e.g., requesting information through involvement with analysis of commute information such as residence location, work location, employment scheduling, or other errand information of one or more passengers associated with one or more drivers of one or more electric vehicles, etc.) including requesting information of at least in part involving one or more occupants of a plurality of electric vehicles to receive electrical energy from a local electrical grid access point of one or more electrical energy generation sources (e.g., requesting information through involvement with queries regarding utility access point such as substation, local solar panels, or local wind generators, co-generation, etc. associated with load sharing activity with other electrical energy consuming devices in addition to electrical energy charging stations, etc.).

In one or more implementations, as shown in FIG. 10-F, the operation o1228 can include operation o1231 for requesting information of at least in part involving one or more electric vehicle users including requesting information of at least in part involving actual recorded electric vehicle use compared with planned electric vehicle use. Origination of a physically tangible component group can be accomplished through skilled in the art design choice selection including use of one or more components and/or subsystems explicitly and/or implicitly referred to herein for at least in part implementing execution of one or more instructions of the operation o1231, for performance of the operation o1231 by an electrical circuitry arrangement as activated thereto, and/or otherwise fulfillment of the operation o1231. One or more non-transitory signal bearing physical media can bear the one or more instructions that when executed can direct performance of the operation o1231. Furthermore, requesting information of involving actual recorded electric vehicle use compared with planned electric vehicle use module m1231 depicted in FIG. 6-C as being included in the module m1228, when executed and/or activated, can direct performance of and/or perform the operation o1231. Illustratively, in one or more implementations, the operation o1231 can be carried out, for example, by requesting information of at least in part involving one or more electric vehicle users (e.g., requesting information through involvement with analysis of commute information such as residence location, work location, employment scheduling, or other errand information of one or more passengers associated with one or more drivers of one or more electric vehicles, etc.) including requesting information of at least in part involving actual recorded electric vehicle use compared with planned electric vehicle use (e.g., requesting information through involvement with queries regarding itineraries posted prior to travel and comparing such with vehicle logs to determine discrepancies between planned activity and actual accomplished activities, etc.).

In one or more implementations, as shown in FIG. 10-F, the operation o1228 can include operation o1232 for requesting information of at least in part involving one or more electric vehicle users including requesting information of at least in part involving recorded driving patterns associated with one or more electric vehicle drivers. Origination of a physically tangible component group can be accomplished through skilled in the art design choice selection including use of one or more components and/or subsystems explicitly and/or implicitly referred to herein for at least in part implementing execution of one or more instructions of the operation o1232, for performance of the operation o1232 by an electrical circuitry arrangement as activated thereto, and/or otherwise fulfillment of the operation o1232. One or more non-transitory signal bearing physical media can bear the one or more instructions that when executed can direct performance of the operation o1232. Furthermore, requesting information of involving recorded driving patterns associated with electric vehicle drivers module m1232 depicted in FIG. 6-C as being included in the module m1228, when executed and/or activated, can direct performance of and/or perform the operation o1232. Illustratively, in one or more implementations, the operation o1232 can be carried out, for example, by requesting information of at least in part involving one or more electric vehicle users (e.g., requesting information through involvement with analysis of commute information such as residence location, work location, employment scheduling, or other errand information of one or more passengers associated with one or more drivers of one or more electric vehicles, etc.) including requesting information of at least in part involving recorded driving patterns associated with one or more electric vehicle drivers (e.g., requesting information through involvement with queries regarding detours from planned routes, departures from compliance with driving rules or regulations, statistical data regarding frequency or duration of waits or stops, historical data regarding weight of loads transported, etc.).

In one or more implementations, as shown in FIG. 10-G, the operation o1228 can include operation o1233 for requesting information of at least in part involving one or more electric vehicle users including requesting information of at least in part involving one or more non-driver occupant ride-sharing plans. Origination of a physically tangible component group can be accomplished through skilled in the art design choice selection including use of one or more components and/or subsystems explicitly and/or implicitly referred to herein for at least in part implementing execution of one or more instructions of the operation o1233, for performance of the operation o1233 by an electrical circuitry arrangement as activated thereto, and/or otherwise fulfillment of the operation o1233. One or more non-transitory signal bearing physical media can bear the one or more instructions that when executed can direct performance of the operation o1233. Furthermore, requesting information of involving non-driver occupant ride-sharing plans module m1233 depicted in FIG. 6-C as being included in the module m1228, when executed and/or activated, can direct performance of and/or perform the operation o1233. Illustratively, in one or more implementations, the operation o1233 can be carried out, for example, by requesting information of at least in part involving one or more electric vehicle users (e.g., requesting information through involvement with analysis of commute information such as residence location, work location, employment scheduling, or other errand information of one or more passengers associated with one or more drivers of one or more electric vehicles, etc.) including requesting information of at least in part involving one or more non-driver occupant ride-sharing plans (e.g., requesting information through involvement with queries regarding designated one or more car pool riders that frequent use of one or more electric vehicles along with one or more designated drivers, etc.).

In one or more implementations, as shown in FIG. 10-G, the operation o1228 can include operation o1234 for requesting information of at least in part involving one or more electric vehicle users including requesting information of at least in part involving one or more priorities distributed among one or more planned electric vehicle users for use of one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1234, for performance of the operation o1234 by an electrical circuitry arrangement as activated thereto, and/or otherwise fulfillment of the operation o1234. One or more non-transitory signal bearing physical media can bear the one or more instructions that when executed can direct performance of the operation o1234. Furthermore, requesting information of involving priorities distributed among planned electric vehicle users for use of electric vehicles module m1234 depicted in FIG. 6-D as being included in the module m1228, when executed and/or activated, can direct performance of and/or perform the operation o1234. Illustratively, in one or more implementations, the operation o1234 can be carried out, for example, by requesting information of at least in part involving one or more electric vehicle users (e.g., requesting information through involvement with analysis of commute information such as residence location, work location, employment scheduling, or other errand information of one or more passengers associated with one or more drivers of one or more electric vehicles, etc.) including requesting information of at least in part involving one or more priorities distributed among one or more planned electric vehicle users for use of one or more electric vehicles (e.g., requesting information through involvement with analysis indicating how scheduling conflicts are generally resolved through use of one or more electric vehicles by a plurality of users such that one or more rules of priority are generated for use in predicting future use of one or more electric vehicles, etc.).

In one or more implementations, as shown in FIG. 10-G, the operation o1228 can include operation o1235 for requesting information of at least in part involving one or more electric vehicle users including requesting information of at least in part involving use of one or more electric vehicles by one or more drivers before electrical energy transfer to one or more electric vehicles occurs after one or more electric vehicles are driven by one or more other drivers. Origination of a physically tangible component group can be accomplished through skilled in the art design choice selection including use of one or more components and/or subsystems explicitly and/or implicitly referred to herein for at least in part implementing execution of one or more instructions of the operation o1235, for performance of the operation o1235 by an electrical circuitry arrangement as activated thereto, and/or otherwise fulfillment of the operation o1235. One or more non-transitory signal bearing physical media can bear the one or more instructions that when executed can direct performance of the operation o1235. Furthermore, requesting information of involving use of electric vehicles by drivers before electrical energy transfer to electric vehicles occurs after electric vehicles are driven by other drivers module m1235 depicted in FIG. 6-D as being included in the module m1228, when executed and/or activated, can direct performance of and/or perform the operation o1235. Illustratively, in one or more implementations, the operation o1235 can be carried out, for example, by requesting information of at least in part involving one or more electric vehicle users (e.g., requesting information through involvement with analysis of commute information such as residence location, work location, employment scheduling, or other errand information of one or more passengers associated with one or more drivers of one or more electric vehicles, etc.) including requesting information of at least in part involving use of one or more electric vehicles by one or more drivers before electrical energy transfer to one or more electric vehicles occurs after one or more electric vehicles are driven by one or more other drivers (e.g., requesting information through involvement with analysis regarding a first sets of uses to determine how one or more electric vehicles may be used for a second set of uses before one or more electric vehicles is charged for the second set of uses, etc.).

In one or more implementations, as shown in FIG. 10-G, the operation o1228 can include operation o1236 for requesting information of at least in part involving one or more electric vehicle users including requesting information of at least in part involving merged plans of multiple planned drivers of one or more electric vehicles for consecutive periods of use planned to occur before one or more electric vehicles are returned to receive electrical energy transfer. Origination of a physically tangible component group can be accomplished through skilled in the art design choice selection including use of one or more components and/or subsystems explicitly and/or implicitly referred to herein for at least in part implementing execution of one or more instructions of the operation o1236, for performance of the operation o1236 by an electrical circuitry arrangement as activated thereto, and/or otherwise fulfillment of the operation o1236. One or more non-transitory signal bearing physical media can bear the one or more instructions that when executed can direct performance of the operation o1236. Furthermore, requesting information of involving merged plans of multiple planned drivers of electric vehicles for consecutive periods of use planned to occur before electric vehicles are returned to receive electrical energy transfer module m1236 depicted in FIG. 6-D as being included in the module m1228, when executed and/or activated, can direct performance of and/or perform the operation o1236. Illustratively, in one or more implementations, the operation o1236 can be carried out, for example, by requesting information of at least in part involving one or more electric vehicle users (e.g., requesting information through involvement with analysis of commute information such as residence location, work location, employment scheduling, or other errand information of one or more passengers associated with one or more drivers of one or more electric vehicles, etc.) including requesting information of at least in part involving merged plans of multiple planned drivers of one or more electric vehicles for consecutive periods of use planned to occur before one or more electric vehicles are returned to receive electrical energy transfer (e.g., requesting information through involvement with extracting data from multiple calendars to generate a composite calendar for use in forecasting use of one or more electric vehicles, etc.).

In one or more implementations, as shown in FIG. 10-G, the operation o1228 can include operation o1237 for requesting information of at least in part involving one or more electric vehicle users including requesting information of at least in part involving individual employee incentive programs. Origination of a physically tangible component group can be accomplished through skilled in the art design choice selection including use of one or more components and/or subsystems explicitly and/or implicitly referred to herein for at least in part implementing execution of one or more instructions of the operation o1237, for performance of the operation o1237 by an electrical circuitry arrangement as activated thereto, and/or otherwise fulfillment of the operation o1237. One or more non-transitory signal bearing physical media can bear the one or more instructions that when executed can direct performance of the operation o1237. Furthermore, requesting information of involving individual employee incentive programs module m1237 depicted in FIG. 6-D as being included in the module m1228, when executed and/or activated, can direct performance of and/or perform the operation o1237. Illustratively, in one or more implementations, the operation o1237 can be carried out, for example, by requesting information of at least in part involving one or more electric vehicle users (e.g., requesting information through involvement with analysis of commute information such as residence location, work location, employment scheduling, or other errand information of one or more passengers associated with one or more drivers of one or more electric vehicles, etc.) including requesting information of at least in part involving individual employee incentive programs (e.g., requesting information through involvement with analysis of one or more human relations database implemented incentive programs for employees to avail themselves of charging stations located in one or more parking garages on the vicinity of an employer of one or more users of one or more electric vehicles, etc.).

In one or more implementations, as shown in FIG. 10-H, the operation o1228 can include operation o1238 for requesting information of at least in part involving one or more electric vehicle users including requesting information of at least in part involving one or more employee group benefit programs. Origination of a physically tangible component group can be accomplished through skilled in the art design choice selection including use of one or more components and/or subsystems explicitly and/or implicitly referred to herein for at least in part implementing execution of one or more instructions of the operation o1238, for performance of the operation o1238 by an electrical circuitry arrangement as activated thereto, and/or otherwise fulfillment of the operation o1238. One or more non-transitory signal bearing physical media can bear the one or more instructions that when executed can direct performance of the operation o1238. Furthermore, requesting information of involving employee group benefit programs module m1238 depicted in FIG. 6-D as being included in the module m1228, when executed and/or activated, can direct performance of and/or perform the operation o1238. Illustratively, in one or more implementations, the operation o1238 can be carried out, for example, by requesting information of at least in part involving one or more electric vehicle users (e.g., requesting information through involvement with analysis of commute information such as residence location, work location, employment scheduling, or other errand information of one or more passengers associated with one or more drivers of one or more electric vehicles, etc.) including requesting information of at least in part involving one or more employee group benefit programs (e.g., requesting information through involvement with queries regarding terms and conditions of contractually obligated benefits to be distributed to one or more employees concerning use of charging stations provided by their employer for charging of one or more electric vehicles as used by the employee, the terms and conditions such as including total energy obtained for a designated period of time, frequency and amount of use of the one or more charging stations located at the employer, etc.).

In one or more implementations, as shown in FIG. 10-H, the operation o1228 can include operation o1239 for requesting information of at least in part involving one or more electric vehicle users including requesting information of at least in part involving one or more prioritized tasks of one or more work schedules. Origination of a physically tangible component group can be accomplished through skilled in the art design choice selection including use of one or more components and/or subsystems explicitly and/or implicitly referred to herein for at least in part implementing execution of one or more instructions of the operation o1239, for performance of the operation o1239 by an electrical circuitry arrangement as activated thereto, and/or otherwise fulfillment of the operation o1239. One or more non-transitory signal bearing physical media can bear the one or more instructions that when executed can direct performance of the operation o1239. Furthermore, requesting information of involving prioritized tasks of work schedules module m1239 depicted in FIG. 6-D as being included in the module m1228, when executed and/or activated, can direct performance of and/or perform the operation o1239. Illustratively, in one or more implementations, the operation o1239 can be carried out, for example, by requesting information of at least in part involving one or more electric vehicle users (e.g., requesting information through involvement with analysis of commute information such as residence location, work location, employment scheduling, or other errand information of one or more passengers associated with one or more drivers of one or more electric vehicles, etc.) including requesting information of at least in part involving one or more prioritized tasks of one or more work schedules (e.g., requesting information through involvement with analysis regarding tasks associated through scheduling documents such as pert, gannt, or other similar planning documents, etc.).

In one or more implementations, as shown in FIG. 10-H, the operation o1228 can include operation o1240 for requesting information of at least in part involving one or more electric vehicle users including requesting information of at least in part involving planned number of occupants to use one or more electric vehicles before one or more electric vehicles receives electrical energy transfer. Origination of a physically tangible component group can be accomplished through skilled in the art design choice selection including use of one or more components and/or subsystems explicitly and/or implicitly referred to herein for at least in part implementing execution of one or more instructions of the operation o1240, for performance of the operation o1240 by an electrical circuitry arrangement as activated thereto, and/or otherwise fulfillment of the operation o1240. One or more non-transitory signal bearing physical media can bear the one or more instructions that when executed can direct performance of the operation o1240. Furthermore, requesting information of involving planned number of occupants to use electric vehicles before electric vehicles receives electrical energy transfer module m1240 depicted in FIG. 6-D as being included in the module m1228, when executed and/or activated, can direct performance of and/or perform the operation o1240. Illustratively, in one or more implementations, the operation o1240 can be carried out, for example, by requesting information of at least in part involving one or more electric vehicle users (e.g., requesting information through involvement with analysis of commute information such as residence location, work location, employment scheduling, or other errand information of one or more passengers associated with one or more drivers of one or more electric vehicles, etc.) including requesting information of at least in part involving planned number of occupants to use one or more electric vehicles before one or more electric vehicles receives electrical energy transfer (e.g., requesting information through involvement with analysis regarding a number of electric vehicle users per day that will be using a commonly shared electric vehicle over a course of one or more days based on reservation scheduling of the number of electric vehicle users, etc.).

In one or more implementations, as shown in FIG. 10-H, the operation o12 can include operation o1241 for electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers including requesting information of at least in part involving one or more electric vehicle features. Origination of a physically tangible component group can be accomplished through skilled in the art design choice selection including use of one or more components and/or subsystems explicitly and/or implicitly referred to herein for at least in part implementing execution of one or more instructions of the operation o1241, for performance of the operation o1241 by an electrical circuitry arrangement as activated thereto, and/or otherwise fulfillment of the operation o1241. One or more non-transitory signal bearing physical media can bear the one or more instructions that when executed can direct performance of the operation o1241. Furthermore, requesting information of involving electric vehicle features module m1241 depicted in FIG. 6-D as being included in the module m12, when executed and/or activated, can direct performance of and/or perform the operation o1241. Illustratively, in one or more implementations, the operation o1241 can be carried out, for example, by electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers including requesting information of at least in part involving one or more electric vehicle features (e.g., requesting information through involvement with queries regarding performance characteristics of one or more electric vehicles including electrical energy storage capacity, electrical energy demand for representative driving cycles, electrical energy charging throughput rate, etc.).

In one or more implementations, as shown in FIG. 10-H, the operation o1241 can include operation o1242 for requesting information of at least in part involving one or more electric vehicle features including requesting information of at least in part involving range of one or more electric vehicles in an all-electric mode. Origination of a physically tangible component group can be accomplished through skilled in the art design choice selection including use of one or more components and/or subsystems explicitly and/or implicitly referred to herein for at least in part implementing execution of one or more instructions of the operation o1242, for performance of the operation o1242 by an electrical circuitry arrangement as activated thereto, and/or otherwise fulfillment of the operation o1242. One or more non-transitory signal bearing physical media can bear the one or more instructions that when executed can direct performance of the operation o1242. Furthermore, requesting information of involving range of electric vehicles in an all-electric mode module m1242 depicted in FIG. 6-D as being included in the module m1241, when executed and/or activated, can direct performance of and/or perform the operation o1242. Illustratively, in one or more implementations, the operation o1242 can be carried out, for example, by requesting information of at least in part involving one or more electric vehicle features (e.g., requesting information through involvement with queries regarding performance characteristics of one or more electric vehicles including electrical energy storage capacity, electrical energy demand for representative driving cycles, electrical energy charging throughput rate, etc.) including requesting information of at least in part involving range of one or more electric vehicles in an all-electric mode (e.g., requesting information through involvement with analysis regarding historical use records indicating actual range of one or more electric vehicles for particular charge levels and routes of travel having various sets of conditions, etc.).

In one or more implementations, as shown in FIG. 10-I, the operation o1241 can include operation o1243 for requesting information of at least in part involving one or more electric vehicle features including requesting information of at least in part involving range of one or more electric vehicles in a hybrid electric-fuel mode. Origination of a physically tangible component group can be accomplished through skilled in the art design choice selection including use of one or more components and/or subsystems explicitly and/or implicitly referred to herein for at least in part implementing execution of one or more instructions of the operation o1243, for performance of the operation o1243 by an electrical circuitry arrangement as activated thereto, and/or otherwise fulfillment of the operation o1243. One or more non-transitory signal bearing physical media can bear the one or more instructions that when executed can direct performance of the operation o1243. Furthermore, requesting information of involving range of electric vehicles in a hybrid electric-fuel mode module m1243 depicted in FIG. 6-D as being included in the module m1241, when executed and/or activated, can direct performance of and/or perform the operation o1243. Illustratively, in one or more implementations, the operation o1243 can be carried out, for example, by requesting information of at least in part involving one or more electric vehicle features (e.g., requesting information through involvement with queries regarding performance characteristics of one or more electric vehicles including electrical energy storage capacity, electrical energy demand for representative driving cycles, electrical energy charging throughput rate, etc.) including requesting information of at least in part involving range of one or more electric vehicles in a hybrid electric-fuel mode (e.g., requesting information through involvement with queries regarding distance range capacity for liquid fuel such as gasoline, diesel, other hydrocarbon or hydrogen fuel and distance range capacity for electric mode for a number of varying ratios of fueled versus electric use, etc.).

In one or more implementations, as shown in FIG. 10-I, the operation o1241 can include operation o1244 for requesting information of at least in part involving one or more electric vehicle features including requesting information of at least in part involving one or more maintenance schedules for one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1244, for performance of the operation o1244 by an electrical circuitry arrangement as activated thereto, and/or otherwise fulfillment of the operation o1244. One or more non-transitory signal bearing physical media can bear the one or more instructions that when executed can direct performance of the operation o1244. Furthermore, requesting information of involving maintenance schedules for electric vehicles module m1244 depicted in FIG. 6-E as being included in the module m1241, when executed and/or activated, can direct performance of and/or perform the operation o1244. Illustratively, in one or more implementations, the operation o1244 can be carried out, for example, by requesting information of at least in part involving one or more electric vehicle features (e.g., requesting information through involvement with queries regarding performance characteristics of one or more electric vehicles including electrical energy storage capacity, electrical energy demand for representative driving cycles, electrical energy charging throughput rate, etc.) including requesting information of at least in part involving one or more maintenance schedules for one or more electric vehicles (e.g., requesting information through involvement with queries regarding quality of maintenance performed to determine possible future unavailability or other performance issues regarding one or more electric vehicles including those that may affect reliability of charging one or more electric vehicles, etc.).

In one or more implementations, as shown in FIG. 10-I, the operation o1241 can include operation o1245 for requesting information of at least in part involving one or more electric vehicle features including requesting information of at least in part involving fueling capacity of one or more electric vehicles as one or more hybrid electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1245, for performance of the operation o1245 by an electrical circuitry arrangement as activated thereto, and/or otherwise fulfillment of the operation o1245. One or more non-transitory signal bearing physical media can bear the one or more instructions that when executed can direct performance of the operation o1245. Furthermore, requesting information of involving fueling capacity of electric vehicles as hybrid electric vehicles module m1245 depicted in FIG. 6-E as being included in the module m1241, when executed and/or activated, can direct performance of and/or perform the operation o1245. Illustratively, in one or more implementations, the operation o1245 can be carried out, for example, by requesting information of at least in part involving one or more electric vehicle features (e.g., requesting information through involvement with queries regarding performance characteristics of one or more electric vehicles including electrical energy storage capacity, electrical energy demand for representative driving cycles, electrical energy charging throughput rate, etc.) including requesting information of at least in part involving fueling capacity of one or more electric vehicles as one or more hybrid electric vehicles (e.g., requesting information through involvement with queries regarding range of one or more electric vehicles in a non-electric mode in relation to location of electric charging stations found along a desired route for one or more electric vehicles, etc.).

In one or more implementations, as shown in FIG. 10-I, the operation o1241 can include operation o1246 for requesting information of at least in part involving one or more electric vehicle features including requesting information of at least in part involving specifications of one or more second electric vehicles other than one or more first electric vehicles, the one or more second electric vehicles involved with plans to receive electric energy transfer from electrical equipment shared with the one or more first electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1246, for performance of the operation o1246 by an electrical circuitry arrangement as activated thereto, and/or otherwise fulfillment of the operation o1246. One or more non-transitory signal bearing physical media can bear the one or more instructions that when executed can direct performance of the operation o1246. Furthermore, requesting information of involving specifications of second electric vehicles other than first electric vehicles, the second electric vehicles involved with plans to receive electric energy transfer from electrical equipment shared with the first electric vehicles module m1246 depicted in FIG. 6-E as being included in the module m1241, when executed and/or activated, can direct performance of and/or perform the operation o1246. Illustratively, in one or more implementations, the operation o1246 can be carried out, for example, by requesting information of at least in part involving one or more electric vehicle features (e.g., requesting information through involvement with queries regarding performance characteristics of one or more electric vehicles including electrical energy storage capacity, electrical energy demand for representative driving cycles, electrical energy charging throughput rate, etc.) including requesting information of at least in part involving specifications of one or more second electric vehicles other than one or more first electric vehicles, the one or more second electric vehicles involved with plans to receive electric energy transfer from electrical equipment shared with the one or more first electric vehicles (e.g., requesting information through involvement with queries regarding another electric vehicle such as length of time to charge the other electric vehicle to a certain capacity to determine availability of charging equipment for one or more electric vehicles, etc.).

In one or more implementations, as shown in FIG. 10-I, the operation o1241 can include operation o1247 for requesting information of at least in part involving one or more electric vehicle features including requesting information of at least in part involving one or more electric vehicles as all-electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1247, for performance of the operation o1247 by an electrical circuitry arrangement as activated thereto, and/or otherwise fulfillment of the operation o1247. One or more non-transitory signal bearing physical media can bear the one or more instructions that when executed can direct performance of the operation o1247. Furthermore, requesting information of involving electric vehicles as all-electric vehicles module m1247 depicted in FIG. 6-E as being included in the module m1241, when executed and/or activated, can direct performance of and/or perform the operation o1247. Illustratively, in one or more implementations, the operation o1247 can be carried out, for example, by requesting information of at least in part involving one or more electric vehicle features (e.g., requesting information through involvement with queries regarding performance characteristics of one or more electric vehicles including electrical energy storage capacity, electrical energy demand for representative driving cycles, electrical energy charging throughput rate, etc.) including requesting information of at least in part involving one or more electric vehicles as all-electric vehicles (e.g., requesting information through involvement with queries regarding charging capacity, length of time to charge, maximum distance available for a particular charge level and driving condition, etc.).

In one or more implementations, as shown in FIG. 10-J, the operation o1241 can include operation o1248 for requesting information of at least in part involving one or more electric vehicle features including requesting information of at least in part involving one or more electric vehicles as one or more hybrid-electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1248, for performance of the operation o1248 by an electrical circuitry arrangement as activated thereto, and/or otherwise fulfillment of the operation o1248. One or more non-transitory signal bearing physical media can bear the one or more instructions that when executed can direct performance of the operation o1248. Furthermore, requesting information of involving electric vehicles as hybrid-electric vehicles module m1248 depicted in FIG. 6-E as being included in the module m1241, when executed and/or activated, can direct performance of and/or perform the operation o1248. Illustratively, in one or more implementations, the operation o1248 can be carried out, for example, by requesting information of at least in part involving one or more electric vehicle features (e.g., requesting information through involvement with queries regarding performance characteristics of one or more electric vehicles including electrical energy storage capacity, electrical energy demand for representative driving cycles, electrical energy charging throughput rate, etc.) including requesting information of at least in part involving one or more electric vehicles as one or more hybrid-electric vehicles (e.g., requesting information through involvement with queries regarding maximum distance available for an amount of fuel available for the vehicle given particular driving characteristics, etc.).

In one or more implementations, as shown in FIG. 10-J, the operation o1241 can include operation o1249 for requesting information of at least in part involving one or more electric vehicle features including requesting information of at least in part involving one or more electric vehicles including to receive electrical energy transfer through field magnetic resonance induction. Origination of a physically tangible component group can be accomplished through skilled in the art design choice selection including use of one or more components and/or subsystems explicitly and/or implicitly referred to herein for at least in part implementing execution of one or more instructions of the operation o1249, for performance of the operation o1249 by an electrical circuitry arrangement as activated thereto, and/or otherwise fulfillment of the operation o1249. One or more non-transitory signal bearing physical media can bear the one or more instructions that when executed can direct performance of the operation o1249. Furthermore, requesting information of involving electric vehicles including to receive electrical energy transfer through field magnetic resonance induction module m1249 depicted in FIG. 6-E as being included in the module m1241, when executed and/or activated, can direct performance of and/or perform the operation o1249. Illustratively, in one or more implementations, the operation o1249 can be carried out, for example, by requesting information of at least in part involving one or more electric vehicle features (e.g., requesting information through involvement with queries regarding performance characteristics of one or more electric vehicles including electrical energy storage capacity, electrical energy demand for representative driving cycles, electrical energy charging throughput rate, etc.) including requesting information of at least in part involving one or more electric vehicles including to receive electrical energy transfer through field magnetic resonance induction (e.g., requesting information through involvement with queries regarding planned electromagnetic frequency profiles to be used for wireless electrical energy transfer, etc.).

In one or more implementations, as shown in FIG. 10-J, the operation o1241 can include operation o1250 for requesting information of at least in part involving one or more electric vehicle features including requesting information of at least in part involving one or more electric vehicles including to receive electrical energy transfer through highly resonant inductive wireless power transfer. Origination of a physically tangible component group can be accomplished through skilled in the art design choice selection including use of one or more components and/or subsystems explicitly and/or implicitly referred to herein for at least in part implementing execution of one or more instructions of the operation o1250, for performance of the operation o1250 by an electrical circuitry arrangement as activated thereto, and/or otherwise fulfillment of the operation o1250. One or more non-transitory signal bearing physical media can bear the one or more instructions that when executed can direct performance of the operation o1250. Furthermore, requesting information of involving electric vehicles including to receive electrical energy transfer through highly resonant inductive wireless power transfer module m1250 depicted in FIG. 6-E as being included in the module m1241, when executed and/or activated, can direct performance of and/or perform the operation o1250. Illustratively, in one or more implementations, the operation o1250 can be carried out, for example, by requesting information of at least in part involving one or more electric vehicle features (e.g., requesting information through involvement with queries regarding performance characteristics of one or more electric vehicles including electrical energy storage capacity, electrical energy demand for representative driving cycles, electrical energy charging throughput rate, etc.) including requesting information of at least in part involving one or more electric vehicles including to receive electrical energy transfer through highly resonant inductive wireless power transfer (e.g., requesting information through involvement with queries regarding electrical energy transfer rate and transfer scheduling for a planned wireless electrical energy transfer to one or more electric vehicles, etc.).

In one or more implementations, as shown in FIG. 10-J, the operation o1241 can include operation o1251 for requesting information of at least in part involving one or more electric vehicle features including requesting information of at least in part involving one or more electric vehicles including to receive electrical energy transfer through wireless capacitive charging. Origination of a physically tangible component group can be accomplished through skilled in the art design choice selection including use of one or more components and/or subsystems explicitly and/or implicitly referred to herein for at least in part implementing execution of one or more instructions of the operation o1251, for performance of the operation o1251 by an electrical circuitry arrangement as activated thereto, and/or otherwise fulfillment of the operation o1251. One or more non-transitory signal bearing physical media can bear the one or more instructions that when executed can direct performance of the operation o1251. Furthermore, requesting information of involving electric vehicles including to receive electrical energy transfer through wireless capacitive charging module m1251 depicted in FIG. 6-E as being included in the module m1241, when executed and/or activated, can direct performance of and/or perform the operation o1251. Illustratively, in one or more implementations, the operation o1251 can be carried out, for example, by requesting information of at least in part involving one or more electric vehicle features (e.g., requesting information through involvement with queries regarding performance characteristics of one or more electric vehicles including electrical energy storage capacity, electrical energy demand for representative driving cycles, electrical energy charging throughput rate, etc.) including requesting information of at least in part involving one or more electric vehicles including to receive electrical energy transfer through wireless capacitive charging (e.g., requesting information through involvement with queries regarding electrical energy transfer rate and capacity of charging over a planned charging duration for wireless electrical energy transfer to one or more electric vehicles, etc.).

In one or more implementations, as shown in FIG. 10-K, the operation o1241 can include operation o1252 for requesting information of at least in part involving one or more electric vehicle features including requesting information of at least in part involving one or more electric vehicles including one or more electrical energy storage devices. Origination of a physically tangible component group can be accomplished through skilled in the art design choice selection including use of one or more components and/or subsystems explicitly and/or implicitly referred to herein for at least in part implementing execution of one or more instructions of the operation o1252, for performance of the operation o1252 by an electrical circuitry arrangement as activated thereto, and/or otherwise fulfillment of the operation o1252. One or more non-transitory signal bearing physical media can bear the one or more instructions that when executed can direct performance of the operation o1252. Furthermore, requesting information of involving electric vehicles including electrical energy storage devices module m1252 depicted in FIG. 6-F as being included in the module m1241, when executed and/or activated, can direct performance of and/or perform the operation o1252. Illustratively, in one or more implementations, the operation o1252 can be carried out, for example, by requesting information of at least in part involving one or more electric vehicle features (e.g., requesting information through involvement with queries regarding performance characteristics of one or more electric vehicles including electrical energy storage capacity, electrical energy demand for representative driving cycles, electrical energy charging throughput rate, etc.) including requesting information of at least in part involving one or more electric vehicles including one or more electrical energy storage devices (e.g., requesting information through involvement with queries regarding current total electrical energy capacity of electrical batteries onboard one or more electric vehicles currently capable of receiving wireless electrical energy, etc.).

In one or more implementations, as shown in FIG. 10-K, the operation o1252 can include operation o1253 for requesting information of at least in part involving one or more electric vehicles including one or more electrical energy storage devices including requesting information of at least in part involving one or more electric vehicles including electrical energy storage devices as capacitive electrical energy storage devices. Origination of a physically tangible component group can be accomplished through skilled in the art design choice selection including use of one or more components and/or subsystems explicitly and/or implicitly referred to herein for at least in part implementing execution of one or more instructions of the operation o1253, for performance of the operation o1253 by an electrical circuitry arrangement as activated thereto, and/or otherwise fulfillment of the operation o1253. One or more non-transitory signal bearing physical media can bear the one or more instructions that when executed can direct performance of the operation o1253. Furthermore, requesting information of involving electric vehicles including electrical energy storage devices as capacitive electrical energy storage devices module m1253 depicted in FIG. 6-F as being included in the module m1252, when executed and/or activated, can direct performance of and/or perform the operation o1253. Illustratively, in one or more implementations, the operation o1253 can be carried out, for example, by requesting information of at least in part involving one or more electric vehicles including one or more electrical energy storage devices (e.g., requesting information through involvement with queries regarding current total electrical energy capacity of electrical batteries onboard one or more electric vehicles currently capable of receiving wireless electrical energy, etc.) including requesting information of at least in part involving one or more electric vehicles including electrical energy storage devices as capacitive electrical energy storage devices (e.g., requesting information through involvement with queries regarding charging rate for the capacitive electrical energy storage devices at their current level of electrical charge, etc.).

In one or more implementations, as shown in FIG. 10-K, the operation o1252 can include operation o1254 for requesting information of at least in part involving one or more electric vehicles including one or more electrical energy storage devices including requesting information of at least in part involving one or more electric vehicles including one or more electrical energy storage devices as lithium ion, lead acid, or nickel cadmium electrical energy storage devices. Origination of a physically tangible component group can be accomplished through skilled in the art design choice selection including use of one or more components and/or subsystems explicitly and/or implicitly referred to herein for at least in part implementing execution of one or more instructions of the operation o1254, for performance of the operation o1254 by an electrical circuitry arrangement as activated thereto, and/or otherwise fulfillment of the operation o1254. One or more non-transitory signal bearing physical media can bear the one or more instructions that when executed can direct performance of the operation o1254. Furthermore, requesting information of involving electric vehicles including electrical energy storage devices as lithium ion, lead acid, or nickel cadmium electrical energy storage devices module m1254 depicted in FIG. 6-F as being included in the module m1252, when executed and/or activated, can direct performance of and/or perform the operation o1254. Illustratively, in one or more implementations, the operation o1254 can be carried out, for example, by requesting information of at least in part involving one or more electric vehicles including one or more electrical energy storage devices (e.g., requesting information through involvement with queries regarding current total electrical energy capacity of electrical batteries onboard one or more electric vehicles currently capable of receiving wireless electrical energy, etc.) including requesting information of at least in part involving one or more electric vehicles including one or more electrical energy storage devices as lithium ion, lead acid, or nickel cadmium electrical energy storage devices (e.g., requesting information through involvement with queries regarding age of storage devices, replacement plans for the storage devices including expiration dates, recall notices, upgrade plans, etc.).

In one or more implementations, as shown in FIG. 10-K, the operation o1252 can include operation o1255 for requesting information of at least in part involving one or more electric vehicles including one or more electrical energy storage devices including requesting information of at least in part involving one or more electric vehicles including storage life aspects of the electrical energy storage devices. Origination of a physically tangible component group can be accomplished through skilled in the art design choice selection including use of one or more components and/or subsystems explicitly and/or implicitly referred to herein for at least in part implementing execution of one or more instructions of the operation o1255, for performance of the operation o1255 by an electrical circuitry arrangement as activated thereto, and/or otherwise fulfillment of the operation o1255. One or more non-transitory signal bearing physical media can bear the one or more instructions that when executed can direct performance of the operation o1255. Furthermore, requesting information of involving electric vehicles including storage life aspects of the electrical energy storage devices module m1255 depicted in FIG. 6-F as being included in the module m1252, when executed and/or activated, can direct performance of and/or perform the operation o1255. Illustratively, in one or more implementations, the operation o1255 can be carried out, for example, by requesting information of at least in part involving one or more electric vehicles including one or more electrical energy storage devices (e.g., requesting information through involvement with queries regarding current total electrical energy capacity of electrical batteries onboard one or more electric vehicles currently capable of receiving wireless electrical energy, etc.) including requesting information of at least in part involving one or more electric vehicles including storage life aspects of the electrical energy storage devices (e.g., requesting information through involvement with queries regarding historical data for charging of the batteries onboard one or more electric vehicles to determine reliability and actual present energy capacity of the batteries, etc.).

In one or more implementations, as shown in FIG. 10-L, the operation o12 can include operation o1256 for electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers including requesting information of at least in part involving one or more user preferences of location for energy transfer to one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1256, for performance of the operation o1256 by an electrical circuitry arrangement as activated thereto, and/or otherwise fulfillment of the operation o1256. One or more non-transitory signal bearing physical media can bear the one or more instructions that when executed can direct performance of the operation o1256. Furthermore, requesting information of involving user preferences of location for energy transfer to electric vehicles module m1256 depicted in FIG. 6-F as being included in the module m12, when executed and/or activated, can direct performance of and/or perform the operation o1256. Illustratively, in one or more implementations, the operation o1256 can be carried out, for example, by electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers including requesting information of at least in part involving one or more user preferences of location for energy transfer to one or more electric vehicles (e.g., requesting information through involvement with queries regarding one or more locations that the one or more users historically charge one or more electric vehicles as to frequency of use of each location and any patterns of use for the one or more chargers at the locations, etc.).

In one or more implementations, as shown in FIG. 10-L, the operation o1256 can include operation o1257 for requesting information of at least in part involving one or more user preferences of location for energy transfer to one or more electric vehicles including requesting information of at least in part involving one or more user preferences of location other than one or more home locations of one or more planned occupants of one or more electric vehicles for electrical energy transfer to one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1257, for performance of the operation o1257 by an electrical circuitry arrangement as activated thereto, and/or otherwise fulfillment of the operation o1257. One or more non-transitory signal bearing physical media can bear the one or more instructions that when executed can direct performance of the operation o1257. Furthermore, requesting information of involving user preferences of location other than home locations of planned occupants of electric vehicles for electrical energy transfer to electric vehicles module m1257 depicted in FIG. 6-F as being included in the module m1256, when executed and/or activated, can direct performance of and/or perform the operation o1257. Illustratively, in one or more implementations, the operation o1257 can be carried out, for example, by requesting information of at least in part involving one or more user preferences of location for energy transfer to one or more electric vehicles (e.g., requesting information through involvement with queries regarding one or more locations that the one or more users historically charge one or more electric vehicles as to frequency of use of each location and any patterns of use for the one or more chargers at the locations, etc.) including requesting information of at least in part involving one or more user preferences of location other than one or more home locations of one or more planned occupants of one or more electric vehicles for electrical energy transfer to one or more electric vehicles (e.g., requesting information through involvement with queries regarding prioritized location information for charging one or more electric vehicles by the one or more users as associated with planned future use of one or more electric vehicles, etc.).

In one or more implementations, as shown in FIG. 10-L, the operation o1256 can include operation o1258 for requesting information of at least in part involving one or more user preferences of location for energy transfer to one or more electric vehicles including requesting information of at least in part involving one or more user preferences of location for electrical energy transfer to one or more electric vehicles at one or more locations of vocational employ of one or more planned occupants of one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1258, for performance of the operation o1258 by an electrical circuitry arrangement as activated thereto, and/or otherwise fulfillment of the operation o1258. One or more non-transitory signal bearing physical media can bear the one or more instructions that when executed can direct performance of the operation o1258. Furthermore, requesting information of involving user preferences of location for electrical energy transfer to electric vehicles at locations of vocational employ of planned occupants of electric vehicles module m1258 depicted in FIG. 6-F as being included in the module m1256, when executed and/or activated, can direct performance of and/or perform the operation o1258. Illustratively, in one or more implementations, the operation o1258 can be carried out, for example, by requesting information of at least in part involving one or more user preferences of location for energy transfer to one or more electric vehicles (e.g., requesting information through involvement with queries regarding one or more locations that the one or more users historically charge one or more electric vehicles as to frequency of use of each location and any patterns of use for the one or more chargers at the locations, etc.) including requesting information of at least in part involving one or more user preferences of location for electrical energy transfer to one or more electric vehicles at one or more locations of vocational employ of one or more planned occupants of one or more electric vehicles (e.g., requesting information through involvement with queries regarding employment locations for charging of one or more electric vehicles such as degree of availability of charging stations, quality of equipment, capacity of equipment, any payment or reimbursement issues with particular charging locations associated with place of employ, etc.).

In one or more implementations, as shown in FIG. 10-L, the operation o1256 can include operation o1259 for requesting information of at least in part involving one or more user preferences of location for energy transfer to one or more electric vehicles including requesting information of at least in part involving one or more user preferences of location for electrical energy transfer to one or more electric vehicles at one or more locations on one or more planned routes of travel of one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1259, for performance of the operation o1259 by an electrical circuitry arrangement as activated thereto, and/or otherwise fulfillment of the operation o1259. One or more non-transitory signal bearing physical media can bear the one or more instructions that when executed can direct performance of the operation o1259. Furthermore, requesting information of involving user preferences of location for electrical energy transfer to electric vehicles at locations on planned routes of travel of electric vehicles module m1259 depicted in FIG. 6-F as being included in the module m1256, when executed and/or activated, can direct performance of and/or perform the operation o1259. Illustratively, in one or more implementations, the operation o1259 can be carried out, for example, by requesting information of at least in part involving one or more user preferences of location for energy transfer to one or more electric vehicles (e.g., requesting information through involvement with queries regarding one or more locations that the one or more users historically charge one or more electric vehicles as to frequency of use of each location and any patterns of use for the one or more chargers at the locations, etc.) including requesting information of at least in part involving one or more user preferences of location for electrical energy transfer to one or more electric vehicles at one or more locations on one or more planned routes of travel of one or more electric vehicles (e.g., requesting information through involvement with queries regarding charging stations for one or more electric vehicles in terms of integration of particular charging stations with itinerary of planned or otherwise future travel of one or more electric vehicles regarding timing associated itinerary, scheduling of other electric vehicle using charging stations, ability of charging station to accommodate charging of one or more electric vehicles involved with the anticipated itinerary, etc.).

In one or more implementations, as shown in FIG. 10-M, the operation o1256 can include operation o1260 for requesting information of at least in part involving one or more user preferences of location for energy transfer to one or more electric vehicles including requesting information of at least in part involving one or more user preferences of location for electrical energy transfer to one or more electric vehicles at one or more garage locations for housing one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1260, for performance of the operation o1260 by an electrical circuitry arrangement as activated thereto, and/or otherwise fulfillment of the operation o1260. One or more non-transitory signal bearing physical media can bear the one or more instructions that when executed can direct performance of the operation o1260. Furthermore, requesting information of involving user preferences of location for electrical energy transfer to electric vehicles at garage locations for housing electric vehicles module m1260 depicted in FIG. 6-G as being included in the module m1256, when executed and/or activated, can direct performance of and/or perform the operation o1260. Illustratively, in one or more implementations, the operation o1260 can be carried out, for example, by requesting information of at least in part involving one or more user preferences of location for energy transfer to one or more electric vehicles (e.g., requesting information through involvement with queries regarding one or more locations that the one or more users historically charge one or more electric vehicles as to frequency of use of each location and any patterns of use for the one or more chargers at the locations, etc.) including requesting information of at least in part involving one or more user preferences of location for electrical energy transfer to one or more electric vehicles at one or more garage locations for housing one or more electric vehicles (e.g., requesting information through involvement with queries regarding frequency, duration, capacity, scheduling, conflicts with other electric vehicles as to historical or anticipated use of the one or more charging stations suited for one or more electric vehicles at the garage locations that can house one or more electric vehicles, etc.).

In one or more implementations, as shown in FIG. 10-M, the operation o1256 can include operation o1261 for requesting information of at least in part involving one or more user preferences of location for energy transfer to one or more electric vehicles including requesting information of at least in part involving one or more user preferences of location for electrical energy transfer to one or more electric vehicles at one or more park and ride locations for parking one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1261, for performance of the operation o1261 by an electrical circuitry arrangement as activated thereto, and/or otherwise fulfillment of the operation o1261. One or more non-transitory signal bearing physical media can bear the one or more instructions that when executed can direct performance of the operation o1261. Furthermore, requesting information of involving user preferences of location for electrical energy transfer to electric vehicles at park and ride locations for parking electric vehicles module m1261 depicted in FIG. 6-G as being included in the module m1256, when executed and/or activated, can direct performance of and/or perform the operation o1261. Illustratively, in one or more implementations, the operation o1261 can be carried out, for example, by requesting information of at least in part involving one or more user preferences of location for energy transfer to one or more electric vehicles (e.g., requesting information through involvement with queries regarding one or more locations that the one or more users historically charge one or more electric vehicles as to frequency of use of each location and any patterns of use for the one or more chargers at the locations, etc.) including requesting information of at least in part involving one or more user preferences of location for electrical energy transfer to one or more electric vehicles at one or more park and ride locations for parking one or more electric vehicles (e.g., requesting information through involvement with queries regarding percentage of vehicle charge is satisfactory to be accomplished at any particular location, amount of time desired as buffer to accommodate changes in scheduling or unanticipated events in schedule for each parking location, etc.).

In one or more implementations, as shown in FIG. 10-M, the operation o1256 can include operation o1262 for requesting information of at least in part involving one or more user preferences of location for energy transfer to one or more electric vehicles including requesting information of at least in part involving one or more user preferences of location for electrical energy transfer to one or more electric vehicles at one or more parking lot locations for parking one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1262, for performance of the operation o1262 by an electrical circuitry arrangement as activated thereto, and/or otherwise fulfillment of the operation o1262. One or more non-transitory signal bearing physical media can bear the one or more instructions that when executed can direct performance of the operation o1262. Furthermore, requesting information of involving user preferences of location for electrical energy transfer to electric vehicles at parking lot locations for parking electric vehicles module m1262 depicted in FIG. 6-G as being included in the module m1256, when executed and/or activated, can direct performance of and/or perform the operation o1262. Illustratively, in one or more implementations, the operation o1262 can be carried out, for example, by requesting information of at least in part involving one or more user preferences of location for energy transfer to one or more electric vehicles (e.g., requesting information through involvement with queries regarding one or more locations that the one or more users historically charge one or more electric vehicles as to frequency of use of each location and any patterns of use for the one or more chargers at the locations, etc.) including requesting information of at least in part involving one or more user preferences of location for electrical energy transfer to one or more electric vehicles at one or more parking lot locations for parking one or more electric vehicles (e.g., requesting information through involvement with queries regarding access to one or more electrical charging stations located at the one or more parking locations in association with planned or otherwise potential use of one or more electric vehicles of the charging stations including availability and potential conflicting issues such as crowding of the parking lots and compatibility of charging equipment found in the parking lots found with one or more electric vehicles, etc.).

In one or more implementations, as shown in FIG. 10-M, the operation o1256 can include operation o1263 for requesting information of at least in part involving one or more user preferences of location for energy transfer to one or more electric vehicles including requesting information of at least in part involving one or more user preferences of location for electrical energy transfer to one or more electric vehicles at one or more parking garage locations for parking one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1263, for performance of the operation o1263 by an electrical circuitry arrangement as activated thereto, and/or otherwise fulfillment of the operation o1263. One or more non-transitory signal bearing physical media can bear the one or more instructions that when executed can direct performance of the operation o1263. Furthermore, requesting information of involving user preferences of location for electrical energy transfer to electric vehicles at parking garage locations for parking electric vehicles module m1263 depicted in FIG. 6-G as being included in the module m1256, when executed and/or activated, can direct performance of and/or perform the operation o1263. Illustratively, in one or more implementations, the operation o1263 can be carried out, for example, by requesting information of at least in part involving one or more user preferences of location for energy transfer to one or more electric vehicles (e.g., requesting information through involvement with queries regarding one or more locations that the one or more users historically charge one or more electric vehicles as to frequency of use of each location and any patterns of use for the one or more chargers at the locations, etc.) including requesting information of at least in part involving one or more user preferences of location for electrical energy transfer to one or more electric vehicles at one or more parking garage locations for parking one or more electric vehicles (e.g., requesting information through involvement with queries including type of vehicle repair performed at the garage locations associated with impact to accessibility and otherwise use of the charging stations found at the garage locations, etc.).

In one or more implementations, as shown in FIG. 10-N, the operation o1256 can include operation o1264 for requesting information of at least in part involving one or more user preferences of location for energy transfer to one or more electric vehicles including requesting information of at least in part involving one or more user preferences of location for non-electrical energy transfer to one or more electric vehicles as a hybrid-electric vehicle at one or more re-fueling station locations. Origination of a physically tangible component group can be accomplished through skilled in the art design choice selection including use of one or more components and/or subsystems explicitly and/or implicitly referred to herein for at least in part implementing execution of one or more instructions of the operation o1264, for performance of the operation o1264 by an electrical circuitry arrangement as activated thereto, and/or otherwise fulfillment of the operation o1264. One or more non-transitory signal bearing physical media can bear the one or more instructions that when executed can direct performance of the operation o1264. Furthermore, requesting information of involving user preferences of location for non-electrical energy transfer to electric vehicles as a hybrid-electric vehicle at re-fueling station locations module m1264 depicted in FIG. 6-G as being included in the module m1256, when executed and/or activated, can direct performance of and/or perform the operation o1264. Illustratively, in one or more implementations, the operation o1264 can be carried out, for example, by requesting information of at least in part involving one or more user preferences of location for energy transfer to one or more electric vehicles (e.g., requesting information through involvement with queries regarding one or more locations that the one or more users historically charge one or more electric vehicles as to frequency of use of each location and any patterns of use for the one or more chargers at the locations, etc.) including requesting information of at least in part involving one or more user preferences of location for non-electrical energy transfer to one or more electric vehicles as a hybrid-electric vehicle at one or more re-fueling station locations (e.g., requesting information through involvement with queries regarding liquid fueling stations, gaseous fueling stations, chemical fueling stations, mechanical energy fuel stations, carbon-based fueling stations, or other non-electrical based energy imparting stations regarding hours of operation, types of equipment used, historical or estimated future demand of other electric vehicles or other types of vehicles upon the equipment, etc.).

In one or more implementations, as shown in FIG. 10-N, the operation o1256 can include operation o1265 for requesting information of at least in part involving one or more user preferences of location for energy transfer to one or more electric vehicles including requesting information of at least in part involving one or more user preferences of location for electrical energy transfer to one or more electric vehicles at one or more static charging locations along one or more routes of travel of one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1265, for performance of the operation o1265 by an electrical circuitry arrangement as activated thereto, and/or otherwise fulfillment of the operation o1265. One or more non-transitory signal bearing physical media can bear the one or more instructions that when executed can direct performance of the operation o1265. Furthermore, requesting information of involving user preferences of location for electrical energy transfer to electric vehicles at static charging locations along routes of travel of electric vehicles module m1265 depicted in FIG. 6-G as being included in the module m1256, when executed and/or activated, can direct performance of and/or perform the operation o1265. Illustratively, in one or more implementations, the operation o1265 can be carried out, for example, by requesting information of at least in part involving one or more user preferences of location for energy transfer to one or more electric vehicles (e.g., requesting information through involvement with queries regarding one or more locations that the one or more users historically charge one or more electric vehicles as to frequency of use of each location and any patterns of use for the one or more chargers at the locations, etc.) including requesting information of at least in part involving one or more user preferences of location for electrical energy transfer to one or more electric vehicles at one or more static charging locations along one or more routes of travel of one or more electric vehicles (e.g., requesting information through involvement with queries regarding location, charging rates, or equipment compatibility regarding charging stations located at traffic signals, locations of heavy traffic congestion, locations where vehicles wait temporarily for relatively brief periods or other locations where electric vehicle charging stations are located to provide intermittent charging along a route of travel for relatively short periods of time such as for less than a minute to a few minutes or tens of minutes, etc.).

In one or more implementations, as shown in FIG. 10-N, the operation o1256 can include operation o1266 for requesting information of at least in part involving one or more user preferences of location for energy transfer to one or more electric vehicles including requesting information of at least in part involving one or more user preferences of location for electrical energy transfer to one or more electric vehicles based on historical or predicted availability of the one or more wireless electrical energy imparting stations provided by an organization employing one or more planned occupants of one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1266, for performance of the operation o1266 by an electrical circuitry arrangement as activated thereto, and/or otherwise fulfillment of the operation o1266. One or more non-transitory signal bearing physical media can bear the one or more instructions that when executed can direct performance of the operation o1266. Furthermore, requesting information of involving user preferences of location for electrical energy transfer to electric vehicles based on historical or predicted availability of the wireless electrical energy imparting stations provided by an organization employing planned occupants of electric vehicles module m1266 depicted in FIG. 6-G as being included in the module m1256, when executed and/or activated, can direct performance of and/or perform the operation o1266. Illustratively, in one or more implementations, the operation o1266 can be carried out, for example, by requesting information of at least in part involving one or more user preferences of location for energy transfer to one or more electric vehicles (e.g., requesting information through involvement with queries regarding one or more locations that the one or more users historically charge one or more electric vehicles as to frequency of use of each location and any patterns of use for the one or more chargers at the locations, etc.) including requesting information of at least in part involving one or more user preferences of location for electrical energy transfer to one or more electric vehicles based on historical or predicted availability of the one or more wireless electrical energy imparting stations provided by an organization employing one or more planned occupants of one or more electric vehicles (e.g., requesting information through involvement with queries regarding capacity, availability, equipment type of electric vehicle charging stations that are potentially available for charging of one or more electric vehicles for short or long duration charging dependent upon how drivers or passengers of vehicle are associated with each other in use of one or more electric vehicles such as whether one or more electric vehicles is shared concurrently or serially, etc.).

In one or more implementations, as shown in FIG. 10-N, the operation o1256 can include operation o1267 for requesting information of at least in part involving one or more user preferences of location for energy transfer to one or more electric vehicles including requesting information of at least in part involving one or more user preferences of location for electrical energy transfer to one or more electric vehicles at one or more locations for mechanical maintenance of one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1267, for performance of the operation o1267 by an electrical circuitry arrangement as activated thereto, and/or otherwise fulfillment of the operation o1267. One or more non-transitory signal bearing physical media can bear the one or more instructions that when executed can direct performance of the operation o1267. Furthermore, requesting information of involving user preferences of location for electrical energy transfer to electric vehicles at locations for mechanical maintenance of electric vehicles module m1267 depicted in FIG. 6-H as being included in the module m1256, when executed and/or activated, can direct performance of and/or perform the operation o1267. Illustratively, in one or more implementations, the operation o1267 can be carried out, for example, by requesting information of at least in part involving one or more user preferences of location for energy transfer to one or more electric vehicles (e.g., requesting information through involvement with queries regarding one or more locations that the one or more users historically charge one or more electric vehicles as to frequency of use of each location and any patterns of use for the one or more chargers at the locations, etc.) including requesting information of at least in part involving one or more user preferences of location for electrical energy transfer to one or more electric vehicles at one or more locations for mechanical maintenance of one or more electric vehicles (e.g., requesting information through involvement with queries regarding amount of time to factor into delays in repairs or unexpected events regarding the repairs to allow for additional charging, etc.).

In one or more implementations, as shown in FIG. 10-O, the operation o1256 can include operation o1268 for requesting information of at least in part involving one or more user preferences of location for energy transfer to one or more electric vehicles including requesting information of at least in part involving one or more preferences for one or more fuels used to re-fuel one or more electric vehicles as one or more hybrid electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1268, for performance of the operation o1268 by an electrical circuitry arrangement as activated thereto, and/or otherwise fulfillment of the operation o1268. One or more non-transitory signal bearing physical media can bear the one or more instructions that when executed can direct performance of the operation o1268. Furthermore, requesting information of involving preferences for fuels used to re-fuel electric vehicles as hybrid electric vehicles module m1268 depicted in FIG. 6-H as being included in the module m1256, when executed and/or activated, can direct performance of and/or perform the operation o1268. Illustratively, in one or more implementations, the operation o1268 can be carried out, for example, by requesting information of at least in part involving one or more user preferences of location for energy transfer to one or more electric vehicles (e.g., requesting information through involvement with queries regarding one or more locations that the one or more users historically charge one or more electric vehicles as to frequency of use of each location and any patterns of use for the one or more chargers at the locations, etc.) including requesting information of at least in part involving one or more preferences for one or more fuels used to re-fuel one or more electric vehicles as one or more hybrid electric vehicles (e.g., requesting information through involvement with queries regarding price, quality, additional ingredients such as cleansing agents, acceptable contaminant levels or other parameters regarding the fuels, etc.).

In one or more implementations, as shown in FIG. 10-O, the operation o1256 can include operation o1269 for requesting information of at least in part involving one or more user preferences of location for energy transfer to one or more electric vehicles including requesting information of at least in part involving one or more preferences for contingency plans for unplanned unavailability to one or more electric vehicles of the one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1269, for performance of the operation o1269 by an electrical circuitry arrangement as activated thereto, and/or otherwise fulfillment of the operation o1269. One or more non-transitory signal bearing physical media can bear the one or more instructions that when executed can direct performance of the operation o1269. Furthermore, requesting information of involving preferences for contingency plans for unplanned unavailability to electric vehicles of one or more electric vehicles wireless electrical energy chargers module m1269 depicted in FIG. 6-H as being included in the module m1256, when executed and/or activated, can direct performance of and/or perform the operation o1269. Illustratively, in one or more implementations, the operation o1269 can be carried out, for example, by requesting information of at least in part involving one or more user preferences of location for energy transfer to one or more electric vehicles (e.g., requesting information through involvement with queries regarding one or more locations that the one or more users historically charge one or more electric vehicles as to frequency of use of each location and any patterns of use for the one or more chargers at the locations, etc.) including requesting information of at least in part involving one or more preferences for contingency plans for unplanned unavailability to one or more electric vehicles of the one or more electric vehicle wireless electrical energy chargers (e.g., requesting information through involvement with queries regarding alternative routes that can be taken, additional time available by one or more electric vehicles user for travel, other modes of transportation available to one or more electric vehicles user, etc.).

In one or more implementations, as shown in FIG. 10-O, the operation o12 can include operation o1270 for electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers including requesting information of at least in part involving information regarding one or more uses of one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1270, for performance of the operation o1270 by an electrical circuitry arrangement as activated thereto, and/or otherwise fulfillment of the operation o1270. One or more non-transitory signal bearing physical media can bear the one or more instructions that when executed can direct performance of the operation o1270. Furthermore, requesting information of involving information regarding uses of electric vehicles module m1270 depicted in FIG. 6-H as being included in the module m12, when executed and/or activated, can direct performance of and/or perform the operation o1270. Illustratively, in one or more implementations, the operation o1270 can be carried out, for example, by electronically requesting electric vehicle wireless electrical energy charger planning information of the one or more electric vehicle wireless electrical energy chargers regarding one or more indications of electric vehicle user activities involving the one or more electric vehicles to be prepared for by wirelessly charging the one or more electric vehicles with electrical energy from the one or more electric vehicle wireless electrical energy chargers including requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.).

In one or more implementations, as shown in FIG. 10-O, the operation o1270 can include operation o1271 for requesting information of at least in part involving information regarding one or more uses of one or more electric vehicles including requesting information of at least in part involving terrain or traffic information regarding routes of travel for one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1271, for performance of the operation o1271 by an electrical circuitry arrangement as activated thereto, and/or otherwise fulfillment of the operation o1271. One or more non-transitory signal bearing physical media can bear the one or more instructions that when executed can direct performance of the operation o1271. Furthermore, requesting information of involving terrain or traffic information regarding routes of travel for electric vehicles module m1271 depicted in FIG. 6-H as being included in the module m1270, when executed and/or activated, can direct performance of and/or perform the operation o1271. Illustratively, in one or more implementations, the operation o1271 can be carried out, for example, by requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.) including requesting information of at least in part involving terrain or traffic information regarding routes of travel for one or more electric vehicles (e.g., requesting information through involvement with queries regarding anticipated or unannounced changes in road conditions, traffic delays, accident reports, detours or re-routing of traffic, weather influenced delays, etc.).

In one or more implementations, as shown in FIG. 10-P, the operation o1270 can include operation o1272 for requesting information of at least in part involving information regarding one or more uses of one or more electric vehicles including requesting information of at least in part involving commuter routing information for one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1272, for performance of the operation o1272 by an electrical circuitry arrangement as activated thereto, and/or otherwise fulfillment of the operation o1272. One or more non-transitory signal bearing physical media can bear the one or more instructions that when executed can direct performance of the operation o1272. Furthermore, requesting information of involving commuter routing information for electric vehicles module m1272 depicted in FIG. 6-H as being included in the module m1270, when executed and/or activated, can direct performance of and/or perform the operation o1272. Illustratively, in one or more implementations, the operation o1272 can be carried out, for example, by requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.) including requesting information of at least in part involving commuter routing information for one or more electric vehicles (e.g., requesting information through involvement with queries regarding traffic congestion, road work issues, weather issues, vehicle accident issues and other issues associated with the planned or estimated routes for commuter use of one or more electric vehicles, etc.).

In one or more implementations, as shown in FIG. 10-P, the operation o1270 can include operation o1273 for requesting information of at least in part involving information regarding one or more uses of one or more electric vehicles including requesting information of at least in part involving trip advisory information regarding routes of travel for one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1273, for performance of the operation o1273 by an electrical circuitry arrangement as activated thereto, and/or otherwise fulfillment of the operation o1273. One or more non-transitory signal bearing physical media can bear the one or more instructions that when executed can direct performance of the operation o1273. Furthermore, requesting information of involving trip advisory information regarding routes of travel for electric vehicles module m1273 depicted in FIG. 6-H as being included in the module m1270, when executed and/or activated, can direct performance of and/or perform the operation o1273. Illustratively, in one or more implementations, the operation o1273 can be carried out, for example, by requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.) including requesting information of at least in part involving trip advisory information regarding routes of travel for one or more electric vehicles (e.g., requesting information through involvement with queries regarding sight-seeing, shopping, restaurant, etc. potential availability of the routes involved as associated with delays due to charging requirements, etc.).

In one or more implementations, as shown in FIG. 10-P, the operation o1270 can include operation o1274 for requesting information of at least in part involving information regarding one or more uses of one or more electric vehicles including requesting information of at least in part involving alternative modes of transportation along one or more routes of travel for one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1274, for performance of the operation o1274 by an electrical circuitry arrangement as activated thereto, and/or otherwise fulfillment of the operation o1274. One or more non-transitory signal bearing physical media can bear the one or more instructions that when executed can direct performance of the operation o1274. Furthermore, requesting information of involving alternative modes of transportation along routes of travel for electric vehicles module m1274 depicted in FIG. 6-H as being included in the module m1270, when executed and/or activated, can direct performance of and/or perform the operation o1274. Illustratively, in one or more implementations, the operation o1274 can be carried out, for example, by requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.) including requesting information of at least in part involving alternative modes of transportation along one or more routes of travel for one or more electric vehicles (e.g., requesting information through involvement with queries regarding taxi, public transportation, rail, ride-share, etc. associated with planned or estimated travel routes of one or more electric vehicles, etc.).

In one or more implementations, as shown in FIG. 10-P, the operation o1270 can include operation o1275 for requesting information of at least in part involving information regarding one or more uses of one or more electric vehicles including requesting information of at least in part involving one or more periods in which one or more electric vehicles will be unavailable for use. Origination of a physically tangible component group can be accomplished through skilled in the art design choice selection including use of one or more components and/or subsystems explicitly and/or implicitly referred to herein for at least in part implementing execution of one or more instructions of the operation o1275, for performance of the operation o1275 by an electrical circuitry arrangement as activated thereto, and/or otherwise fulfillment of the operation o1275. One or more non-transitory signal bearing physical media can bear the one or more instructions that when executed can direct performance of the operation o1275. Furthermore, requesting information of involving periods in which electric vehicles will be unavailable for use module m1275 depicted in FIG. 6-H as being included in the module m1270, when executed and/or activated, can direct performance of and/or perform the operation o1275. Illustratively, in one or more implementations, the operation o1275 can be carried out, for example, by requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.) including requesting information of at least in part involving one or more periods in which one or more electric vehicles will be unavailable for use (e.g., requesting information through involvement with queries as to reserved wait times, maintenance scheduling, use by others, planned or estimated charging times, for one or more electric vehicles, etc.).

In one or more implementations, as shown in FIG. 10-P, the operation o1270 can include operation o1276 for requesting information of at least in part involving information regarding one or more uses of one or more electric vehicles including requesting information of at least in part involving planned errands to be run by one or more users of one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1276, for performance of the operation o1276 by an electrical circuitry arrangement as activated thereto, and/or otherwise fulfillment of the operation o1276. One or more non-transitory signal bearing physical media can bear the one or more instructions that when executed can direct performance of the operation o1276. Furthermore, requesting information of involving planned errands to be run by users of electric vehicles module m1276 depicted in FIG. 6-H as being included in the module m1270, when executed and/or activated, can direct performance of and/or perform the operation o1276. Illustratively, in one or more implementations, the operation o1276 can be carried out, for example, by requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.) including requesting information of at least in part involving planned errands to be run by one or more users of one or more electric vehicles (e.g., requesting information through involvement with queries regarding store hours, office hours, traffic congestion issues, service provider availability, shopping lists, shopping ordering information associated with planned or estimated itinerary of use of one or more electric vehicles, etc.).

In one or more implementations, as shown in FIG. 10-Q, the operation o1270 can include operation o1277 for requesting information of at least in part involving information regarding one or more uses of one or more electric vehicles including requesting information of at least in part involving one or more commercial delivery schedules utilizing one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1277, for performance of the operation o1277 by an electrical circuitry arrangement as activated thereto, and/or otherwise fulfillment of the operation o1277. One or more non-transitory signal bearing physical media can bear the one or more instructions that when executed can direct performance of the operation o1277. Furthermore, requesting information of involving commercial delivery schedules utilizing electric vehicles module m1277 depicted in FIG. 6-H as being included in the module m1270, when executed and/or activated, can direct performance of and/or perform the operation o1277. Illustratively, in one or more implementations, the operation o1277 can be carried out, for example, by requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.) including requesting information of at least in part involving one or more commercial delivery schedules utilizing one or more electric vehicles (e.g., requesting information through involvement with queries regarding planned or estimated routes for delivery, prioritization of various deliveries along the routes, any breaks allowed the driver along the route, one or more driving history or other factors involved with the planned electric vehicle drivers along the route, etc.).

In one or more implementations, as shown in FIG. 10-Q, the operation o1270 can include operation o1278 for requesting information of at least in part involving information regarding one or more uses of one or more electric vehicles including requesting information of at least in part involving one or more courier service uses for one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1278, for performance of the operation o1278 by an electrical circuitry arrangement as activated thereto, and/or otherwise fulfillment of the operation o1278. One or more non-transitory signal bearing physical media can bear the one or more instructions that when executed can direct performance of the operation o1278. Furthermore, requesting information of involving courier service uses for electric vehicles module m1278 depicted in FIG. 6-I as being included in the module m1270, when executed and/or activated, can direct performance of and/or perform the operation o1278. Illustratively, in one or more implementations, the operation o1278 can be carried out, for example, by requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.) including requesting information of at least in part involving one or more courier service uses for one or more electric vehicles (e.g., requesting information through involvement with queries regarding urgency, level of payment, arrangement for delivery associated with the courier service, etc.).

In one or more implementations, as shown in FIG. 10-Q, the operation o1270 can include operation o1279 for requesting information of at least in part involving information regarding one or more uses of one or more electric vehicles including requesting information of at least in part involving industrial cargo transport by one or more electric vehicles.

Origination of a physically tangible component group can be accomplished through skilled in the art design choice selection including use of one or more components and/or subsystems explicitly and/or implicitly referred to herein for at least in part implementing execution of one or more instructions of the operation o1279, for performance of the operation o1279 by an electrical circuitry arrangement as activated thereto, and/or otherwise fulfillment of the operation o1279. One or more non-transitory signal bearing physical media can bear the one or more instructions that when executed can direct performance of the operation o1279. Furthermore, requesting information of involving industrial cargo transport by electric vehicles module m1279 depicted in FIG. 6-I as being included in the module m1270, when executed and/or activated, can direct performance of and/or perform the operation o1279. Illustratively, in one or more implementations, the operation o1279 can be carried out, for example, by requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.) including requesting information of at least in part involving industrial cargo transport by one or more electric vehicles (e.g., requesting information through involvement with queries regarding shipment urgency, hazardous materials issues, inspection issues, contractual obligations for delivery, etc.).

In one or more implementations, as shown in FIG. 10-Q, the operation o1270 can include operation o1280 for requesting information of at least in part involving information regarding one or more uses of one or more electric vehicles including requesting information of at least in part involving one or more uses of one or more electric vehicles including requesting information of at least in part involving one or more driving habits of one or more users of one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1280, for performance of the operation o1280 by an electrical circuitry arrangement as activated thereto, and/or otherwise fulfillment of the operation o1280. One or more non-transitory signal bearing physical media can bear the one or more instructions that when executed can direct performance of the operation o1280. Furthermore, requesting information of involving uses of electric vehicles including requesting information of involving driving habits of users of electric vehicles module m1280 depicted in FIG. 6-I as being included in the module m1270, when executed and/or activated, can direct performance of and/or perform the operation o1280. Illustratively, in one or more implementations, the operation o1280 can be carried out, for example, by requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.) including requesting information of at least in part involving one or more uses of one or more electric vehicles including requesting information of at least in part involving one or more driving habits of one or more users of one or more electric vehicles (e.g., requesting information through involvement with queries regarding historical punctuality of users, traffic violation histories of the users, tendency to exceed speed limits of the users, braking habits of the users, etc.).

In one or more implementations, as shown in FIG. 10-Q, the operation o1270 can include operation o1281 for requesting information of at least in part involving information regarding one or more uses of one or more electric vehicles including requesting information of at least in part involving one or more itineraries associated with use of one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1281, for performance of the operation o1281 by an electrical circuitry arrangement as activated thereto, and/or otherwise fulfillment of the operation o1281. One or more non-transitory signal bearing physical media can bear the one or more instructions that when executed can direct performance of the operation o1281. Furthermore, requesting information of involving itineraries associated with use of electric vehicles module m1281 depicted in FIG. 6-I as being included in the module m1270, when executed and/or activated, can direct performance of and/or perform the operation o1281. Illustratively, in one or more implementations, the operation o1281 can be carried out, for example, by requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.) including requesting information of at least in part involving one or more itineraries associated with use of one or more electric vehicles (e.g., requesting information through involvement with queries start times, stop times, wait times, characterization of priority levels for arrival, etc.).

In one or more implementations, as shown in FIG. 10-R, the operation o1270 can include operation o1282 for requesting information of at least in part involving information regarding one or more uses of one or more electric vehicles including requesting information of at least in part involving one or more weather forecasts associated with travel through use of one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1282, for performance of the operation o1282 by an electrical circuitry arrangement as activated thereto, and/or otherwise fulfillment of the operation o1282. One or more non-transitory signal bearing physical media can bear the one or more instructions that when executed can direct performance of the operation o1282. Furthermore, requesting information of involving weather forecasts associated with travel through use of electric vehicles module m1282 depicted in FIG. 6-I as being included in the module m1270, when executed and/or activated, can direct performance of and/or perform the operation o1282. Illustratively, in one or more implementations, the operation o1282 can be carried out, for example, by requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.) including requesting information of at least in part involving one or more weather forecasts associated with travel through use of one or more electric vehicles (e.g., requesting information through involvement with queries regarding current or forecast weather issues such as storms, flooding, road conditions, traffic congestion duet to weather related aspects, etc.).

In one or more implementations, as shown in FIG. 10-R, the operation o1270 can include operation o1283 for requesting information of at least in part involving information regarding one or more uses of one or more electric vehicles including requesting information of at least in part involving one or more news broadcasts associated with travel through use of one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1283, for performance of the operation o1283 by an electrical circuitry arrangement as activated thereto, and/or otherwise fulfillment of the operation o1283. One or more non-transitory signal bearing physical media can bear the one or more instructions that when executed can direct performance of the operation o1283. Furthermore, requesting information of involving news broadcasts associated with travel through use of electric vehicles module m1283 depicted in FIG. 6-I as being included in the module m1270, when executed and/or activated, can direct performance of and/or perform the operation o1283. Illustratively, in one or more implementations, the operation o1283 can be carried out, for example, by requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.) including requesting information of at least in part involving one or more news broadcasts associated with travel through use of one or more electric vehicles (e.g., requesting information through involvement with queries regarding sports events, political events, business events, unpredictable or catastrophic events impacting traffic or road conditions, etc.).

In one or more implementations, as shown in FIG. 10-R, the operation o1270 can include operation o1284 for requesting information of at least in part involving information regarding one or more uses of one or more electric vehicles including requesting information of at least in part involving emergency warning messages associated with use of one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1284, for performance of the operation o1284 by an electrical circuitry arrangement as activated thereto, and/or otherwise fulfillment of the operation o1284. One or more non-transitory signal bearing physical media can bear the one or more instructions that when executed can direct performance of the operation o1284. Furthermore, requesting information of involving emergency warning messages associated with use of electric vehicles module m1284 depicted in FIG. 6-I as being included in the module m1270, when executed and/or activated, can direct performance of and/or perform the operation o1284. Illustratively, in one or more implementations, the operation o1284 can be carried out, for example, by requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.) including requesting information of at least in part involving emergency warning messages associated with use of one or more electric vehicles (e.g., requesting information through involvement with queries regarding fire, police, ambulance, military or other response team issues associated with travel conditions, etc.).

In one or more implementations, as shown in FIG. 10-R, the operation o1270 can include operation o1285 for requesting information of at least in part involving information regarding one or more uses of one or more electric vehicles including requesting information of at least in part involving availability of alternate transportation within a designated distance from one or more electric vehicle wireless electrical energy chargers for transferring electrical energy to one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1285, for performance of the operation o1285 by an electrical circuitry arrangement as activated thereto, and/or otherwise fulfillment of the operation o1285. One or more non-transitory signal bearing physical media can bear the one or more instructions that when executed can direct performance of the operation o1285. Furthermore, requesting information of involving availability of alternate transportation within a designated distance from electric vehicle wireless electrical energy chargers for transferring electrical energy to electric vehicles module m1285 depicted in FIG. 6-I as being included in the module m1270, when executed and/or activated, can direct performance of and/or perform the operation o1285. Illustratively, in one or more implementations, the operation o1285 can be carried out, for example, by requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.) including requesting information of at least in part involving availability of alternate transportation within a designated distance from one or more electric vehicle wireless electrical energy chargers for transferring electrical energy to one or more electric vehicles (e.g., requesting information through involvement with queries regarding bus, train, taxi, hitch-hiking, carpool, ride-share or other access points to transportation alternate to that provided by one or more electric vehicles, etc.).

In one or more implementations, as shown in FIG. 10-R, the operation o1270 can include operation o1286 for requesting information of at least in part involving information regarding one or more uses of one or more electric vehicles including requesting information of at least in part involving ride-share programs associated with travel routes traveled by one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1286, for performance of the operation o1286 by an electrical circuitry arrangement as activated thereto, and/or otherwise fulfillment of the operation o1286. One or more non-transitory signal bearing physical media can bear the one or more instructions that when executed can direct performance of the operation o1286. Furthermore, requesting information of involving ride-share programs associated with travel routes traveled by electric vehicles module m1286 depicted in FIG. 6-I as being included in the module m1270, when executed and/or activated, can direct performance of and/or perform the operation o1286. Illustratively, in one or more implementations, the operation o1286 can be carried out, for example, by requesting information of at least in part involving information regarding one or more uses of one or more electric vehicles (e.g., requesting information through involvement with queries regarding potential for sharing of one or more electric vehicles among one or more groups of electric vehicle owners, economic status of one or more electric vehicles owner, health or contagion condition of one or more electric vehicles users, physical accessibility or disability issues of one or more electric vehicles users, etc.) including requesting information of at least in part involving ride-share programs associated with travel routes traveled by one or more electric vehicles (e.g., requesting information through involvement with queries regarding passenger biographical information, historical travel information of ride-share participants, availability of ride-share participants, etc.).

In one or more implementations, as shown in FIG. 11-A, the operation o13 can include operation o1301 for electronically outputting electric vehicle wireless electrical energy charger advisement information to the one or more electric vehicle wireless electrical energy chargers based at least in part upon one or more portions of the electricity provider detail information and based at least in part upon one or more portions of the electric vehicle wireless electrical energy charger advisement information regarding at least in part preparation of the one or more electric vehicles for the one or more electric vehicle user activities through electrical energy charging of the one or more electric vehicles by the one or more electric vehicle wireless electrical energy chargers including outputting advisement information for at least in part controlling one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1301, for performance of the operation o1301 by an electrical circuitry arrangement as activated thereto, and/or otherwise fulfillment of the operation o1301. One or more non-transitory signal bearing physical media can bear the one or more instructions that when executed can direct performance of the operation o1301. Furthermore, outputting advisement information for controlling electric vehicle wireless electrical energy chargers module m1301 depicted in FIG. 7-A as being included in the module m13, when executed and/or activated, can direct performance of and/or perform the operation o1301. Illustratively, in one or more implementations, the operation o1301 can be carried out, for example, by electronically outputting electric vehicle wireless electrical energy charger advisement information to the one or more electric vehicle wireless electrical energy chargers based at least in part upon one or more portions of the electricity provider detail information and based at least in part upon one or more portions of the electric vehicle wireless electrical energy charger planning information, the electric vehicle electrical energy charger advisement information regarding at least in part preparation of the one or more electric vehicles for the one or more electric vehicle user activities through electrical energy charging of the one or more electric vehicles by the one or more electric vehicle wireless electrical energy chargers including outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.).

In one or more implementations, as shown in FIG. 11-A, the operation o1301 can include operation o1302 for outputting advisement information for at least in part controlling one or more electric vehicle wireless electrical energy chargers including outputting advisement information at least in part involving one or more schedules for electrical load sharing for one or more electrical energy generation sources with one or more electric vehicle wireless electrical energy chargers associated with one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1302, for performance of the operation o1302 by an electrical circuitry arrangement as activated thereto, and/or otherwise fulfillment of the operation o1302. One or more non-transitory signal bearing physical media can bear the one or more instructions that when executed can direct performance of the operation o1302. Furthermore, outputting advisement information involving schedules for electrical load sharing for electrical energy generation sources with electric vehicle wireless electrical energy chargers associated with electric vehicles module m1302 depicted in FIG. 7-A as being included in the module m1301, when executed and/or activated, can direct performance of and/or perform the operation o1302. Illustratively, in one or more implementations, the operation o1302 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving one or more schedules for electrical load sharing for one or more electrical energy generation sources with one or more electric vehicle wireless electrical energy chargers associated with one or more electric vehicles (e.g., outputting information regarding types, capacities, demand cycles of equipment, appliances, and other equipment to share electrical energy resources with the one or more electrical charging stations for one or more electric vehicles, etc.).

In one or more implementations, as shown in FIG. 11-A, the operation o1301 can include operation o1303 for outputting advisement information for at least in part controlling one or more electric vehicle wireless electrical energy chargers including outputting advisement information at least in part involving charging rate capacity of one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1303, for performance of the operation o1303 by an electrical circuitry arrangement as activated thereto, and/or otherwise fulfillment of the operation o1303. One or more non-transitory signal bearing physical media can bear the one or more instructions that when executed can direct performance of the operation o1303. Furthermore, outputting advisement information involving electricity use data accessed through remote reporting from electric utility databases module m1303 depicted in FIG. 7-A as being included in the module m1301, when executed and/or activated, can direct performance of and/or perform the operation o1303. Illustratively, in one or more implementations, the operation o1303 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving charging rate capacity of one or more electric vehicle wireless electrical energy chargers (e.g., outputting information regarding short burst capacity, or long term durational levels for transfer of electrical energy wirelessly from charging stations for one or more electric vehicles, etc.).

In one or more implementations, as shown in FIG. 11-A, the operation o1301 can include operation o1304 for outputting advisement information for at least in part controlling one or more electric vehicle wireless electrical energy chargers including outputting advisement information at least in part involving one or more consumer incentive programs associated with one or more electricity cost schedules. Origination of a physically tangible component group can be accomplished through skilled in the art design choice selection including use of one or more components and/or subsystems explicitly and/or implicitly referred to herein for at least in part implementing execution of one or more instructions of the operation o1304, for performance of the operation o1304 by an electrical circuitry arrangement as activated thereto, and/or otherwise fulfillment of the operation o1304. One or more non-transitory signal bearing physical media can bear the one or more instructions that when executed can direct performance of the operation o1304. Furthermore, outputting advisement information involving consumer incentive programs associated with electricity cost schedules module m1304 depicted in FIG. 7-A as being included in the module m1301, when executed and/or activated, can direct performance of and/or perform the operation o1304. Illustratively, in one or more implementations, the operation o1304 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving one or more consumer incentive programs associated with one or more electricity cost schedules (e.g., outputting information timing, duration, scheduling, percentages of cost reductions associated with the consumer incentive programs, etc.).

In one or more implementations, as shown in FIG. 11-B, the operation o1301 can include operation o1305 for outputting advisement information for at least in part controlling one or more electric vehicle wireless electrical energy chargers including outputting advisement information at least in part involving one or more electricity financial cost rate schedules. Origination of a physically tangible component group can be accomplished through skilled in the art design choice selection including use of one or more components and/or subsystems explicitly and/or implicitly referred to herein for at least in part implementing execution of one or more instructions of the operation o1305, for performance of the operation o1305 by an electrical circuitry arrangement as activated thereto, and/or otherwise fulfillment of the operation o1305. One or more non-transitory signal bearing physical media can bear the one or more instructions that when executed can direct performance of the operation o1305. Furthermore, outputting advisement information involving electricity financial cost rate schedules module m1305 depicted in FIG. 7-A as being included in the module m1301, when executed and/or activated, can direct performance of and/or perform the operation o1305. Illustratively, in one or more implementations, the operation o1305 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving one or more electricity financial cost rate schedules (e.g., outputting information regarding historical, planned, estimated or other cost data as to cost structures for electrical energy pricing from utility or onsite electrical energy resource providers, etc.).

In one or more implementations, as shown in FIG. 11-B, the operation o1301 can include operation o1306 for outputting advisement information for at least in part controlling one or more electric vehicle wireless electrical energy chargers including outputting advisement information at least in part involving one or more electricity load share capacity schedules for one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1306, for performance of the operation o1306 by an electrical circuitry arrangement as activated thereto, and/or otherwise fulfillment of the operation o1306. One or more non-transitory signal bearing physical media can bear the one or more instructions that when executed can direct performance of the operation o1306. Furthermore, outputting advisement information involving electricity load share capacity schedules for electric vehicle wireless electrical energy chargers module m1306 depicted in FIG. 7-A as being included in the module m1301, when executed and/or activated, can direct performance of and/or perform the operation o1306. Illustratively, in one or more implementations, the operation o1306 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving one or more electricity load share capacity schedules for one or more electric vehicle wireless electrical energy chargers (e.g., outputting information regarding historical, planned, or estimated use of electrical energy resource provider equipment for providing electrical energy to appliances, HVAC, industrial equipment and other demands for electrical energy including other electric vehicles, etc.).

In one or more implementations, as shown in FIG. 11-B, the operation o1301 can include operation o1307 for outputting advisement information for at least in part controlling one or more electric vehicle wireless electrical energy chargers including outputting advisement information at least in part involving electric utility capacity information passed through communication channels of one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1307, for performance of the operation o1307 by an electrical circuitry arrangement as activated thereto, and/or otherwise fulfillment of the operation o1307. One or more non-transitory signal bearing physical media can bear the one or more instructions that when executed can direct performance of the operation o1307. Furthermore, outputting advisement information involving electric utility capacity information passed through communication channels of electric vehicle wireless electrical energy chargers module m1307 depicted in FIG. 7-A as being included in the module m1301, when executed and/or activated, can direct performance of and/or perform the operation o1307. Illustratively, in one or more implementations, the operation o1307 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving electric utility capacity information passed through communication channels of one or more electric vehicle wireless electrical energy chargers (e.g., outputting information from wide area network, local area network, cellular network, point-to-point direct network communication, etc.).

In one or more implementations, as shown in FIG. 11-B, the operation o1301 can include operation o1308 for outputting advisement information for at least in part controlling one or more electric vehicle wireless electrical energy chargers including outputting advisement information at least in part involving one or more electrical energy charging appointments reserved for electrical vehicles other than one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1308, for performance of the operation o1308 by an electrical circuitry arrangement as activated thereto, and/or otherwise fulfillment of the operation o1308. One or more non-transitory signal bearing physical media can bear the one or more instructions that when executed can direct performance of the operation o1308. Furthermore, outputting advisement information involving electrical energy charging appointments reserved for electrical vehicles other than electric vehicles module m1308 depicted in FIG. 7-A as being included in the module m1301, when executed and/or activated, can direct performance of and/or perform the operation o1308. Illustratively, in one or more implementations, the operation o1308 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving one or more electrical energy charging appointments reserved for electrical vehicles other than one or more electric vehicles (e.g., outputting information associated with planned or estimated itineraries of users of electric vehicles other than one or more electric vehicles as associated with use or availability of charging stations planned or estimated to be used by one or more electric vehicles, etc.).

In one or more implementations, as shown in FIG. 11-C, the operation o1301 can include operation o1309 for outputting advisement information for at least in part controlling one or more electric vehicle wireless electrical energy chargers including outputting advisement information at least in part involving maximum charging rate capacities of one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1309, for performance of the operation o1309 by an electrical circuitry arrangement as activated thereto, and/or otherwise fulfillment of the operation o1309. One or more non-transitory signal bearing physical media can bear the one or more instructions that when executed can direct performance of the operation o1309. Furthermore, outputting advisement information involving maximum charging rate capacities of electric vehicle wireless electrical energy chargers module m1309 depicted in FIG. 7-A as being included in the module m1301, when executed and/or activated, can direct performance of and/or perform the operation o1309. Illustratively, in one or more implementations, the operation o1309 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving maximum charging rate capacities of one or more electric vehicle wireless electrical energy chargers (e.g., outputting information regarding planned, estimated, or historical maximum charging rate capacities for the electrical charging stations with regard to charging one or more electric vehicles at planned or estimated charging times given factors such as load sharing for one or more electric vehicles wireless electrical energy chargers with other stations and factors concerning interfacing of one or more electric vehicles with the stations, etc.).

In one or more implementations, as shown in FIG. 11-C, the operation o1301 can include operation o1310 for outputting advisement information for at least in part controlling one or more electric vehicle wireless electrical energy chargers including outputting advisement information at least in part involving cost information for priority handling of charging of one or more electric vehicles by one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1310, for performance of the operation o1310 by an electrical circuitry arrangement as activated thereto, and/or otherwise fulfillment of the operation o1310. One or more non-transitory signal bearing physical media can bear the one or more instructions that when executed can direct performance of the operation o1310. Furthermore, outputting advisement information involving cost information for priority handling of charging of electric vehicles by electric vehicle wireless electrical energy chargers module m1310 depicted in FIG. 7-A as being included in the module m1301, when executed and/or activated, can direct performance of and/or perform the operation o1310. Illustratively, in one or more implementations, the operation o1310 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving cost information for priority handling of charging of one or more electric vehicles by one or more electric vehicle wireless electrical energy chargers (e.g., outputting information regarding pricing for providing of electrical energy based on charge scheduling, load sharing of other energy consuming devices, and capacity of the electrical energy providing utility stations, etc.).

In one or more implementations, as shown in FIG. 11-C, the operation o1301 can include operation o1311 for outputting advisement information for at least in part controlling one or more electric vehicle wireless electrical energy chargers including outputting advisement information at least in part involving one or more electric vehicle wireless electrical energy charger availability schedules for one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1311, for performance of the operation o1311 by an electrical circuitry arrangement as activated thereto, and/or otherwise fulfillment of the operation o1311. One or more non-transitory signal bearing physical media can bear the one or more instructions that when executed can direct performance of the operation o1311. Furthermore, outputting advisement information involving electric vehicle wireless electrical energy charger availability schedules for electric vehicles module m1311 depicted in FIG. 7-B as being included in the module m1301, when executed and/or activated, can direct performance of and/or perform the operation o1311. Illustratively, in one or more implementations, the operation o1311 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving one or more electric vehicle wireless electrical energy charger availability schedules for one or more electric vehicles (e.g., outputting information regarding actual, estimated, or historical scheduling for electric vehicle wireless electrical energy chargers concerning one or more electric vehicles, users of the stations, other electric vehicles, and other users of the stations, etc.).

In one or more implementations, as shown in FIG. 11-C, the operation o1301 can include operation o1312 for outputting advisement information for at least in part controlling one or more electric vehicle wireless electrical energy chargers including outputting advisement information at least in part involving one or more histories of electrical energy consumption by one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1312, for performance of the operation o1312 by an electrical circuitry arrangement as activated thereto, and/or otherwise fulfillment of the operation o1312. One or more non-transitory signal bearing physical media can bear the one or more instructions that when executed can direct performance of the operation o1312. Furthermore, outputting advisement information involving histories of electrical energy consumption by electric vehicle wireless electrical energy chargers module m1312 depicted in FIG. 7-B as being included in the module m1301, when executed and/or activated, can direct performance of and/or perform the operation o1312. Illustratively, in one or more implementations, the operation o1312 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving one or more histories of electrical energy consumption by one or more electric vehicle wireless electrical energy chargers (e.g., outputting information regarding short term, long term, peak demand, average demand, mix of electric vehicle type, mix of user type as associated with one or more electric vehicles wireless electrical energy chargers for one or more electric vehicles, etc.).

In one or more implementations, as shown in FIG. 11-D, the operation o1301 can include operation o1313 for outputting advisement information for at least in part controlling one or more electric vehicle wireless electrical energy chargers including outputting advisement information at least in part involving electricity use data accessed through remote reporting from one or more electric utility databases. Origination of a physically tangible component group can be accomplished through skilled in the art design choice selection including use of one or more components and/or subsystems explicitly and/or implicitly referred to herein for at least in part implementing execution of one or more instructions of the operation o1313, for performance of the operation o1313 by an electrical circuitry arrangement as activated thereto, and/or otherwise fulfillment of the operation o1313. One or more non-transitory signal bearing physical media can bear the one or more instructions that when executed can direct performance of the operation o1313. Furthermore, outputting advisement information involving electricity use data accessed through remote reporting from electric utility databases module m1313 depicted in FIG. 7-B as being included in the module m1301, when executed and/or activated, can direct performance of and/or perform the operation o1313. Illustratively, in one or more implementations, the operation o1313 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving electricity use data accessed through remote reporting from one or more electric utility databases (e.g., outputting information regarding frequency of occurrence, length of time associated, profile of individual users or groups of users associated with remote reporting requests, etc.).

In one or more implementations, as shown in FIG. 11-D, the operation o1301 can include operation o1314 for outputting advisement information for at least in part controlling one or more electric vehicle wireless electrical energy chargers including outputting advisement information at least in part involving peak demand and reserve capacity of one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1314, for performance of the operation o1314 by an electrical circuitry arrangement as activated thereto, and/or otherwise fulfillment of the operation o1314. One or more non-transitory signal bearing physical media can bear the one or more instructions that when executed can direct performance of the operation o1314. Furthermore, outputting advisement information involving peak demand and reserve capacity of electric vehicle wireless electrical energy chargers module m1314 depicted in FIG. 7-B as being included in the module m1301, when executed and/or activated, can direct performance of and/or perform the operation o1314. Illustratively, in one or more implementations, the operation o1314 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving peak demand and reserve capacity of one or more electric vehicle wireless electrical energy chargers (e.g., outputting information regarding statistical data for differences in demand and capacity regarding outages, scheduled maintenance, recognized patterns of demand, recognized patterns for capacity, etc.).

In one or more implementations, as shown in FIG. 11-D, the operation o1301 can include operation o1315 for outputting advisement information for at least in part controlling one or more electric vehicle wireless electrical energy chargers including outputting advisement information at least in part involving communication with electric utility smart grid information systems with updates regarding electricity consumption from electric utility databases. Origination of a physically tangible component group can be accomplished through skilled in the art design choice selection including use of one or more components and/or subsystems explicitly and/or implicitly referred to herein for at least in part implementing execution of one or more instructions of the operation o1315, for performance of the operation o1315 by an electrical circuitry arrangement as activated thereto, and/or otherwise fulfillment of the operation o1315. One or more non-transitory signal bearing physical media can bear the one or more instructions that when executed can direct performance of the operation o1315. Furthermore, outputting advisement information involving communication with electric utility smart grid information systems with updates regarding electricity consumption from electric utility databases module m1315 depicted in FIG. 7-B as being included in the module m1301, when executed and/or activated, can direct performance of and/or perform the operation o1315. Illustratively, in one or more implementations, the operation o1315 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving communication with electric utility smart grid information systems with updates regarding electricity consumption from electric utility databases (e.g., outputting information from household appliances, from industrial equipment, from other electric vehicles, office equipment, etc. tied in with one or more electric vehicle wireless electrical energy chargers supplying charging capacity for one or more electric vehicles, etc.).

In one or more implementations, as shown in FIG. 11-D, the operation o1301 can include operation o1316 for outputting advisement information for at least in part controlling one or more electric vehicle wireless electrical energy chargers including outputting advisement information at least in part involving priority classification for electric vehicle charging scheduling requests of one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1316, for performance of the operation o1316 by an electrical circuitry arrangement as activated thereto, and/or otherwise fulfillment of the operation o1316. One or more non-transitory signal bearing physical media can bear the one or more instructions that when executed can direct performance of the operation o1316. Furthermore, outputting advisement information involving priority classification for electric vehicle charging scheduling requests of electric vehicle wireless electrical energy chargers module m1316 depicted in FIG. 7-B as being included in the module m1301, when executed and/or activated, can direct performance of and/or perform the operation o1316. Illustratively, in one or more implementations, the operation o1316 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving priority classification for electric vehicle charging scheduling requests of one or more electric vehicle wireless electrical energy chargers (e.g., outputting information regarding historical, planned, or estimated use by electric vehicles other than one or more electric vehicles of electric vehicle wireless electrical energy chargers historically, planned, or estimated to be used by one or more electric vehicles, etc.).

In one or more implementations, as shown in FIG. 11-E, the operation o1301 can include operation o1317 for outputting advisement information for at least in part controlling one or more electric vehicle wireless electrical energy chargers including outputting advisement information at least in part involving one or more electric vehicle user profile classifications. Origination of a physically tangible component group can be accomplished through skilled in the art design choice selection including use of one or more components and/or subsystems explicitly and/or implicitly referred to herein for at least in part implementing execution of one or more instructions of the operation o1317, for performance of the operation o1317 by an electrical circuitry arrangement as activated thereto, and/or otherwise fulfillment of the operation o1317. One or more non-transitory signal bearing physical media can bear the one or more instructions that when executed can direct performance of the operation o1317. Furthermore, outputting advisement information involving electric vehicle user profile classifications module m1317 depicted in FIG. 7-B as being included in the module m1301, when executed and/or activated, can direct performance of and/or perform the operation o1317. Illustratively, in one or more implementations, the operation o1317 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving one or more electric vehicle user profile classifications (e.g., outputting information regarding user profiles associated with employment information, benefits information, electric vehicle use information, user demographic information, user geographic information, etc.).

In one or more implementations, as shown in FIG. 11-E, the operation o1301 can include operation o1318 for outputting advisement information for at least in part controlling one or more electric vehicle wireless electrical energy chargers including outputting advisement information at least in part involving electrical energy use of associated local grid electrical energy provider resources for other than charging of one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1318, for performance of the operation o1318 by an electrical circuitry arrangement as activated thereto, and/or otherwise fulfillment of the operation o1318. One or more non-transitory signal bearing physical media can bear the one or more instructions that when executed can direct performance of the operation o1318. Furthermore, outputting advisement information involving electrical energy use of associated local grid electrical energy provider resources for other than charging of electric vehicles module m1318 depicted in FIG. 7-C as being included in the module m1301, when executed and/or activated, can direct performance of and/or perform the operation o1318. Illustratively, in one or more implementations, the operation o1318 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving electrical energy use of associated local grid electrical energy provider resources for other than charging of one or more electric vehicles (e.g., outputting information overall household electrical energy demand, overall industrial electrical energy demand, overall office electrical energy demand, overall service provider electrical energy demand as associated with local electrical grid facilities of one or more charging stations for one or more electric vehicles, etc.).

In one or more implementations, as shown in FIG. 11-E, the operation o1301 can include operation o1319 for outputting advisement information for at least in part controlling one or more electric vehicle wireless electrical energy chargers including outputting advisement information at least in part involving one or more plans for charging of second one or more electric vehicles other than one or more first electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1319, for performance of the operation o1319 by an electrical circuitry arrangement as activated thereto, and/or otherwise fulfillment of the operation o1319. One or more non-transitory signal bearing physical media can bear the one or more instructions that when executed can direct performance of the operation o1319. Furthermore, outputting advisement information involving plans for charging of second electric vehicles other than first electric vehicles module m1319 depicted in FIG. 7-C as being included in the module m1301, when executed and/or activated, can direct performance of and/or perform the operation o1319. Illustratively, in one or more implementations, the operation o1319 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving one or more plans for charging of second one or more electric vehicles other than one or more first electric vehicles (e.g., outputting information as associated with planned or estimated travel for users of electric vehicles other than one or more electric vehicles, etc.).

In one or more implementations, as shown in FIG. 11-E, the operation o1301 can include operation o1320 for outputting advisement information for at least in part controlling one or more electric vehicle wireless electrical energy chargers including outputting advisement information at least in part involving one or more technical specifications of one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1320, for performance of the operation o1320 by an electrical circuitry arrangement as activated thereto, and/or otherwise fulfillment of the operation o1320. One or more non-transitory signal bearing physical media can bear the one or more instructions that when executed can direct performance of the operation o1320. Furthermore, outputting advisement information involving technical specifications of electric vehicle wireless electrical energy chargers module m1320 depicted in FIG. 7-C as being included in the module m1301, when executed and/or activated, can direct performance of and/or perform the operation o1320. Illustratively, in one or more implementations, the operation o1320 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving one or more technical specifications of one or more electric vehicle wireless electrical energy chargers (e.g., outputting information regarding electromagnetic frequencies used for wireless transfer of electrical energy, electrical energy peak and sustained charging rates available, associated equipment capability standards, etc.).

In one or more implementations, as shown in FIG. 11-E, the operation o1301 can include operation o1321 for outputting advisement information for at least in part controlling one or more electric vehicle wireless electrical energy chargers including outputting advisement information at least in part involving computer network communication linking one or more electric vehicle wireless electrical energy chargers. Origination of a physically tangible component group can be accomplished through skilled in the art design choice selection including use of one or more components and/or subsystems explicitly and/or implicitly referred to herein for at least in part implementing execution of one or more instructions of the operation o1321, for performance of the operation o1321 by an electrical circuitry arrangement as activated thereto, and/or otherwise fulfillment of the operation o1321. One or more non-transitory signal bearing physical media can bear the one or more instructions that when executed can direct performance of the operation o1321. Furthermore, outputting advisement information involving computer network communication linking electric vehicle wireless electrical energy chargers module m1321 depicted in FIG. 7-C as being included in the module m1301, when executed and/or activated, can direct performance of and/or perform the operation o1321. Illustratively, in one or more implementations, the operation o1321 can be carried out, for example, by outputting advisement information for at least in part controlling one or more electric vehicle wireless electrical energy chargers (e.g., outputting information regarding planned or estimated one or more electromagnetic frequencies, energy transfer rates available, positioning of wireless energy transmitters, etc.) including outputting advisement information at least in part involving computer network communication linking one or more electric vehicle wireless electrical energy chargers (e.g., outputting information associated with communication sent over wired, wireless, packetized, cellular, direct point-to-point, or other computer network communication systems, etc.).

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The one or more instructions discussed herein may be, for example, computer executable and/or logic-implemented instructions. In some implementations, signal-bearing medium as articles of manufacture may store the one or more instructions. In some implementations, the signal bearing medium may include a computer-readable medium. In some implementations, the signal-bearing medium may include a recordable medium. In some implementations, the signal-bearing medium may include a communication medium.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture (limited to patentable subject matter under 35 USC 101). Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof (limited to patentable subject matter under 35 U.S.C. 101). In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure (limited to patentable subject matter under 35 USC 101). In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution.

Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, (e.g., transmitter, receiver, transmission logic, reception logic, etc.), etc.).

Electro-Mechanical System Support

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

Electrical Circuitry Support

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Image Processing System Support

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Data Processing System Support

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Software as Patentable Subject Matter Support

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very High Speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Mote System Support

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Licensing System Support Language

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

Extraterritorial Use Language

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Residual Incorporation Language

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

Not Limited to Implementations Described Language

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Not Limited to Human User Language

Although user XXX is shown/described herein as a single illustrated figure, those skilled in the art will appreciate that user XXX may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

Plural Terms Language

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

Operably-Coupled Language

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Active/Inactive Component Language

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

Cloud Computing Standard Language

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scalable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Use of Trademarks in Specification Language

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Caselaw-Driven Clarification Language

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system, comprising:
one or more electronically evaluating electricity generation factors for providing electrical energy for wirelessly charging electric vehicle wireless charging modules configured to operate in accordance with electronically evaluating one or more electricity generation factors for providing electrical energy for wirelessly charging electric vehicle wireless charging;
one or more electronically soliciting wireless electrical charger plans for electric vehicle charging associated with anticipated events involving electric vehicle wireless charging modules configured to operate in accordance with electronically soliciting one or more wireless electrical charger plans for electric vehicle charging associated with anticipated events involving electric vehicle wireless charging; and
one or more electronically producing wireless electrical charger operational directives to provide to wireless electrical chargers from the evaluating of the electricity generation factors and from the solicited wireless electric vehicle plans modules configured to operate in accordance with electronically producing wireless electrical charger operational directives to provide to one or more wireless electrical chargers at least from the evaluating of the one or more electricity generation factors and from the solicited one or more wireless electric vehicle plans.

2. The system of claim 1, wherein the one or more electronically evaluating electricity generation factors for providing electrical energy for wirelessly charging electric vehicle wireless charging modules configured to operate in accordance with electronically evaluating one or more electricity generation factors for providing electrical energy for wirelessly charging electric vehicle wireless charging comprises:
one or more evaluating electricity generation factors regarding providing electrical energy associated with providing electrical energy to electric vehicle wireless energy chargers modules configured to operate in accordance with electronically evaluating one or more electricity generation factors for providing electrical energy for wirelessly charging electric vehicle wireless charging including evaluating electricity generation factors regarding providing electrical energy associated with providing electrical energy to one or more electric vehicle wireless energy chargers.

3. The system of claim 2, wherein the one or more evaluating electricity generation factors regarding providing electrical energy associated with providing electrical energy to electric vehicle wireless energy chargers modules configured to operate in accordance with electronically evaluating one or more electricity generation factors for providing electrical energy for wirelessly charging electric vehicle wireless charging including evaluating electricity generation factors regarding providing electrical energy associated with providing electrical energy to one or more electric vehicle wireless energy chargers comprises:
one or more evaluating factors regarding providing electrical energy according to schedules involving time periods to switch from use of a first electricity production center to a second electricity production center modules configured to operate in accordance with evaluating electricity generation factors regarding providing electrical energy associated with providing electrical energy to one or more electric vehicle wireless energy chargers including evaluating factors regarding providing electrical energy according to one or more schedules involving one or more time periods to switch from use of a first electricity production center to a second electricity production center.

4. The system of claim 3, wherein the one or more evaluating factors regarding providing electrical energy according to schedules involving time periods to switch from use of a first electricity production center to a second electricity production center modules configured to operate in accordance with evaluating electricity generation factors regarding providing electrical energy associated with providing electrical energy to one or more electric vehicle wireless energy chargers including evaluating factors regarding providing electrical energy according to one or more schedules involving one or more time periods to switch from use of a first electricity production center to a second electricity production center comprises:
one or more evaluating factors regarding providing electrical energy according to schedules for generating electricity by an electricity production center located on location of electric vehicle wireless charging modules configured to operate in accordance with evaluating factors regarding providing electrical energy according to one or more schedules involving one or more time periods to switch from use of a first electricity production center to a second electricity production center including evaluating factors regarding providing electrical energy according to one or more schedules for at least in part generating electricity by an electricity production center located on location of electric vehicle wireless charging.

5. The system of claim 2, wherein the one or more evaluating electricity generation factors regarding providing electrical energy associated with providing electrical energy to electric vehicle wireless energy chargers modules configured to operate in accordance with electronically evaluating one or more electricity generation factors for providing electrical energy for wirelessly charging electric vehicle wireless charging including evaluating electricity generation factors regarding providing electrical energy associated with providing electrical energy to one or more electric vehicle wireless energy chargers comprises:

one or more evaluating factors regarding providing electrical energy according to financial status information for user accounts of electric vehicle wireless charging modules configured to operate in accordance with evaluating electricity generation factors regarding providing electrical energy associated with providing electrical energy to one or more electric vehicle wireless energy chargers including evaluating factors regarding providing electrical energy according to financial status information for one or more user accounts of electric vehicle wireless charging.

6. The system of claim 2, wherein the one or more evaluating electricity generation factors regarding providing electrical energy associated with providing electrical energy to electric vehicle wireless energy chargers modules configured to operate in accordance with electronically evaluating one or more electricity generation factors for providing electrical energy for wirelessly charging electric vehicle wireless charging including evaluating electricity generation factors regarding providing electrical energy associated with providing electrical energy to one or more electric vehicle wireless energy chargers comprises:

one or more evaluating factors regarding providing electrical energy according to planned use of electricity production centers to service estimated charging service demand of electric vehicle wireless charging modules configured to operate in accordance with evaluating electricity generation factors regarding providing electrical energy associated with providing electrical energy to one or more electric vehicle wireless energy chargers including evaluating factors regarding providing electrical energy according to planned use of one or more electricity production centers to service estimated charging service demand of electric vehicle wireless charging.

7. The system of claim 2, wherein the one or more evaluating electricity generation factors regarding providing electrical energy associated with providing electrical energy to electric vehicle wireless energy chargers modules configured to operate in accordance with electronically evaluating one or more electricity generation factors for providing electrical energy for wirelessly charging electric vehicle wireless charging including evaluating electricity generation factors regarding providing electrical energy associated with providing electrical energy to one or more electric vehicle wireless energy chargers comprises:

one or more evaluating factors regarding providing electrical energy according to approval of consumer profile of users of electric vehicle wireless charging modules configured to operate in accordance with evaluating electricity generation factors regarding providing electrical energy associated with providing electrical energy to one or more electric vehicle wireless energy chargers including evaluating factors regarding providing electrical energy according to approval of consumer profile of one or more users of electric vehicle wireless charging.

8. The system of claim 2, wherein the one or more evaluating electricity generation factors regarding providing electrical energy associated with providing electrical energy to electric vehicle wireless energy chargers modules configured to operate in accordance with electronically evaluating one or more electricity generation factors for providing electrical energy for wirelessly charging electric vehicle wireless charging including evaluating electricity generation factors regarding providing electrical energy associated with providing electrical energy to one or more electric vehicle wireless energy chargers comprises:

one or more evaluating factors regarding providing electrical energy according to impact from planned schedule for providing electrical energy by electrical energy production upon itinerary and route information associated with electric vehicle wireless charging modules configured to operate in accordance with evaluating electricity generation factors regarding providing electrical energy associated with providing electrical energy to one or more electric vehicle wireless energy chargers including evaluating factors regarding providing electrical energy according to impact from planned schedule for providing electrical energy by electrical energy production upon itinerary and route information associated with electric vehicle wireless charging.

9. The system of claim 1, wherein the one or more electronically soliciting wireless electrical charger plans for electric vehicle charging associated with anticipated events involving electric vehicle wireless charging modules configured to operate in accordance with electronically soliciting one or more wireless electrical charger plans for electric vehicle charging associated with anticipated events involving electric vehicle wireless charging comprises:

one or more soliciting plans of involving overt action by electric vehicle charging modules configured to operate in accordance with electronically soliciting one or more wireless electrical charger plans for electric vehicle charging associated with anticipated events involving electric vehicle wireless charging including soliciting plans of at least in part involving overt action by electric vehicle charging.

10. The system of claim 9, wherein the one or more soliciting plans of involving overt action by electric vehicle charging modules configured to operate in accordance with electronically soliciting one or more wireless electrical charger plans for electric vehicle charging associated with anticipated events involving electric vehicle wireless charging including soliciting plans of at least in part involving overt action by electric vehicle charging comprises:

one or more soliciting plans of involving electronic calendaring systems modules configured to operate in accordance with soliciting plans of at least in part involving overt action by electric vehicle charging including soliciting plans of at least in part involving one or more electronic calendaring systems.

11. The system of claim 9, wherein the one or more soliciting plans of involving overt action by electric vehicle charging modules configured to operate in accordance with electronically soliciting one or more wireless electrical charger plans for electric vehicle charging associated with anticipated events involving electric vehicle wireless charging including soliciting plans of at least in part involving overt action by electric vehicle charging comprises:
  one or more soliciting plans of involving overt action by electric vehicle charging including soliciting plans of involving monitoring cell phone conversations modules configured to operate in accordance with soliciting plans of at least in part involving overt action by electric vehicle charging including soliciting plans of at least in part involving monitoring one or more cell phone conversations.

12. The system of claim 9, wherein the one or more soliciting plans of involving overt action by electric vehicle charging modules configured to operate in accordance with electronically soliciting one or more wireless electrical charger plans for electric vehicle charging associated with anticipated events involving electric vehicle wireless charging including soliciting plans of at least in part involving overt action by electric vehicle charging comprises:
  one or more soliciting plans of involving data access to e-mail systems modules configured to operate in accordance with soliciting plans of at least in part involving overt action by electric vehicle charging including soliciting plans of at least in part involving data access to one or more e-mail systems.

13. The system of claim 9, wherein the one or more soliciting plans of involving overt action by electric vehicle charging modules configured to operate in accordance with electronically soliciting one or more wireless electrical charger plans for electric vehicle charging associated with anticipated events involving electric vehicle wireless charging including soliciting plans of at least in part involving overt action by electric vehicle charging comprises:
  one or more soliciting plans of involving electronic queries of historical vehicle use records modules configured to operate in accordance with soliciting plans of at least in part involving overt action by electric vehicle charging including soliciting plans of at least in part involving one or more electronic queries of historical vehicle use records.

14. The system of claim 9, wherein the one or more soliciting plans of involving overt action by electric vehicle charging modules configured to operate in accordance with electronically soliciting one or more wireless electrical charger plans for electric vehicle charging associated with anticipated events involving electric vehicle wireless charging including soliciting plans of at least in part involving overt action by electric vehicle charging comprises:
  one or more soliciting plans of involving electric vehicle electronic sensors modules configured to operate in accordance with soliciting plans of at least in part involving overt action by electric vehicle charging including soliciting plans of at least in part involving one or more electric vehicle electronic sensors.

15. The system of claim 1, wherein the one or more electronically soliciting wireless electrical charger plans for electric vehicle charging associated with anticipated events involving electric vehicle wireless charging modules configured to operate in accordance with electronically soliciting one or more wireless electrical charger plans for electric vehicle charging associated with anticipated events involving electric vehicle wireless charging comprises:
  one or more soliciting plans of involving electric vehicle charging modules configured to operate in accordance with electronically soliciting one or more wireless electrical charger plans for electric vehicle charging associated with anticipated events involving electric vehicle wireless charging including soliciting plans of at least in part involving electric vehicle charging.

16. The system of claim 15, wherein the one or more soliciting plans of involving electric vehicle charging modules configured to operate in accordance with electronically soliciting one or more wireless electrical charger plans for electric vehicle charging associated with anticipated events involving electric vehicle wireless charging including soliciting plans of at least in part involving electric vehicle charging comprises:
  one or more soliciting plans of involving participants of electric vehicle wireless charging to use electrical energy from a local electrical grid access point of electrical energy production modules configured to operate in accordance with soliciting plans of at least in part involving electric vehicle charging including soliciting plans of at least in part involving one or more participants of electric vehicle wireless charging to use electrical energy from a local electrical grid access point of electrical energy production.

17. The system of claim 15, wherein the one or more soliciting plans of involving electric vehicle charging modules configured to operate in accordance with electronically soliciting one or more wireless electrical charger plans for electric vehicle charging associated with anticipated events involving electric vehicle wireless charging including soliciting plans of at least in part involving electric vehicle charging comprises:
  one or more soliciting plans of involving actual recorded electric vehicle charging compared with planned electric vehicle charging modules configured to operate in accordance with soliciting plans of at least in part involving electric vehicle charging including soliciting plans of at least in part involving actual recorded electric vehicle charging compared with planned electric vehicle charging.

18. The system of claim 15, wherein the one or more soliciting plans of involving electric vehicle charging modules configured to operate in accordance with electronically soliciting one or more wireless electrical charger plans for electric vehicle charging associated with anticipated events involving electric vehicle wireless charging including soliciting plans of at least in part involving electric vehicle charging comprises:
  one or more soliciting plans of involving recorded driving patterns associated with electric vehicle drivers modules configured to operate in accordance with soliciting plans of at least in part involving electric vehicle charging including soliciting plans of at least in part involving recorded driving patterns associated with one or more electric vehicle drivers.

19. The system of claim 15, wherein the one or more soliciting plans of involving electric vehicle charging modules configured to operate in accordance with electronically soliciting one or more wireless electrical charger plans for electric vehicle charging associated with anticipated events involving electric vehicle wireless charging including soliciting plans of at least in part involving electric vehicle charging comprises:

one or more soliciting plans of involving priorities distributed among planned electric vehicle charging modules configured to operate in accordance with soliciting plans of at least in part involving electric vehicle charging including soliciting plans of at least in part involving one or more priorities distributed among planned electric vehicle charging.

20. The system of claim 15, wherein the one or more soliciting plans of involving electric vehicle charging modules configured to operate in accordance with electronically soliciting one or more wireless electrical charger plans for electric vehicle charging associated with anticipated events involving electric vehicle wireless charging including soliciting plans of at least in part involving electric vehicle charging comprises:

one or more soliciting plans of involving merged plans of multiple planned electric vehicle wireless charging modules configured to operate in accordance with soliciting plans of at least in part involving electric vehicle charging including soliciting plans of at least in part involving merged plans of multiple planned electric vehicle wireless charging.

21. The system of claim 1, wherein the one or more electronically soliciting wireless electrical charger plans for electric vehicle charging associated with anticipated events involving electric vehicle wireless charging modules configured to operate in accordance with electronically soliciting one or more wireless electrical charger plans for electric vehicle charging associated with anticipated events involving electric vehicle wireless charging comprises:

one or more soliciting plans of involving electric vehicle features modules configured to operate in accordance with electronically soliciting one or more wireless electrical charger plans for electric vehicle charging associated with anticipated events involving electric vehicle wireless charging including soliciting plans of at least in part involving one or more electric vehicle features.

22. The system of claim 21, wherein the one or more soliciting plans of involving electric vehicle features modules configured to operate in accordance with electronically soliciting one or more wireless electrical charger plans for electric vehicle charging associated with anticipated events involving electric vehicle wireless charging including soliciting plans of at least in part involving one or more electric vehicle features comprises:

one or more soliciting plans of involving maintenance schedules for electric vehicle wireless charging modules configured to operate in accordance with soliciting plans of at least in part involving one or more electric vehicle features including soliciting plans of at least in part involving one or more maintenance schedules for electric vehicle wireless charging.

23. The system of claim 21, wherein the one or more soliciting plans of involving electric vehicle features modules configured to operate in accordance with electronically soliciting one or more wireless electrical charger plans for electric vehicle charging associated with anticipated events involving electric vehicle wireless charging including soliciting plans of at least in part involving one or more electric vehicle features comprises:

one or more soliciting plans of involving specifications of second electric vehicles other than first electric vehicles, the second electric vehicles involved with plans to receive electric energy transfer from electrical equipment shared with the first electric vehicles modules configured to operate in accordance with soliciting plans of at least in part involving one or more electric vehicle features including soliciting plans of at least in part involving specifications of one or more second electric vehicles other than one or more first electric vehicles, the one or more second electric vehicles involved with plans to receive electric energy transfer from electrical equipment shared with the one or more first electric vehicles.

24. The system of claim 21, wherein the one or more soliciting plans of involving electric vehicle features modules configured to operate in accordance with electronically soliciting one or more wireless electrical charger plans for electric vehicle charging associated with anticipated events involving electric vehicle wireless charging including soliciting plans of at least in part involving one or more electric vehicle features comprises:

one or more soliciting plans of involving electric vehicle wireless charging including to receive electrical energy transfer through field magnetic resonance induction modules configured to operate in accordance with soliciting plans of at least in part involving one or more electric vehicle features including soliciting plans of at least in part involving electric vehicle wireless charging including to receive electrical energy transfer through field magnetic resonance induction.

25. The system of claim 1, wherein the one or more electronically soliciting wireless electrical charger plans for electric vehicle charging associated with anticipated events involving electric vehicle wireless charging modules configured to operate in accordance with electronically soliciting one or more wireless electrical charger plans for electric vehicle charging associated with anticipated events involving electric vehicle wireless charging comprises:

one or more soliciting plans of involving user preferences of location for energy transfer for electric vehicle wireless charging modules configured to operate in accordance with electronically soliciting one or more wireless electrical charger plans for electric vehicle charging associated with anticipated events involving electric vehicle wireless charging including soliciting plans of at least in part involving one or more user preferences of location for energy transfer for electric vehicle wireless charging.

26. The system of claim 25, wherein the one or more soliciting plans of involving user preferences of location for energy transfer for electric vehicle wireless charging modules configured to operate in accordance with electronically soliciting one or more wireless electrical charger plans for electric vehicle charging associated with anticipated events involving electric vehicle wireless charging including soliciting plans of at least in part involving one or more user preferences of location for energy transfer for electric vehicle wireless charging comprises:

one or more soliciting plans of involving user preferences of location other than home locations of electric vehicle wireless charging modules configured to operate in accordance with soliciting plans of at least in part involving one or more user preferences of location for energy transfer for electric vehicle wireless charging including soliciting plans of at least in part involving one or more user preferences of location other than one or more home locations of electric vehicle wireless charging.

27. The system of claim 25, wherein the one or more soliciting plans of involving user preferences of location for energy transfer for electric vehicle wireless charging modules configured to operate in accordance with electronically soliciting one or more wireless electrical charger plans for electric vehicle charging associated with anticipated events involving electric vehicle wireless charging including soliciting plans of at least in part involving one or more user preferences of location for energy transfer for electric vehicle wireless charging comprises:

one or more soliciting plans of involving user preferences of location for electric vehicle wireless charging at locations on planned routes of travel associated with electric vehicle wireless charging modules configured to operate in accordance with soliciting plans of at least in part involving one or more user preferences of location for energy transfer for electric vehicle wireless charging including soliciting plans of at least in part involving one or more user preferences of location for electric vehicle wireless charging at one or more locations on one or more planned routes of travel associated with electric vehicle wireless charging.

28. The system of claim 25, wherein the one or more soliciting plans of involving user preferences of location for energy transfer for electric vehicle wireless charging modules configured to operate in accordance with electronically soliciting one or more wireless electrical charger plans for electric vehicle charging associated with anticipated events involving electric vehicle wireless charging including soliciting plans of at least in part involving one or more user preferences of location for energy transfer for electric vehicle wireless charging comprises:

one or more soliciting plans of involving user preferences of location for electric vehicle wireless charging at park and ride locations modules configured to operate in accordance with soliciting plans of at least in part involving one or more user preferences of location for energy transfer for electric vehicle wireless charging including soliciting plans of at least in part involving one or more user preferences of location for electric vehicle wireless charging at one or more park and ride locations.

29. The system of claim 25, wherein the one or more soliciting plans of involving user preferences of location for energy transfer for electric vehicle wireless charging modules configured to operate in accordance with electronically soliciting one or more wireless electrical charger plans for electric vehicle charging associated with anticipated events involving electric vehicle wireless charging including soliciting plans of at least in part involving one or more user preferences of location for energy transfer for electric vehicle wireless charging comprises:

one or more soliciting plans of involving user preferences of location for electric vehicle wireless charging at parking garage locations modules configured to operate in accordance with soliciting plans of at least in part involving one or more user preferences of location for energy transfer for electric vehicle wireless charging including soliciting plans of at least in part involving one or more user preferences of location for electric vehicle wireless charging at one or more parking garage locations.

30. The system of claim 25, wherein the one or more soliciting plans of involving user preferences of location for energy transfer for electric vehicle wireless charging modules configured to operate in accordance with electronically soliciting one or more wireless electrical charger plans for electric vehicle charging associated with anticipated events involving electric vehicle wireless charging including soliciting plans of at least in part involving one or more user preferences of location for energy transfer for electric vehicle wireless charging comprises:

one or more soliciting plans of involving user preferences of location for electric vehicle wireless charging at static charging locations along routes of travel modules configured to operate in accordance with soliciting plans of at least in part involving one or more user preferences of location for energy transfer for electric vehicle wireless charging including soliciting plans of at least in part involving one or more user preferences of location for electric vehicle wireless charging at one or more static charging locations along one or more routes of travel.

31. The system of claim 25, wherein the one or more soliciting plans of involving user preferences of location for energy transfer for electric vehicle wireless charging modules configured to operate in accordance with electronically soliciting one or more wireless electrical charger plans for electric vehicle charging associated with anticipated events involving electric vehicle wireless charging including soliciting plans of at least in part involving one or more user preferences of location for energy transfer for electric vehicle wireless charging comprises:

one or more soliciting plans of involving user preferences of location for electric vehicle wireless charging at locations for electric vehicle mechanical maintenance modules configured to operate in accordance with soliciting plans of at least in part involving one or more user preferences of location for energy transfer for electric vehicle wireless charging including soliciting plans of at least in part involving one or more user preferences of location for electric vehicle wireless charging at one or more locations for electric vehicle mechanical maintenance.

32. The system of claim 25, wherein the one or more soliciting plans of involving user preferences of location for energy transfer for electric vehicle wireless charging modules configured to operate in accordance with electronically soliciting one or more wireless electrical charger plans for electric vehicle charging associated with anticipated events involving electric vehicle wireless charging including soliciting plans of at least in part involving one or more user preferences of location for energy transfer for electric vehicle wireless charging comprises:

one or more soliciting plans of involving preferences for contingency plans for unplanned unavailability of electric vehicle wireless charging modules configured to operate in accordance with soliciting plans of at least in part involving one or more user preferences of location for energy transfer for electric vehicle wireless charging including soliciting plans of at least in part involving one or more preferences for contingency plans for unplanned unavailability of electric vehicle wireless charging.

33. The system of claim 1, wherein the one or more electronically producing wireless electrical charger operational directives to provide to wireless electrical chargers from the evaluating of the electricity generation factors and from the solicited wireless electric vehicle plans modules configured to operate in accordance with electronically producing wireless electrical charger operational directives to provide to one or more wireless electrical chargers at least from the evaluating of the one or more electricity generation factors and from the solicited one or more wireless electric vehicle plans comprises:

one or more producing operational directives with respect to aspects regarding electric vehicle wireless charging modules configured to operate in accordance with electronically producing wireless electrical charger operational directives to provide to one or more wireless electrical chargers at least from the evaluating of the one or more electricity generation factors and from the solicited one or more wireless electric vehicle plans including producing operational directives with respect to aspects regarding electric vehicle wireless charging.

34. The system of claim 33, wherein the one or more producing operational directives with respect to aspects regarding electric vehicle wireless charging modules configured to operate in accordance with electronically producing wireless electrical charger operational directives to provide to one or more wireless electrical chargers at least from the evaluating of the one or more electricity generation factors and from the solicited one or more wireless electric vehicle plans including producing operational directives with respect to aspects regarding electric vehicle wireless charging comprises:

one or more including producing operational directives involving schedules for electrical load sharing associated with electric vehicle wireless charging modules configured to operate in accordance with producing operational directives with respect to aspects regarding electric vehicle wireless charging including producing operational directives at least in part involving one or more schedules for electrical load sharing associated with electric vehicle wireless charging.

35. The system of claim 33, wherein the one or more producing operational directives with respect to aspects regarding electric vehicle wireless charging modules configured to operate in accordance with electronically producing wireless electrical charger operational directives to provide to one or more wireless electrical chargers at least from the evaluating of the one or more electricity generation factors and from the solicited one or more wireless electric vehicle plans including producing operational directives with respect to aspects regarding electric vehicle wireless charging comprises:

one or more producing operational directives involving consumer incentive programs associated with electricity cost schedules modules configured to operate in accordance with producing operational directives with respect to aspects regarding electric vehicle wireless charging including producing operational directives at least in part involving one or more consumer incentive programs associated with one or more electricity cost schedules.

36. The system of claim 33, wherein the one or more producing operational directives with respect to aspects regarding electric vehicle wireless charging modules configured to operate in accordance with electronically producing wireless electrical charger operational directives to provide to one or more wireless electrical chargers at least from the evaluating of the one or more electricity generation factors and from the solicited one or more wireless electric vehicle plans including producing operational directives with respect to aspects regarding electric vehicle wireless charging comprises:

one or more producing operational directives involving electric utility capacity information passed through communication channels associated with electric vehicle wireless charging modules configured to operate in accordance with producing operational directives with respect to aspects regarding electric vehicle wireless charging including producing operational directives at least in part involving electric utility capacity information passed through communication channels associated with electric vehicle wireless charging.

37. The system of claim 33, wherein the one or more producing operational directives with respect to aspects regarding electric vehicle wireless charging modules configured to operate in accordance with electronically producing wireless electrical charger operational directives to provide to one or more wireless electrical chargers at least from the evaluating of the one or more electricity generation factors and from the solicited one or more wireless electric vehicle plans including producing operational directives with respect to aspects regarding electric vehicle wireless charging comprises:

one or more producing operational directives involving electrical energy charging appointments modules configured to operate in accordance with producing operational directives with respect to aspects regarding electric vehicle wireless charging including producing operational directives at least in part involving one or more electrical energy charging appointments.

38. The system of claim 33, wherein the one or more producing operational directives with respect to aspects regarding electric vehicle wireless charging modules configured to operate in accordance with electronically producing wireless electrical charger operational directives to provide to one or more wireless electrical chargers at least from the evaluating of the one or more electricity generation factors and from the solicited one or more wireless electric vehicle plans including producing operational directives with respect to aspects regarding electric vehicle wireless charging comprises:

one or more producing operational directives involving histories of electrical energy consumption for electric vehicle wireless charging modules configured to operate in accordance with producing operational directives with respect to aspects regarding electric vehicle wireless charging including producing operational directives at least in part involving one or more histories of electrical energy consumption for electric vehicle wireless charging.

39. The system of claim 33, wherein the one or more producing operational directives with respect to aspects regarding electric vehicle wireless charging modules configured to operate in accordance with electronically producing wireless electrical charger operational directives to provide to one or more wireless electrical chargers at least from the evaluating of the one or more electricity generation factors and from the solicited one or more wireless electric vehicle plans including producing operational directives with respect to aspects regarding electric vehicle wireless charging comprises:

one or more producing operational directives involving electricity use data accessed through remote reporting from electric utility databases modules configured to operate in accordance with producing operational directives with respect to aspects regarding electric vehicle wireless charging including producing operational directives at least in part involving electricity use data accessed through remote reporting from one or more electric utility databases.

40. The system of claim 33, wherein the one or more producing operational directives with respect to aspects regarding electric vehicle wireless charging modules configured to operate in accordance with electronically producing wireless electrical charger operational directives to provide to one or more wireless electrical chargers at least from the evaluating of the one or more electricity generation factors and from the solicited one or more wireless electric vehicle plans including producing operational directives with respect to aspects regarding electric vehicle wireless charging comprises:

one or more producing operational directives involving communication with electric utility smart grid information systems with updates regarding electricity consumption from electric utility databases modules configured to operate in accordance with producing operational directives with respect to aspects regarding electric vehicle wireless charging including producing operational directives at least in part involving communication with electric utility smart grid information systems with updates regarding electricity consumption from electric utility databases.

41. The system of claim 33, wherein the one or more producing operational directives with respect to aspects regarding electric vehicle wireless charging modules configured to operate in accordance with electronically producing wireless electrical charger operational directives to provide to one or more wireless electrical chargers at least from the evaluating of the one or more electricity generation factors and from the solicited one or more wireless electric vehicle plans including producing operational directives with respect to aspects regarding electric vehicle wireless charging comprises:

one or more producing operational directives involving electrical energy use of associated local grid electrical energy provider resources for electric vehicle wireless charging modules configured to operate in accordance with producing operational directives with respect to aspects regarding electric vehicle wireless charging including producing operational directives at least in part involving electrical energy use of associated local grid electrical energy provider resources for electric vehicle wireless charging.

42. An article of manufacture comprising:
one or more non-transitory signal bearing storage media bearing:
    one or more electronically evaluating electricity generation factors for providing electrical energy for wirelessly charging electric vehicle wireless charging instructions for electronically evaluating one or more electricity generation factors for providing electrical energy for wirelessly charging electric vehicle wireless charging;
    one or more electronically soliciting wireless electrical charger plans for electric vehicle charging associated with anticipated events involving electric vehicle wireless charging instructions for electronically soliciting one or more wireless electrical charger plans for electric vehicle charging associated with anticipated events involving electric vehicle wireless charging; and
    one or more electronically producing wireless electrical charger operational directives to provide to wireless electrical chargers from the evaluating of the electricity generation factors and from the solicited wireless electric vehicle plans instructions for electronically producing wireless electrical charger operational directives to provide to one or more wireless electrical chargers at least from the evaluating of the one or more electricity generation factors and from the solicited one or more wireless electric vehicle plans.

43. A system comprising:
one or more computing devices; and
one or more instructions when executed on the one or more computing devices cause the one or more computing devices to perform
electronically evaluating one or more electricity generation factors for providing electrical energy for wirelessly charging electric vehicle wireless charging;
electronically soliciting one or more wireless electrical charger plans for electric vehicle charging associated with anticipated events involving electric vehicle wireless charging; and
electronically producing wireless electrical charger operational directives to provide to one or more wireless electrical chargers at least from the evaluating of the one or more electricity generation factors and from the solicited one or more wireless electric vehicle plans.

* * * * *